United States Patent
Smith et al.

(10) Patent No.: US 12,242,267 B2
(45) Date of Patent: Mar. 4, 2025

(54) SYSTEMS AND METHODS FOR AUTOMATED OPERATION AND HANDLING OF AUTONOMOUS TRUCKS AND TRAILERS HAULED THEREBY

(71) Applicant: Outrider Technologies, Inc., Brighton, CO (US)

(72) Inventors: Andrew F. Smith, Bend, OR (US); Lawrence S. Klein, Bend, OR (US); Stephen A. Langenderfer, Bend, OR (US); Martin E. Sotola, Boulder, CO (US); Vikas Bahl, Highlands Ranch, CO (US); Mark H. Rosenblum, Denver, CO (US); Peter James, Denver, CO (US); Dale Dee Rowley, Highlands Ranch, CO (US); Matthew S. Johannes, Arvada, CO (US); Gary Michael Seminara, Golden, CO (US); Jeremy M. Nett, Littleton, CO (US)

(73) Assignee: Outrider Technologies, Inc., Brighton, CO (US)

( * ) Notice: Subject to any disclaimer, the term of this patent is extended or adjusted under 35 U.S.C. 154(b) by 0 days.

(21) Appl. No.: 18/244,657

(22) Filed: Sep. 11, 2023

(65) Prior Publication Data
US 2023/0418289 A1 Dec. 28, 2023

Related U.S. Application Data

(63) Continuation of application No. 17/409,623, filed on Aug. 23, 2021, now Pat. No. 11,755,013, which is a
(Continued)

(51) Int. Cl.
*G05D 1/00* (2024.01)
*B25J 9/16* (2006.01)
(Continued)

(52) U.S. Cl.
CPC .......... *G05D 1/0061* (2013.01); *B25J 9/1679* (2013.01); *B60D 1/015* (2013.01);
(Continued)

(58) Field of Classification Search
CPC ............ B25J 9/1679; B60D 1/26; B60D 1/64; G05D 1/0231; G05D 1/0061; G05D 1/249;
(Continued)

(56) References Cited

U.S. PATENT DOCUMENTS 3,881,748 A 5/1975 Donaldson
4,366,965 A 1/1983 Rhodes
(Continued)

FOREIGN PATENT DOCUMENTS

CA 2555212 A1 9/2005
CN 106741239 5/2017
(Continued)

OTHER PUBLICATIONS

'Re: Adapting the gladhand to an airhose'. In Steel Soldiers Military Vehicles Supersite Forums [online], Nov. 24, 2008 [ retrieved on Nov. 4, 2020], Retrieved from the Internet: <https://www.steelsoldiers.com/threads/adapting-the-gladhand-to-an-airhose ,28023/post-292796>. (Year: 2008).
(Continued)

*Primary Examiner* — Gertrude Arthur Jeanglaude
(74) *Attorney, Agent, or Firm* — Loginov & Associates, PLLC; William A. Loginov

(57) ABSTRACT

A system and method for operation of an autonomous vehicle (AV) yard truck is provided. A processor facilitates autonomous movement of the AV yard truck, and connection to and disconnection from trailers. A plurality of sensors are interconnected with the processor that sense terrain/objects and assist in automatically connecting/disconnecting trailers. A server, interconnected, wirelessly with the processor,
(Continued)

that tracks movement of the truck around and determines locations for trailer connection and disconnection. A door station unlatches/opens rear doors of the trailer when adjacent thereto, securing them in an opened position via clamps, etc. The system computes a height of the trailer, and/or if landing gear of the trailer is on the ground and interoperates with the fifth wheel to change height, and whether docking is safe, allowing a user to take manual control, and optimum charge time(s). Reversing sensors/safety, automated chocking, and intermodal container organization are also provided.

46 Claims, 80 Drawing Sheets

Related U.S. Application Data continuation of application No. 16/282,279, filed on Feb. 21, 2019, now Pat. No. 11,099,560.

(60) Provisional application No. 62/715,757, filed on Aug. 7, 2018, provisional application No. 62/681,044, filed on Jun. 5, 2018, provisional application No. 62/633,185, filed on Feb. 21, 2018.

(51) Int. Cl.
| | |
|---|---|
| B60D 1/01 | (2006.01) |
| B60D 1/26 | (2006.01) |
| B60D 1/62 | (2006.01) |
| B60D 1/64 | (2006.01) |
| B60L 53/36 | (2019.01) |
| B60L 58/12 | (2019.01) |
| B60R 1/00 | (2022.01) |
| B60R 25/04 | (2013.01) |
| B60R 25/102 | (2013.01) |
| B60R 25/23 | (2013.01) |
| B60R 25/25 | (2013.01) |
| B62D 13/06 | (2006.01) |
| B62D 15/02 | (2006.01) |
| B62D 33/02 | (2006.01) |
| B62D 53/08 | (2006.01) |
| B62D 53/12 | (2006.01) |
| B65G 69/00 | (2006.01) |
| E05B 81/54 | (2014.01) |
| E05C 17/02 | (2006.01) |
| G05D 1/247 | (2024.01) |
| G05D 1/249 | (2024.01) |
| G05D 1/661 | (2024.01) |
| G05D 1/81 | (2024.01) |
| B62D 63/08 | (2006.01) |

(52) U.S. Cl.
CPC ............... *B60D 1/26* (2013.01); *B60D 1/62* (2013.01); *B60D 1/64* (2013.01); *B60L 53/36* (2019.02); *B60L 58/12* (2019.02); *B60R 1/003* (2013.01); *B60R 25/04* (2013.01); *B60R 25/102* (2013.01); *B60R 25/23* (2013.01); *B60R 25/25* (2013.01); *B62D 13/06* (2013.01); *B62D 15/0285* (2013.01); *B62D 33/0222* (2013.01); *B62D 53/0821* (2013.01); *B62D 53/12* (2013.01); *B65G 69/005* (2013.01); *E05B 81/54* (2013.01); *E05C 17/02* (2013.01); *G05D 1/0088* (2013.01); *G05D 1/0225* (2013.01); *G05D 1/0231* (2013.01); *G05D 1/0276* (2013.01); *G05D 1/247* (2024.01); *G05D 1/249* (2024.01); *G05D 1/661* (2024.01); *G05D 1/81* (2024.01); *B60L 2200/36* (2013.01); *B62D 63/08* (2013.01); *E05Y 2900/516* (2013.01); *E05Y 2900/531* (2013.01)

(58) Field of Classification Search
CPC .............. B62D 63/08; E05Y 2900/516; E05Y 2900/531; B60L 2200/36; B60L 58/12; B60L 53/36
See application file for complete search history.

(56) References Cited

U.S. PATENT DOCUMENTS

| | | | |
|---|---|---|---|
| 4,448,447 A | 5/1984 | Funk | |
| 4,548,783 A | 10/1985 | Dalke | |
| 5,305,427 A * | 4/1994 | Nagata | B25J 19/023 700/254 |
| 5,607,221 A | 3/1997 | Justus | |
| 6,179,319 B1 | 1/2001 | Malisch | |
| 6,863,538 B2 | 3/2005 | Mattern | |
| 7,562,918 B2 | 7/2009 | Toma | |
| 7,669,875 B2 | 3/2010 | Halverson | |
| 7,748,549 B1 | 7/2010 | Browning | |
| 8,187,020 B2 | 5/2012 | Manuel | |
| 8,301,318 B2 | 10/2012 | Lacaze | |
| 8,532,862 B2 | 9/2013 | Neff | |
| 8,727,084 B1 | 5/2014 | Kuker | |
| 8,806,689 B2 | 8/2014 | Riviere | |
| 8,888,121 B2 | 11/2014 | Trevino | |
| 9,068,668 B2 | 6/2015 | Grover | |
| 9,211,889 B1 | 12/2015 | Hoetzer | |
| 9,302,678 B2 | 4/2016 | Murphy | |
| 9,592,964 B2 | 3/2017 | Aleks | |
| 10,081,504 B2 | 9/2018 | Walford | |
| 11,099,560 B2 | 8/2021 | Smith | |
| 11,429,099 B2 | 8/2022 | Smith | |
| 11,560,188 B2 | 1/2023 | Moore | |
| 2003/0233189 A1 | 12/2003 | Hsiao | |
| 2004/0146384 A1 | 7/2004 | Whelan | |
| 2005/0017506 A1 | 1/2005 | Caldwell | |
| 2005/0103541 A1 | 5/2005 | Nelson | |
| 2006/0071447 A1 | 4/2006 | Gehring | |
| 2007/0030349 A1 | 2/2007 | Riley | |
| 2008/0012695 A1 | 1/2008 | Herschell | |
| 2008/0223630 A1 | 9/2008 | Couture | |
| 2008/0262654 A1 * | 10/2008 | Omori | A61B 34/71 901/30 |
| 2010/0025964 A1 | 2/2010 | Fisk | |
| 2011/0037241 A1 | 2/2011 | Temple | |
| 2011/0254504 A1 | 10/2011 | Haddad | |
| 2012/0248167 A1 | 10/2012 | Flanagan | |
| 2014/0007386 A1 | 1/2014 | Liao | |
| 2014/0251556 A1 | 9/2014 | Orton | |
| 2014/0268095 A1 | 9/2014 | Petkov | |
| 2015/0251366 A1 | 9/2015 | Voth | |
| 2015/0258908 A1 | 9/2015 | Fukui | |
| 2015/0263541 A1 | 9/2015 | Fukui | |
| 2015/0328655 A1 | 11/2015 | Reichler | |
| 2016/0039456 A1 | 2/2016 | Lavoie | |
| 2016/0054143 A1 | 2/2016 | Abuelsaad | |
| 2016/0075526 A1 | 3/2016 | Avalos | |
| 2016/0260328 A1 | 9/2016 | Mishra | |
| 2016/0304122 A1 | 10/2016 | Herzog | |
| 2016/0318490 A1 | 11/2016 | Ben Shalom | |
| 2017/0031356 A1 | 2/2017 | Bell | |
| 2017/0050526 A1 | 2/2017 | Sommarström | |
| 2017/0146168 A1 | 5/2017 | Caprio | |
| 2017/0165839 A1 | 6/2017 | Tan | |
| 2017/0174019 A1 | 6/2017 | Lurie | |
| 2017/0185082 A1 | 6/2017 | Matos | |
| 2017/0186124 A1 | 6/2017 | Jones | |
| 2017/0305694 A1 | 10/2017 | McMurrough | |
| 2017/0361844 A1 | 12/2017 | Kahn | |
| 2017/0364070 A1 | 12/2017 | Oba | |
| 2017/0369260 A1 | 12/2017 | Hoofard | |
| 2018/0050573 A1 | 2/2018 | Strand | |

(56) References Cited

U.S. PATENT DOCUMENTS

| | | |
|---|---|---|
| 2018/0202822 A1 | 7/2018 | Delizio |
| 2018/0250833 A1 | 9/2018 | Boria |
| 2018/0264963 A1 | 9/2018 | Dudar |
| 2018/0265076 A1 | 9/2018 | Hall |
| 2018/0281178 A1 | 10/2018 | Jacobsen |
| 2019/0002216 A1 | 1/2019 | Walford |
| 2019/0064828 A1 | 2/2019 | Meredith |
| 2019/0064835 A1 | 2/2019 | Hoofard |
| 2019/0077600 A1 | 3/2019 | Watts |
| 2019/0095861 A1 | 3/2019 | Baldwin |
| 2019/0129429 A1 | 5/2019 | Juelsgaard |
| 2019/0187716 A1 | 6/2019 | Cantrell |
| 2019/0197786 A1 | 6/2019 | Molyneaux |
| 2019/0235504 A1 | 8/2019 | Carter |
| 2020/0338942 A1 | 10/2020 | Winograd |
| 2020/0387166 A1 | 12/2020 | Lacaze |
| 2020/0387168 A1 | 12/2020 | Lacaze |
| 2021/0053407 A1 | 2/2021 | Smith |
| 2021/0061304 A1 | 3/2021 | Braunstein |
| 2021/0141384 A1 | 5/2021 | Lacaze |
| 2021/0192784 A1 | 6/2021 | Taylor |
| 2021/0316761 A1 | 10/2021 | Torrie |
| 2021/0380182 A1 | 12/2021 | Delizio |
| 2022/0080584 A1 | 3/2022 | Wicks |
| 2022/0371199 A1 | 11/2022 | Schultz |
| 2024/0043075 A1 | 2/2024 | Johannes |

FOREIGN PATENT DOCUMENTS

| | | |
|---|---|---|
| CN | 107380002 | 11/2017 |
| DE | 102012102648 B4 | 9/2012 |
| DE | 102012023999 A1 | 1/2014 |
| EP | 2886497 B1 | 6/2015 |
| JP | S5885702 A | 5/1983 |
| JP | 3215916 B2 | 10/2001 |
| WO | 2010118420 A2 | 10/2010 |
| WO | 2013180622 A1 | 12/2013 |
| WO | 2016205559 A1 | 12/2016 |
| WO | 2017100716 A1 | 6/2017 |
| WO | 2018001915 A1 | 1/2018 |
| WO | 2019042958 A1 | 3/2019 |
| WO | 2019046383 A1 | 3/2019 |
| WO | 2019118848 A1 | 6/2019 |

OTHER PUBLICATIONS

Bennett, Sean. Modern Diesel Technology: Brakes, Suspension & Steering. New York, Delmar, 2007. pp. 53-54. ISBN-10: 1-4180-1372-2. (Year: 2007).

Fuchs C et al: "3D pose estimation for articulated vehicles using Kalman-filter based tracking", Pattern Recognition. Image Analysis, Allen Press, Lawrence, KS, US, vol. 26, No. 1, Jul. 23, 2016 (Jul. 23, 2016), pp. 109-113, XP036013102, ISSN: 1054-6618, DOI: 10.1134/S1054661816010077 [retrieved on Jul. 23, 2016] p. 109-p. 112.

Tofael Ahamed: "Navigation of an Autonomous Tractor Using Multiple Sensors", Thesis, Feb. 22, 2008 (Feb. 22, 2008), XP055527539, Retrieved from the Internet: URL:https://tsukuba.repo.nii.ac.jp/?action =repository action common download&item id=20956 &item- -no=I&attribute- id=I7&file- no=2 [retrieved on Nov. 27, 2018] Chapter 9.

* cited by examiner

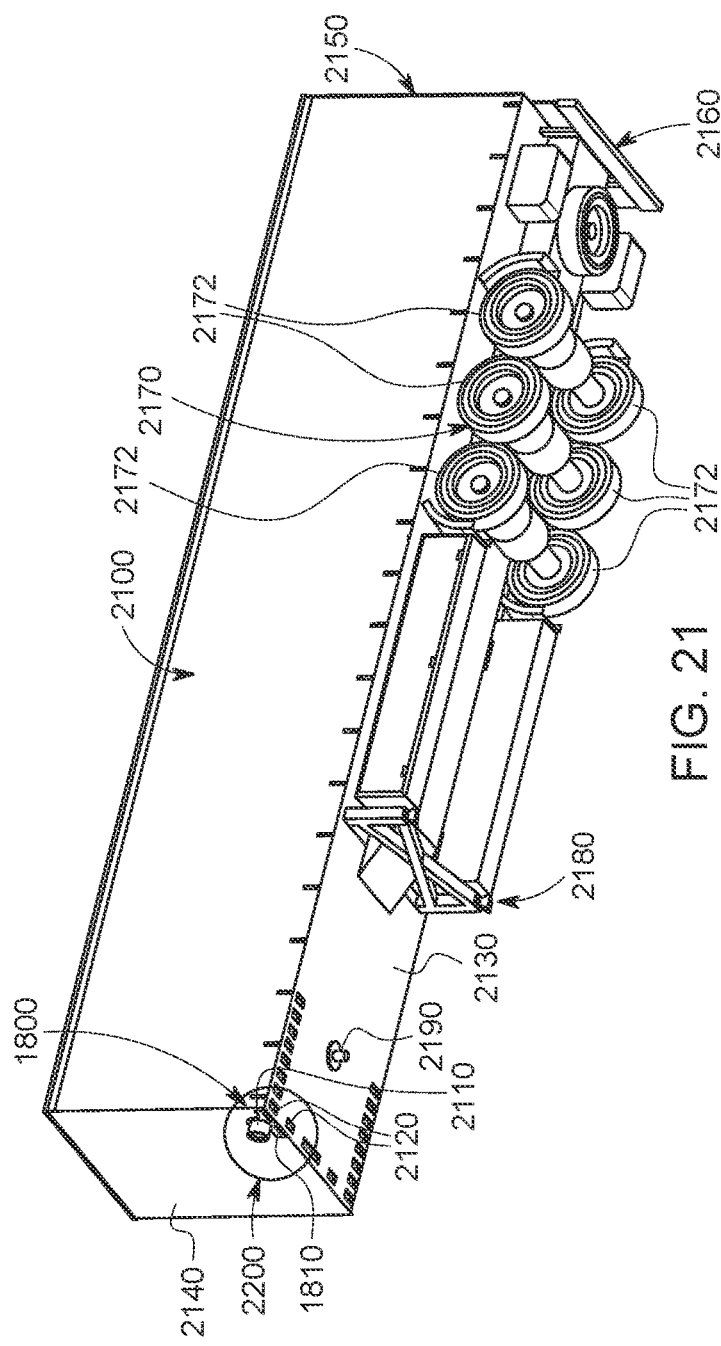
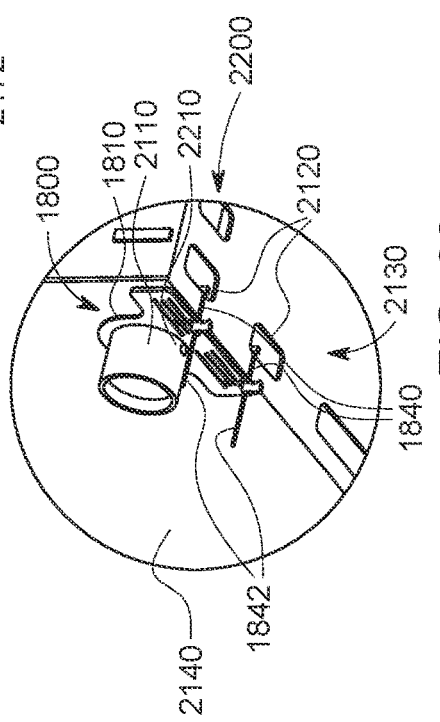
FIG. 21
FIG. 22

SYSTEMS AND METHODS FOR AUTOMATED OPERATION AND HANDLING OF AUTONOMOUS TRUCKS AND TRAILERS HAULED THEREBY

RELATED APPLICATION

This application is a continuation of U.S. patent application Ser. No. 17/409,623, entitled SYSTEMS AND METHODS FOR AUTOMATED OPERATION AND HANDLING OF AUTONOMOUS TRUCKS AND TRAILERS HAULED THEREBY, filed Aug. 23, 2021, now U.S. Pat. No. 11,755,013, issued Sep. 12, 2023, which is a continuation of U.S. patent application Ser. No. 16/282,279, filed Feb. 21, 2019, entitled SYSTEMS AND METHODS FOR AUTOMATED OPERATION AND HANDLING OF AUTONOMOUS TRUCKS AND TRAILERS HAULED THEREBY, now U.S. Pat. No. 11,099,560, issued Aug. 24, 2021, which claims the benefit of U.S. Provisional Application Ser. No. 62/633,185, entitled SYSTEMS AND METHODS FOR AUTOMATED OPERATION AND HANDLING OF AUTONOMOUS TRUCKS AND TRAILERS HAULED THEREBY, filed Feb. 21, 2018, U.S. Provisional Application Ser. No. 62/681,044, entitled SYSTEMS AND METHODS FOR AUTOMATED OPERATION AND HANDLING OF AUTONOMOUS TRUCKS AND TRAILERS HAULED THEREBY, filed Jun. 5, 2018, and U.S. Provisional Application Ser. No. 62/715,757, entitled SYSTEMS AND METHODS FOR AUTOMATED OPERATION AND HANDLING OF AUTONOMOUS TRUCKS AND TRAILERS HAULED THEREBY, filed Aug. 7, 2018, the entire disclosure of each of which applications is herein incorporated by reference.

FIELD OF THE INVENTION

This invention relates to autonomous vehicles and more particularly to autonomous trucks and trailers therefor, for example, as used to haul cargo around a shipping facility, a production facility or yard, or to transport cargo to and from a shipping facility, a production facility or yard.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting of a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer. Thus, a plurality of removable connections are made between the cab and trailer to deliver both electric power and pneumatic pressure. The pressure is used to operate emergency and service brakes, typically in conjunction with the cab's own (respective) brake system. The electrical power is used to power (e.g.) interior lighting, exterior signal and running lights, lift gate motors, landing gear motors (if fitted), etc.

Throughout the era of modern transport trucking, the connection of such electrical and pneumatic lines, the raising and lowering of landing gear, the operation of rear swing doors associated with trailers, and vehicle inspections have been tasks that have typically been performed manually by a driver. For example, when connecting to a trailer with the cab, after having backed into the trailer so as to couple the truck's fifth wheel to the trailer's kingpin, these operations all require a driver to then exit his or her cab. More particularly, a driver must crank the landing gear to drop the kingpin into full engagement with the fifth wheel, climb onto the back of the cab chassis to manually grasp a set of extendable hoses and cables (carrying air and electric power) from the rear of the cab, and affix them to a corresponding set onto related connections at the front of the trailer body. This process is reversed when uncoupling the trailer from the cab. That is, the operator must climb up and disconnect the hoses/cables, placing them in a proper location, and then crank down the landing gear to raise the kingpin out of engagement with the fifth wheel. Assuming the trailer is to be unloaded (e.g. after backing it into a loading dock), the driver also walks to the rear of the trailer to unlatch the trailer swing doors, rotate them back 270 degrees, and (typically) affix each door to the side of the trailer. With some trailer variations, rear doors are rolled up (rather than swung), and/or other action is taken to allow access to cargo. Other facilities, such as loading dock warning systems, chocks which prevent trailers from rolling unexpectedly and trailer-to-dock locking mechanisms rely upon human activation and monitoring to ensure proper function and safety. Similar safety concerns exist when trucks and trailers are backing up, as they exhibit a substantial blind spot due to their long length and large width and height.

Further challenges in trucking relate to intermodal operations, where yard trucks are used to ferry containers between various transportation modalities. More particularly, containers must be moved between railcars and trailers in a railyard in a particular order and orientation (front-to-rear facing, with doors at the rear). Likewise, order and orientation is a concern in dockyard operations where containers are removed from a ship.

A wide range of solutions have been proposed over the years to automate one or more of the above processes, thereby reducing the labor needed by the driver. However, no matter how effective such solutions have appeared in theory, the trucking industry still relies upon the above-described manual approach(es) to connecting and disconnecting a trailer to/from a truck tractor/cab.

With the advent of autonomous vehicles, it is desirable to provide further automation of a variety of functions that have been provided manually out of tradition or reasonable convenience.

SUMMARY OF THE INVENTION

This invention overcomes disadvantages of the prior art by providing systems and methods for connecting and disconnecting trailers from truck cabs (tractors) that enhance the overall automation of the process and reduce the need for human intervention therewith. These systems and methods are particularly desirable for use in an autonomous trucking environment, such as a shipping yard, port, manufacturing center, fulfillment center and/or general warehouse complex, where the operational range and routes taken by hauling vehicles are limited and a high density of are moved into, out of and around the facility. Such trailers typically originate from, and are dispatched to, locations using over-the-road cabs or trucks (that can be powered by diesel, gasoline, compressed gas other internal-combustion-based fuels, and/ or electricity in a plug-in-charged and/or fuel/electric hybrid arrangement). Cabs or trucks within the facility (termed "yard trucks") can be powered by electricity or another desirable (e.g. internal combustion) fuel source—which can be, but is not limited to, clean-burning fuel, in various implementations.

In order to facilitate substantially autonomous operation of yard trucks (herein referred to as "autonomous vehicle", or "AV" yard trucks), as well as other AV trucks and hauling vehicles, various systems are automated. The systems and methods herein address such automation. By way of non-limiting example, the operation of hitching, including the connection of brake/electrical service to a trailer by the truck is automated. Additionally, unlatching and opening of trailer (e.g. swing) doors is automated. Identification of trailers in a yard and navigation with respect to such trailers is automated, and safety mechanisms and operations when docking and undocking a trailer are automated. Access to the truck by a user can be controlled, and safety tests can be performed in an automated manner—including but not limited to a tug test that ensures a secure hitch. Likewise, the raising of the fifth wheel and verification that the trailer landing gear has disengaged the ground is automated.

In an embodiment, connection of at least the emergency brake pneumatic lines is facilitated by an interengaging connection structure that consists of a cab-mounted, conical or tapered guide structure located on the distal end of a manipulator or extension and a base connector located on the front face/wall of the trailer body having a corresponding receptacle shaped and arranged to center and register the cab guide structure so that, when fully engaged, the air connection between the cab and the trailer is complete and (at least) the emergency brakes can be actuated via pressure delivered from the cab. In a further embodiment, the cab-mounted guide structure can be adapted to include one or more electrical connectors that engage to close the power circuit between the cab and trailer. The connection arrangement can also be adapted to interconnect the service brake lines between the cab and the trailer. The connection on the trailer can be provided using a mounting plate that is removably (or permanently) attached to the front of the trailer when it enters the facility using (e.g.) clamps that engage slots on the trailer bottom. Alternatively, an interengaging fabric (e.g. hook-and-loop, 3M Dual-Lock™) fasteners, magnetic sheet or buttons, etc., can be employed to removably fasten the connection plate. The plate includes the base connector and a hose with a fitting (e.g. a glad hand) adapted to engage a standard hose fitting on the trailer.

In another embodiment, a pneumatically or hydraulically extendable (telescoping) arm is affixed behind the cab of the yard truck on a linear actuator that allows lateral movement. In addition, a second smaller pneumatic/hydraulic piston is affixed to the base and the bottom of the larger arm, allowing the arm to raise and lower. At the end of the arm is a vertical pivot or wrist (for vertical alignment) with an electrically actuated gripping device or hand, that can hold (and retrieve) a coupling device which is deployed onto the trailer to a corresponding shaped receiving receptacle. The coupling devise also has one (or more) side-mounted air-hose(s) that deliver the air pressure from the yard truck for connection to the trailer. An integrated power (and communications line) is paired with the air-hose, allowing for the actuation of a collar (lock) on a standard hose fitting to pair the coupling device to the receiving receptacle. In addition, the electrical power that is delivered via the coupling devise could also provide power to the trailer systems (as described above). In order to assist with the arm's autonomous ranging and alignment, a camera and laser-ranging device are also mounted on the gripping mechanism or hand. Once the hand delivers the coupling device (with associated air-hose and electrical connection) to the receiving receptacle and a positive air connection is detected, the grip release is actuated and the coupling remains with the receiving receptacle, as the arm is retracted back towards the cab for trailer clearance purposes. The receiving receptacle on the trailer can be mounted in a preferred available location on the front face of the trailer by the use of an interengaging fabric tape or sheet—such as industrial grade hook-and-loop material and/or Dual-Lock™ recloseable fasteners, or similar (e.g. magnetic sheets), as a removably attached device when onsite (or permanently affixed). The receiving receptacle is also marked with an identifying bordering pattern that the associated ranging/locating software can use to orient the arm and align the coupling device.

In another embodiment, in place of the extendable arm and secondary piston, two additional linear actuators are mounted, in a cross-formation onto the base linear actuator, which now runs in orientation along the length of the truck's frame. This results in the ability of the three linear actuators to move, in-concert, in the orthogonal X, Y, and Z-axis dimensions. The linear actuator that is cross-mounted on the vertical linear actuator still retains the electrically actuated gripping device or hand, as described above.

A system and method for operation of an autonomous vehicle (AV) yard truck in a yard environment is provided. A processor facilitates autonomous movement of the AV yard truck, substantially free of human user control inputs to onboard controls of the truck, and connection to and disconnection from trailers in the yard. A plurality of sensors are interconnected with the processor that sense terrain and objects in the yard and assist in automatically connecting to and disconnecting from the trailers. A server (and/or yard management system (YMS)) is interconnected, wirelessly with the processor, and tracks movement of the AV yard truck around the yard. It determines locations for connecting to and disconnecting from the trailers. Illustratively, a connection mechanism connects a service line between one of the trailers and the AV yard truck when the AV yard truck and trailer are hitched (connected) and disconnects the service line when the AV yard truck and trailer are unhitched (disconnected). The service line can comprise at least one of an electrical line, an emergency brake pneumatic line and a service brake pneumatic line. The connection mechanism can include a robotic manipulator that joins a connector on the AV yard truck to a receiving connector on the trailer. Also, the receiving connector can comprises a receptacle that is removably attached to the trailer with a clamping assembly or a receptacle that is removably attached to the trailer with an interengaging fabric-type fastener (or other types of fasting mechanisms). Illustratively, the processor can communicate with a tug-test process that, when the truck is hitched to the trailer, automatically determines whether the trailer is hitched, more particularly by applying motive power to the truck and determining load on the truck thereby.

In an embodiment, a system and method for automatically connecting at least one service line on a truck to a trailer is provided. A receiver on the trailer is permanently or temporarily affixed thereto. The receiver is interconnected with at least one of a pneumatic line and an electrical line. A coupling is manipulated by an end effector of a robotic manipulator to find and engage the receiver when the trailer is brought into proximity with, or hitched to, the truck. A processor, in response to a position of the receiver, moves the manipulator to align and engage the coupling with the receiver so as to complete a circuit between the truck and the trailer. The end effector can be mounted on at least one of (a) a framework moving along at least two orthogonal axes and having a rearwardly extending arm, (b) a multi-degree-of-freedom robot arm, and (c) a linear-actuator-driven arm with pivoting joints to allow for concurrent rearward extension and height adjustment. The linear-actuator-driven arm can be mounted on a laterally moving base on the truck chassis. A pivoting joint attached to the end effector can include a rotary actuator to maintain a predetermined angle in the coupling. The coupling can include an actuated, quick-disconnect-style fitting adapted to selectively and sealingly secure to a connector in the receptacle. The actuated, quick-disconnect-style fitting can comprise a magnetic solenoid assembly that selectively and slidably opens and allows closure of the quick-disconnect-style fitting in response, to application of electrical current thereto. A tensioned cable can be attached to the coupling and a pneumatic line can be attached to the truck brake system. The brake system can comprise at least one of a service brake and an emergency brake. An electrical connection can be provided on the coupling attached to the truck electrical system. Illustratively, the receptacle is removably attached to a front face of the trailer by at least one of an interengaging fabric material, fasteners, clamps and magnets.

In an embodiment, a retrofit kit for the trailer is provided, which includes a Y-connector assembly for at least one of a trailer pneumatic line and a trailer electrical line, the Y-connector assembly connects to both a conventional service connector and the receiver. The Y-connector assembly can be operatively connected to a venting mechanism that selectively allows one of the coupling and the conventional service connector to vent. The conventional service connector can comprises a glad hand.

In an embodiment, a system and method for operating an autonomous truck with respect to a trailer is provided. A vehicle-based processor communicates with a tug-test process that, when the truck is hitched to the trailer, automatically determines whether the trailer is hitched by applying motive power to the truck and determining load on the truck thereby.

In an embodiment, a system and method for handling a trailer with a truck in a manner that is free of service connections between a pneumatic brake system of the truck and a brake system of the trailer is provided. A pressurized air canister is removably secured to the trailer, and connected to the brake system thereof. The arrangement includes a valve, in line with the canister, which is actuated based upon a signal from the truck to release the brake system. Illustratively, the truck is an autonomous truck, and the signal is transmitted wirelessly from a controller of the truck. More particularly the truck can be an AV yard truck, and the canister can be adapted to be attached to the trailer upon delivery of the trailer to a yard, by (e.g.) an OTR truck.

In an embodiment, a system and method for locating a glad hand connector on a front face of a trailer comprises a gross sensing system that acquires at least one of a 2D and a 3D image of the front face, and searches for glad hand-related image features. The gross sensing system locates features having a differing texture or color from the surrounding image features after identifying edges of the trailer front face in the image. The gross sensing system can include a sensor located on a cab or chassis of an AV yard truck. A fine sensing system, located on an end effector of a fine manipulator, can be moved in a gross motion operation to a location adjacent to a location on the front face containing candidate glad hand features. The fine sensing system can includes a plurality of 2D and/or 3D imaging sensors. The fine manipulator can comprise a multi-axis robotic arm mounted on a multi-axis gross motion mechanism. The gross motion mechanism can comprise a plurality of linear actuators mounted on the AV yard truck that move the fine manipulator from a neutral location to the location adjacent to the glad hand candidate features. Illustratively, the gross motion mechanism comprises a piston driven, hinged platform mounted on the AV yard truck that moves the fine manipulator from a neutral location to the location adjacent to the glad hand candidate features. The fine manipulator can be served based upon feedback received from the fine sensing system relative to the glad hand imaged thereby. Illustratively, the fine sensing system locates a trained feature on the glad hand to determine pose thereof. The feature can be at least one of the annular glad hand seal, an outline edge of a flange for securing the glad hand, and a tag attached to the glad hand. The tag can include a fiducial matrix that assists in determining the pose. The tag can be located on a clip attached to a raised element on the glad hand. The feature can include a plurality of identification regions on a gasket seal of the glad hand.

In an embodiment, a system and method for attaching a truck based pneumatic line connector to a glad hand on a trailer using a manipulator with an end effector that selectively engages and releases the connector includes a clamping assembly that selectively overlies an annular seal of the glad hand, and that sealingly clamps the connector to the annular seal. The clamping assembly can be at least one of an actuated clamp and a spring-loaded clamp. Illustratively, the spring-loaded claim is normally closed and is opened by a gripping action of the end effector. The actuated clamp includes one of (a) a pivoting pair of clamping members and (b) a sliding clamping member.

In an embodiment, a system and method for attaching a truck based pneumatic line connector to a glad hand on a trailer, using a manipulator with an end effector that selectively engages and releases the connector, includes a probe member containing a pressure port, which inserts into, and becomes lodged in, an annular seal of the glad hand based upon a placement motion of the end effector. The probe member can comprise one of (a) a frustoconical plug that is releasable press fit into the annual seal, and (b) an inflatable plug that selectively engages a cavity in the glad hand beneath the annular seal and is inflated to become secured therein. The frustoconical plug includes a circumferential barb to assist in retaining against the annular seal.

In an embodiment, a system and method for attaching a truck-based pneumatic line connector to a trailer glad hand on a trailer, using a manipulator with an end effector that selectively engages and releases the connector, comprises another glad hand that is secured to the trailer glad hand in a substantially conventional manner. The other glad hand include a quick-disconnect (universal) fitting that receives the selectively connector from the end effector. A corresponding, opposite-gender, fitting is carried by the end effector to selectively connect and disconnect the universal fitting.

In another embodiment, a system and method for determining a relative angle of a trailer with respect to a truck in a confronting relationship, in which the truck is attempting to move in reverse to hitch to the trailer is provided. A spatial sensing device is located to face rearward on the truck, the sensing device oriented to sense space beneath an underside of the trailer. A processor identifies and analyzes data points generated by the sensing device with respect to at least one of landing gear legs of the trailer and wheel sets of the trailer, and thereby determines the relative angle. The sensing device can comprise a high-resolution LIDAR device that generates points, and associated groups of points (e.g. 3D point clouds), using projected rings of structured light. The processor identifies point groups/clouds, and compares the point groups to expected shapes and locations of the landing gear legs. If one of the landing gear legs is occluded, then the processor is adapted to estimate a location of the occluded landing gear leg to determine the relative angle. The processor is also adapted to locate and analyze a shape and position of the wheel sets to, at least one of, (a) confirm a determination of the relative angle based on the landing gear legs and (b) determine the relative angle independently where analysis the landing gear legs is unavailable or inconclusive. The processor can be arranged to determine a location of a kingpin of the trailer.

In an embodiment, a system and method for determining a relative location of a kingpin of a trailer with respect to a truck in a confronting relationship, in which the truck is attempting to move in reverse to hitch to the trailer, is provided. A spatial sensing device is located to face rearward on the truck The sensing device is oriented to sense space beneath an underside of the trailer. A processor identifies and analyzes data points (e.g. 3D point clouds) generated by the sensing device with respect to at least one of the kingpin, landing gear legs of the trailer and wheel sets of the trailer so as to, thereby, determine the relative location of the kingpin. Illustratively, the sensing device is a high-resolution LIDAR device that generates the points/point clouds using projected rings of structured light. The processor identifies point groups/clouds and compares the point groups/clouds to expected shapes and locations of the kingpin and landing gear legs. The processor can be arranged to iteratively image with the LIDAR device and locate groups of points that represent the expected locations. The processor thereby provides the relative location of the kingpin in response to a confidence value above a predetermined threshold.

In an embodiment, a system for interconnecting an airline between an autonomous truck and a trailer can include an adapter that is mounted with respect to a trailer-side airline and directs pressurized air therethrough, the adapter having at least one glad hand connection thereon, and a manipulator that carries and moves a connection tool into and out of engagement with the adapter, the connection tool being interconnected with a truck-side airline for delivering the pressurized air to the adapter when engaged therewith and the manipulator being arranged to selectively release from the tool when the tool is engaged to the adapter. Illustratively, the adapter can include a glad hand connection that engages a glad hand connection attached to the trailer-side airline and the adapter can include a quick-disconnect fitting that engages an actuable quick disconnect on the tool. The quick disconnect can be actuated by at least one of a pulling motion and a powered actuator assembly. The adapter can include a truck-side glad hand connection and a shuttle valve that selectively routes the pressurized air from either the truck side glad hand connection or the quick disconnect fitting. The tool can include guide structures to enable alignment with the adapter during engagement therebetween. The guide structures can include at least one of guide pins, vanes, slots, and keyways. The tool can include a screw-driven clamp that selectively engages a truck-side glad hand connection and a guide pin that is arranged to engage one of a plurality of keyways at different rotational orientations about an axis of the truck-side glad hand connection. The adapter can include a fiducial that can identify and assist in orienting the manipulator, based upon an operatively connected vision system.

BRIEF DESCRIPTION OF THE DRAWINGS

The invention description below refers to the accompanying drawings, of which:

FIG. 21 is a bottom-oriented perspective view of a trailer showing various operational components thereof, including an attached, plate and bracket assembly with receptacle, according to FIG. 18;

FIG. 22 is a more detailed fragmentary perspective view of the attached, plate and bracket assembly shown in FIG. 21;

DETAILED DESCRIPTION

I. Overview

Figure 1:
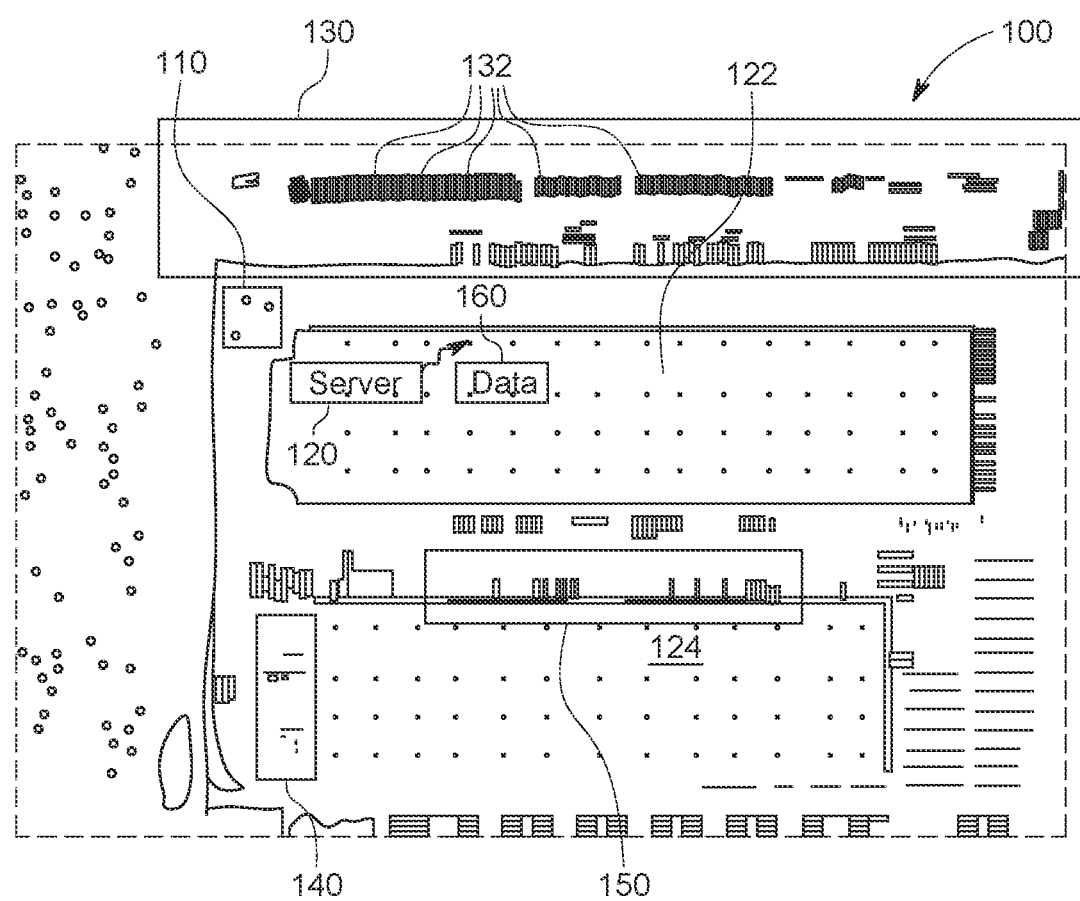
FIG. 1 is a diagram showing an aerial view of an exemplary shipping facility with locations for storing, loading and unloading trailers used in conjunction with the AV yard truck arrangements provided according to a system and method for handling trailers within a yard.

FIG. 1 shows an aerial view of an exemplary shipping facility 100, in which over-the-road (OTR) trucks (tractor trailers) deliver goods-laden trailers from remote locations and retrieve trailers for return to such locations (or elsewhere—such as a storage depot). In a standard operational procedure, the OTR transporter arrives with a trailer at a destination's guard shack (or similar facility entrance checkpoint) 110. The guard/attendant enters the trailer information (trailer number or QR (ID) code scan-imbedded information already in the system, which would typically include: trailer make/model/year/service connection location, etc.) into the facility software system, which is part of a server or other computing system 120, located offsite, or fully or partially within the facility building complex 122 and 124. The complex 122, 124 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of the OTR truck, the guard/attendant would then direct the driver to deliver the trailer to a specific numbered parking space in a designated staging area 130—shown herein as containing a large array of parked, side-by-side trailers 132, arranged as appropriate for the facility's overall layout. The trailer's data and parked status is generally updated in the company's integrated yard management system (YMS), which can reside of the server 120 or elsewhere.

Once the driver has dropped the trailer in the designated parking space of the staging area 130, he/she disconnects the service lines and ensures that connectors are in an accessible position (i.e. if adjustable/sealable). If the trailer is equipped with swing doors, this can also provide an opportunity for the driver to unlatch and clip trailer doors in the open position, if directed by yard personnel to do so.

At some later time, the (i.e. loaded) trailer in the staging area 130 is hitched to a yard truck/tractor, which, in the present application is arranged as an autonomous vehicle (AV). Thus, when the trailer is designated to be unloaded, the AV yard truck is dispatched to its marked parking space in order to retrieve the trailer. As the yard truck backs down to the trailer, it uses one or multiple mounted (e.g. a standard or custom, 2D grayscale or color-pixel, image sensor-based) cameras (and/or other associated (typically 3D/range-determining) sensors, such as GPS receiver(s), radar, LiDAR, stereo vision, time-of-flight cameras, ultrasonic/laser range finders, etc.) to assist in: (i) confirming the identity of the trailer through reading the trailer number or scanning a QR, bar, or other type of coded identifier; (ii) Aligning the truck's connectors with the corresponding trailer receptacles. Such connectors include, but are not limited to, the cab fifth (5th) wheel-to-trailer kingpin, pneumatic lines, and electrical leads. Optionally, during the pull-up and initial alignment period of the AV yard truck to the trailer, the cameras mounted on the yard truck can also be used to perform a trailer inspection, such as checking for damage, confirming tire inflation levels, and verifying other safety criteria.

The hitched trailer is hauled by the AV yard truck to an unloading area 140 of the facility 124. It is backed into a loading bay in this area, and the opened rear is brought into close proximity with the portal and cargo doors of the facility. Manual and automated techniques are then employed to offload the cargo from the trailer for placement within the facility 124. During unloading, the AV yard truck can remain hitched to the trailer or can be unhitched so the yard truck is available to perform other tasks. After unloading, the AV yard truck eventually removes the trailer from the unloading area 140 and either returns it to the staging area 130 or delivers it to a loading area 150 in the facility 124. The trailer, with rear swing (or other type of door(s)) open, is backed into a loading bay and loaded with goods from the facility 124 using manual and/or automated techniques. The AV yard truck can again hitch to, and haul, the loaded trailer back to the staging area 130 from the loading area 150 for eventual pickup by an OTR truck. Appropriate data tracking and management is undertaken at each step in the process using sensors on the AV yard truck and/or other manual or automated data collection devices—for example, terrestrial and/or aerial camera drones.

Having described a generalized technique for handling trailers within a facility reference is now made to FIGS. 2-4, which show exemplary yard trucks 200 and 300 for use with the various embodiments described hereinbelow. The yard truck 200 (FIG. 2) is powered by diesel or another internal combustion fuel, and the yard truck 300 (FIGS. 3 and 4) electricity, using appropriate rechargeable battery assembly that can operate in a manner known to those of skill. For the purposes of this description, the AV yard truck is powered by rechargeable batteries, but it is contemplated that any other motive power source (or a combination thereof) can be used to provide mobility to the unit. Notably, the yard truck 200, 300 of each example respectively includes at least a driver's cab section 210, 310 (which can be omitted in a fully autonomous version) and steering wheel (along with other manual controls) 212, 412 and a chassis 220, 320, 420 containing front steerable wheels 222, 322, and at least one pair of rear, driven wheels 224, 324 (shown herein as a double-wheel arrangement for greater load-bearing capacity). The respective chassis 220, 320 also includes a so-called fifth ($5^{th}$) wheel 240, 340, that (with particular reference to the truck 300 in FIGS. 3 and 4) is arranged as a horseshoe-shaped pad 342, 442 with a rear-facing slot 344 (FIG. 3), which is sized and arranged to receive the kingpin hitch (shown and described further below) located at the bottom of a standard trailer (not shown). The fifth wheel 240, 340, 440 is shown tilted downwardly in a rearward direction so as to facilitate a ramping action when the truck is backed onto the trailer in FIG. 2. In FIG. 4, the fifth wheel 440 is shown raised by a lever arm assembly 442, which, as described below, allows the landing gear of the trailer (when attached) to clear the ground during hauling by the truck 400. The lever assembly 442 or other fifth wheel-lifting mechanisms can employ appropriate hydraulic lifting actuators/mechanisms known to those of skill so that the hitched trailer is raised at its front end. In this raised orientation, the hitch between the truck and trailer is secured.

The AV yard truck can include a variety of sensors as described generally above, that allow it to navigate through the yard and hitch-to/unhitch-from a trailer in an autonomous manner that is substantially or completely free of human intervention. Such lack of human intervention can be with the exception, possibly, of issuing an order to retrieve or unload a trailer—although such can also be provided by the YMS via the server 120 using a wireless data transmission 160 (FIG. 1) to and from the truck (which also includes an appropriate wireless network transceiver—e.g. WiFi-based, etc.).

Figure 2:
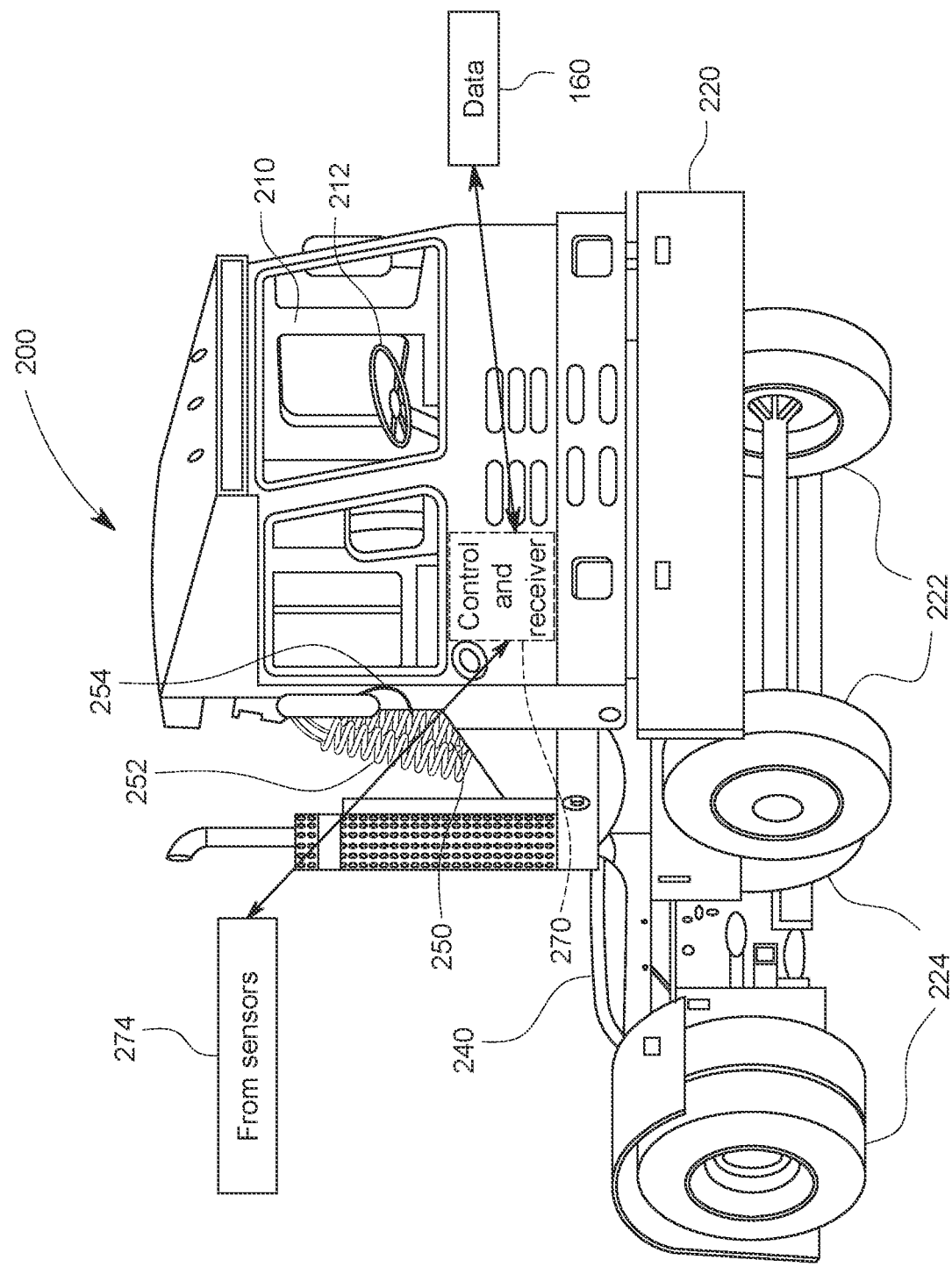
FIG. 2 is a perspective view of a fuel-powered AV yard truck for use in association with the system and method herein.
Figure 3:
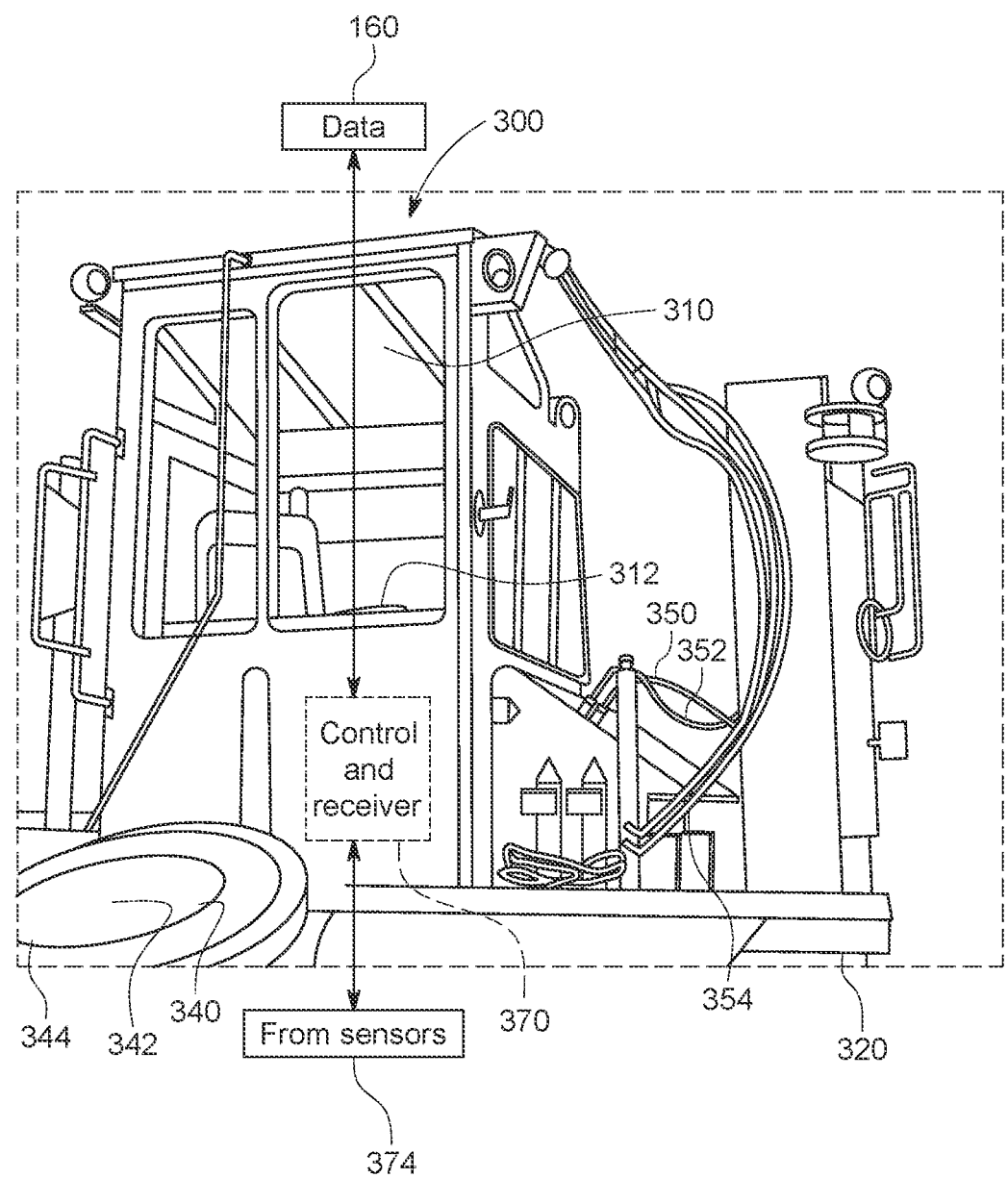
FIG. 3 is a rear-oriented perspective view of an electrically powered AV yard truck for use in association with the system and method herein, showing service connections (e.g. pneumatic braking and electrical) thereof.
Figure 4:
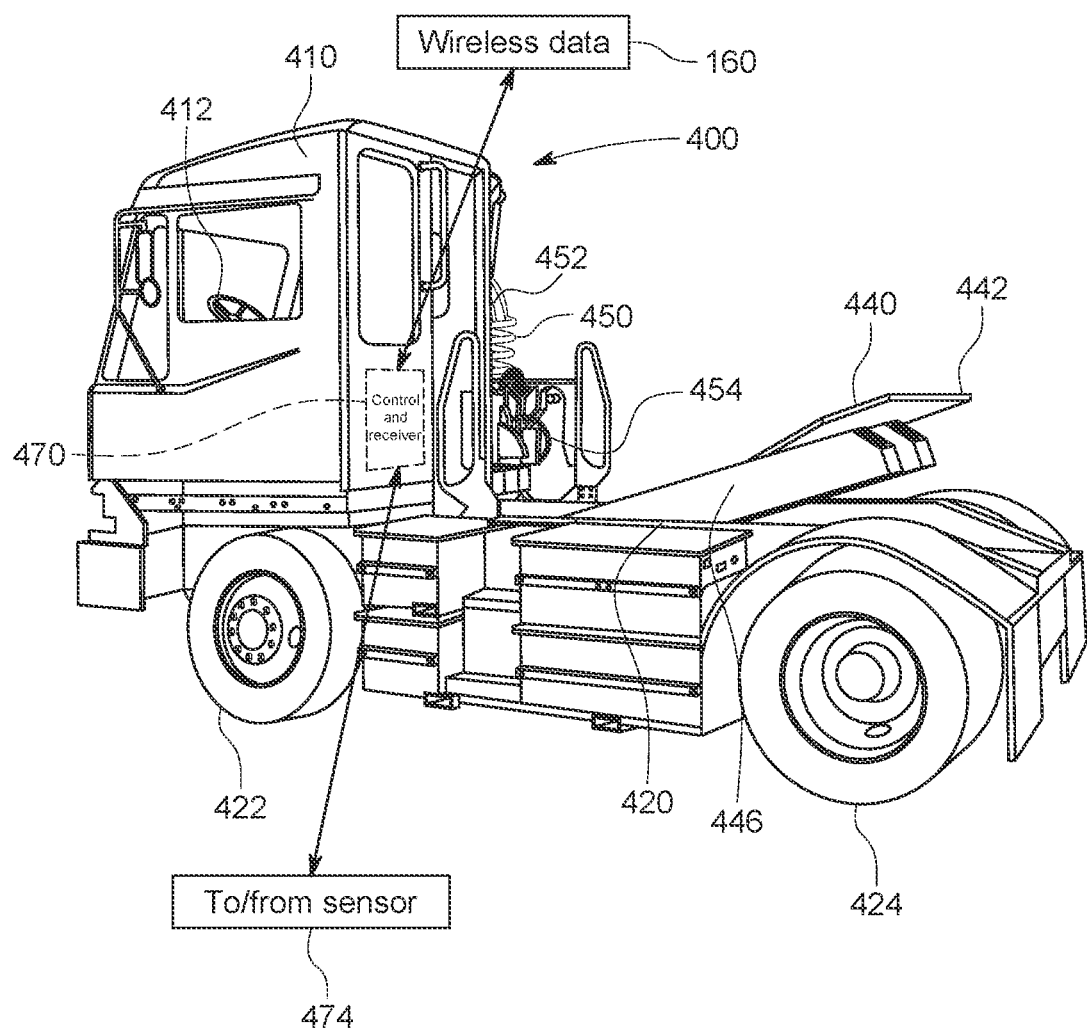
FIG. 4 is a rear-oriented perspective view of another electrically powered AV yard truck, showing a truck chassis raised fifth wheel thereof.
Figure 5:
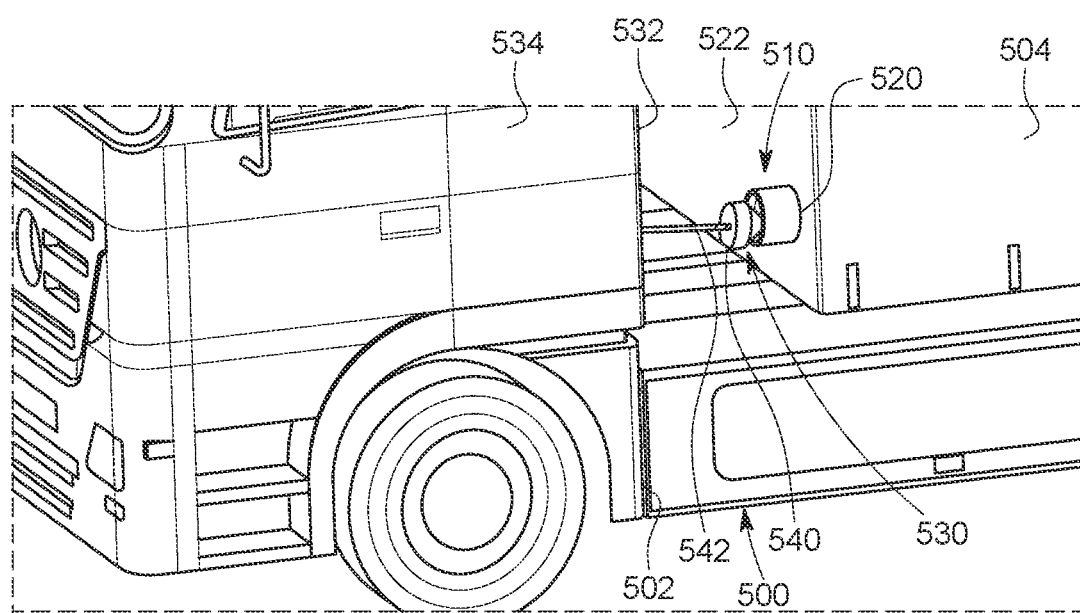
FIG. 5 is a partial, side-oriented perspective view of a hitched AV yard truck and trailer showing a pneumatic connection consisting of a truck-mounted probe and a trailer-mounted receptacle according to an embodiment.

Notably, the AV yard truck 200, 300 and 400 of FIGS. 2, 3 and 4, respectively, includes an emergency brake pneumatic hose 250, 350, 450 (typically red), service brake pneumatic hose 252, 352, 452 (typically blue) and an electrical line 254, 354, 454 (often black), that extend from the rear of the cab 210, 310, 410 and in this example, are suspended front the side thereof in a conventional (manually connected) arrangement. This allows for access by yard personnel when connecting and disconnecting the hoses/lines from a trailer during the maneuvers described above. The AV yard truck 200, 300, 400 includes a controller assembly 270, 370 and 470, respectively, shown as a dashed box. The controller 270, 370, 470 can reside at any acceptable location on the truck, or a variety of locations. The controller 270, 370, 470 interconnects with one or more sensors 274, 374, 474, respectively, that sense and measure the operating environment in the yard, and provides data 160 to and from the facility (e.g. the YMS, server 120 etc.) via a transceiver. Control of the truck 200, 300, 400 can be implemented in a self-contained manner, entirely within the controller 270, 370, 470 whereby the controller receives mission plans and decides on appropriate maneuvers (e.g. start, stop, turn accelerate, brake, move forward, reverse, etc.). Alternatively, control decisions/functions can be distributed between the controller and a remote-control computer—e.g. server 120, that computes control operations for the truck and transmits them back as data to be operated upon by the truck's local control system. In general, control of the truck's operation, based on a desired outcome, can be distributed appropriately between the local controller 270, 370, 470 and the facility system server 120.

II. Pneumatic Line Connection Between Yard Truck and Trailer

A. Probe and Receptacle Assemblies

A particular challenge in creating an AV yard truck and trailer system, which is substantially or fully free of human intervention in its ground operations, is automating the connections/disconnections of such hoses and electrical leads between the truck and the trailer in a manner that is reliable and accurate. FIGS. 5-8 show a basic arrangement 500 consisting of an AV yard truck 502 and trailer 504. The trailer can be conventional in arrangement with additions and/or modifications as described below, which allow it to function in an AV yard environment. The truck 502 and trailer 504, shown hitched together in this arrangement with at least one connection (e.g. the pneumatic emergency brake line) 510 to be made. It is common for yard trucks to make only the emergency brake connection when hauling trailers around a yard—however it is expressly contemplated that additional connections can be made for e.g. the service brakes, as well as the electrical leads. The connection arrangement 510 for a single pneumatic line herein comprises a receptacle assembly 520, mounted permanently or temporarily on the front 522 of the trailer 504, and a probe assembly 530 that extends from the rear face 532 of the truck cab 534. The connection arrangement 510 in this embodiment provides a positive, sealed pressurized coupling between one of the source pneumatic lines (e.g. the emergency brakes) from the truck to the trailer. Pressure is generated at the truck side (via a pump, pressure tank, etc.), and delivered to components that drive the trailer brakes when actuated by the truck control system 270, 370.

Figure 8:
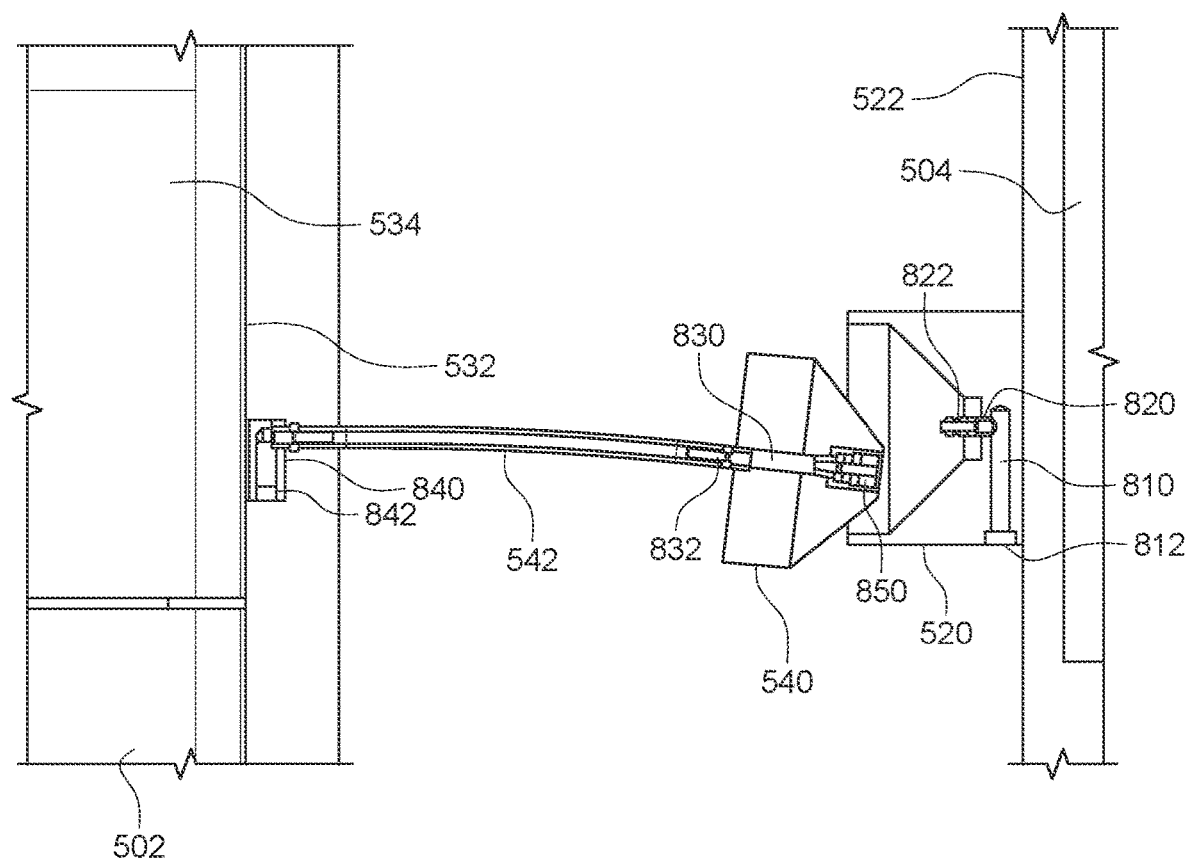
FIG. 8 is an exposed side view of the probe and receptacle arrangement of FIG. 5 showing exemplary pneumatic connections for, e.g. the emergency braking circuit between the AV yard truck and the trailer.

The receptacle assembly 520 and probe assembly 530 consist of interengaging, frustoconical shapes, wherein the probe head 540 is mounted on the end of a semi-rigid hose member 542 (e.g. approximately 1.5-4.5 feet), which can be supported by one or more guy wires mounted higher up on the back of the truck cab. The cone shape is sufficient to allow for a connection between the head 540 and receptacle 520 when the truck is backed straight onto the trailer. With reference particularly to FIG. 8, the receptacle of this embodiment is attached directly to the front face 522 of the trailer 504, and includes a central bore 810 that extends between a side-mounted port (that can be threaded or otherwise adapted to interconnect a standard trailer pressure line) and a pressure (e.g. male) quick-disconnect fitting 822. The geometry of such a fitting should be clear to those of skill. The probe head 540 also include a bore 830 that joins to a proximal fitting 832 that couples the semi-rigid hose member 542 to the head 540. The proximal end of the semi-rigid hose member 542, in this embodiment, is attached to a base 840 affixed to the rear face 532 of the truck cab 534. The location of the base 840 is selected to align with the receptacle 520 when the trailer and truck are in a straight front-to-rear alignment. As described below, a variety of mechanisms can be employed to align and direct the head 540 into the receptacle. The base 840 also includes a side port 842 that interconnects with the AV trucks braking pressure source/circuit, and is selectively pressurized when brakes are actuated. The conical probe head 540 includes, at its distal end, a (e.g. female) quick-disconnect pressure connector 850 that is adapted to sealingly mate with the receptacle connector 822. The probe connector 850 can be arranged to lock onto the receptacle connector 822 when driven axially a sufficient distance onto the receptacle connector. The receptacle connector can include one or more circumferential detents and appropriate internal springs, collars and ball bearings can be used in the construction of the probe connector to engage the detent(s) and thereby effect this interlocked seal between the connectors 822, 850. Alternatively, or additionally, pneumatic and/or electromechanical locking mechanisms can be used to lock the connectors together. Unlocking of the connectors 822, 850 during disconnection can be effected by simply pulling the arrangement apart—thereby overcoming axial resistance the locking force, activating a pneumatic and/or electromechanical unlocking mechanism or any other mechanical action that allows the mechanism to unlock. The diameter and angle of the probe and receptacle cones are variable. In an embodiment, the ports 812 and 842 of the receptacle 520 and probe 540 are connected to hoses that can be directly tapped into the pneumatic lines on each of the trailer and the truck. Alternatively, the ports 812, 842 can each be connected to hoses that each include a conventional or modified (described below) glad hand connector. That glad hand interconnects permanently or temporarily (in the case of the trailer) with the standard pneumatic line glad hand.

The probe 540 and receptacle 520 can be constructed from variety of materials, such as a durable polymer, aluminum alloy, steel or a combination thereof. The connectors 822 and 850 can be constructed from brass, steel, polymer or a combination thereof. They typically include one or more (e.g.) O-ring seals constructed from polyurethane or another durable elastomer. The semi-rigid hose 542 can be constructed from a polymer (polyethylene, polypropylene, etc.), or a natural or synthetic rubber with a fiber or steel reinforcing sheath.

Figure 8A:
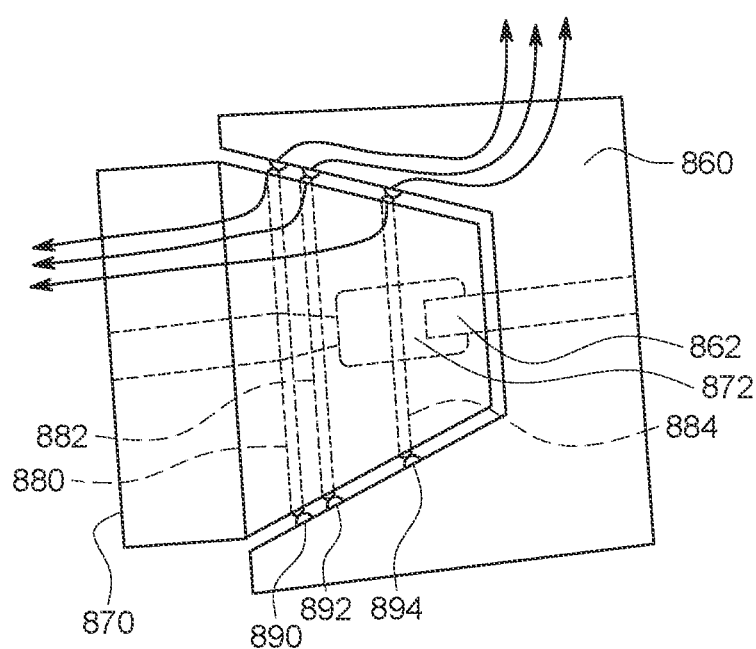
FIG. 8A is an exposed side view of an exemplary probe and receptacle arrangement similar to that of the arrangement of FIG. 5, including a plurality of electrical contacts for interconnecting electrical service between the AV yard truck and the receptacle when the pneumatic service is connected.
Figure 8B:
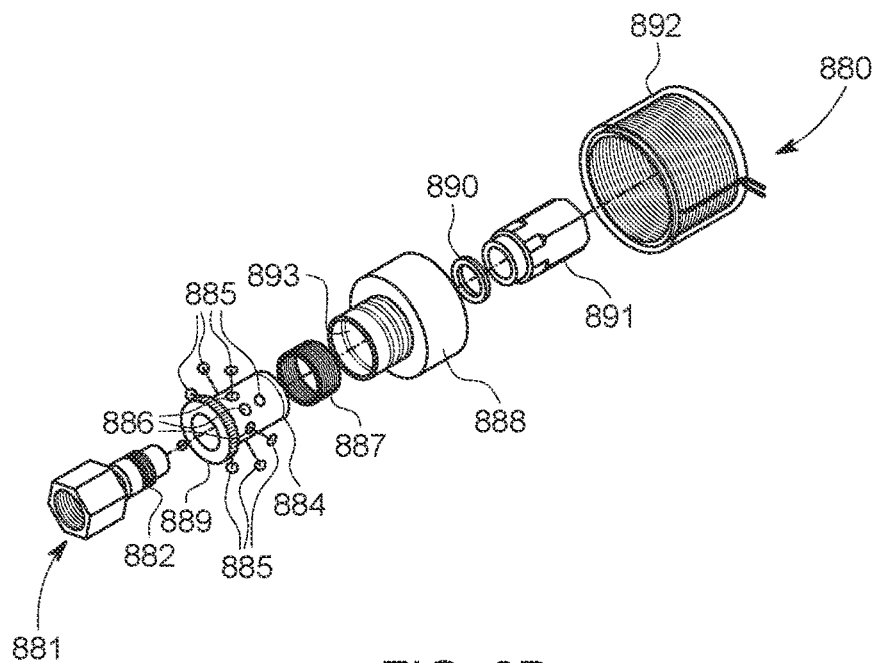
FIG. 8B is an exploded perspective view of an air-connecting mechanism with actuating collar to lock the female connector (truck/coupling side) to the male connector (trailer/receiving side), according to another embodiment.

As shown briefly in an embodiment in FIG. 8A, the receptacle 860 and probe 870 (which operate similarly to the probe 540 and receptacle 520 described above) can be adapted to include electrical contacts—for example a plurality of axially spaced-apart concentric rings 880, 882, 884 on the outer, conical surface of the probe 870—that make contact with corresponding rings or contacts 890, 892, 894 on the inner, conical surface of the receptacle 860 when the probe and receptacle connectors (862 and 872, shown in phantom) are fully engaged. This can complete the electrical connection between the trailer electrical components (lights, signals, etc.) and the switched power feeds on the truck. Appropriate plugs and sockets can extend from the probe and receptacle to interconnect standard truck and trailer electrical leads. Note that a variety of alternate electric connection arrangements can be employed in alternate embodiments in conjunction with, or separate from the pneumatic probe and receptacle.

With reference to the embodiment of FIGS. 8B-8E, a connector/coupling assembly 880 capable of electrical actuation to selectively change it between a locked and unlocked state is shown. This assembly 880 can be adapted to interoperate with the probe and receptacle assemblies described above, or other coupling and receiver arrangements, as described in embodiments hereinbelow. The coupling assembly 880 consists of a male coupling 881, which can be part of a receiver or probe as appropriate. In this embodiment, it comprises a conventional (e.g.) ½-inch NPT, threaded pipe, airline quick-disconnect fitting with one or more, unitary, annular locking trough 882. The trough 882 can define a semicircular cross section shape. The female portion of the overall assembly 880, adapted to releasably connect and lock-to, the male fitting 881 is formed as a sliding quick-disconnect fitting as well. In this embodiment, the inner sleeve 884 is sized to slide over the male fitting 881 when coupled together. A set of circumferential (e.g.) ball bearings 885 reside in holes 886 formed about the circumference of the sleeve 884. The ball bearings 885 are sized to engage the trough 882 when fully seated in the sleeve's circumferential holes 886. Thus, this forms a locking engagement. A spring 887 resides behind the inner sleeve 884. The ball bearings 885 are forced into the engaged position when an overlying, iron or steel (magnetic) sleeve 888 is located fully forward against a front shoulder 889 on the inner sleeve 884 (see FIG. 8E). This locking bias is provided by the spring, which also bears on a rear pipe fitting 891. In this position, the inner surface of the magnetic sleeve 888 is arranged to force the balls 884 inwardly against the mail fitting's trough 882. Thus, a positive lock between male and female components is formed. An O-ring seal 890, which is part of the female coupling seals this locked arrangement against air leakage (and thereby allows a pressurized connection to form).

Figure 8C:
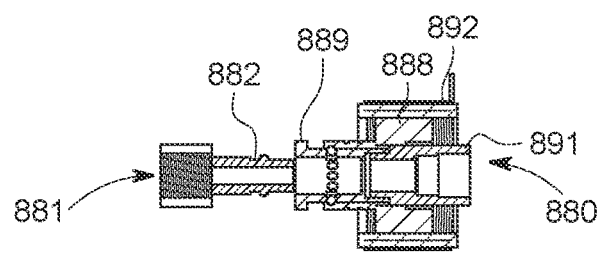
FIGS. 8C-8E are side cross sections of the mechanism of FIG. 8B showing a connection process for the connecting and locking the female connector to the male connector, respectively in a disconnected, connected and locked state.
Figure 8D:
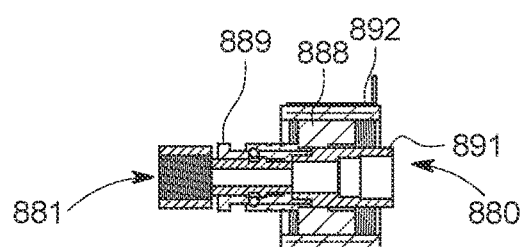

Notably, an outer annular (or other shape) sleeve 892 comprises an electromagnetic coil (e.g.) a solenoid. This coil, when energized forces the magnetic sleeve 888 axially rearwardly (against the bias of the spring 887), and places the ball bearings 885 in alignment with an annular trough 893 within the front, inner surface of the magnetic sleeve 888. This trough allows the ball bearings 885 to float radially outwardly from the holes 886 sufficiently to disengage them from the male fitting trough 882, thereby allowing axial movement of the male fitting relative to the female coupling. This unlocked state is shown in FIGS. 8C and 8D.

Figure 8E:
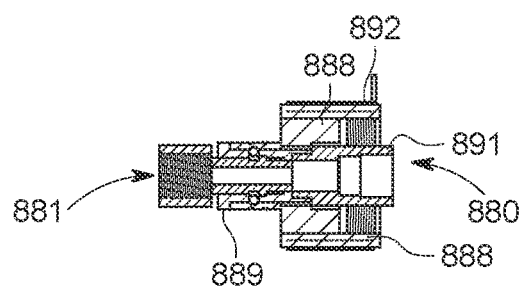

In operation, an electrical current is delivered to the outer sleeve/solenoid 892 via a relay or other switch that receives a signal from (e.g. the AV yard truck controller). An onboard battery (not shown) of sufficient power can be included in the female coupling assembly. Alternatively, power can be supplied by the AV Yard truck's electrical system. The magnetic sleeve, thus, moves axially rearwardly as shown in FIG. 8C. This position allows the ball bearings 885 to move radially inwardly as the make fitting move axially inwardly relative to the inner sleeve 884 (shown in FIG. 8D). During this step, the outer sleeve/solenoid 892 remains energized by the switch and battery. Once fully engaged, the switch disconnects the battery and the spring 887 drives the magnetic sleeve forwardly (as it is now free of bias by the magnetic solenoid). The ball bearings 885, thus encounter the non-indented part of the magnetic sleeve's (884) inner surface and are driven radially into the male fitting's trough 882, thereby forming a sealed lock as shown in FIG. 8E.

Disconnection of the male fitting 881 occurs when the outer sleeve/solenoid 892 is again energized by the switch/battery (typically based on a signal from the controller). In various embodiments, the male fitting 881, inner sleeve 884 and rear base fitting 891 can be constructed from a non-magnetic material, such as a durable polymer, brass, aluminum, titanium, nickel, etc. It should also be clear to those of skill that a range of variations of the assembly of FIGS. 8B-8E can be implemented, in which (e.g.) the solenoid is normally locked and the spring causes an unlocked state, the arrangement of components can be varied, etc. In an embodiment, the male fitting (which is not energized) can be part of the trailer's receptacle and the female coupling (which is energized) can be part of the AV yard truck's pneumatic line. Hence, the female coupling is brought into engagement with the male fitting by one of the various techniques described herein (e.g. a robotic arm, manipulator, framework, etc.).

B. Reel-Connected Probe

Figure 6:
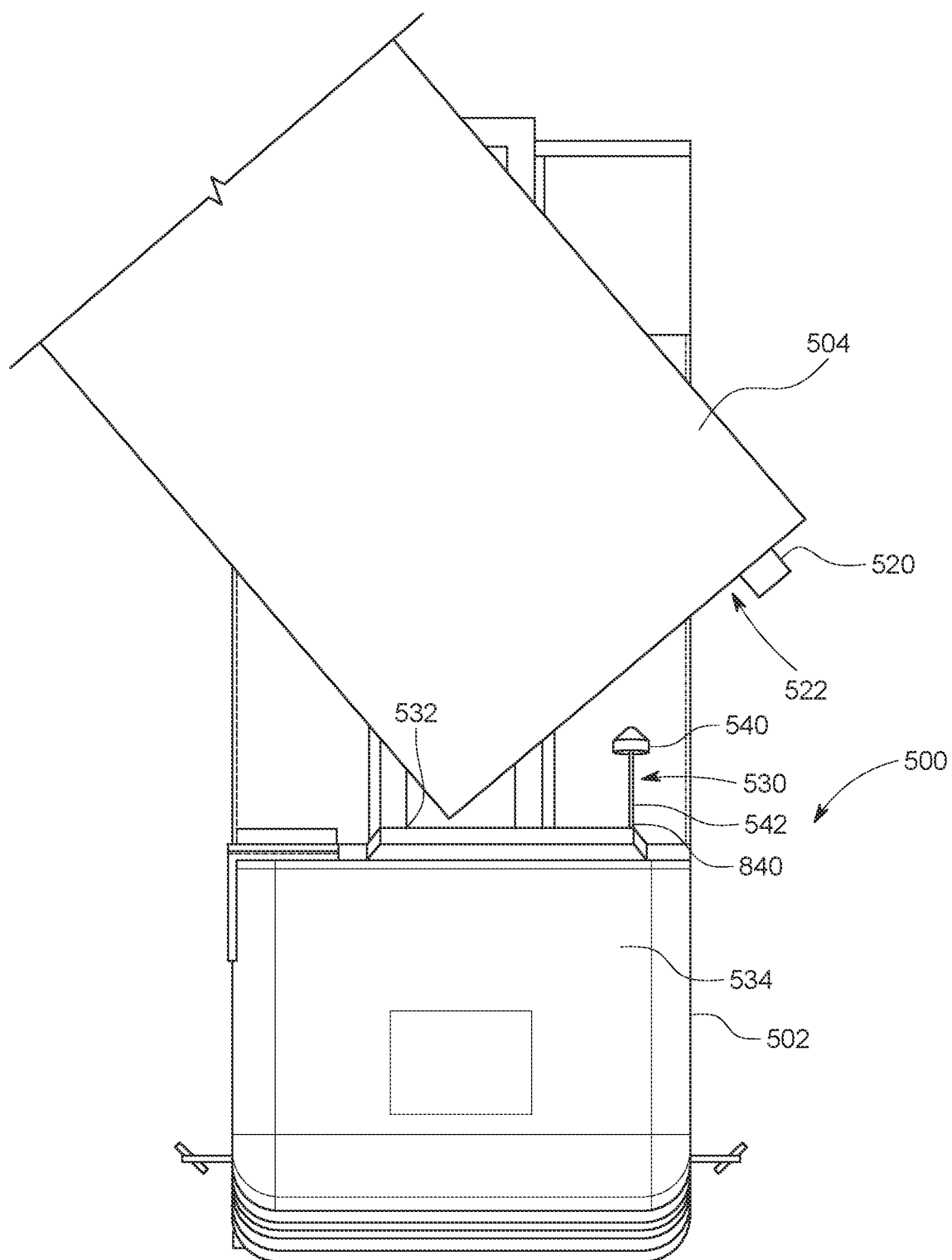
FIG. 6 is a partial top view of the hitched AV yard truck and trailer of FIG. 5 showing the trailer turned at an angle with respect to the truck so that the receptacle and the probe located remote from each other.
Figure 7:
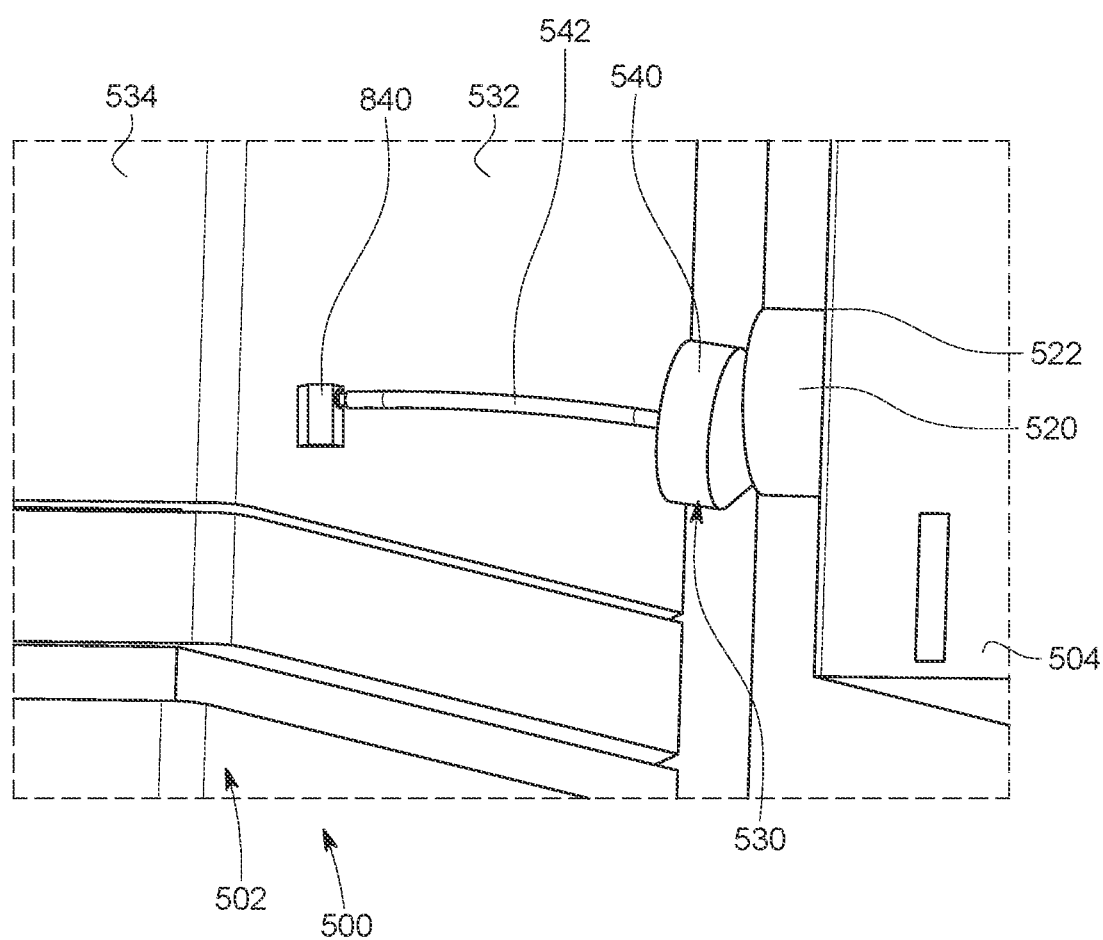
FIG. 7 is a more detailed perspective view of the probe and receptacle arrangement of FIG. 5, showing the probe guided into the receptacle during a connection process.
Figure 9:
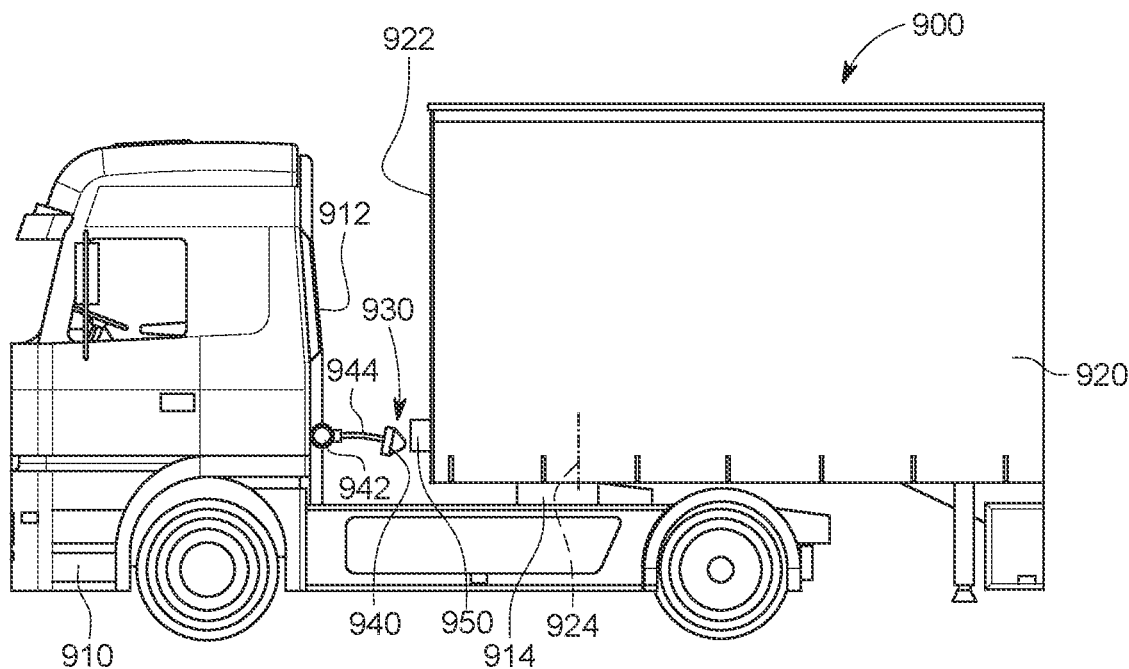
FIG. 9 is a side view of an exemplary AV yard truck and trailer having a truck-mounted probe and trailer-mounted receptacle for connecting (e.g.) pneumatic emergency brake service, in which the probe is mounted on a tensioned cable and spool assembly to allow for turning of the trailer with respect to the truck, according to an embodiment.
Figure 10:
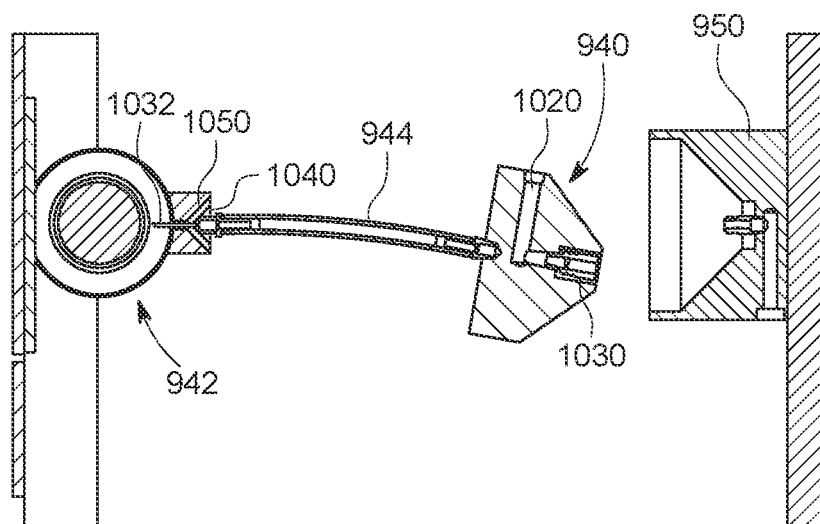
FIG. 10 is a more detailed side cross section of the probe and receptacle arrangement, including cable and spool assembly of FIG. 9.

Reference is now made to FIGS. 9 and 10 that show an arrangement 900 having a pneumatic connection 930 for use with an AV yard truck 910 and trailer 920 according to another embodiment, in which the probe assembly 940 is attached to a reel or spool 942. This arrangement recognizes that the trailer front face 922 often moves away from the cab rear face 912 during turns (i.e. where the kingpin pivots on dashed-line axis 924 about the fifth wheel 914). This condition is also shown in FIG. 6, where the receptacle 520 is spaced at a significant distance from the probe 540. To address the variability of spacing between the receptacle 950 and probe 940 (of the present embodiment of FIGS. 9 and 10) during turning motion, and more generally deal with shifting of position between the truck and trailer, the probe 940 is mounted on a semi-rigid tube 944, that is (in this embodiment) free of any air conduit. The illustrative, frustoconical probe 940 includes a side port 1020 (FIG. 10) that routes air to the (e.g. female) pressure connector 1030 at the probe's proximal end. The probe side port 1020 interconnects to the truck pressure line in a manner similar to that described above for probe 540. This connector and the associated receptacle (950) components are otherwise similar to the embodiment of FIGS. 5-8 described above and interconnection is made according to a similar operation. That is, the truck is backed into the trailer with the probe 940 and receptacle 950 in relatively straight-line alignment. Then, the probe 940 is guided into the receptacle 950 by interengagement between respective frustoconical surfaces until a positive lock between associated pressure connectors occurs. As in the embodiment of FIGS. 5-8, the rigidity of the semi-rigid tube 944 is sufficient to prevent buckling as the connectors are biased together to create a lock. Once locked, as the probe 940 is tensioned by movement of the trailer 920 relative to the truck 910, the tension is relieved by paying out a cable from the spool 942 that is attached to the proximal end of the tube 944. The spool 942 can be spring-loaded so that it maintains a mild tension on the tube 944, and associated probe head, at all times. The hose attached from the pneumatic source to the probe side port 1020 can be flexible (e.g. contain spring coils as shown generally in FIG. 2), or can otherwise absorb stretching and contraction. Note that the proximal end of the tube includes a (positive) frustoconical end member 1040 that mates with a (negative) frustoconical receiver 1050 on the spool 942. This assembly forms a backstop for the tube 944 when the probe head is biased into the receptacle 950 and ensures that the spool cable 1032, when fully retracted, draws the cable fully back into the spool 942, free of any kinks near the base of the tube 944. The spool can be constructed in a variety of ways, such as a wrapped/wound clockwork-style spring, and appropriate gearing to generate a predetermined torque over a predetermined number of revolutions (which should be clear to those of skill). The spool 942 can alternatively be motorized, paying out cable and drawing it in, based on prevailing tension. In this embodiment, the spool 942 acts as both a cable (1032) winding device, and a base for the probe assembly 940 in a single unit. Note the cable spool can be a commercially available component. In addition, the pressure connectors can be commercially available components, such as those used in standard pneumatic hose applications.

Figure 11:
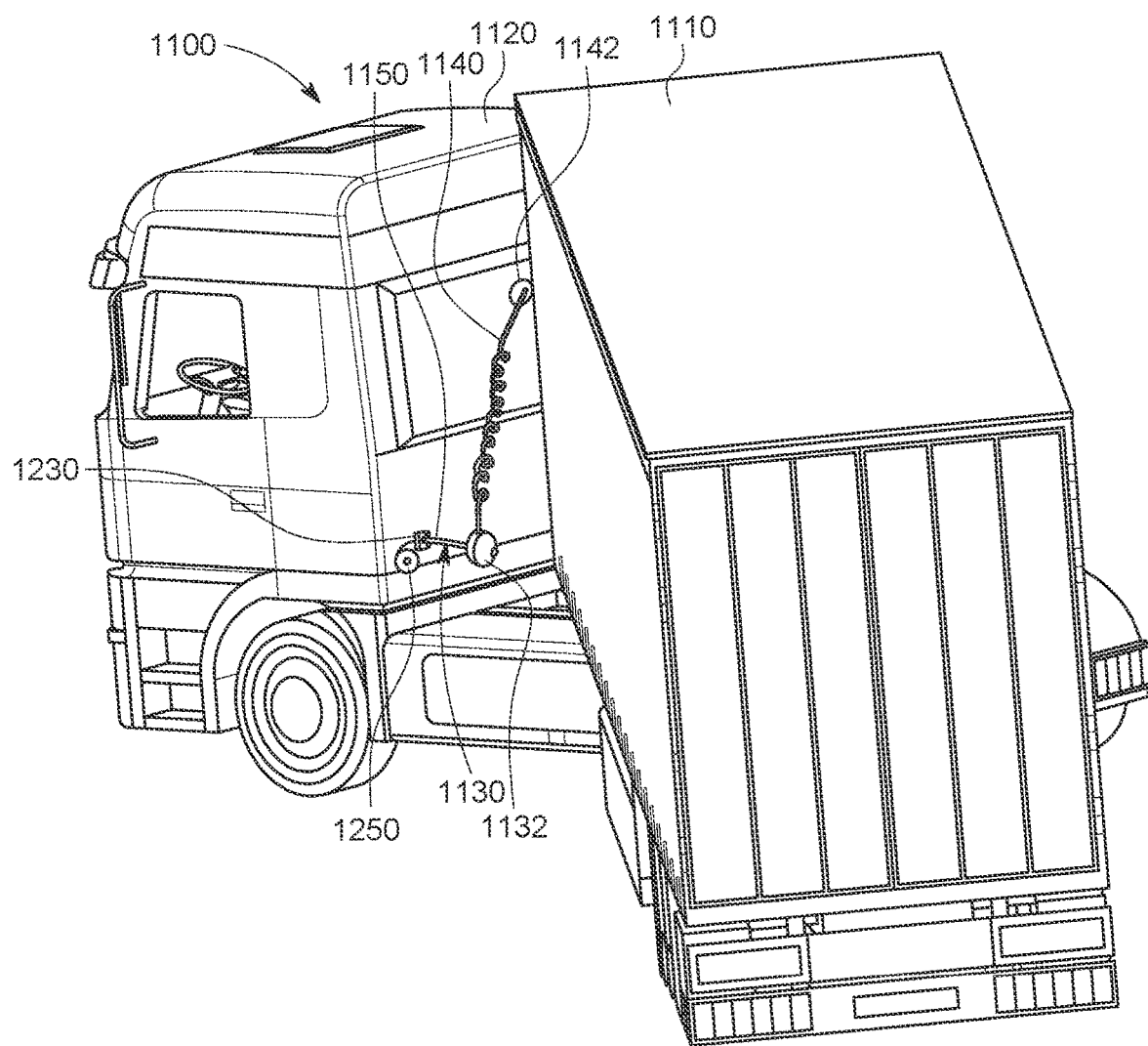
FIG. 11 is a rear-oriented perspective view of an AV yard truck and trailer in a hitched configuration showing a truck-mounted probe and trailer-mounted receptacle for connecting (e.g.) pneumatic emergency brake service, in which the probe is mounted in connection with an adjacent tensioned cable and spool assembly to allow for turning of the trailer with respect to the truck, according to an embodiment.
Figure 12:
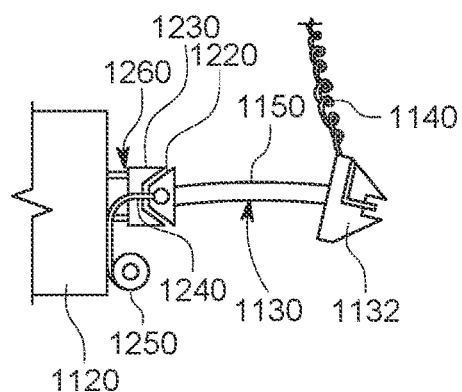
FIG. 12 is a more detailed side cross section of the probe and receptacle arrangement, including cable and spool assembly of FIG. 11.

This arrangement 1100 is further detailed in the embodiment of FIGS. 11 and 12, in which the trailer 1110 contains a receptacle (not shown) as described above or in accordance with another embodiment (described below), and the truck 1120 contains the probe assembly 1130 that is adapted to removably engage the receptacle as described above. The head 1132 of the probe assembly 1130 includes a side-mounted pressure port and associated hose 1140 (e.g. an emergency brake pneumatic line from the truck's (1120) conventional outlet 1142 for such). The probe head 1132 is mounted on a semi-rigid tube 1150, as described above, with a (positive) frustoconical end member 1220, which is adapted to seat in a conforming, (negative) frustoconical receiver 1230, as also described above. The receiver is permanently, or temporarily, affixed to the rear face of the truck 1120. The end member 1220 provides an anchor for a tension cable 1240, and that cable 1240 extends through the receiver 1230 to an external spring-wound spool 1250. The spool exerts a mild tension on the probe assembly 1130 in a manner described above. The spool 1250 can be constructed by any acceptable technique and can be a commercially available component. The spool 1250 is also affixed to the face of the truck at an appropriate location. A chase that allows the cable 1240 to pass from the receiver to the spool 1250 can be provided (e.g. a gap 1260).

C. Removable Receptacle Assemblies/Alternate Pressure Connections

Figure 13:
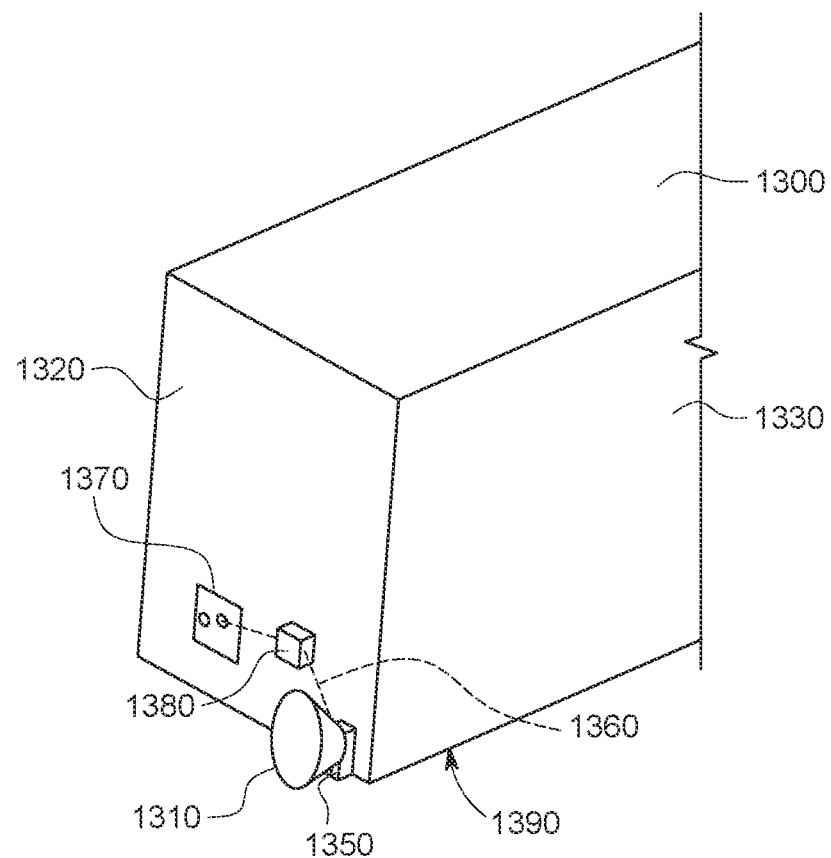
FIG. 13 is a partial rear-oriented perspective view of a trailer having a frustoconical receiver for a pneumatic connection for use with an AV yard truck according to an embodiment.
Figure 14:
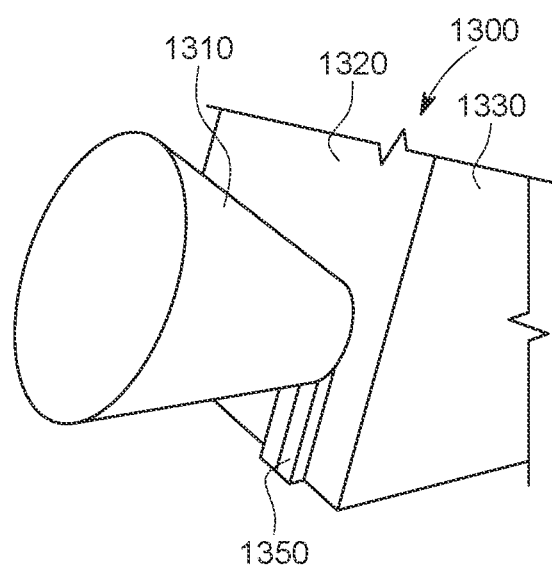
FIG. 14 is a more detailed perspective view of the conical receiver of FIG. 13 showing an interconnected bracket assembly allowing for selective attachment to and detachment of the receiver from the trailer body.
Figure 14A:
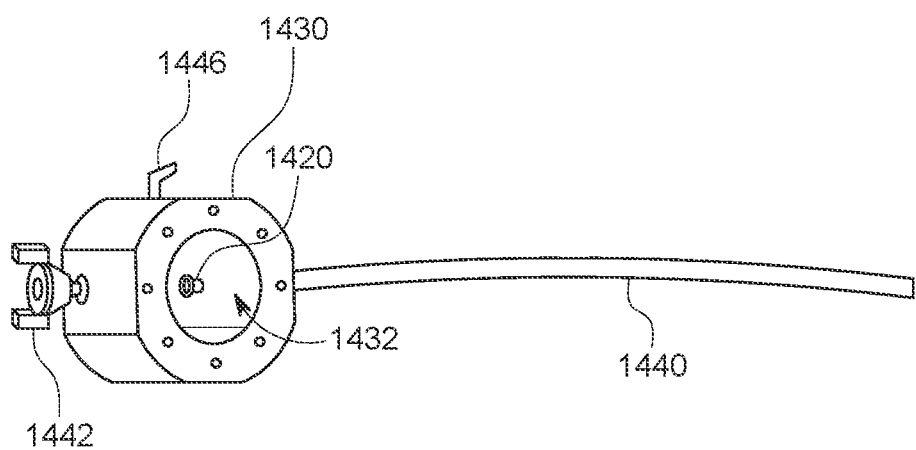
FIG. 14A is perspective view of an illustrative receiving receptacle with an interconnected pneumatic line/air-hose that connects to the trailer pneumatic line's existing glad hand.
Figure 23:
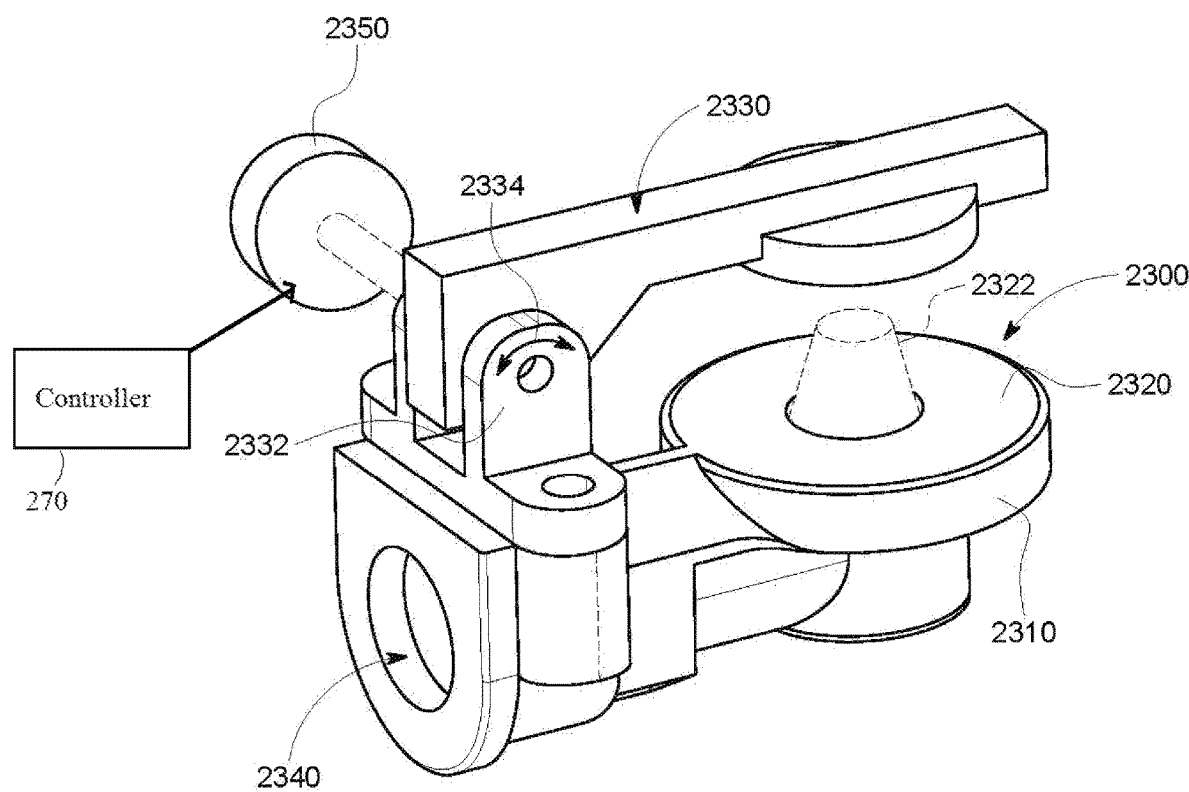
FIG. 23 is a top-rear-oriented perspective view of a modified glad hand connector for use in forming pneumatic connections, according to various embodiments.
Figure 24:
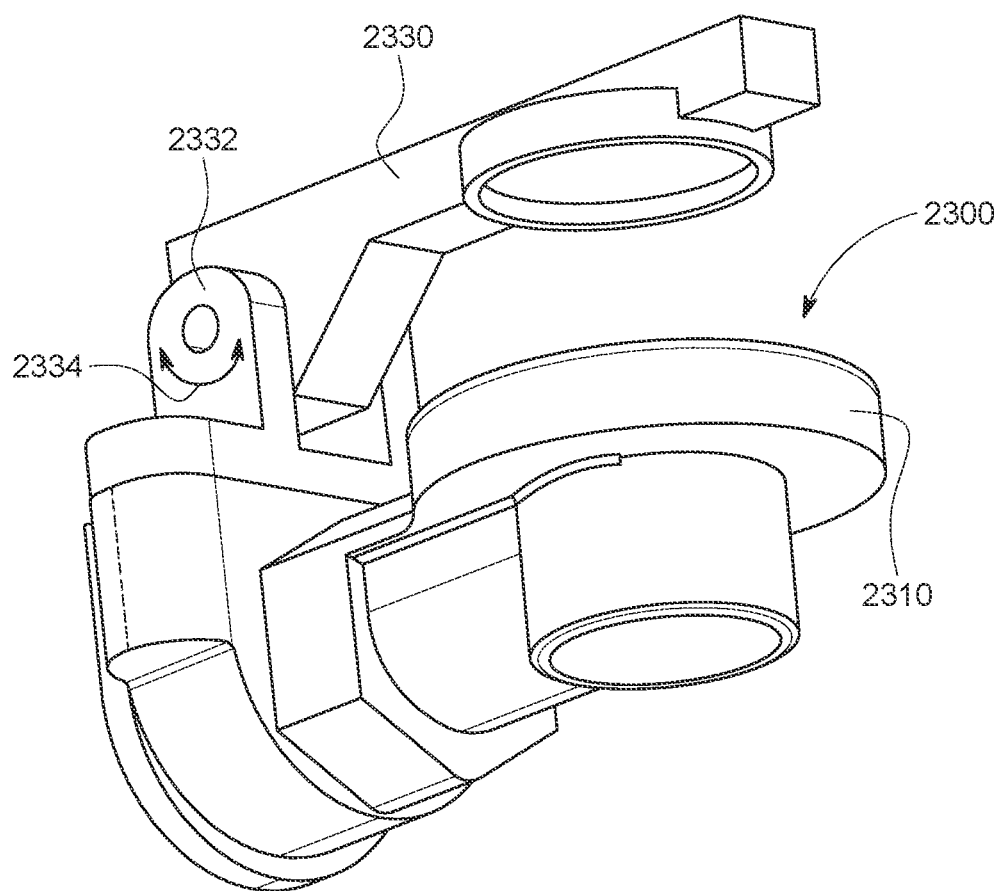
FIG. 24 is a bottom-front-oriented perspective view of the modified glad hand of FIG. 23.
Figure 25:
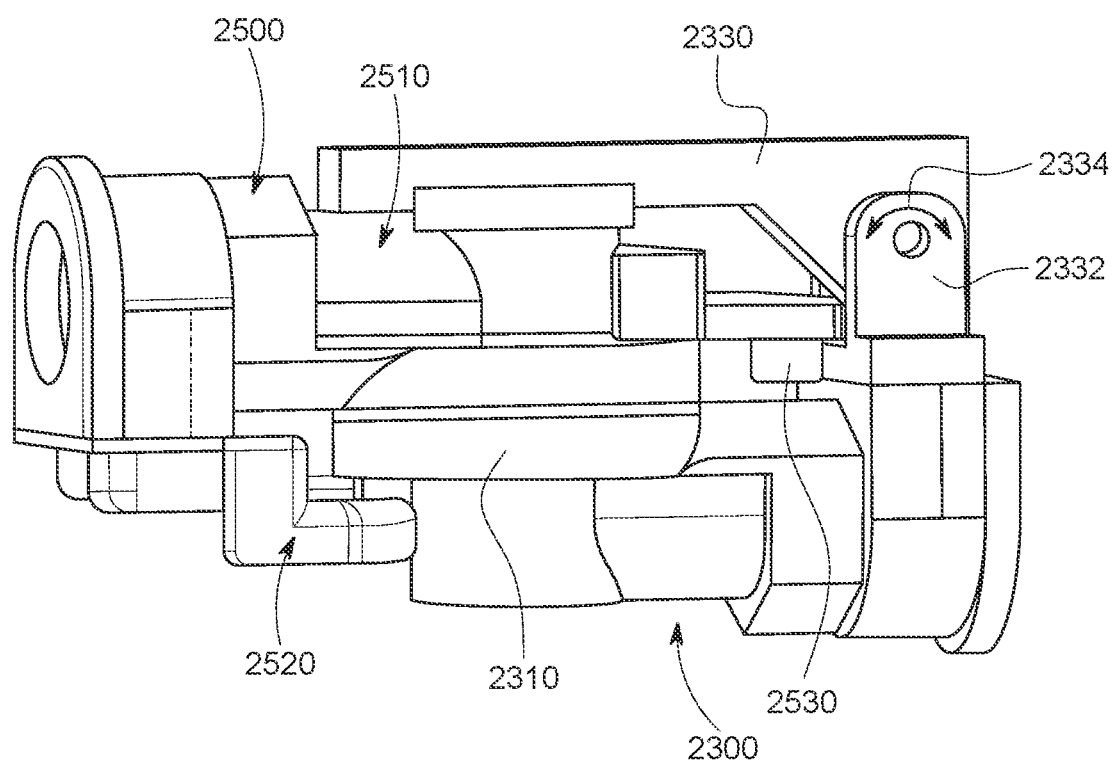
FIG. 25 is a side-oriented perspective view of the modified glad hand of FIG. 23, shown secured to a conventional glad hand (e.g. on trailer emergency brake line) with the movable thumb clamp thereof engaged to the top of the conventional glad hand body.

FIGS. 13, 14 and 14A show and arrangement 1300, consisting of a removable receptacle assembly 1310 that is mounted variably on the front face 1320 of the trailer 1330. As shown, a clamping assembly, or other form of mounting bracket 1350, can be temporarily or permanently fixed to the trailer in a manner that locates the receptacle (in this example, a frustoconical shape) 1310 at a position on the front face 1320 of the trailer 1330. In an operational embodiment, the clamping assembly 1350 can be attached at the guard shack (110 in FIG. 1), at the desired location, so as to provide the needed autonomously operable pneumatic connection. As part of the attachment, a pneumatic hose (dashed line 1360) can be attached to a conventional port 1370 of the trailer 1330. The pneumatic circuit can direct to the port 1370 from a continuous hose extending from the receptacle 1310, or via an intermediate connection (represented as box 1380) between a separate (conventional) trailer pneumatic hose and a receptacle hose. The intermediate connection 1380 can be accomplished using e.g. a conventional or customized glad hand connector arrangement. A modified glad hand arrangement is described in further detail (FIGS. 23-25 below).

As shown further in FIG. 14A, a male, quick-disconnect-style fitting 1420 (for example, similar or identical to fitting 881 in FIG. 8B) is shown located coaxially within the cylindrical or frustoconical well 1432 of a receiver housing

1430. The receiver housing 1430 can be constructed from a variety of materials, such as aluminum alloy, steel, polymer, or combination of materials. The housing can be adapted to be secured directly to the trailer body (e.g. along the front face as described above) or using a mounting plate assembly, as described hereinbelow (see, for example, FIGS. 18-22). The fitting 1820 can be connected directly, or via a port arrangement within the housing, to a trailer pneumatic line 1440—for example, an emergency brake line. A valve knob 1442 or other pressure regulating system (e.g. a safety valve) can be integrated in the housing port system. A variety of attachments, brackets, accessory mounts, switches, can be applied to the receiver housing 1430, represented generally by the handle 1446, which can reside in a threaded well or other structure.

Figure 15:
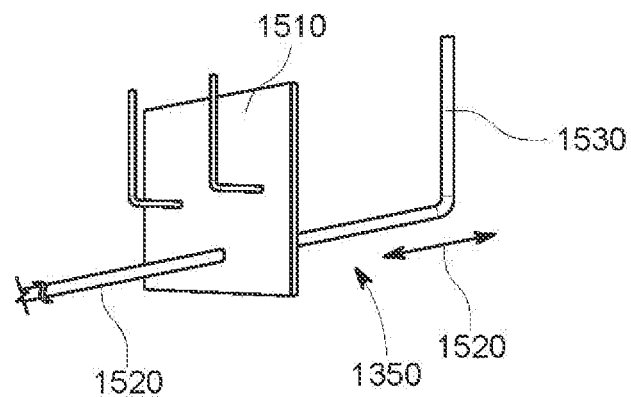
FIG. 15 is a perspective view showing a movable clamp for allowing selective attachment and detachment of the bracket.
Figure 16:
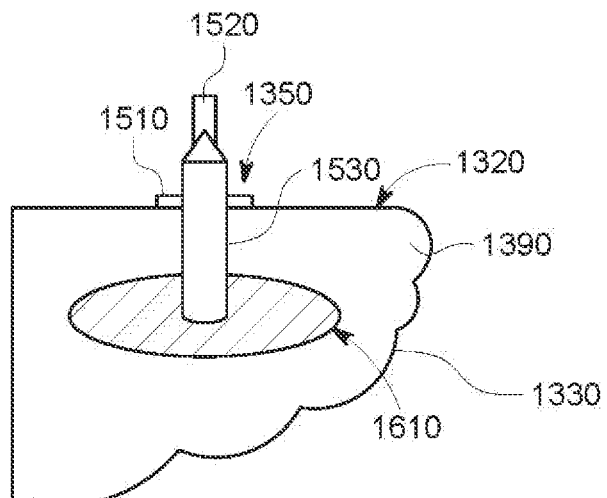
FIG. 16 is a partial bottom view of the trailer of FIG. 13 showing the insertion of the bracket end hook or post into a slot in the trailer bottom.
Figure 17:
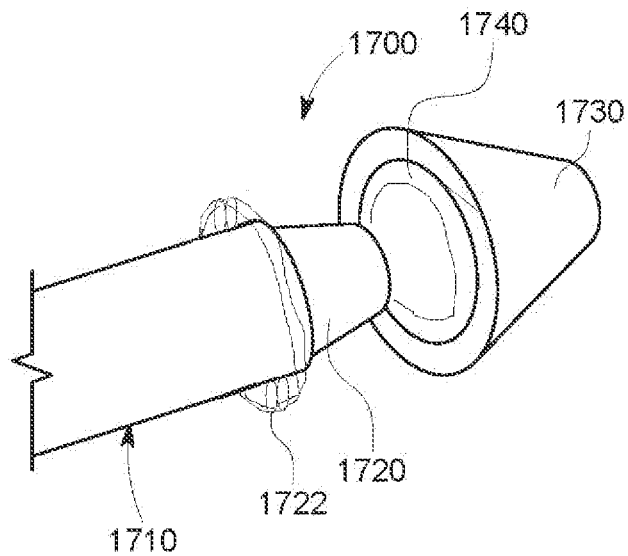
FIG. 17 is a perspective view of a pneumatic connection system for an AV truck and trailer, showing frustoconical receiver or receptacle attached to a trailer and a probe assembly with an inflatable ring for securing the probe and receptacle together with a pressure-tight seal.
Figure 18:
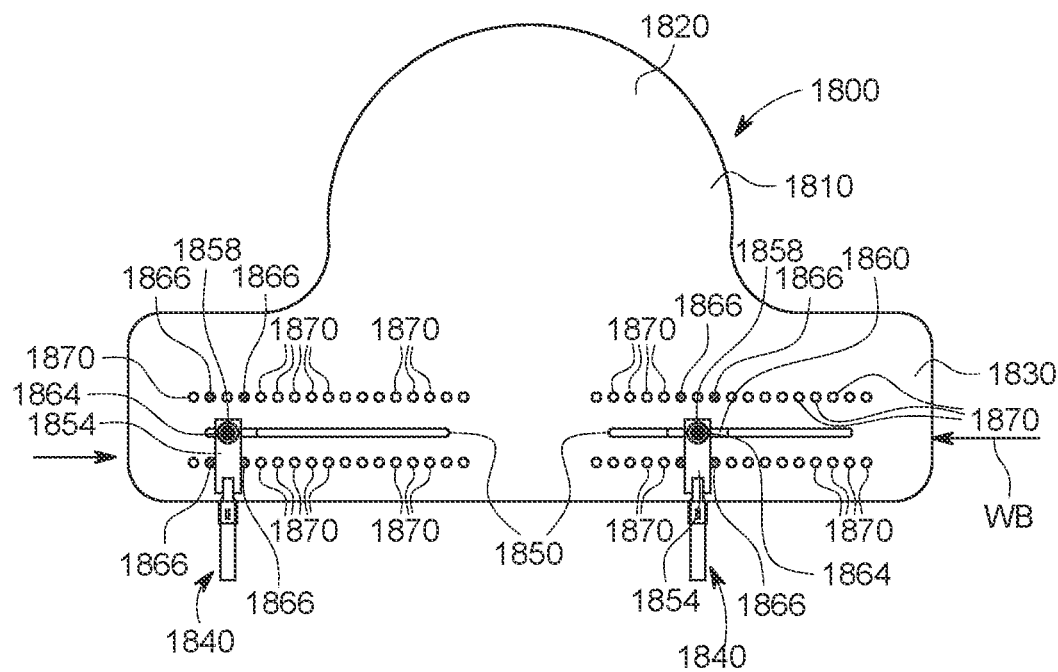
FIG. 18 is a front view of a removable plate for mounting one or more receptacles for connection of pneumatic and/or electrical service on a trailer, including a pair of bar-clamp-like brackets that engage a slot in the bottom/underside of the trailer, according to an embodiment.
Figure 19:
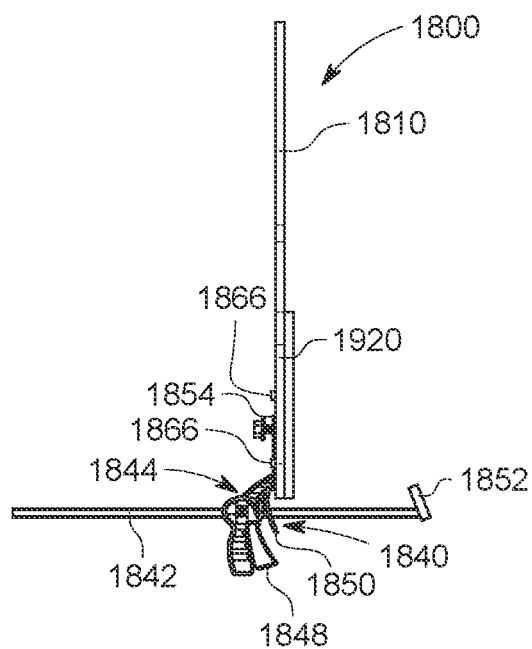
FIG. 19 is a side view of the plate and bracket assembly of FIG. 18.
Figure 20:
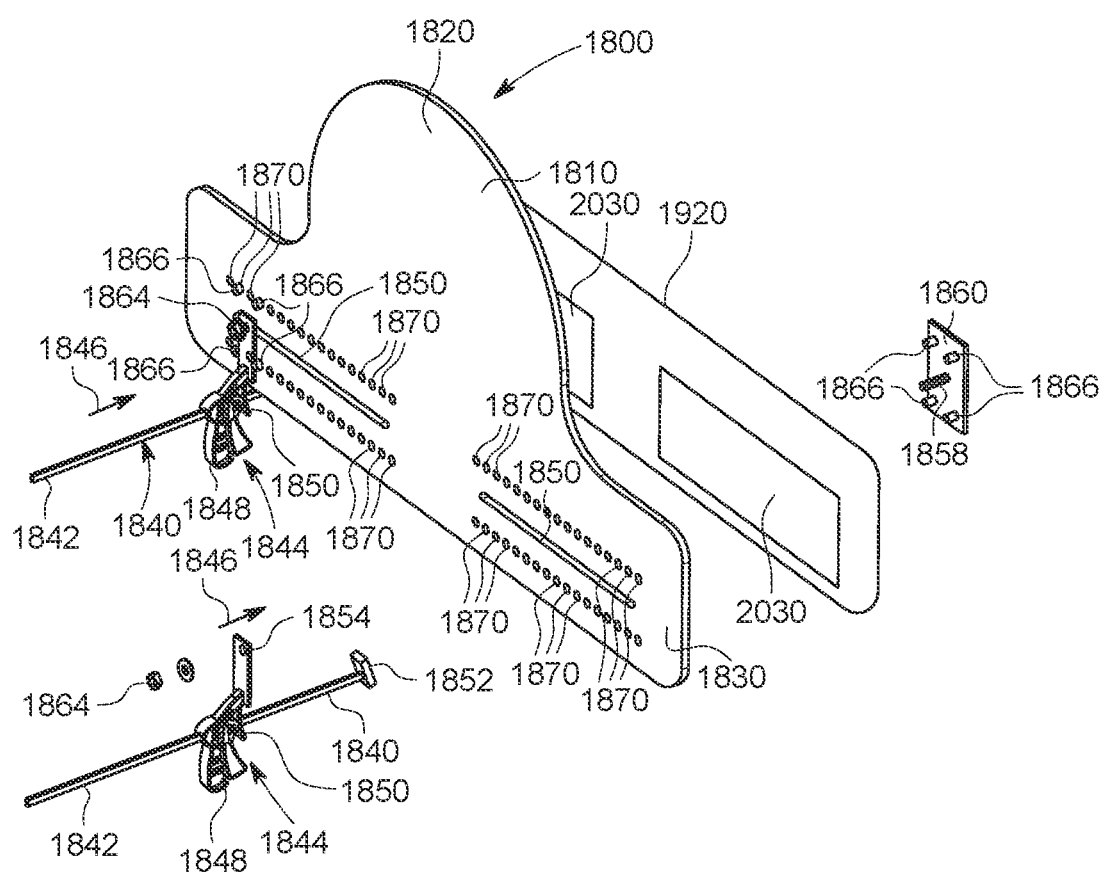
FIG. 20 is an exploded view of the plate and bracket assembly of FIG. 18.

With further reference to FIGS. 15 and 16, the clamping assembly 1350 can consist of a plate 1510 that slides (double-arrow 1522) along a bar 1520, and can be locked relative to the bar using any appropriate mechanism—e.g. a pinch, clamp, turn screw, etc. The bar 1520 terminates in an upright post or hook 1530 located at a rearmost end of the bar 1520. Note that the receptacle in this embodiment can be similar to those described above, containing an internal pressure connector for use with a probe head of appropriate design. Alternatively, the receptacle can be adapted to receive an alternate form of connector, such as that shown in FIG. 17. The post/hook 1530 is adapted to extend upwardly into a slot, step or hole 1610 at the bottom 1390 of the trailer 1330. The post/hook engages a front edge of the slot/step/hole 1610 as shown (FIG. 16) when the clamp is tightened, with the plate 1510 engaged against the front face 1320 of the trailer 1330. In this manner, the plate 1510 and associated receptacle (1310) are firmly attached in a desired position to the trailer front face when located in the yard. The clamping arrangement 1350 can be detached from the trailer 1330 at (e.g.) the guard shack as the trailer is placed into storage, exits the yard, or is hitched to an OTR truck, with conventional connections made to the trailer's pneumatic lines and electrical leads by the truck. The plate 1510 can include a frictional backing (e.g. a silicone, rubber or neoprene layer/sheet) to avoid marring the surface of the trailer and to resist shifting once clamped.

As discussed above, the clamped, or otherwise affixed, receptacle can employ a quick-disconnect-style pressure connector (see, for example FIGS. 8B-8E, above), or an alternate arrangement can be employed. As shown in the arrangement 1700 of FIG. 17, the probe assembly 1710 can define a (positive) frustoconical probe head 1720 constructed from an appropriate material (e.g. metal, polymer, etc.), as described generally above, that mates with a (negative) frustoconical receptacle 1730, with an internal geometry that accommodates an expanding, inflatable locking ring 1722, located at the proximal end of the probe head 1720. When pressure is applied (either tapping the pressure of the pneumatic line or a separate pressure source that is switched on during connection), the ring 1722 expands to bear against (e.g.) an annular shoulder 1740 of the receptacle to sealably lock the probe and receptacle together. In this manner, the arrangement resists pull-out and defines a gas-tight pressure seal. Additional internal pressure connectors can be provided in this arrangement with or without (free-of) a quick-disconnect locking mechanism.

Note that the pressure connection in any of the embodiments herein can also be sealably locked and unlocked using appropriate motorized and/or solenoid operated actuators.

Reference is made to FIGS. 18-22, which show a further embodiment of a detachable receptacle, or other form of removable connection between the truck pneumatic line(s) and the trailer's (2100 in FIG. 21) pneumatic lines, and optionally, its electrical leads (not shown). Note that this arrangement 1800 can be used to carry a plurality of receptacles/connectors for both pneumatic pressure and electricity. In the present embodiment, a single receptacle 2110 is mounted on the plate 1810 of the arrangement 1800, with a single side-mounted port 2210 (the close-up depiction 2200 of FIG. 22) to interconnect with an air hose of the trailer (e.g.) braking system via a standard/conventional port and hose. The plate can be constructed from any acceptable material, such as a metal (e.g. aluminum, steel, etc.), polymer (e.g. polycarbonate, acrylic, PET, POM, etc.), composite (e.g. fiberglass, carbon fiber, aramid fiber, etc.), or a combination of materials. In an exemplary embodiment, the plate includes an upper, semi-circular extension 1820 and a lower rectangular base 1830. The plate's upper extension 1820 and base 1830 are shaped in one of a variety of possible geometries. The upper extension is shaped and sized to accommodate the receptacle (or other connector), which can be mounted to it by adhesives, fasteners, clamps, and/or other attachment mechanisms. The rectangular base 1830 is sized in width WB sufficiently to allow placement of the clamp assemblies 1840 in appropriate slots 2120 that are typically located near the front face 2140 of the trailer bottom 2130. In an embodiment, the width WB of the base 1830 can be between approximately 1 and 2 feet, although a smaller or larger dimension can be defined in alternate embodiment.

The clamp assemblies 1840 are each mounted at an appropriate widthwise location on the base 1830 of the plate 1810, riding within horizontal slots 1850. The clamp assemblies each include a bar 1842 upon which a clamp member 1844 slides. The clamp members 1844 are in the form of conventional bar clamps that progress along a clamping direction (arrow 1846), as the user repetitively squeezes a grip 1848. Clamping pressure is released and the clamps can be moved opposite arrows 1846 to a more open state by toggling releases 1850. The bars include a hook or post 1852 that engages the slot 2120 in the trailer bottom 2130. The upper portion of each clamp member 1844 includes a flange 1854 that interengages a bolt 1858 on a lateral adjustment plate 1860 that bears against an opposing side of the plate 1810 when the flange 1854 is secured to the plate as shown. The 1858 bolt of the lateral adjustment plate 1860 passes through the slot 1850 in the plate 1810, and is secured to the flange 1854 by a nut 1864. The nut can be (e.g.) a standard hex nut, wing nut or threaded lever (for ease of attachment). The lateral adjustment plate 1860 also includes at least four pegs 1866, which surround the bolt 1858. These pegs are adapted to seat in holes 1870 located above and below each slot 1850 on the plate 1810. In this manner the clamp members 1844, of the corresponding assemblies 1840, can be adjusted and secured laterally (horizontally) along the plate 1810 so that each post/hook 1852 is located appropriately to engage a slot 2120 in the trailer bottom 2130. The back of the plate 1810 can include an elastomeric (e.g. neoprene, rubber, foam) backing 1910, which resists sliding friction when the plate 1810 is clamped securely to the trailer front face 2140 and protects the face 2140 form marring and scratching. The backing 1910 can include cutouts 2030, which allow the clamp assemblies 1840 to be adjusted along respective plate slots 1850.

In an alternate embodiment, the forward extension of the rods is mitigated by attaching the plate directly to the forward ends of each rod and providing a separate grippable clamp member that engages the front face of the trailer separately. In such an arrangement, the plate floats forward for the trailer face. Other arrangements in which a clamp engages slots on the trailer bottom and thereby secures an upright plate containing a connector are also expressly contemplated.

In an alternate embodiment, the receiving receptacle/receiver on the trailer can be mounted in a preferred available location on the front face of the trailer by the use of (e.g.) fasteners—such as an interengaging fabric sheet and/or tape fastener, including but not limited to, industrial grade hook-and-loop tape/sheet and/or Dual-Lock' recloseable fasteners (available from 3M Corporation of Minneapolis, MN), or similar mechanisms, as a removably attached device when onsite (or permanently affixed). In an embodiment, the receiving receptacle is also marked with an identifying bordering pattern that the associated ranging/locating software can use to orient the robotic arm that removably carries the AV yard truck's connector/probe/coupling arm, and align this coupling device.

For purposes of other sections of this description, the depiction of the trailer 2100 in FIG. 21 is now further described, by way of non-limiting example. The trailer rear 2150 can include swinging or rolling doors—among other types (not shown). An underride protection structure 2160 is provided beneath the rear of the body. A set of wheels 2172—in the form of a bogey arrangement 2170 is shown adjacent to the rear 2150. A movable landing gear assembly 2180 is provided further forward on the trailer bottom 2130. The kingpin 2190 is also depicted near the front face 2140 along the bottom 2130.

D. Modified Glad Hand Connector and Uses

FIGS. 23-25 depict a modified glad hand connector 2300 for use in various embodiments of the pneumatic connection arrangement herein. In general, the glad hand is modified to clamp so as to enable automatic connection to a stock fitted trailer, with a uniformly accepted glad-hand. This allows the vast majority of trailers currently on the road, regardless of model/brand, to avoid the need of a specialty retrofit in order to integrate with an AV yard truck as described herein, and its automated trailer attachment systems. The modified clamp, compatible with conventional glad hands, comprises a base 2310 with a rubber grommet 2320, which can optionally include a hollow central cone (dashed member 2322) protruding from the standard rubber grommet 2320 (to insert, and assist in glad-hand alignment, as well as allow the passage of air). The cone can be omitted in alternate embodiments and a conventional grommet geometry or another modified geometry—for example, a pronounced profile that compresses more when engaging an opposing glad hand grommet.

A thumb-like clamp (or "thumb") 2330 is provided on a pivoting clevis 2332 (double arrow 2334) at the inlet port 2340 of the modified glad hand 2300, to pivot toward the grommet 2320 when locked and pivot away from the grommet 2320 when released. As shown particularly in FIG. 25, the modified glad hand 2300 is interconnected with a standard glad hand fitting 2500, for example, part of the trailer pneumatic system. As shown, the thumb 2330 compresses on the top 2510 of the standard glad hand 2500 while the conventional turn-locked locking shoulder 2530 is unused, as such is omitted from the modified glad hand. Rather, in this embodiment, the seal between opposing glad hand grommets is secured by the pressurable engagement of the thumb 2330. The thumb 2330 is, itself, actuated between an engaged position (as shown) and a released position (not shown, but pivoted out of engagement with the standard glad hand) by an appropriate rotational driving mechanism—for example, a direct-drive or geared rotary solenoid and/or stepper motor 2350, that can include position locks or a rotational pneumatic actuator. Alternatively, a linear actuator, or other force-translation mechanism, can be employed with appropriate links, gearing etc. The actuator 2350 receives signals from an appropriate controller within the vehicle's overall control system when a connection is to be made or released.

In a further embodiment, the glad hand body (or a portion thereof) can be magnetized or provided with (e.g. powerful rare-earth) magnets, thereby allowing for magnetically assisted alignment and a positive pressure seal with the trailer glad hand. Such magnetic connection can also be used to assist in connection and alignment of other types of connectors, such as the above-described probe and receptacle connector assemblies.

In various embodiment, the modified glad hand can be used to interconnect directly from the AV yard truck's pneumatic system to that of the autonomously hitched/unhitched trailer. A variety of mechanisms can be used to perform this operation. Likewise, the connection described above, or another form of connection can be used with an appropriate guiding mechanism/system that can be integrated with various sensor or the rear face of the truck (e.g. cameras, LiDAR, radar, etc.).

In any of the embodiments described herein, it is contemplated that the receptacle can be arranged to coexist with conventional (e.g. glad hand) connectors and/or electrical connectors. A Y-connector (not shown), can be arranged to route to the receptacle(s) and to conventional trailer connectors—e.g. standard or custom glad hands that integrate with the conventional air system on (e.g.) an OTR truck or conventional yard truck. The Y-connector can include appropriate valves and venting so that it seals when needed, but allows escape of air to depressurize the system as appropriate. Battery powered or electrical-system-connected air valves (e.g. linear or rotary solenoid driven valves) of conventional design can be employed. This allows the receptacle assembly to act as a true retrofit kit, that can be mounted upon and stay with the trailer after it leaves the yard, or can be mounted offsite—for example, for trailers that will frequent the automated facility of the present embodiments.

E. Automated Guidance of Trailer Pneumatic and Electrical Connectors

Figure 26:
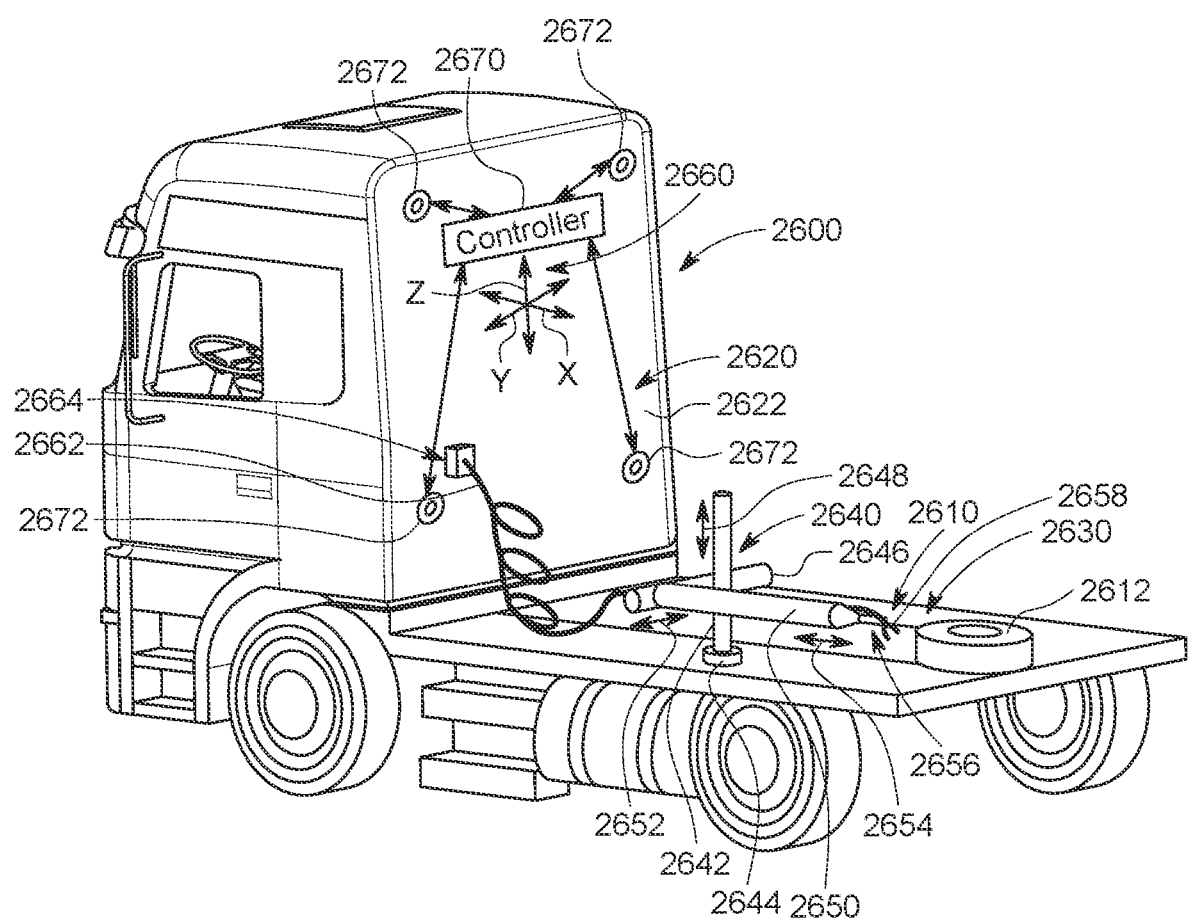
FIG. 26 is a rear perspective view of an AV yard truck showing a multi-axis robot arm assembly for connecting a truck pressure or electrical connector to a trailer receptacle according to an embodiment.

Reference is made to FIG. 26, which shows an AV yard truck 2600 having a conventional chassis bed 2610 with a fifth wheel 2612, and a cab 2620 in front of the chassis bed 2610. The area 2630 in front of the fifth wheel 2612 has sufficient space (between the rear face 2622 of the cab 2620 and the front face of a hitched trailer (not shown)) to accommodate a robotic framework 2640. In this exemplary embodiment, the framework 2640 consists of an upright post 2642 that is secured to the chassis bed 2610 at an appropriate location (for example offset to the left side as shown). The post 2642 can be secured in a variety of ways that ensures stability of the robotic framework 2640—for example, a bolted flange 2644 as shown. The upright post 2642 provides a track for a horizontal bar 2646 to move vertically (double-arrow 2648) therealong. Motion can be provided by drive screws, rack and pinion systems, linear motors, or any appropriate electrical and/or pneumatic mechanism that allows displacement over a predetermined distance (for example, approximately 1-2 feet in each direction). The horizontal bar 2646 could also support a rearwardly directed telescoping arm 2650 so that it can move (double-arrow 2652) horizontally/laterally from left to right (with respect to the truck 2600). The arm can move (double-arrow 2654) horizontally from front-to-rear using a variety of mechanisms that should be clear to those of skill, thereby placing an end effector 2656 ("coupling device") at precise x,y,z-axis coordinates (axis 2660) within a predetermined range of motion. The end effector can carry a modified glad hand or probe head as described above for attachment to the trailer glad hand or (e.g.) receptacle. The end-effector-mounted coupling device 2658 has a side-ported pneumatic hose 2662, that is, itself, linked to the vehicle port 2664 on the rear face 2622 of the cab 2620. That is, the end effector 2656 is moved via the controller 2670, which receives inputs from sensors 2672 of the type(s) and function(s) described above (camera, laser rangefinder, etc.). These sensors determine the position in 3D space of the trailer connector when present (e.g. after hitching is complete).

In operation, using the robotic framework 2640, the alignment of the telescoping end effector 2656, and associated connector 2658 (e.g. the modified glad hand clamp) is directed, in part, by sensors 2672 in the form of 2D or 3D cameras. However, more detailed information of the trailer type and precise receptacle location can also be read off of the trailer (e.g.) using a QR/Bar or other appropriate, scannable ID code, RFID or other data-presentation system. This embedded value can provide a precise x,y,z-coordinate location of the receptacle and optionally the rotations, Ox, Oy and Oz, about the respective x, y and z axes. In an embodiment, the location can be computed in relation to a fixed point, such as the code sticker itself, kingpin, trailer body edge and/or corner, etc. In another embodiment, the receiving connector is surrounded by a specific pattern of passive reflective stickers that can be used to home in on the specific location of the receiving connector.

As described above, a conventional or custom passive or active RFID sticker/transponder, or another trackable signaling device can be placed directly on the trailer connector (e.g. glad hand), to assist the end effector 2656 in delivering the connector(s) 2658 precisely to the alignment position. The sticker can either be placed at the time of the guard shack check-in, or by the driver, as the OTR connectors are disengaged.

Figure 26A:
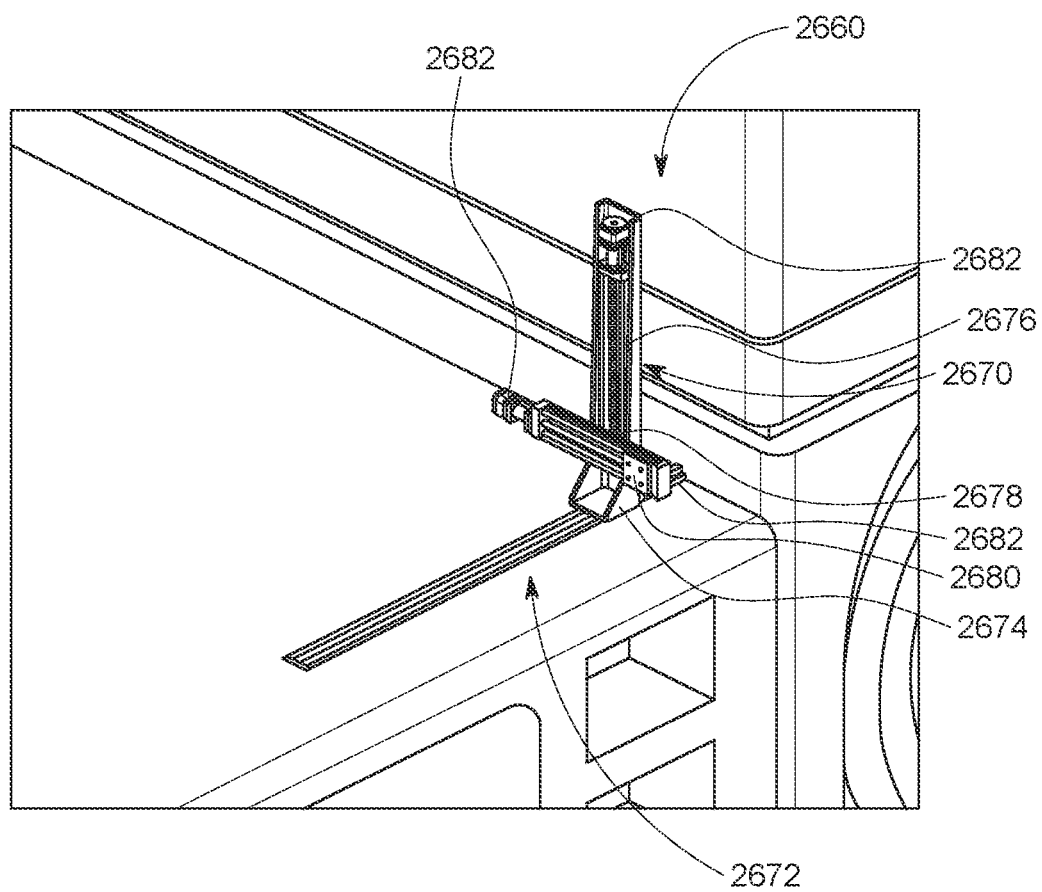
FIG. 26A fragmentary perspective view of the rear of an AV yard truck having a three-axis (triple) linear actuator adapted to deliver a coupler to a receiver according to an embodiment.

Another embodiment of a robotic manipulator 2670, mounted on the rear of an AV yard truck 2660, is shown in FIG. 26A. This manipulator, 2670, also adapted to handle the AV yard truck's service connector (e.g. emergency brake pneumatic line connector) and defines three orthogonal axes of motion. It consists of a horizontal, base linear actuator or motor 2672, arranged to carry a shuttle 2674 forwardly and rearwardly a sufficient distance to reach the receiver on the trailer (not shown) in a rearward orientation and clear the trailer's swing motion in a forward location (e.g. at least approximately 1-4 feet of motion in a typical implementation). The shuttle 2674 supports a perpendicular linear motor 2676 that moves a third, orthogonally arranged horizontal linear motor 2678 upwardly and downwardly (vertically, e.g. approximately 1-3 feet). The third motor 2678 includes a mounting plate 2680 that can hold a gripper or other hand assembly that can move in one or more degrees of freedom (e.g. 1-3 feet) and selectively grip the service connector for insertion into the trailer receiver/coupling. The linear motors can be effectuated by a variety of techniques. For example, each can include a stepper or servo motor 2682 at one end, that drives a lead screw. Other mechanisms, such as a rack and pinion system can be used in alternate arrangements. As with other manipulators herein, the range of motion for each axis or degree of freedom is sufficient to ensure that during transit of the truck, the robot does not interfere with normal operation, including swing of the trailer during turning, and also to ensure that the hand or end effector of the robot can reach and insert a carried connector/coupling into an appropriate receiver/receptacle on the trailer during hitching and hook-up.

Figure 27:
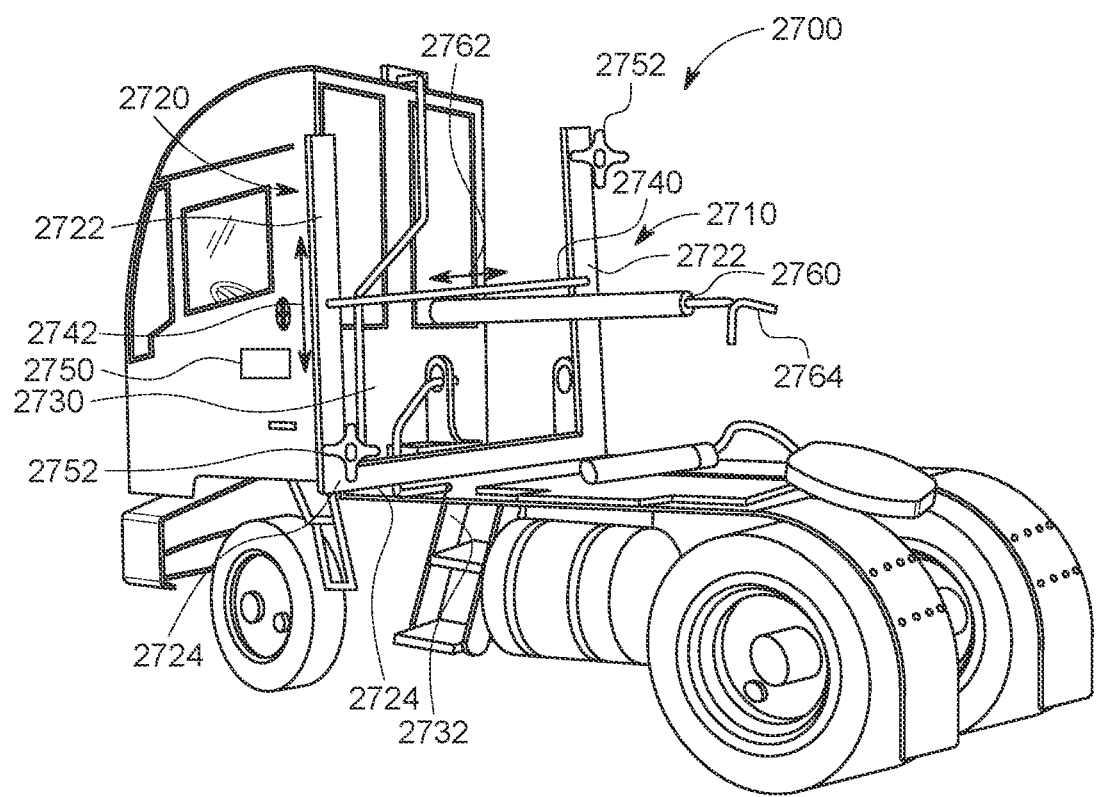
FIG. 27 is a rear perspective view of an AV yard truck showing a robotic framework and telescoping arm and end effector assembly for connecting a truck pressure or electrical connector to a trailer receptacle according to an embodiment.

FIG. 27 depicts an AV yard truck 2700 with automated connection system 2710 according to another embodiment. This system 2710 employs a U-shaped frame 2720 with opposing uprights 2722 on each of opposing sides of the cab rear face 2730, and a base bar 2724 mounted to the chassis 2732. The uprights 2722 each carry a gear rack that is engaged by a servo or stepper driven pinion on each of opposing sides of a cross bar 2740. The cross bar 2740 moves upwardly and downwardly (vertically, as shown by double-arrow 2742) based on control inputs from a controller 2750 that receives position information on the trailer connector based on rear-facing, cab mounted cameras 2752, and/or other appropriate sensor type(s). A telescoping arm 2760, with appropriate end effector 2764 (and/or directly arm-attached connector/glad hand), moves laterally (horizontally, as shown by double-arrow 2762) based on the controller using (e.g.) a leadscrew drive, linear motor or rack and pinion system. Telescoping is provided by another motor or actuation system that should be clear to those of skill, thereby providing at least three (3) degrees of freedom of motion. The end effector 2764 can, optionally, include articulated joints, knuckles and/or other powered/movable structures clear to those of skill (in both this embodiment and the embodiment of FIG. 26). The framework system 2710 can be custom-built, or fully/partially based upon an existing, commercially available system, such as a printing servo frame.

Figure 28:
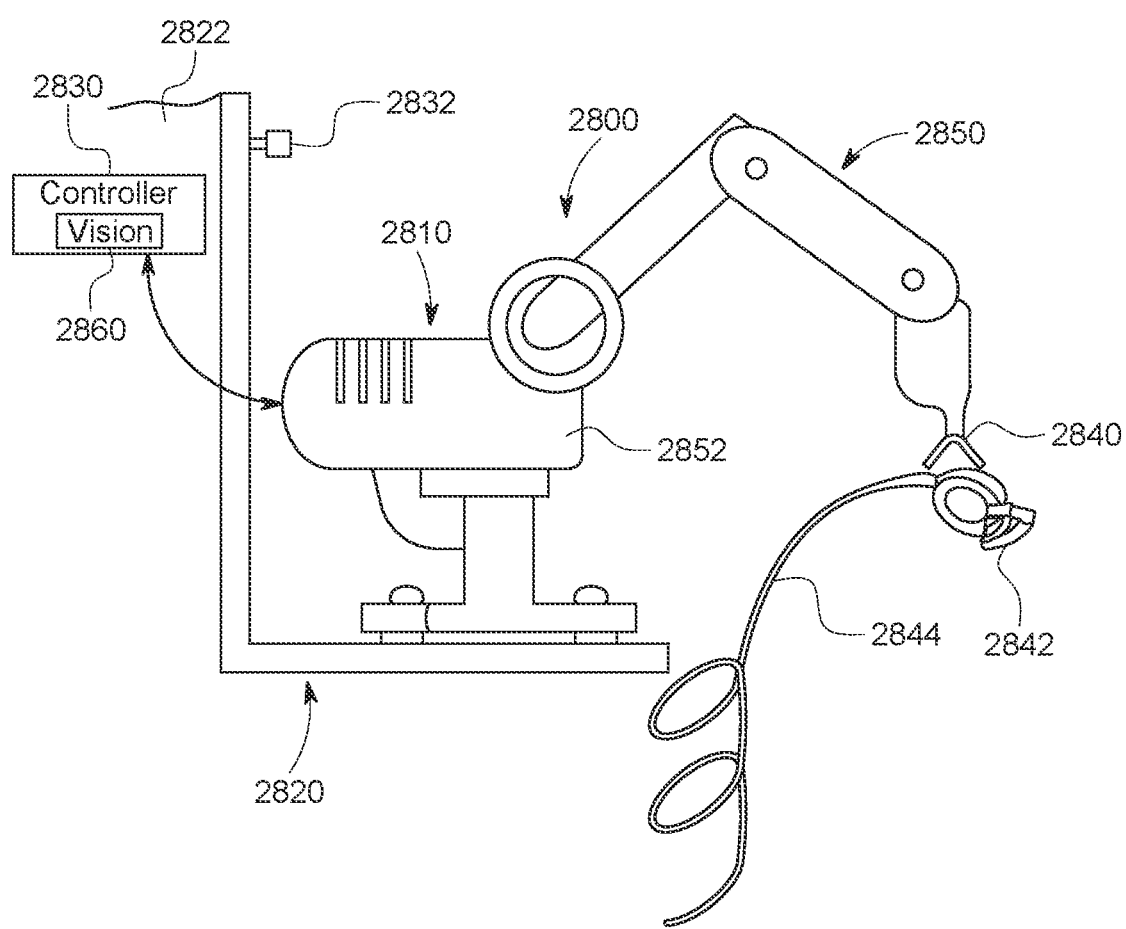
FIG. 28 is a fragmentary side view of a truck chassis showing a multi-axis robotic arm and end effector assembly for connecting a truck pressure or electrical connector to a trailer receptacle according to an embodiment.

With brief reference to FIG. 28, an automated connection arrangement 2800 can comprise a multi-axis robot 2810, available from a commercial supplier, (or custom built), and adapted to outside/extreme environments as appropriate. The design and function of such a robot should be clear to those of skill. In general, the robot 2810 is mounted to the chassis, behind the truck cab 2822. It communicates with a controller 2830, which receives inputs from one or more sensor(s) 2832. As described above, the sensors 2832 can be used to identify both the trailer connector and its associated 3D location and the 3D location of the end effector 2840, and the associated connector 2842, which is carried by that end effector. The connector 2842 is shown connected to a hose 2844, that is, likewise, connected to the truck pneumatic and/or electric system. The end effector is a distal part of fully articulated (e.g. 5 or 6-axis) robot arm 2850 and base 2852. It is served (i.e. it is guided using sensory feedback) by commands from the controller 2830. Where 2D or 3D camera sensors are employed (in any of the embodiments herein), they can be connected to a vision system 2860. A variety of commercially available vision systems can be employed—typically operating based on pattern recognition, and trained on model (e.g.) 3D data. Such systems are available from a variety of vendors, such as Cognex Corporation of Natick, MA. These systems include modules for robot control.

Using a fully-articulated, multi-axis robot can enable the connector 2842 to be either modified or conventional (e.g. a standard rotation-locked glad hand). In the case of a conventional connector, the robot 2810 can be trained to move the end effector containing the connector along its several axes, in which the robot arm 2850 and base 2852 is trained to align and rotate the (e.g.) glad hand into a securely locked/sealed position during connection, and to counter-rotate/unlock the glad hand during disconnection.

Figure 28A:
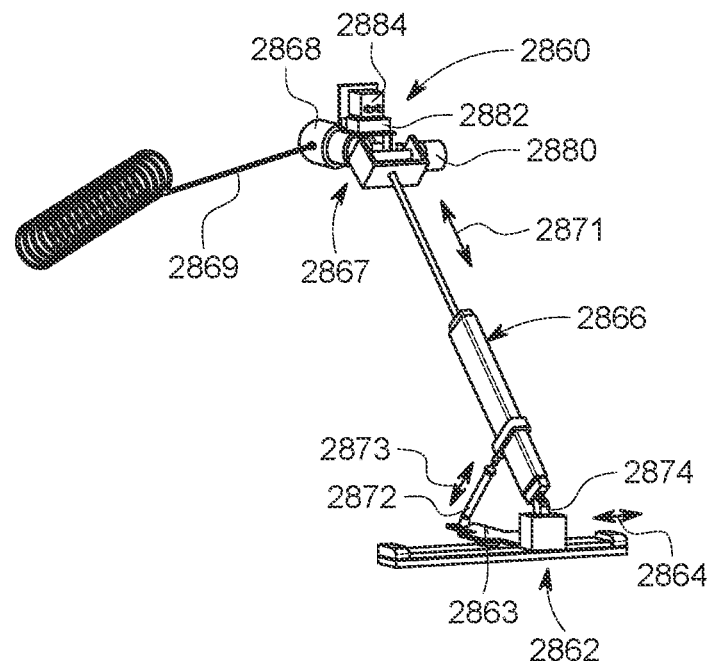
FIG. 28A is rendering perspective view of an AV yard-truck-mounted robotic manipulator, including an arm/wrist/hand delivery mechanism with interconnected trailer pneumatic line (air hose) and coupling device, according to an embodiment.
Figure 28B:
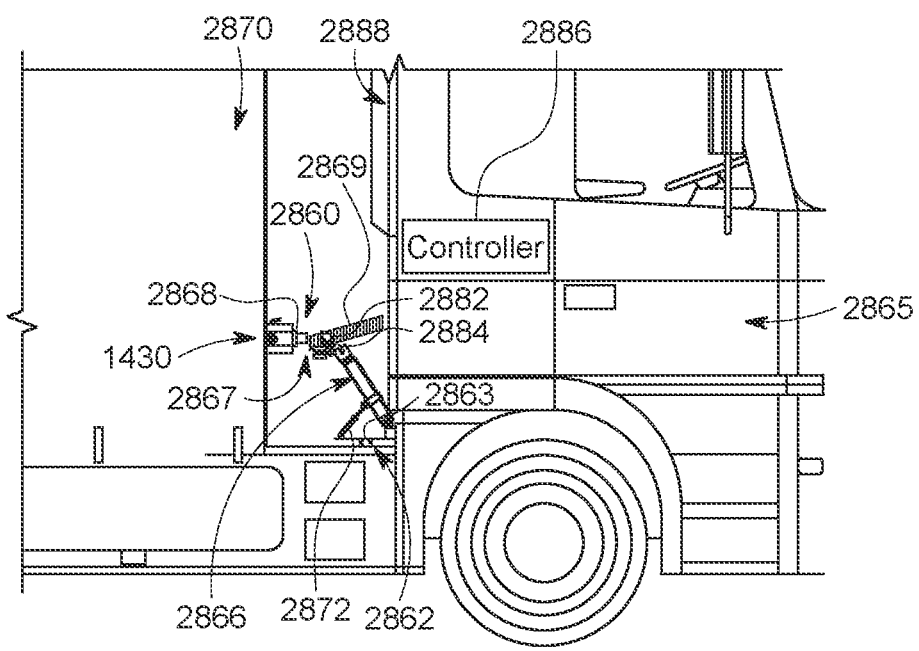
FIG. 28B is a fragmentary side view of an exemplary AV yard truck and trailer hitched thereto, having of the arm/wrist/hand delivery mechanism of FIG. 28A, and a corresponding receiver mounted on the trailer.
Figure 28C:
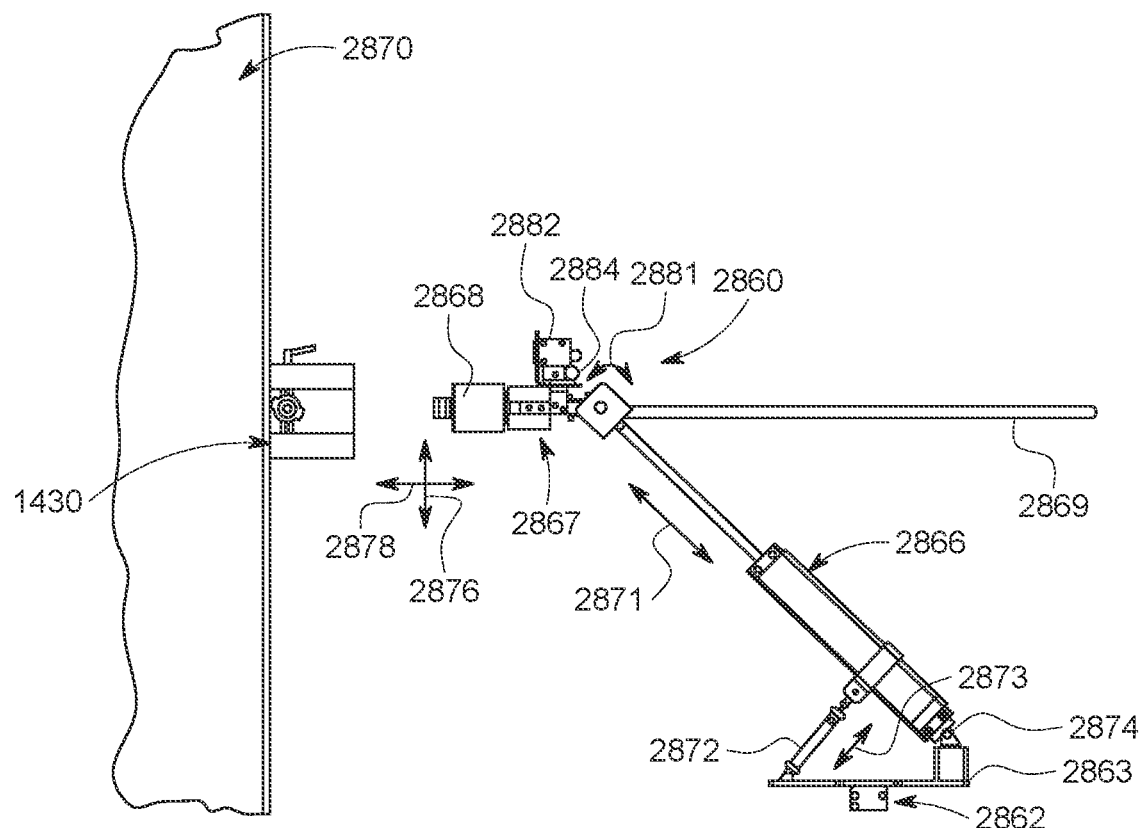
FIG. 28C is a side view of the arm/wrist/hand delivery mechanism of FIG. 28A shown making a connection to the trailer-mounted receiver.

FIGS. 28A-28C depict an automated connection arrangement 2860 according to another embodiment. The arrangement 2860 consists of a horizontally, left-right, positioned linear actuator or screw-drive base 2862 (as also described generally above—see, for example, FIG. 26A) with a baseplate 2863 mounted to the actuator/screw-drive 2862, allowing for lateral movement (double arrow 2864) across the back of the truck 2865 (e.g. approximately 1-3 feet). Attached to the baseplate 2863 is a large hydraulic or pneumatic piston 2866, with an articulating end-effector (also termed a "hand") 2867, shown holding onto a releasable coupling assembly 2868 (see, for example the female portion of the connector 880 in FIGS. 8B-8E above), which can remain connected to the trailer receiver after the end-effector/hand 2867 has been retracted. Also associated with the coupling 2868 is a side-ported pneumatic line/hose 2869 that connects back to the main AV yard truck air-system. Routed with the pneumatic line 2869 is electrical power, used to operate an actuation device on the air-connection device (e.g. solenoid sleeve 892 in FIGS. 8b-8E), as well as to optionally connect electrical power to the trailer 2870 (as described above—see for example, FIG. 8A). In addition to the large piston 2866 that is primarily used to selectively extend (e.g. 1-4 feet) the end effector 2867 out toward the trailer 2870 and retract the end effector away from the trailer 2870 (double-arrow 2871), there is a smaller hydraulic or pneumatic piston 2872 that is pivotally affixed to both the baseplate, and as the belly side of the large piston 2866. Motion (double-arrow 2873, 3-9 in) of this smaller piston 2872 is responsible for allowing the entire arrangement to move up/down by inducing rotation about a base pivot 2874. More particularly, the motions of three discrete actuators is coordinated to allow the end effector 2867 and its gripped connector 2868 to move in two orthogonal directions vertically (double-arrow 2880 and horizontally (forwardly/rearwardly—double-arrow 2878). That is, as the large/main piston 2871 strobes inwardly and outwardly, and appropriate height is maintained by changing the position of the smaller piston 2872 (which also has a smaller effect on front-to-rear position). A rotary actuator 2880 changes the relative angle (double-curved-arrow 2881) of the end effector 2867 so that the gripped connector 2868 remains horizontally aligned (level) with the trailer receiver 1430 (described above). That is, as the smaller piston 2872 changes the angle of the larger piston 2866 relative to the truck, the rotary actuator re-levels the end effector. Appropriate motion sensors, accelerometers, gyros and other position/attitude sensors can be employed to maintain level. Such sensors can be located on the end effector and/or elsewhere on the arrangement 2860. Alternatively, or additionally, using stepper motors, differential controllers, etc., the angular orientation of the end effector 2867 can be computed based on the relative positions of the two pistons 2866, 2872, and the rotary actuator 2880 can be adjusted to level the end effector 2867 (in a manner clear to those of skill).

In an embodiment, a camera 2882 and ranging device 2884 of conventional or custom design are mounted on top of (or at another location on) the end effector. These components are interconnected via wires or wirelessly to a processor (e.g. the AV yard truck controller 2886, or a module thereof), which operates a vision system to assist in coupler/receiver alignment (as described above). Ranging and alignment are also assisted by any of the previously mentioned optional components or arrangements above (e.g. reference position to known location, reflective patterned stickers, etc.).

In operation, the arrangement 2860 of FIGS. 28A-28C, initiates function after the AV yard truck 2865 hitches to the trailer 2870 under operation of the controller 2886. The controller (or another processor/module) 2886 then instructs the end effector 2867, which is gripping the coupler 2868 to move from a retracted position toward the receiver 1430 on the trailer. The camera 2884 and range finder 2882 acquire the receiver 1430 using a variety of techniques as described above. Other cameras on the truck rear face 2888 can also assist in locating the receiver as appropriate. The controller 2886, or a localized motion module/processor on the arrangement 2860 servos the linear motor 2862 to laterally (side-to-side) align the end effector 2867 and coupler 2868 with the receiver. Subsequently, or concurrently, the large and small pistons 2866 and 2872 are stroked (large piston outwardly and small piston inwardly) while the rotary actuator 2880 rotates to maintain a level angle, thereby bringing the coupler 2868 into engagement with the receiver 1430. After engagement, the electronic locking solenoid in the coupler de-energizes and causes the (e.g. female) quick disconnect fitting to springably lock onto the receiver (e.g. male) fitting. The end effector 2867 then releases and the arrangement returns to a retracted location on the truck chassis rear—out of interfering contact with the trailer. The connection is made only by the flexible pneumatic line 2869, which can bend and stretch freely as the trailer swings relative to the truck during normal driving motion.

Disconnection of the coupled connectors 1430, 2868 is the approximate reverse of connection, as described above. That is, the end effector moves back into engagement with the coupler 2868 and grips it. The solenoid in the coupler energizes, allowing for unlocking from the fitting in the receiver. The pistons 2866, 2872 and rotary actuator 2880 move in a coordinated manner to withdraw the coupler and move it to a neutral (retracted) location. The linear actuator 2862 can also move to a neutral location as appropriate. The trailer is then unhitched in a manner described above.

III. AV Yard Truck Operation

Figure 29:
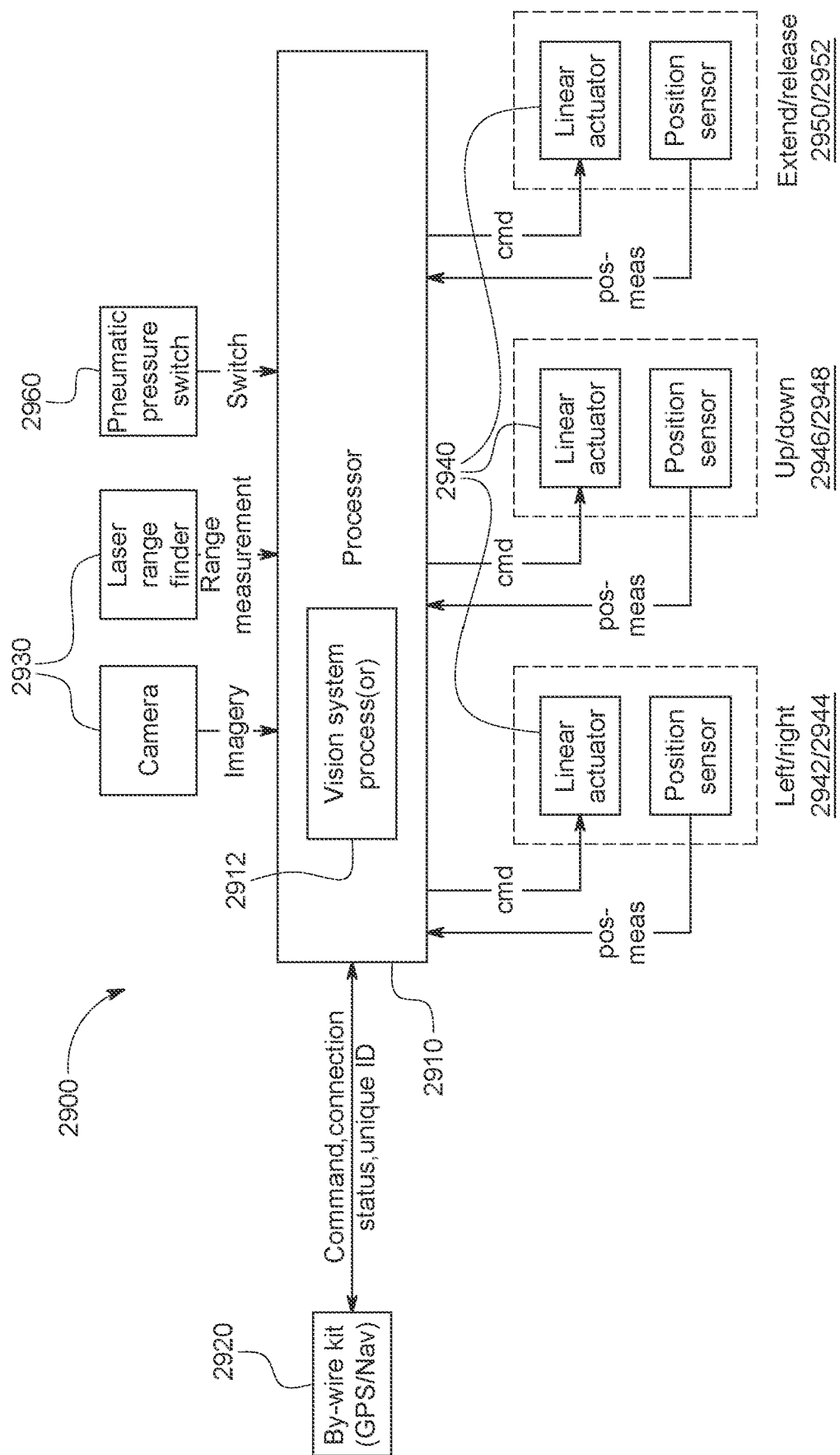
FIG. 29 is a block diagram showing generalized procedures and operational components employed in hitching an AV yard truck to a trailer, including the connection of one or more service lines using a robot manipulator according to an embodiment.

Further to the general operation of an AV yard truck as described above, once the designated trailer has been successfully secured/hitched to the AV yard truck (pneumatic line(s), optional electrical connections, and kingpin), the fifth wheel is raised by operation of the controller, in order to clear the landing gear off the ground, and the trailer is then hauled away. Reference is made to the block diagram of FIG. 29, showing an arrangement 2900 of functions and operational components for use in performing the steps described above—particularly in connection with the hitching of a trailer to the AV yard truck. As shown, the processor/controller 2910 coordinates operation of the various functions and components. The AV yard truck is instructed to drive to, and back into, a slip containing the trailer. This movement can be based on local or global navigation resources—such as satellite based GPS and/or yard-based radio frequency (RF) beacons 2920. Once within optical range, the camera(s) and/or other sensors (e.g. RF/RFID-based) 2930 can transmit images of the trailer to the vision system process(or) 2912, locating the trailer's receptacle or similar connector. As the receptacle/connector is identified, the truck and/or manipulator (e.g. robotic framework, robot arm, etc.) 2940 can be servoed by the vision system to attempt to align the end effector and associated truck probe/connector with the trailer receptacle/connector. This can include a variety of motion commands (denoted "cmd"), including moving the framework/arm left 2942, right 2944, up 2946 and down 2948, and extending/retracting 2950 the (e.g.) telescoping arm/member of the robot manipulator to move the truck probe/connector a desired 3D location and impart a required attachment motion i.e. insertion of a probe into the receptacle. Appropriate knowledge (denoted as "pos-meas" of current arm position (e.g. counting stepper motor/encoder steps, providing servo feedback and/or using visual tracking via a guidance camera assembly) can be returned to the processor 2910 as the arm components move. The arm can be released (block 2952) at this time so the connection between the truck and trailer pneumatics (and optionally, electrics) is able to flex as the vehicle turns. Once connected, the pneumatic pressure of the truck is switched on (block 2960) by the controller. The controller also then lifts the fifth wheel when using appropriate hydraulic/pneumatic (more generally, "fluid" herein) pressure actuators on the truck to raise the trailer landing gear out of engagement with a ground surface and allow it to be hauled to another location in the yard.

IV. Additional AV Yard Truck Devices and Operations

A. Secondary Pressure Source

In order to simplify yard truck to trailer connection for the large variations in service connection locations that exist, one option is to produce adapter connectors that could be applied to any configuration, producing a universal connection location on any trailer. This connector can be provided and/or connected at the guardhouse, or by the driver during OTR disconnection. In addition, a provided glad-hand to universal connection air-line adapter' could be connected to the trailer's existing glad-hand system by the OTR driver, during disconnection. This can allow for a variety of options, more suitable for AV truck connection, to be accomplished. Also, in addition to the universal adapter, the system can include a cone that shrouds the universal connector and allows for a reduction in the need for accuracy of alignment. The cone can physically assist in the guiding and alignment of the service line connection.

To avoid the need for any service (pneumatic, etc.) connection from AV yard truck to trailer, in an alternate arrangement, a compressor or pre-compressed air tank can be secured to the trailer (e.g. at the guardhouse, or by the driver, during OTR disconnection). The pressurized air can be capable of releasing the emergency brakes of the trailer via a (e.g. RF) signal (from the AV yard truck), or a physically closed contact occurring during the kingpin hookup of the AV yard truck that senses that the trailer is now hitched to the truck. This system can then be removed when the trailer exits the yard via the guard shack. As needed, the tank can be recharged for future reuse by a compressor system within the yard.

B. Automated 'Tug-Test'

A truck tug-test is a mechanism by which the fifth-wheel connection of a truck to its trailer is confirmed by placing the truck into a forward gear and pulling against the trailer while the trailer's brakes are still engaged. If the truck encounters strong resistance, this proves that the fifth wheel engagement has been successful.

Figure 30:
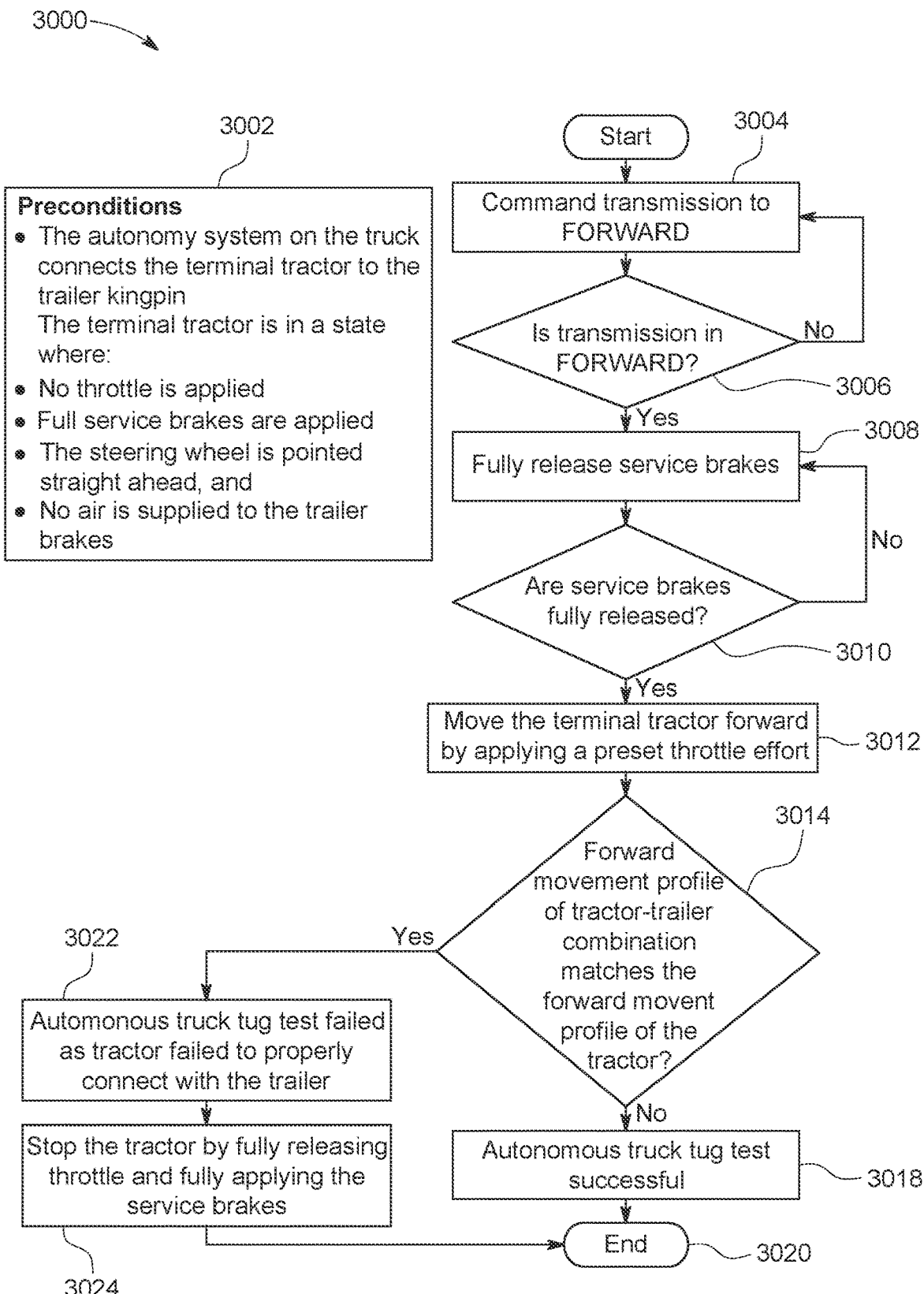
FIG. 30 is a flow diagram of an exemplary tug-test procedure for use with an autonomous truck to verify proper hookup of a trailer thereto.

From a safety standpoint, it is desirable that this same tug-test be employed by an autonomous (e.g. AV yard) truck. With reference to the procedure 3000 of FIG. 30, the autonomous truck tug-test procedure 3000 assumes that before being activated the truck is positioned such that the entire fifth wheel is under the front edge of the trailer floor/skid plate (the trailer is physically sitting on the tractor fifth wheel) there is no gap between the fifth wheel and the trailer floor/skid plate, and the fifth-wheel has been raised sufficiently so that the trailer's landing gear is clear of the ground (in order to avoid landing gear damage during test). Further, the autonomous truck tug-test procedure 3000 is adapted to detect proper mechanical coupling with a fifth wheel in the absence of any feedback from the fifth wheel unlatch control valve, thereby indicating if the kingpin jaws on the fifth wheel are in the open position.

Before beginning the autonomous truck tug-test procedure 3000 to confirm proper mechanical coupling of a fifth wheel with a trailer, the autonomy system on the truck connects the truck's fifth wheel to the trailer kingpin and gets the truck in a state where, a) no throttle is applied, b) full service brakes are applied to the truck, c) the steering wheel is pointed straight ahead, and d) no air is supplied to the trailer brakes (precondition box 3002).

The autonomous truck tug-test procedure 3000 begins by commanding the transmission to transition to FORWARD (or DRIVE) in step 3004. As soon as the transmission, via the controller, returns a status value indicating that it is in FORWARD (decision step 3006), the autonomous truck tug-test procedure 3000 fully releases the service brakes in step 3008, and when confirmed (decision step 3010), the autonomous truck tug-test procedure 3000 then drives the truck forward (step 3012), by commanding a preset throttle effort, and monitors, (a) the tractor longitudinal acceleration, and (b) the tractor forward distance traveled. Additionally, depending on the drive train on the truck, the autonomous truck tug-test procedure 3000 also monitors either the drive motor current and/or the engine RPMs. If, upon the application of the preset throttle effort, it is determined by the process(or) that the actual forward movement of the truck system does not match (or is less than an experimental percentage based upon current and future testing) the forward motion profile of the truck without a trailer connected to it (decision step 3014), then the autonomous truck tug-test procedure concludes that the mechanical coupling of the fifth wheel with the trailer is successful (step 3018), and the procedure 3000 concludes (step 3020), and the system is notified of such success. Conversely, if after step 3012, the truck moves, and its forward motion profile is the same/similar to when no trailer is connected (decision step 3014), then the autonomous truck tug-test procedure 3000 concludes that the mechanical coupling of the fifth wheel with the trailer has failed (step 3022) and immediately notifies the system while releasing the truck throttle and fully applying the service brakes (step 3024). The procedure again ends at step 3020 awaiting a repeat attempt to hitch the trailer and/or operator intervention.

In various embodiments, a multiple tug test procedure can consist of successive single tug tests. Upon successful completion of initial tug-test, and following connection of air and electrical cables to the trailer, the fifth wheel is commanded to raise the trailer to a driving height, with possibly a forward motion to ensure that the back of the trailer is not dragging weather stripping on dock doors. After the trailer has been lifted to a driving height, some customers and application areas would prefer that an additional, final tug be performed as an additional check that the mechanical mating of the tractor and trailer is complete. In this case, since air has been provided to the trailer to remove emergency brakes, either this air must be removed to re-engage emergency brakes, or air must be supplied on the service brakes to the trailer. Following, a brief forward throttle or propulsion is applied to the tractor, to perform a tug on the trailer and ensure the tractor remains engaged with the trailer.

Figure 30A:
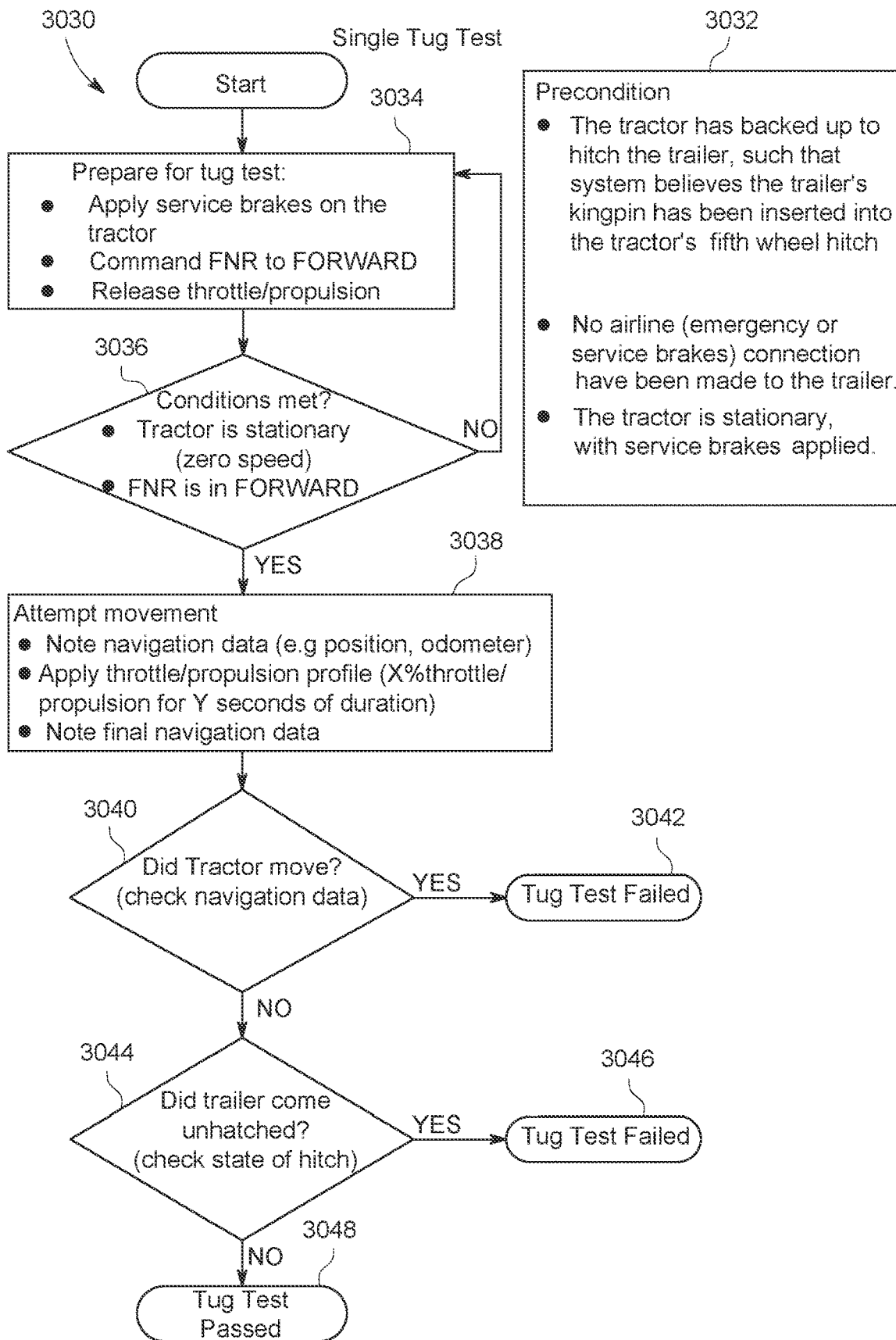
FIG. 30A is a flow diagram of an exemplary single tug-test procedure for use as part of a multiple tug-test procedure to verify proper hookup of a trailer.

With reference to the procedure 3030 of FIG. 30A, the autonomous truck tug-test procedure 3030 assumes that before being activated the truck is positioned such that the entire fifth wheel is under the front edge of the trailer floor/skid plate (the trailer is physically sitting on the tractor fifth wheel) there is no gap between the fifth wheel and the trailer floor/skid plate, and the fifth-wheel has been raised sufficiently so that the trailer's landing gear is clear of the ground (in order to avoid landing gear damage during test). Further, the autonomous truck tug-test procedure 3030 is adapted to detect proper mechanical coupling with a fifth wheel in the absence of any feedback from the fifth wheel unlatch control valve, thereby indicating if the kingpin jaws on the fifth wheel are in the open position.

Before beginning the autonomous truck tug-test procedure 3030 to confirm proper mechanical coupling of a fifth wheel with a trailer, the autonomy system on the truck a) has backed the tractor up to hitch the trailer such that the system believes the trailer's kingpin has been inserted into the tractor's fifth wheel hitch, b) no airline (emergency or service brakes) connections have been made to the trailer, and c) the tractor is stationary, with service brakes applied (precondition box 3032).

Preparation for the tug test includes applying service brakes on the tractor, commanding the FNR to FORWARD, and releasing the throttle/propulsion (step 3034). The system confirms the conditions that a) the tractor is stationary (zero speed) and b) FNR is in FORWARD (decision step 3036). If the conditions are not met, the procedure returns to step 3034. If the conditions are met, the procedure then attempts movement at step 3038. Attempting movement at 3038 includes a) noting navigation data (e.g. position, odometer), b) applying a predetermined percentage (X %) of throttle/propulsion profile for a predetermined number of seconds (Y). At decision step 4040, the procedure determines if the tractor moved, based on navigation data. If the tractor moved, the tug test has failed, and the procedure ends at step 3042 awaiting a repeat attempt to hitch the trailer and/or operator intervention. If the tractor did not move, the procedure advances to decision step 3044 and determines if the trailer cam unhitched by checking the state of the hitch. If the trailer became unhitched, the procedure ends at step 3046 awaiting a repeat attempt to hitch the trailer and/or operator intervention. If the trailer did not come unhitched, the procedure ends at step 3048 with the iteration of the tug test being passed.

Figure 30B:
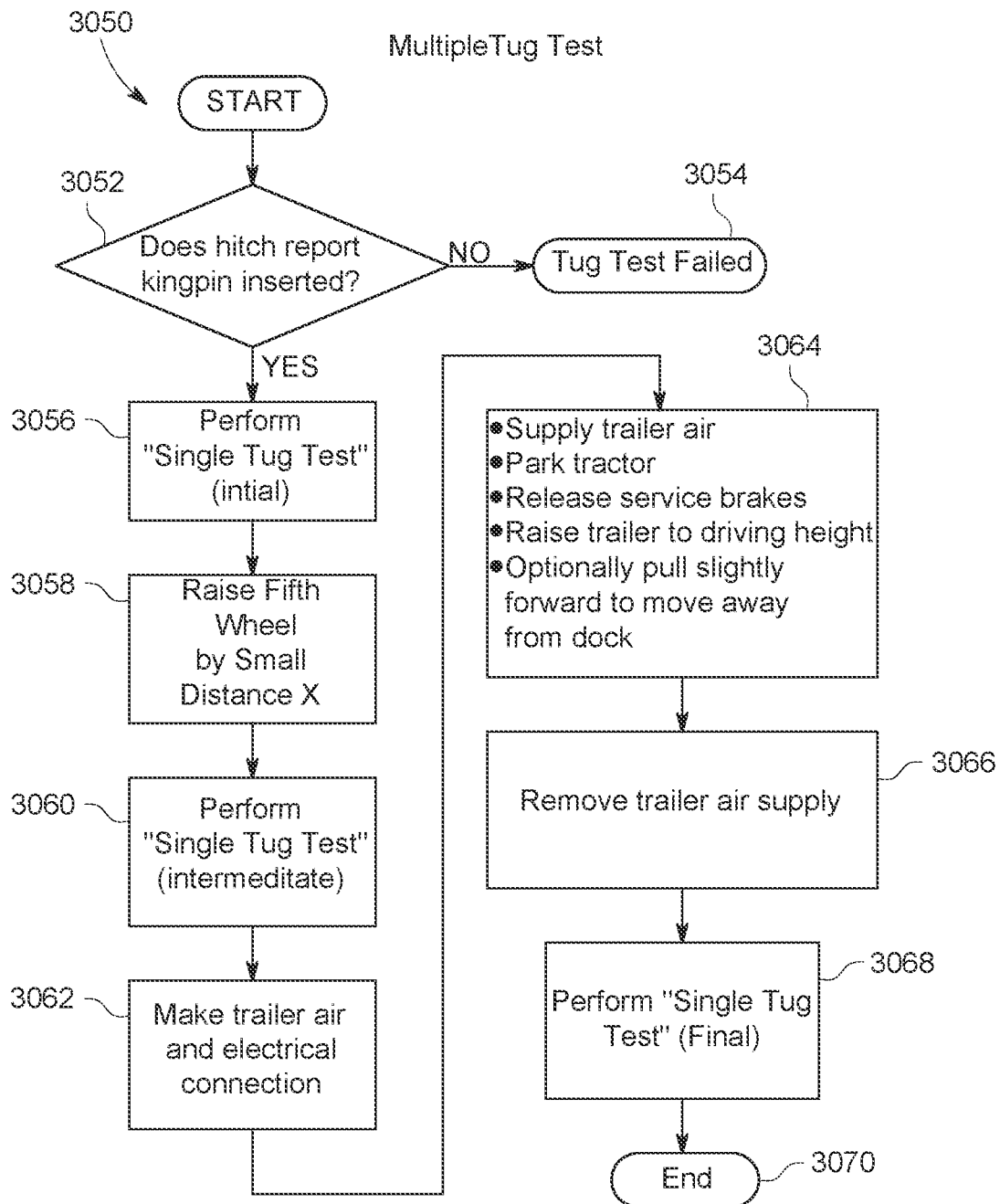
FIG. 30B is a flow diagram of an exemplary multiple tug-test procedure incorporating repeated use of the single tug-test procedure of FIG. 30A to verify proper hookup of a trailer.

The procedure 3030 can be repeated as multiple parts of a multiple tug test procedure 3050, as shown in FIG. 30B. At decision step 3052, the system determines if the hitch reports the kingpin is inserted. If the hitch reports that the kingpin is not inserted the procedure ends at step 3054 awaiting a repeat attempt to hitch the trailer and/or operator intervention. If the hitch reports that the kingpin is inserted, the procedure advances to step 3056 to perform the first iteration of the single tug test procedure 3030. If the first iteration of the tug test is passed and ends at 3048 (FIG. 30A), the multiple tug test procedure 3050 then raises the fifth wheel by a predetermined small distance at step 3058. After raising the fifth wheel by the predetermined small distance, the multiple tug test procedure 3050 performs the single tug test procedure 3030 a second time at step 3060. If the second iteration of the tug test is passed and ends at 3048 (FIG. 30A), the multiple tug test procedure 3050 then makes the trailer air and/or electrical connections at step 3062.

After making the connections, at step 3064 a) the trailer is supplied with air, b) the transmission is put in park, c) the service brakes are released, d) the trailer is raised to driving height, and (optionally) e) the tractor pulls slightly forward to move the trailer away from the dock. The trailer air supply can then be removed at step 3066. At 3068, the multiple tug test procedure 3050 can perform the single tug test procedure 3030 for a third and final time. If the single tug test procedure 3030 is passed at step 3068, the procedure ends at step 3070 and the system is notified of success.

Different customers and mission environments require selection and customization of the automated tug-tests. The automated tug-test conceived here is configurable with respect to enablement of individual tugs, and selection of parameters of the complete test.

C. Glad Hand Gross Detection

Referring again to the description of the modified glad hand-based connection system, shown and described with reference to the embodiment of FIGS. 23—it is contemplated that the conventional (i.e. unmodified) glad hand connections on a trailer front can be used to interconnect pneumatic lines relative to the AV yard truck according to embodiments herein. A trailer that can interoperate with the AV yard truck herein with a minimum of, or substantially free of, modification is logistically and commercially advantageous. The embodiment of FIGS. 31-33 helps to facilitate such operation. More particularly, it is desirable to provide a mechanism for gross detection of the conventional pneumatic connections (typically configured as glad hands) on the front side of the trailer.

Figure 31:
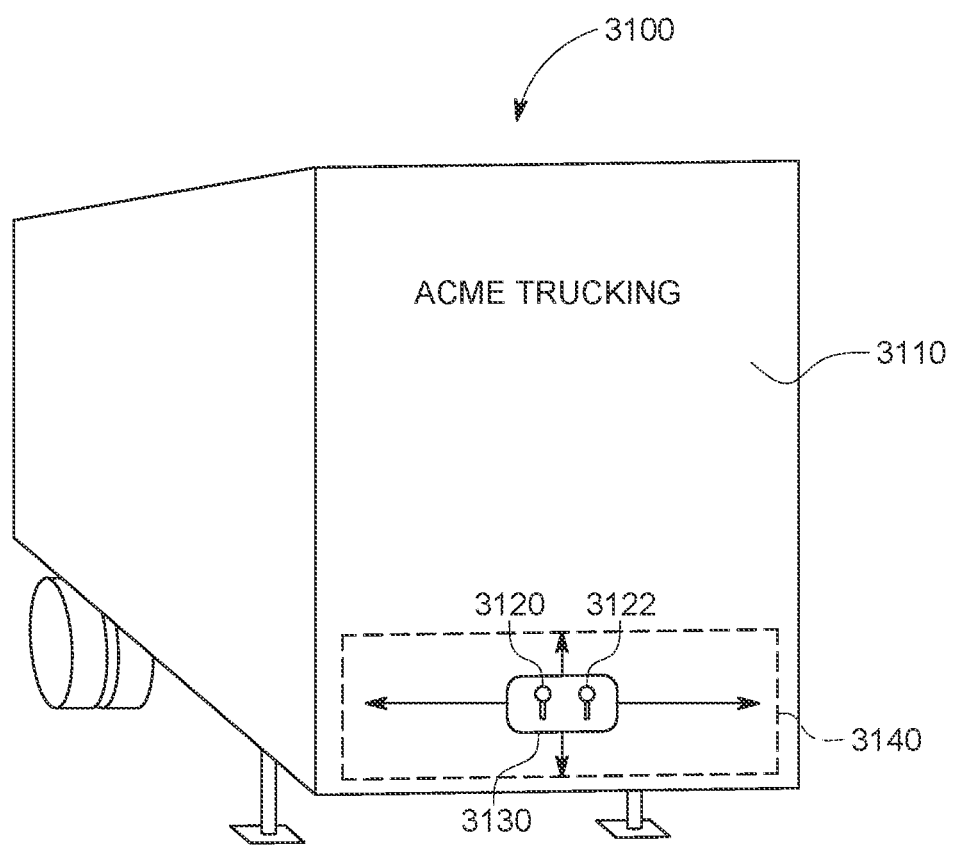
FIG. 31 is a diagram showing the front face of a trailer showing the probable location of pneumatic braking glad hand connections and an associated panel for use in gross location determination by a gross sensing assembly provide on an autonomous truck according to an embodiment.

Reference is made to the exemplary trailer 31 of FIG. 31. Where a robotic manipulator (described above and further below) is used to maneuver an end effector, containing a pneumatic (glad hand-compatible) connection, to a corresponding glad hand 3120, 3122 on the front 3110 of the trailer 3100, the gross position of the glad hands 3120 and 3122 can help narrow the search for the connection by the end effector. In general, the glad hand(s) are mounted in a panel 3130 that can potentially be located anywhere on (e.g. dashed box 3140), and typically along the lower portion of, the trailer front 3110. A system and method for the gross detection of the glad hand (or similar trailer-mounted pneumatic and/or electrical connection) is provided in this embodiment. This system and method generally provides a sensor-based estimate of the location of the glad hand panel on the front of the trailer is provided in this embodiment.

Once the glad hand panel 3130 is located on the front face 3110 of the trailer 3100, the end effector can be grossly positioned to align with it. Thereafter the connection system can begin a fine manipulation of the end effector to actually engage the glad hand with the end-effector-mounted truck-based connector. An end effector-mounted sensor (e.g. a vision system camera) can be used to finely guide the connector into engagement with the trailer's glad hand. The data from the sensor/camera assembly 3210 is provided to a machine vision system 3250 that determines the location of the glad hands as described below.

Figure 32:
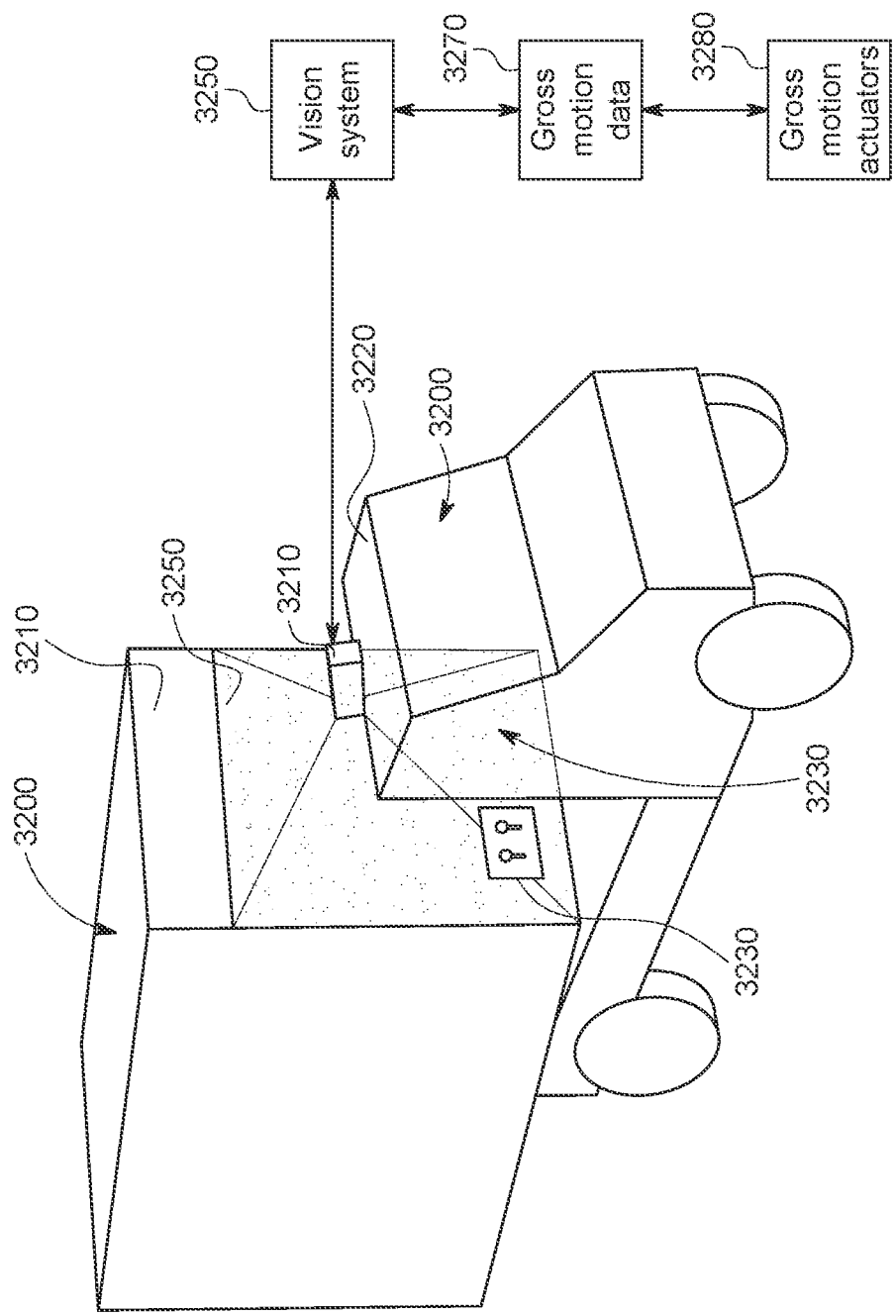
FIG. 32 is a diagram showing an autonomous truck-mounted gross location sensing assembly detecting the characteristics of the front face of an adjacent trailer so as to attempt to localize the glad hand panel thereof.

With further reference to FIGS. 31 and 32, a single-color camera or a combination of a color camera and a 3D imaging sensor 3210 is/are provided at a location on an autonomous truck 3220 that can be used to find the glad hand panel 3130 on the front face 3110 of the trailer 3100. The sensors 3210 for detecting the glad hand panel 3130 can be statically mounted to the truck 3200 on, for example, the roof 3220 of the cab 3230. The sensors 3210 are mounted so that they have coverage over the expected areas on the adjacent trailer front (when hitched or in the process of hitching) where glad hands would be located. The sensor coverage is shown as a shaded area 3250 on the depicted trailer front 3110 in FIG. 32.

In operation, understanding the location of the trailer face bounds the search in the sensor data for the glad hand panel. In an exemplary embodiment, the sensor assembly 3210 can include exclusively a 2D color camera. Using acquired color images of the scene that includes the trailer 3100, the process identifies which image pixels are associated with the front face 3110 and which are background pixels. The front face is highly structured and tends produce prominent contrast-based edges using edge processing tools generally available in commercially available machine vision applications. From the edge information and the (typically) homogeneous color of the front truck panel, the trailer front face 3110 can be identified in the imagery.

In another exemplary embodiment, the sensor assembly 3210 includes a dense 3D sensing, which is used to detect the front face 3110 of the trailer 3100 using the known/trained 3D geometric signature of the trailer face (for example, a rectangle of a given height and width ratio). The 3D sensing can be accomplished using a variety of arrangements including, but not limited to, stereo cameras, time-of-flight sensors, active 3D LIDAR, and/or laser displacement sensors. These 2D and/or 3D sensing modalities each return the generalized location and boundaries of the trailer front face, and potentially its range from a reference point on the truck.

Figure 33:
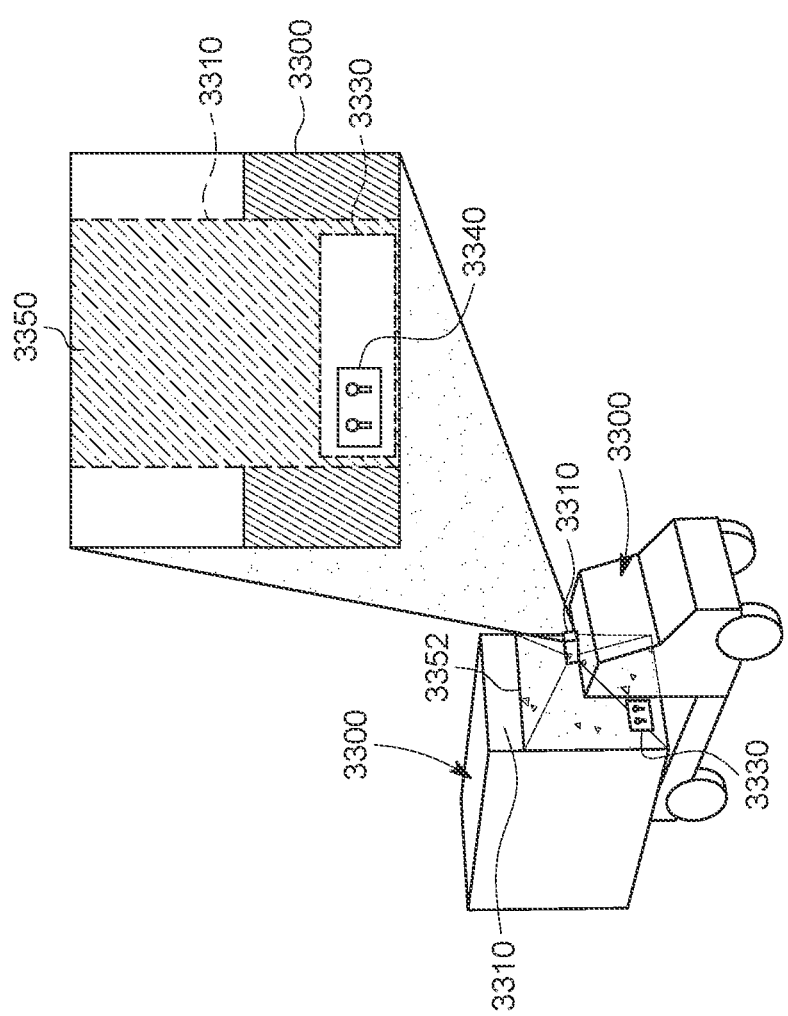
FIG. 33 is a diagram showing the acquired image(s) generated by the sensing assembly of FIG. 32 and the regions therein used to localize the glad hand panel.

After locating the trailer front face and bounding it, the next step in the gross detection procedure is locating the glad hand panel 3130 within the bounds of the trailer front face 3110. With reference to FIG. 33, the reduced search area 3310 comprising the image of the trailer front face 3110 is shown within the overall imaged scene 3300. Within the reduced search area 3310, the expected polygonal (e.g. rectangular) region of the glad hand panel 3340 is identified based on the knowledge that glad hand panels are situated at the bottom (dashed search box 3330) of the trailer front face.

Based upon identification of the outline/edges of the trailer front face within one or more acquired images, as described above, the gross detection procedure is completed as follows:
  (a) A diverse color sampling of pixels is made for regions within the identified front trailer face but outside of the expected region where glad hands are situated (the color sample region 3350). This provides a color sampling of the background color characteristics of the trailer.
  (b) The background color samples are then compared to the pixel colors within the expected search region (dashed box 3330) for glad hand panels 3340. Since glad hand panels are typically a different color/texture than the background trailer color, the glad hand pixels will produce a low color match response.
  (c) Within the expected glad hand search region, the color match responses are thresholded and then grouped using (e.g.) a connected component analysis which will form groupings of pixels. The groupings represent possible glad hand locations.
  (d) The groups of pixels are then analyzed for shape properties and groups are discarded that do not have a structured geometric rectangular shape. Additional shape attributes such as size and width-to-height ratio can be used to eliminate false glad hand panel detections. The remaining groups are the highest probability candidates for the glad hand panel.
  (e) The shape attributes are also used to score the remaining group candidates. The group with the highest score has the greatest likelihood of being the glad hand panel.
  (f) Optionally, in an embodiment in which dense 3D sensing is used, if there are still multiple high probability candidate regions for the glad hand panel, 3D geometric cues can be used to filter out false positive candidates based on the expected 3D characteristics of glad hands.
  (g) The location/pose of the identified glad hand panel and associated glad hand(s) in an appropriate coordinate space—for example, a global coordinate space that is relevant to the truck's manipulator based upon calibration with respect to the sensor(s) 3210—is then for use in a fine localization process to be carried out by the robot manipulator in connecting to the glad hand.
  (h) The manipulator and its associated end effector can be moved based upon gross motion data 3270 derived from the present location of the manipulator assembly versus the determined location of the glad hand panel 3130 and associated glad hands. This gross motion data 3270 is delivered to the gross motion actuators 3280 of the manipulator assembly, or otherwise translated into gross motion that places the end effector into an adjacent relationship with the glad hands/glad hand panel.

D. Fine Localization of Glad Hand Pose

Once a gross estimation of the glad hand (and/or glad hand panel) location is provided to the system, a sensor-based estimate of the glad hand connector location/pose is computed. As described further below, the robot manipulator contains a separate or integrated gross manipulation system that is adapted to place the connector-carrying end effector, which also carries an on-board fine localization sensor/camera into a confronting relationship with the located glad hand panel. Since the panel can be located anywhere on the trailer front face, the use of a gross manipulator system limits the effort and travel distance required by the fine adjustment actuators of the manipulator—thereby increasing its operational speed and accuracy in making a connection between the truck pneumatics (and/or electrics) and those of the trailer. Thus, after moving the manipulator into a gross adjusted position, the fine manipulation system is now in a location in which it can detect the glad hand pose on the panel. Any stored information already available from the gross position system on connector pose is provided to the fine system so that it can attempt to narrow its initial search. If this information is inaccurate, the search range can be broadened until the glad hand is located by the fine position system.

Figure 34:
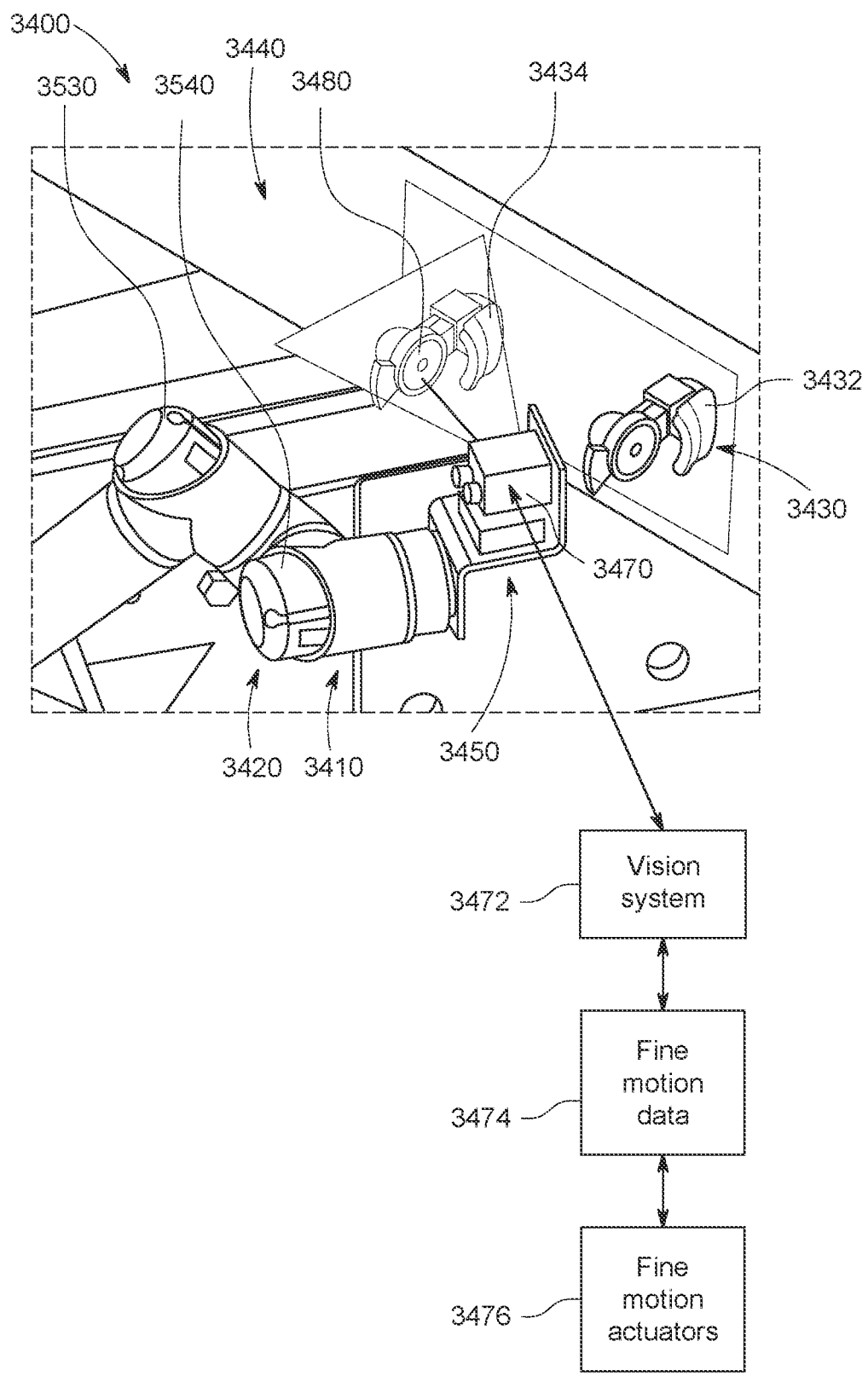
FIG. 34 is a diagram of a trailer hitched to an autonomous truck chassis, showing a fine position end effector mounted on the chassis of an autonomous truck generally in accordance with FIG. 32, having a fine sensing assembly located with respect to tend effector for guiding it to the glad hand of the trailer.
Figure 35:
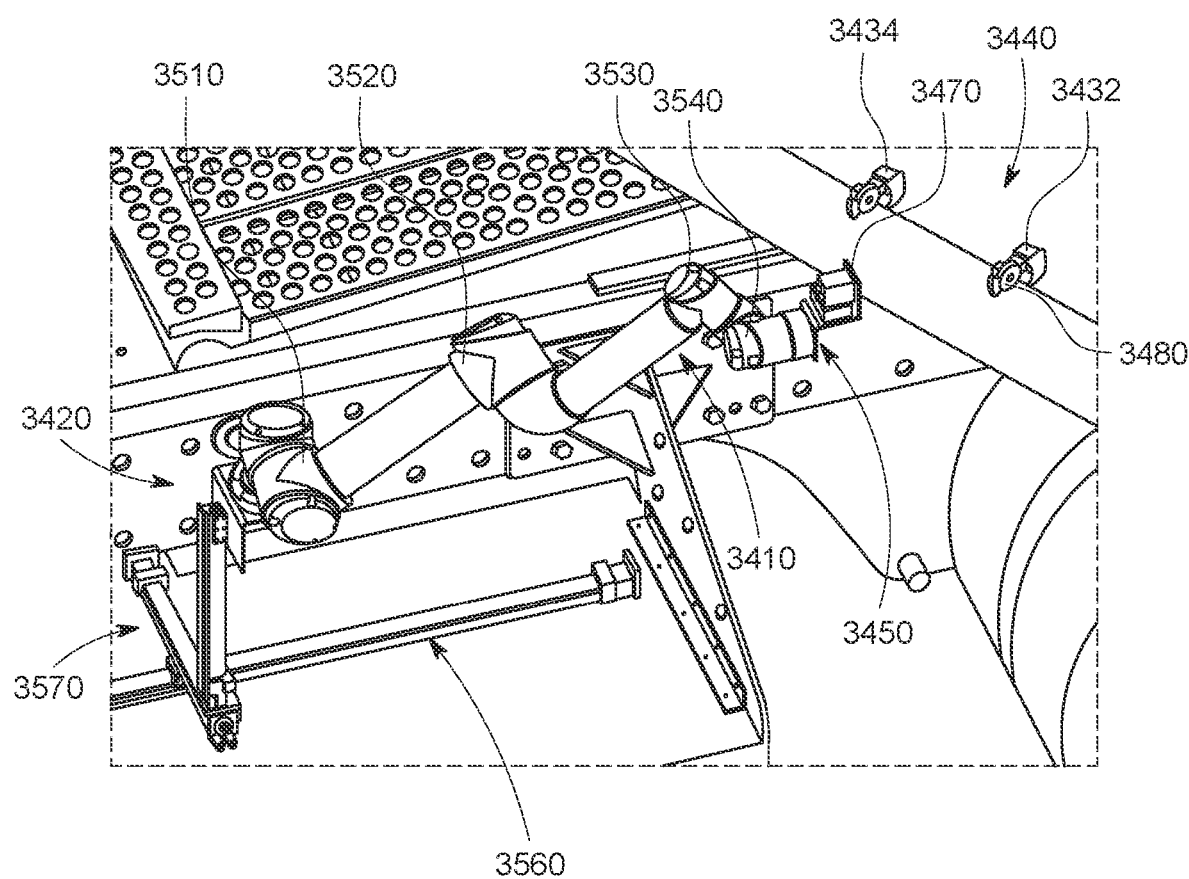
FIG. 35 is a multi-axis (e.g. three-axis) gross positioning assembly mounted on an autonomous truck chassis for moving a robotic arm manipulator and associated end effector so as to locate the end effector and a carried truck-based glad hand connector adjacent to a trailer glad hand panel located by the gross detection system.

Reference is now made to FIGS. 34 and 35 that show a multi-axis robot manipulator assembly 3410 mounted on an autonomous truck rear chassis 3420 in a confronting relationship with the glad hand panel 3430, and glad hand(s) 3432 and 3434 of a trailer front 3440. The trailer 3400 has been, or is being, hitched to the fifth wheel of the truck chassis 3410.

As described above, the robot manipulator assembly 3410 is a multi-axis, arm-based industrial robot in this embodiment. A variety of commercially available units can be employed in this application. For example, the model UR3 available from Universal Robots A/S of Denmark and/or the VS Series available from Denso Robotics of Japan can be employed. The robot includes a plurality of moving joints 3510, 3520, 3530 and 3540 between arm segments. These joints 3510, 3520, 3530 and 3540 provide fine motion adjustment to guide the end effector into engagement with the glad hand 3432. The base joint 3510 is mounted to the gross motion mechanism, which comprises a pair of transverse (front-to-rear and side-to-side) linear slides 3560 and 3570 of predetermined length, mounted and arranged to allow the manipulator end effector 3450 to access any location on the trailer front 3440 that may contain the glad hand(s) 3432 and 3434. The slides can allow the manipulator's base joint 3410 to move according to a variety of techniques, including, but not limited to screw drives, linear motors, and/or rack and pinion systems.

Notably, the end effector 3450 includes the fine motion sensor assembly/pod 3470 according to an embodiment. The sensor assembly 3470 is connected to a vision system and associated process(or) 3472 that can be all or partially contained in the assembly 3470, or can be instantiated on a separate computing device, such as one of the vehicle's onboard processor(s). The vision system can be the same unit as the gross system 3250 (FIG. 33), or can be separate. The gross and fine vision systems 3250 and 3472 can optionally exchange data as appropriate—for example, to establish a single global coordinate system and provide narrowing search data from the gross pose to the fine pose estimate. In general, the fine vision system generates fine motion data for use by the joints of the manipulator assembly 3410 and this data is transmitted in a manner clear to those of skill in robotic control, to the robot's fine motion actuators 3476. Note that the manipulator can also include force feedback and various safety mechanisms to ensure that it does not apply excessive force or break when moving and/or engaging a target. Such can include mechanisms for detecting human or animal subject presence so as to avoid injuring a subject. One or more of the below-described sensor types/arrangements, typically provided to the assembly 3470, mounted on, or adjacent to, the moving end effector 3450, can be used to finely determine glad hand pose, and servo the robot to that location via a feedback routine:

(a) A color or monochrome camera with motion control can be moved using the delivery motion control hardware to produce multiple image frames of the target area (the glad hands). The collection of frames has a known motion profile and stereo correspondence processing can be performed and coupled with the motion profile to triangulate image points to produce a three-dimensional range image.

(b) A fixed-baseline stereo camera can be defined by a single camera, in which movement of the end effector is replaced by two or more cameras separated by a fixed and known separation. Such an arrangement can be mounted on the end effector or another location, such as the base joint 3510, or the chassis itself. Stereo correspondence processing and triangulation steps are used to produce a three-dimensional range image.

(c) A structured light stereo camera can be used, comprising a single camera in conjunction with an infrared (IR) light pattern projector with a known relative pose to the camera. The stereo correspondence processing incorporates the known projected pattern to simplify the processing and permit more dense coverage of the untextured surfaces of the glad hand. A triangulation process is used to produce a three-dimensional range image.

(d) A near IR camera can be used with a near IR filter to take advantage of near IR illumination. Using a near IR illumination will exaggerate the contact between the rubber gasket in the glad hand and the rest of the glad hand structure and background (as described below).

(e) A short-range laser ranger can be used to provide additional distance information of the glad hand.

(f) Additionally, artificial lighting can also be mounted on the end-effector 3450 to allow the vision sensor in the assembly 3470 to image the glad hand in virtually any lighting or weather conditions. The lighting can be in the visible spectrum or can be in the near IR spectrum (or another spectrum or combination of spectrums) to enhance glad hand gasket detection.

(g) The sensor assembly 3470 can also include other forms of distance-measuring devices, such as time of flight sensors to enhance range measurement between the end effector 3450 and glad hand(s) 3432 and 3434.

Figure 36:
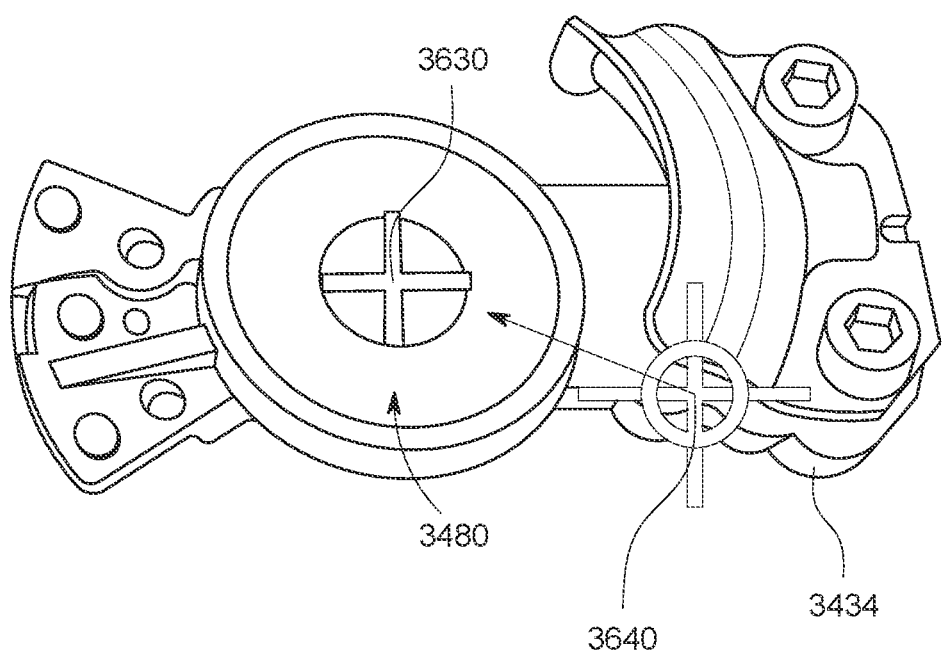
FIG. 36 is a diagram of an image of a trailer glad hand used by the fine sensing system to determine pose for use in servoing a robotic manipulator end effector and associated truck-based glad hand connector into engagement with the trailer glad hand.

One method for fine detection of the glad hand pose is by using machine vision to image and analyze the circular rubber gasket 3480. This gasket 3480 has sufficient contrast to the glad hand and surrounding structure that may be reflected in the camera imagery. The tracking of the rubber gasket 3480 by the fine sensor 3470 can provide a significant amount of information on the glad hand's position relative to the end effector 3450. FIG. 36 shows how the detected rubber gasket 3480 of the exemplary glad hand 3434 is used to generate fine motion control commands for the end effector 3450 to align with the gasket 3480. Since the rubber gasket 3480 is typically annular, with a circular inner and outer perimeter, it can be used to estimate angular offset of the end-effector relative to the (e.g.) center/centroid 3630 of gasket 3480 based on the skew (image center 3640) of the extracted shape in the imagery (which translates into an ellipse defining a particular major and minor axis in an acquired 2D image). The rubber gaskets on glad hands are also typically a standard size, so that the dimensions of the extracted gasket in the imagery can provide a metric of the relative distance/range to the gasket, which can also be used to determine the relative location of the center of the glad hand. A short-range laser ranger (beam 3490) can be provided in the sensor assembly 3470 and used to provide a second measurement of the end-effector range to the glad hand.

Another related option for glad hand detection and ranging via the glad hand gasket is to create a custom molded glad hand seal with characteristics that aid in the goal pose identification process. This seal can be impregnated with additive material during polymeric curing, such as magnetic particles, UV reactive particles, or molded to assume a shape or texture that has other visual based feature (colors, patterns, shapes, markers, etc.) that would aid in pose identification through a variety of methods.

Figure 36A:
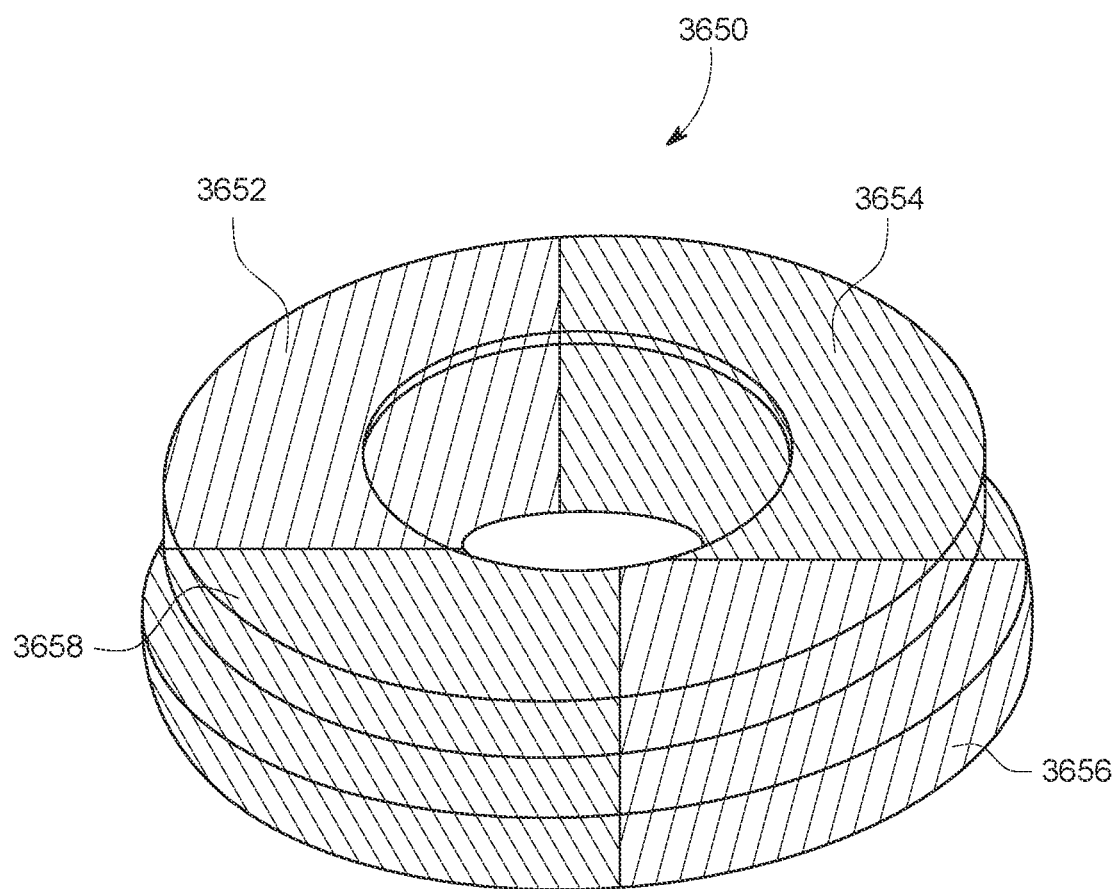
FIG. 36A is a perspective view of an exemplary glad hand gasket with features to enhance autonomous identification, location, and pose of the glad hand gasket.

FIG. 36A is a perspective view of an exemplary glad hand gasket with features to enhance autonomous identification, location, and pose of the glad hand gasket. The glad hand gasket can have different regions with different features so that the system can easily identify the glad hand gasket by these features. As shown in FIG. 36A, the glad hand gasket 3650 can have four distinct identification regions 3652, 3654, 3656, and 3658, although it should be clear that a gasket can have more or fewer than four identification regions. The identification regions 3652, 3654, 3656, and 3658 can include different colors in various regions, magnetic particles in various regions, UV reactive particles in various regions, and/or other features to aid in the location and pose identification process.

Figure 37:
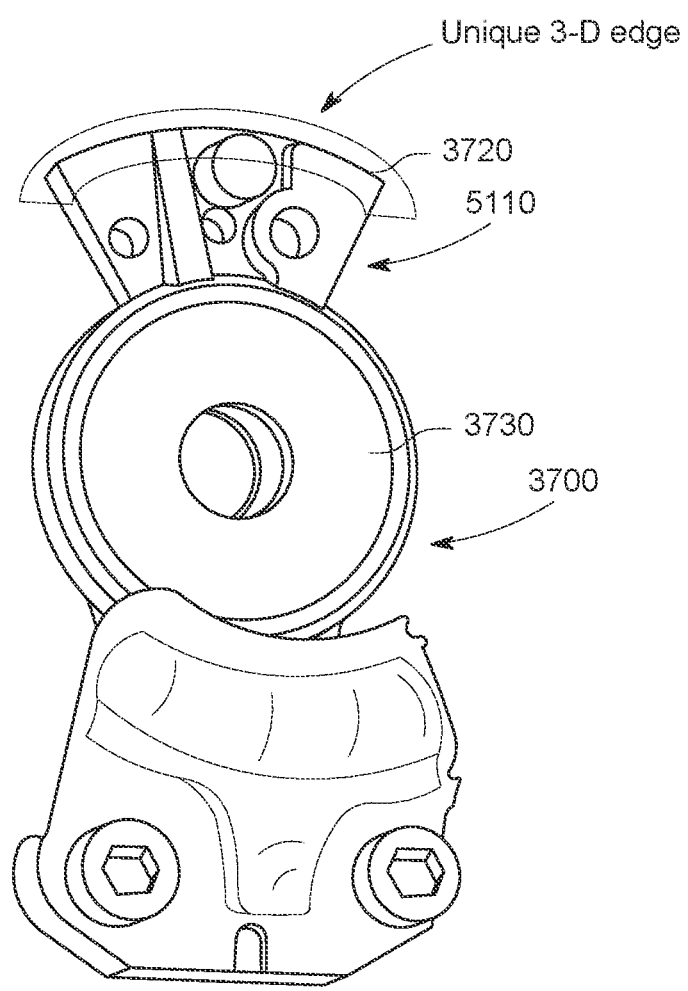
FIG. 37 is a diagram of a conventional trailer glad hand depicting the unique edge of a flange used to identify the pose of the glad hand by the autonomous truck manipulator sensing assembly.

Another method for detecting the glad hand pose is by employing a three-dimensional range image. By way of non-limiting example, the edge 3620 of the unique adapter plate 3710 of the exemplary glad hand 3700, as shown in FIG. 37, can be identified by the fine motion system using three-dimensional shape matching. One exemplary algorithm, which allows identification of this feature, is based upon Iterative Closest Point (ICP) algorithm, relying in part upon constraints related to the consistent geometry of that edge 3720 relative to the glad hand seal 3730. This enables an estimate of the relative position and orientation (pose) of the glad hand seal 3730 for fine positioning. See, by way of useful background information, Besl, P. and N. McKay, *A Method of Registration of 3-D Shapes*, IEEE Transactions on Pattern Analysis and Machine Intelligence, vol. 14, no. 2, February 1992, pp. 239-256.

Figure 38:
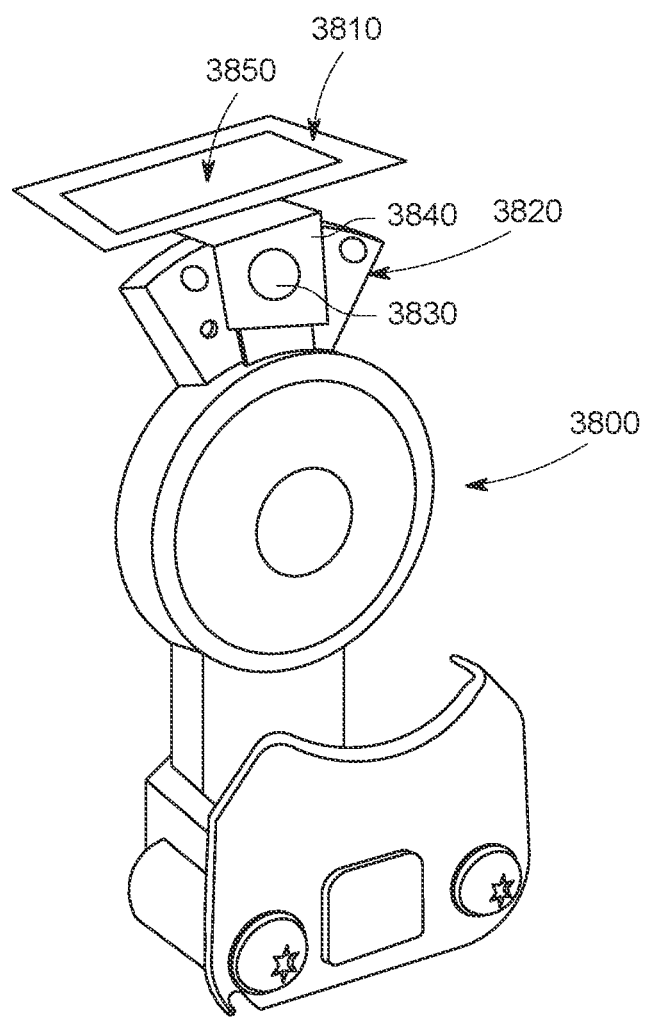
FIG. 38 is a diagram of a conventional glad hand provided with a unique tag used to identify the pose of the glad hand by the autonomous truck manipulator sensing assembly.

In another embodiment, as shown in FIG. 38, a rectangular tag 3810 can be affixed to the exemplary glad hand 3800. This tag 3810 can be located at any position on the glad hand framework that is typically visible to the fine sensor assembly. In this embodiment, it is mounted on the outer end of the adapter plate 3820 using a spring-loaded base 3840. In this example a hole in the base engages a raised cylindrical protrusion 3830 to secure the base 3840 to the adapter. Adhesives, fasteners or other attachment mechanisms can be used as an alternative or in addition to the depicted arrangement in FIG. 38. The tag 3810 provides a visual (or other spectral) reference for simplifying and improving the accuracy of the glad hand fine pose estimate by the sensor assembly. The tag 3810 can be removably attached to the glad hand using the depicted clip base 3840, or other attachment mechanism, so as to provide repeatable positioning of the tag relative to the underlying, associated glad hand. The exposed (i.e. outer) surface of the tag 3810 can define a high-contrast rectangle (or other polygonal and/or curvilinear) of known/stored dimensions. The features of the tag can be extracted by the sensor assembly and associated vision system using thresholding of the observed intensity. The extracted image pixel coordinates can be related to the planar physical dimensions of the tag using a homography (transformation) in accordance with known techniques. This transformation provides the rotation and translation of the tag relative to the sensor's coordinate space. The known transformation between the sensor and delivery coordinate frame and the known transformation between the tag and the glad hand coordinate frame enables an estimate of the glad hand pose for fine positioning.

Figure 39:
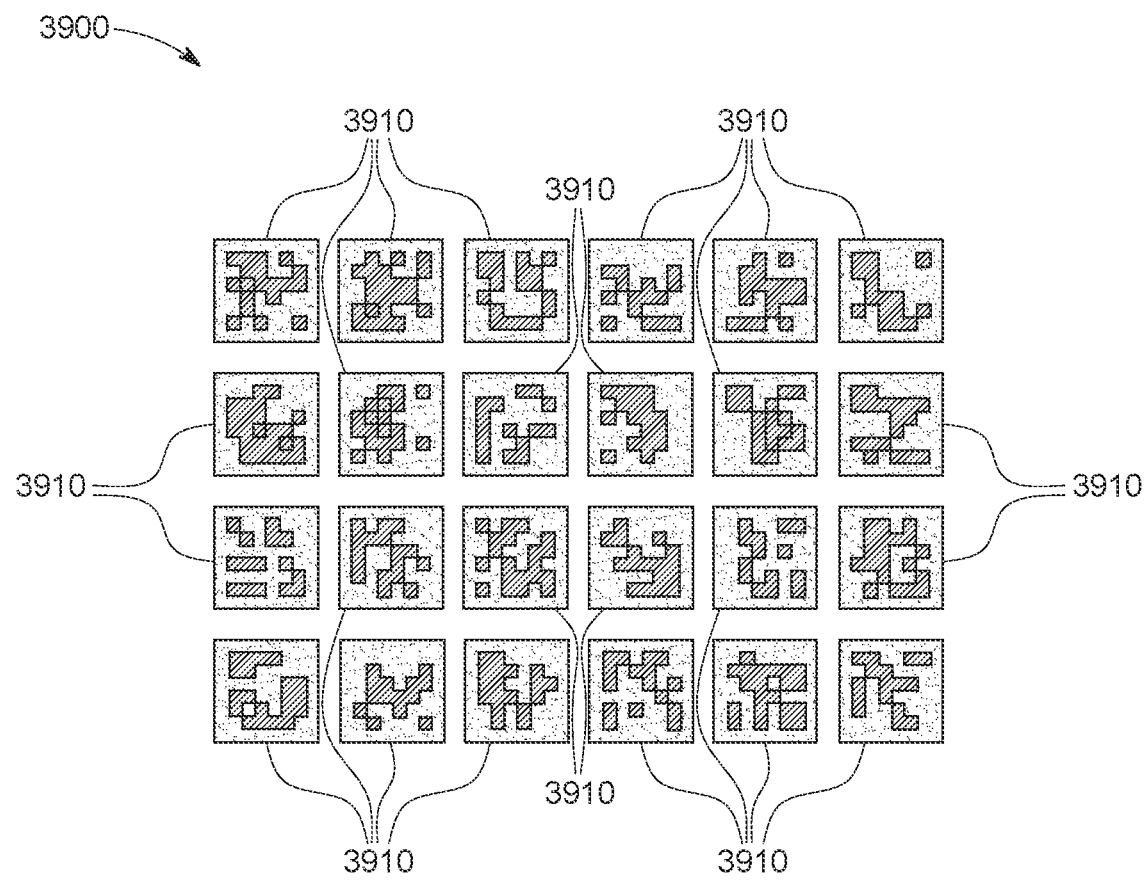
FIG. 39 is a diagram of a unique fiducial-based identifier that can be applied to the surface of the tag of FIG. 38.

An alternative to a single high contrast rectangle for use as the tag 3810 is the use of a visual marker/fiducial embedded within the bounded (e.g. rectangular) area 3850 of the tag 3810. Examples of this type of marker 3900 are depicted in FIG. 39. The advantage offered by this visual marker is more robust detection and homography estimation in degraded environments or when a portion of the tag is occluded. The generation of this form of visual tag and the detection and pose estimation is known in the art and described generally in Garrido-Jurado, S. et al., Automatic generation and detection of highly reliable fiducial markers under occlusion, Pattern Recognition, vol. 47, Issue 6, June 2014, pp. 2280-2292; and on the World Wide Web at the Software Repository: https://sourcesforge.net/projects/aruco/files/?source=navbar. As shown the marker 3900 can comprise a matrix of 2D ID (barcode) patterns 3910, which provide specific information on the identity, characteristics and/or positioning of the glad hand, as well as other relevant information—such as the identity of the trailer, its extents and characteristics. In alternate embodiments, the tag can define 3D shapes and/or features (for example a frustum) that allow a 3D sensor to more accurately gauge range and orientation of the glad hand.

Visual servoing can be used to achieve proper positioning for a mating operation between the end-effector-carried glad hand/connector and the trailer glad hand. The end effector can be controlled using proportional velocity control under operation of a control loop receiving pose information from the fine vision system 3472. As the sensor's acquired image of the glad hand rubber gasket 3480 gets closer to the desired target position, the commanded velocities of the manipulator joints driving end effector converge to zero, at which point the end-effector is aligned with the glad hand, and ready to perform the mating operation.

A blind movement (rotation about an axis passing through the glad hand gasket centroid) can be used to mate the end effector to the trailer glad hand. That is, once the glad hand location and pose are understood by the fine vision and manipulator system, a blind movement of the end-effector along the estimated normal to the glad hand can occur, making the final physical contact to the glad hand. The move is typically (but not necessarily) blind because the sensors are too close to the target glad hand to produce useful information.

In general, and as described below, once the truck connector (e.g. glad hand) is mated fully to the trailer glad hand, the end effector releases its grip upon the truck glad hand via an appropriate release motion. The motion is dependent upon the geometry of the end effector grasping mechanism. A variety of grasping mechanisms can be employed, and can be implemented in accordance with skill in the art. After releasing the glad hand, the end effector can return to a neutral/retracted position based upon motion of both the fine and gross motion mechanisms to an origin location.

As with other embodiments described herein, the release of the mated truck glad hand from the trailer glad hand can be performed in a similar manner to attachment. The end effector is moved to a gross location and then the fine sensor servos the end effector to the final position in engagement with the mated truck glad hand. The end effector then grasps the truck glad hand, blindly rotates it to an unlocked position and it is withdrawn to the origin.

E. Gross Manipulation Systems and Operation Thereof

As described above, the end effector carrying the glad hand or other truck-based pneumatic (and/or electric) connector can be moved via the manipulator assembly in an initial, gross movement that places the end effector relatively adjacent (and within fine sensor range of) the trailer glad hand(s). Thereafter, the relatively adjacent end effector is moved by the fine manipulation system into engagement with the trailer glad hand.

A gross manipulation system is also desirable if the fine manipulation system lacks the ability to reach glad hands when the trailer is at an angle relative to the truck. The gross manipulation system generally operates to move the fine manipulation system within reach of the trailer glad hands. In operation, the gross manipulation/movement system can have one-two or three axes of motion along sufficient distance(s) to locate the end effector in contact with the trailer glad hand(s) at any expected location along the trailer front face and/or at any pivotal orientation of the trailer with respect to the truck chassis. A generalized gross manipulation system can include: (a) a frame, comprising a structure that is mounted to the yard truck; (b) a platform where the fine manipulation assembly is integrated; (c) an x-axis manipulation mechanism that moves the fine manipulation system in the x-direction (i.e. front-to-rear of the vehicle); (d) a y-axis manipulation assembly that moves the fine manipulation system in the y-direction (side-to-side of the vehicle); and (e) a z-axis manipulation assembly that moves the fine manipulation system in the z-direction (vertically with respect to the ground).

Figure 40:
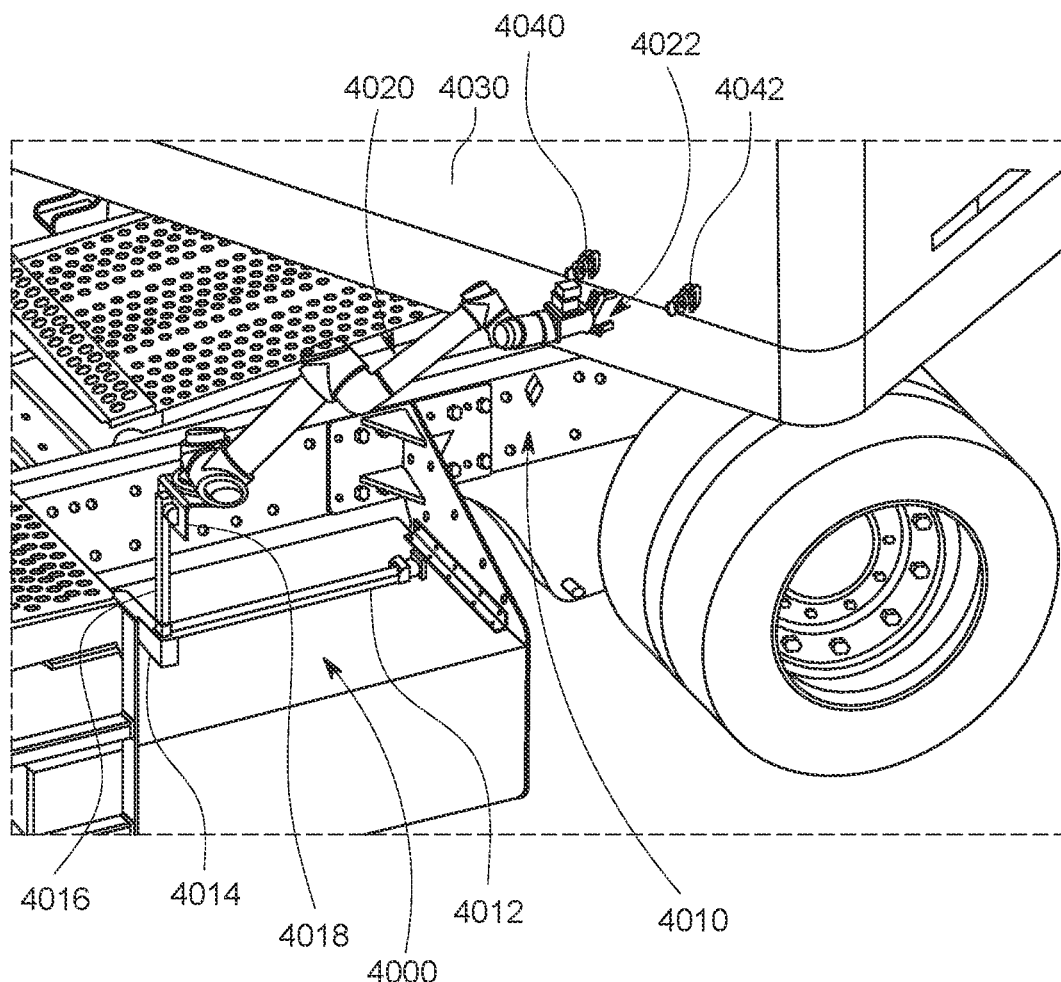
FIG. 40 is a diagram of a trailer hitched to an autonomous truck chassis, showing a multi-axis gross manipulation system carrying fine manipulator robotic arm according to an embodiment.

One embodiment is a 3-axis gross manipulation system 4000 is shown in FIG. 40, located on the side of the autonomous truck chassis 4010. This system 4010 includes an x-axis rail or slider 4012, a y-axis rail/slider 4014 and a z-axis rail/slider 4016. The base 4018 of the robotic manipulator (the depicted multi joint arm assembly) 4020 rides vertically along the z-axis rail/slider 4016, whilst the z-axis rail travels laterally along the y-axis rail/slider 4014. In turn, the y-axis rail slider travels front-to-rear along the x-axis rail/slider 4012, thereby affording the arm base 4018 full three-dimensional gross movement within the range (length) of each rail/slider. Use of a multi-axis system improves the overall motion range for the robotic manipulator arm 4020, and thereby allows the arm's end effector 4022 to reach a larger range of trailer pivot angles and glad hand locations along the trailer front face 4030, including the depicted glad hands 4040 and 4042.

Figure 41:
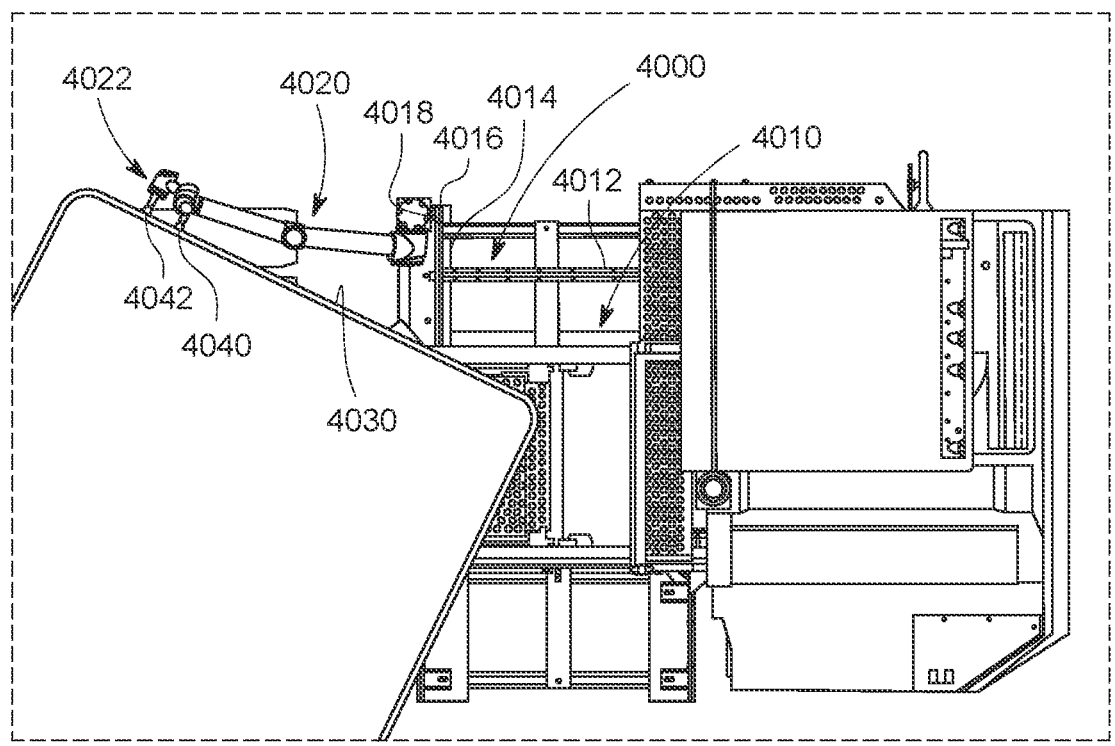
FIG. 41 is a top view of the trailer and autonomous truck of FIG. 40, showing the trailer at a pivot angle on its hitch, in which the gross manipulation system is locating the fine manipulator so that its end effector can reach the trailer glad hand panel.
Figure 42:
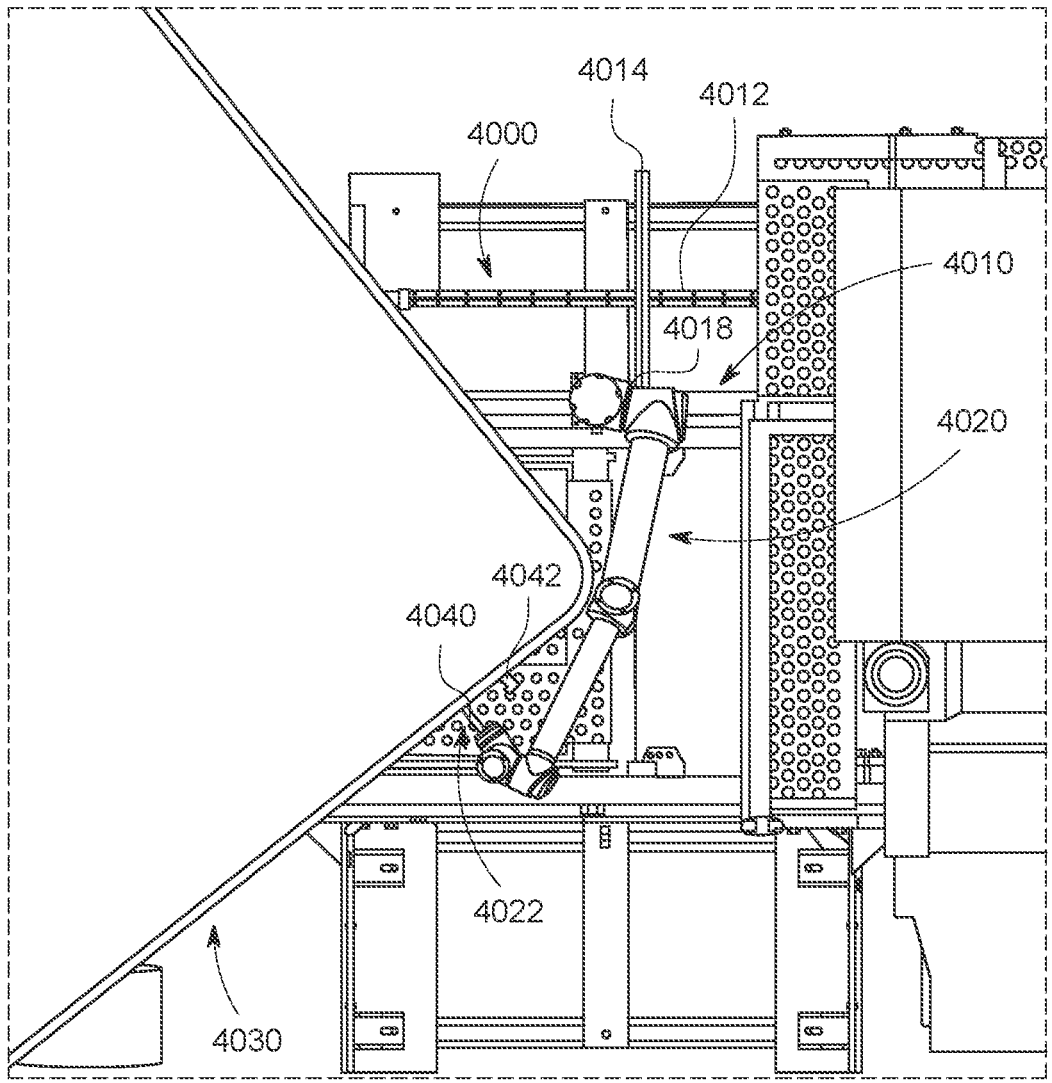
FIG. 42 is a top view of the trailer and autonomous truck of FIG. 40, showing the trailer at another, opposing pivot angle relative to FIG., in which the gross manipulation system is locating the fine manipulator so that its end effector can reach the trailer glad hand panel.

The improved gross motion range provided by the exemplary 3-axis system 4000 is exemplified in FIGS. 41 and 42. In FIG. 41 the trailer front face 4030 is pivoted with respect to the truck chassis at a steep angle that places the trailer glad hands 4040 and 4042 at a distant rearward angle. The manipulator arm base 4018 is moved rearward and leftward on the x-axis rail/slider 4012 and y-axis rail/slider 4014, respectively, to a nearly maximum distance. This allows the end effector 4022 to reach the glad hand(s) 4040 and 4042, even at the extreme geometry depicted. Likewise, in FIG. 42, the trailer front face 4030 is pivoted at an opposing steep angle. In this example, the manipulator arm base 4018 is moved to a slightly forward and rightmost position by the x-axis rail/slider 4012 and y-axis rail/slider 4014, respectively, allowing the end effector 4022 to reach the glad hands 4040 and 4042, which now reside further forward and centered on the chassis, when compared to FIG. 41. The exemplary multi-axis gross manipulation system 4000 can contain one or more of the linear actuation devices described above (e.g. linear motors, lead screws, rack and pinion gears, etc.). Note that the vertical position of the base 4018 along the z-axis rail/slider 4016 is chosen to make the arm appropriately level with the height of the glad hands 4040, 4042. The height/level of the base 4018 may differ from the actual glad hand height to allow for bends in certain manipulator arm joints.

Figure 43:
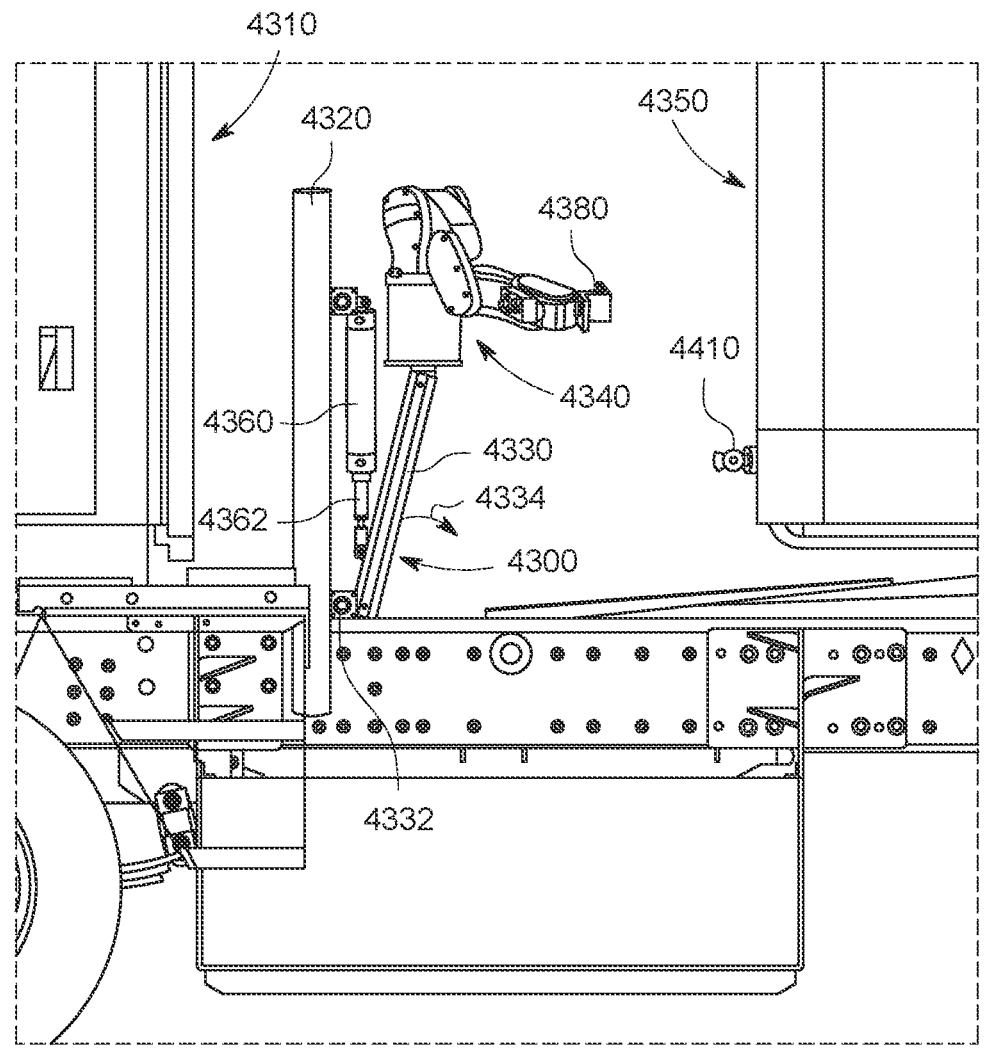
FIG. 43 is a side view of a trailer hitched to an autonomous truck chassis, showing a multi-axis gross manipulation system carrying fine manipulator robotic arm, in which the manipulator system is mounted on a piston-driven, hinged platform in a stowed orientation on the truck chassis, according to another embodiment.
Figure 44:
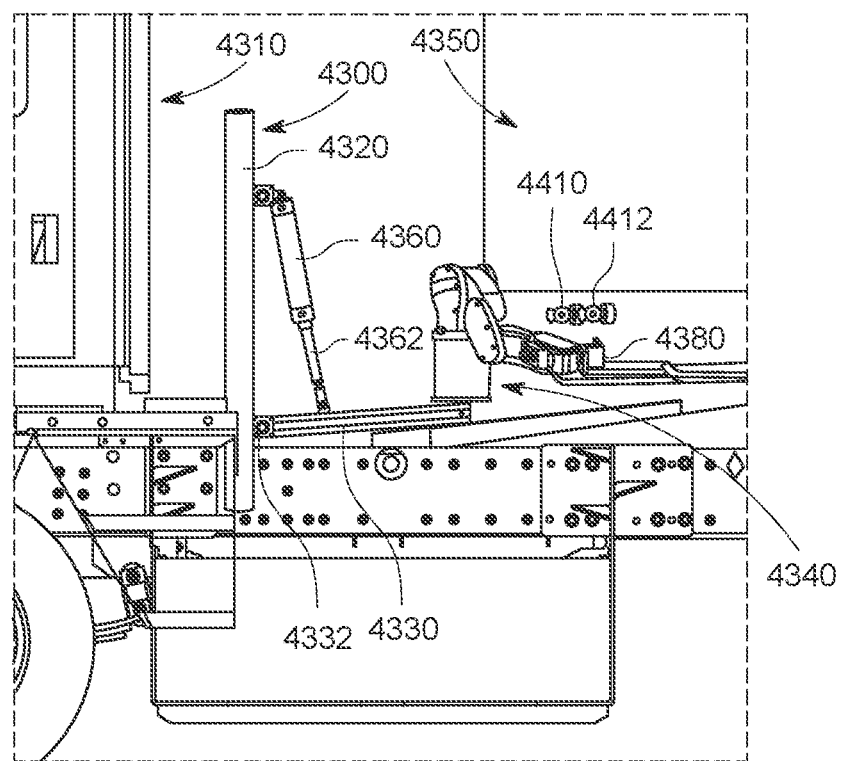
FIG. 44 is a side view of the trailer and autonomous truck of FIG. 43, showing the piston-driven, hinged platform in a deployed orientation on the truck chassis.

Another embodiment of a gross manipulation system 4300 is shown in FIG. 43. In this arrangement, the system is mounted on an upright frame 3420 behind the cab 4310 of the autonomous truck. A platform 4330 is mounted on a hinge 4332. The platform supports the fine manipulation system 4340 at a top end and is adapted to pivot downwardly on the hinge 4332 to adjustably extend (curved arrow 4334) the fine manipulation system 4340 toward the trailer front face 4350. This pivotal extension can be accomplished using (e.g.) any acceptable linear actuator described above. In the depicted exemplary embodiment, a fluid (e.g. hydraulic or pneumatic) piston 4360 is used to extend and retract the hinged platform 4330. The piston is pivotally mounted between the upright frame 4320 and the hinged platform 4330. Extending the piston ram 4362 causes the platform 4330 to hinge downwardly, as shown in FIG. 44. This moves the manipulator arm system 4340 closer to the trailer front face 4350. When the ram 4360 is retracted into the piston 4360, as shown in FIG. 43, the manipulator arm system 4340 is retracted upwardly and towards the cab 4310. This takes it out of interference with the trailer when not in use. The piston 4360 and hinged platform 4330 effect coordinated motion along the x-axis and z-axis directions. The geometry of the platform and motion characteristics of the arm are coordinated in the overall design so as to allow the end effector 4380 to access the glad hand(s) 4410 and 4412 in a range of possible positions and trailer orientations. While not shown, the hinge axis 4332 (or another element in the system 4300) can include a y-axis slider/rail (e.g. a lead screw, linear motor or rack and pinion system that facilitates y-axis (side-to-side) movement). In an exemplary embodiment, the y-axis assembly can be electromechanically driven, while the x/z-axis assembly can be fluid-driven (hydraulic/pneumatic).

It is contemplated in another embodiment that the gross manipulation mechanism can be part of a separate vehicle. This separate vehicle can be manually driven or comprise an autonomous robotic vehicle (not shown)—which can be similar to those commercially available from a variety of vendors for use in hazardous environments, etc. A fine manipulation arm assembly is mounted on the vehicle/robot. The vehicle/robot can move along the truck length and provide fine manipulation access to the truck hoses and trailer glad hands. The separate vehicle can communicate with the yard truck and/or the system server and execute an attach or detach command as desired.

F. Systems for Fine Manipulation and Delivery of a Truck Glad Hand

Upon sensing of the glad hand location on the trailer front face, a combination of fine and/or gross manipulation system can be used to connect the manipulated truck glad hand interface onto the fixed position trailer glad hand. The fine manipulation system is used in accordance with the sensor-based glad hand perception system described above (see Section K).

Figure 45:
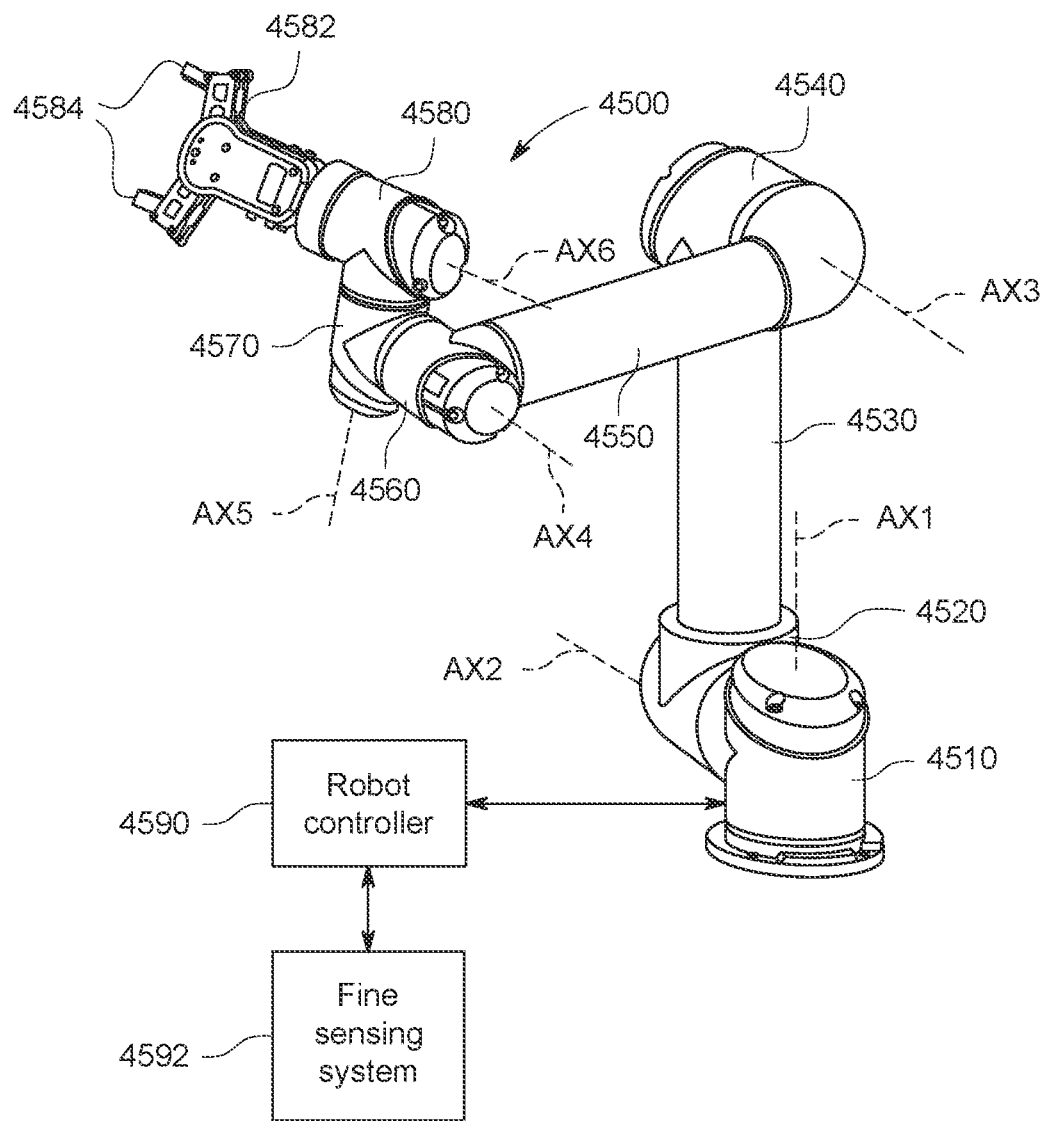
FIG. 45 is a perspective view of a multi-axis (e.g. 6-axis) fine manipulation robotic arm assembly and associated end effector for use in manipulating a truck-based trailer glad hand connector according to various embodiments herein.

An embodiment of this fine manipulation system consists of a tightly controllable, multi-axis robotic manipulator (multi joint arm) that can compensate for variations in trailer pivot angle with respect to the truck, glad hand position on the trailer front face, glad hand angle with respect to the plane of the trailer front face, and overall trailer height. The system is capable of depositing/releasing and grasping/retrieving the glad hand interface. The multi-axis manipulator system can contain any or all modalities for linear travel including electro-mechanical actuation, in which one or more electric motors are used to move the system components, such motors can include integrated or integral motion feedback devices (e.g. stepper motors, encoders, etc.) that allow the robotic controller to monitor motion with respect to a given coordinate space. An example of such an electromechanical manipulator system is shown in FIG. 45. The depicted, tightly controllable, 6-axis robotic arm 4500 can be commercially sourced from, a variety of vendors, including Universal Robotics and Denso, described above. The manipulator arm 4500 includes a base 4510 that is attached to an appropriate platform (such as a gross manipulator, described above). The base can rotate a first transverse joint 4520 about a first vertical axis AX1. The first joint 4520 rotates about a second, transverse axis AX2 so as to swing an elongated arm segment 4530 through an arc. On the distal end of the arm segment 4530 is mounted another joint 4540 that rotates about a transverse axis AX3 to swing an interconnected arm segment 4550 about an arc. The distal end of the arm segment 4550 includes three joints 4560, 4570 and 4580 that rotate the end effector 4582 about three orthogonal axes AX4, AX5 and AX6 in the manner of a wrist. The end effector 4582 can include a variety of actuated mechanisms, including the depicted gripper fingers that move into and out of a grasping configuration. In embodiments a specialized end effector can be used to grasp and release the truck's glad hand interface. The end effector 4582 can be actuated using electrical, pneumatic or hydraulic motive force under control of the robot controller 4590 (that also moves and monitors the joints 4510, 4520, 4540, 4560, 4570, 4580). Alternatively, a separate controller that also communicates with the fine sensing system 4592 can actuate the end effector.

In alternate embodiments, the robotic arm manipulator can define a differing number of motion axes, as appropriate to carry out the desired grasping and releasing tasks. In further alternate embodiments, some or all of the manipulator motion elements can be operated with differing mechanisms and/or motive forces including, but not limited to, hydraulic actuation, using hydraulic pressure to extend or retract a piston in a cylinder and/or pneumatic actuation, using air pressure to extend or retract a piston in a cylinder.

G. Glad Hand Interface Mechanisms and Operational Methods

As described above, various mechanisms can be used to create a pressure-tight connection between the truck pneumatic (and/or electric system) and a fully or substantially conventional glad hand mounted on the trailer front face. Some implementations of a connection mechanism/interface employ a similarly conventional glad hand geometry on the truck pneumatic line, while other implementations utilize a modified connection.

One system entails modification of the truck glad hand to provide a favorable interface that allows for leverage and integration with a robotic end effector to twist and lock the glad hand into place. The system is composed of (a) a conventional glad hand connector on the trailer; (b) a glad hand adaptor, which includes a mechanism to connect the glad hand to a lever; (c) a lever, consisting of a long extension to provide favorable leverage to twist the glad hands into place; and (d) an end effector interface that provides a location for an end effector to grasp and pivotally move the lever.

Figure 46:
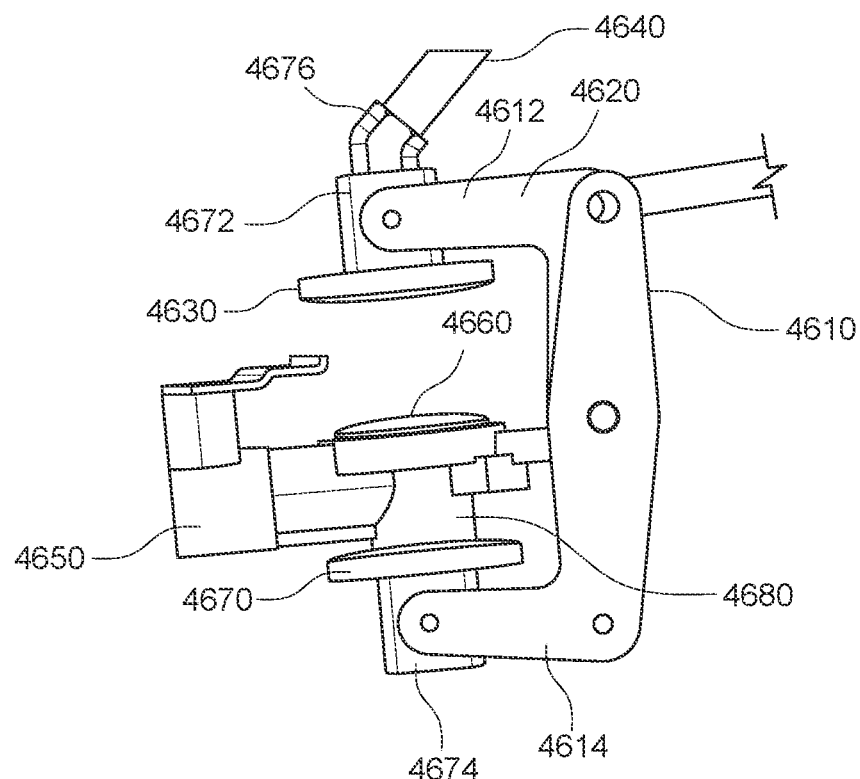
FIG. 46 is a fragmentary side view of a truck-based glad hand connection employing a clamping action in response to an associated actuator, shown in an open orientation with respect to a trailer glad hand.
Figure 46A:
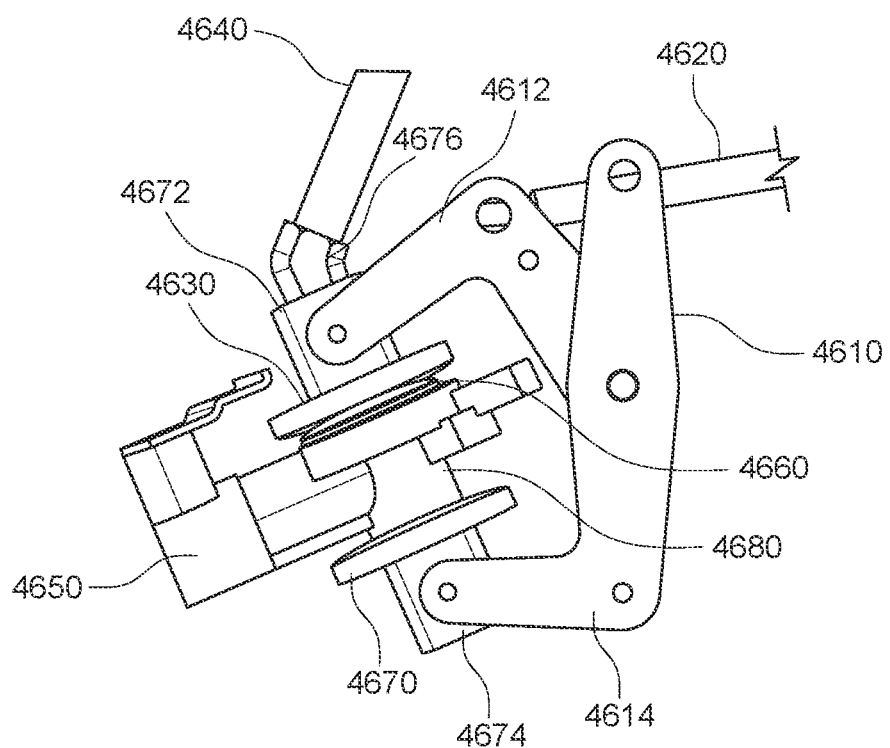
FIG. 46A is a fragmentary side view of the truck-based glad hand connection of FIG. 46, shown in a closed/engaged orientation with respect to the trailer glad hand.

An alternate technique, shown generally in FIGS. 46 and 46A, employs a clamp 4610 with an actuator 4620 that provides consistent force and seals the glad hand face. A rotary actuator or linear actuator can provide linear force to close the clamp from an opened, disengaged position (FIG. 46) to a closed, sealed position (FIG. 46A), in which top clamp pad 4630 is annular and is connected to a truck pneumatic line 4640. The pad confronts, and seals against, the trailer glad hand 4650 and associated seal 4660. More generally, the bottom clamp pad 4670 bears against the central barrel 4680 of the trailer glad hand 4650. The body of the clamp 4610 is composed of two pivotally jointed L-shaped sections 4612, 4614, each carrying a respective clamp pad 4630, 4670. The clamp pads 4630, 4670 are, likewise, carried on respective pivoting bases 4672, 4674. The upper base 4672 receives a threaded connector 4676. Clamping action by the actuator is used to pressurably engage and disengage the trailer glad hand 4560. In an alternate embodiment, a rotary actuator can be employed instead of the depicted linear actuator, which serves to drive a led screw that clamps and unclamps the arrangement.

Figure 47:
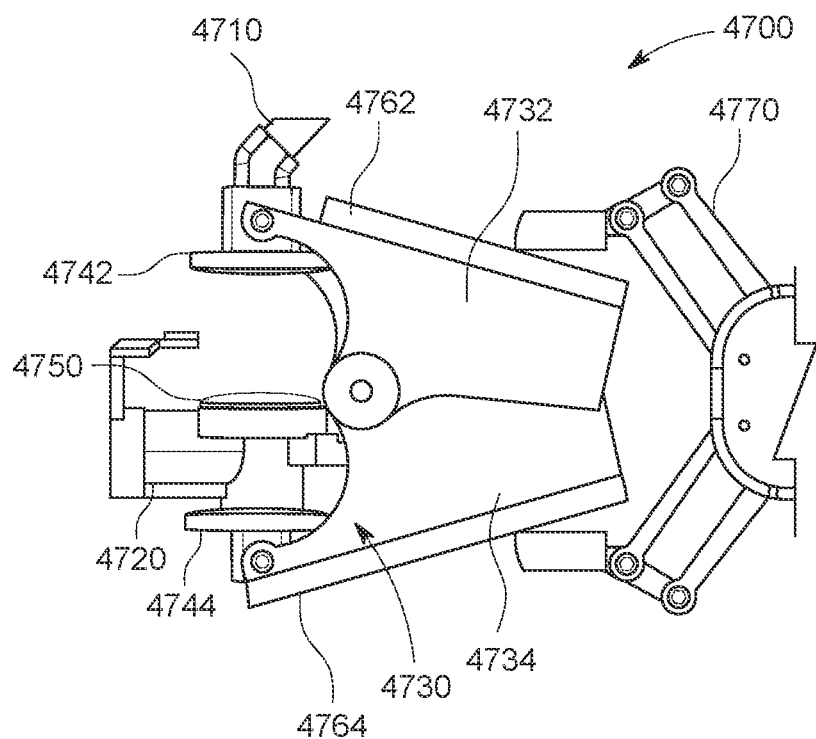
FIG. 47 is a fragmentary side view of a truck-based glad hand connection employing a spring-loaded, clip-like action in response to the motion of the manipulator end effector, shown in an open orientation with respect to a trailer glad hand.
Figure 47A:
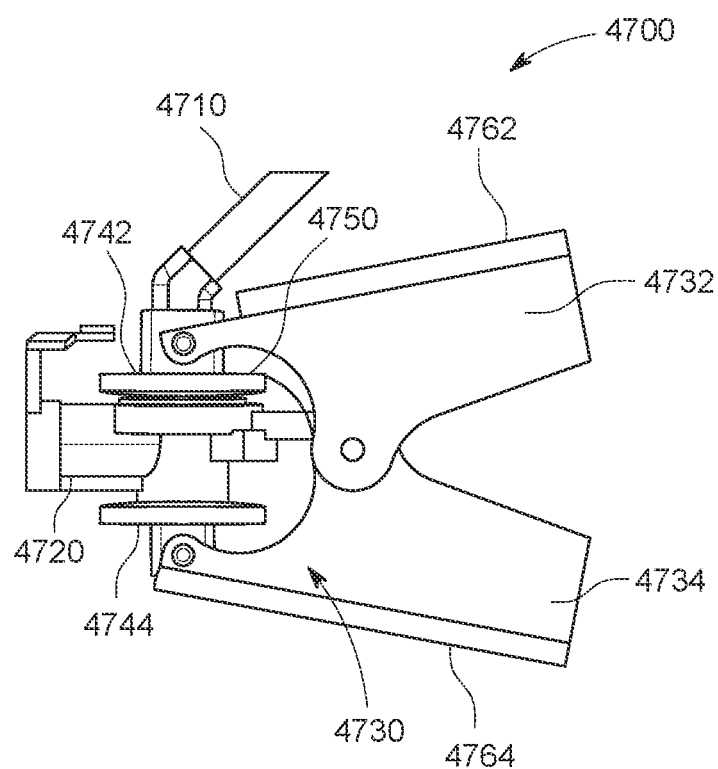
FIG. 47A is a fragmentary side view of the truck-based glad hand connection of FIG. 47, shown in a closed/engaged orientation with respect to the trailer glad hand.

FIGS. 47 and 47A provide another clamping mechanism 4700 for selectively engaging and disengaging the truck pneumatic source/line 4710 from a conventional trailer glad hand 4720. This embodiment employs a spring-loaded clamp body 4730 with a pair of pivoting clamp members 4732, 4734. The clamp members 4732, 4734 are spring-loaded to remain in a normally closed orientation under a predetermined clamping pressure. When normally closed (FIG. 47A), the opposing clamp pads 4742, 4744 on each member 4732, 4734 compress against opposing sides of the trailer glad hand 4720. In this orientation, the upper clamp pad 4732 includes an annular passage that seals against and allows air passage into the trailer glad hand seal 4650 in a manner similar to the clamp 4600 of FIGS. 46 and 46A, described above. The fine manipulator end effector can be used to deliver the clamping mechanism into alignment with the trailer glad hand using servoing techniques and sensor feedback as described above.

As shown in FIG. 47, the clamp members 4732 and 4734 each include a respective outer interface surface 4762, 4764, which can include a textured finish and/or friction-generating material. The end effector 4770 of the fine manipulator can grasp the interface surfaces and force the clamp open as shown in FIG. 47. The clamp can be moved into and out of alignment with the trailer glad hand 4720 in this orientation. The end effector releases pressure on the clamp members 4732, 4734 causing the internal spring (e.g. a conventional torsion wrap spring) to pivot the clamp members closed into sealed engagement with the trailer glad hand 4720. The spring-loaded clamp is opened using the fine manipulator system and positioned facing the center hole in the glad hand. This spring-loaded clamp 4700 automatically engages with the trailer glad hand when released in proper alignment therebetween.

Figure 48:
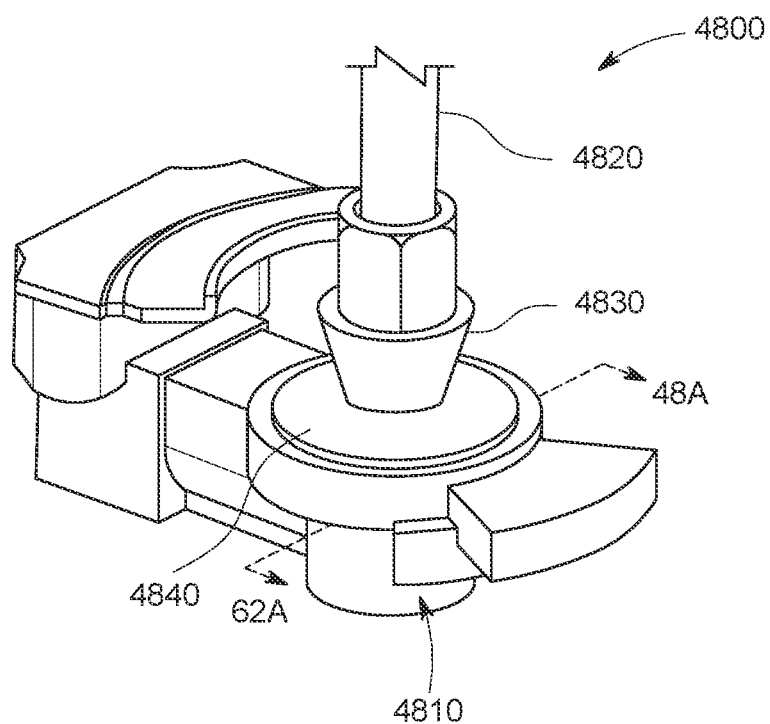
FIG. 48 is a fragmentary perspective view of a truck-based glad hand connection employing a press-fit connection action, shown in an engaged/connected orientation with respect to a trailer glad hand.
Figure 48A:
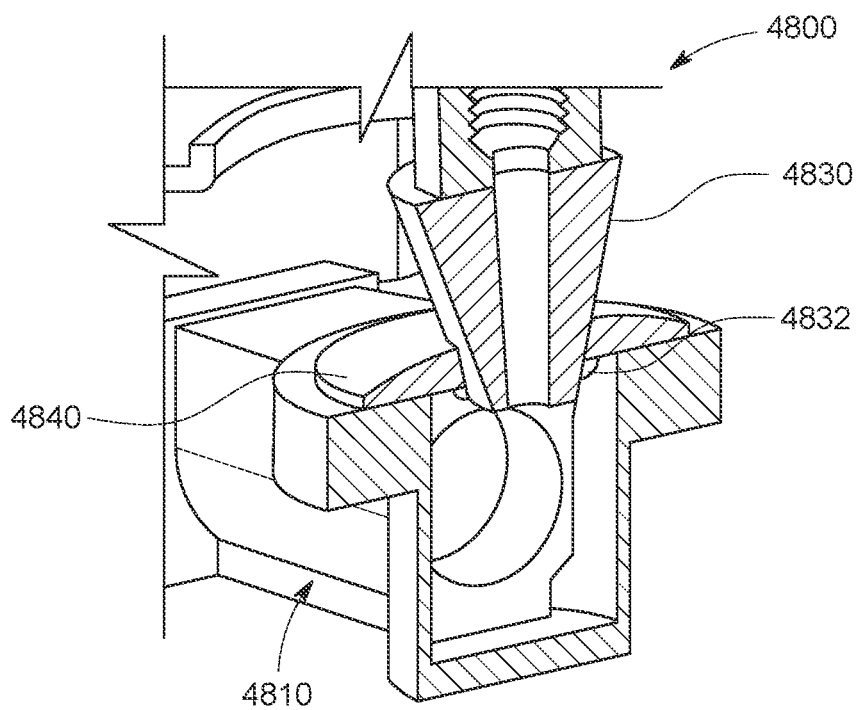
FIG. 48A is a cross section taken along line 48A-48A of FIG. 48.

FIGS. 48 and 48A show another embodiment of an arrangement 4800 for sealing the truck pneumatic source/line 4820 with respect to a conventional trailer glad hand 4810. This embodiment employs a cone shaped plug 4830 that is pressed into the annular seal 4840 of the trailer glad hand 4810 to provide a proper seal. The plug can define an optional step 4832 that passes through and acts as a holding barb with respect to the glad hand seal hole, so as to provide extra holding strength. As another option (not shown) an external clamp can be used to grip the back of the trailer glad hand and provide positive pressure to seal. The plug is aligned and pressed into place by an appropriately shaped end effector on the fine manipulator. The plug can include a bracket interface (not shown) that allows the end effector to apply and remove the cone.

Figure 49:
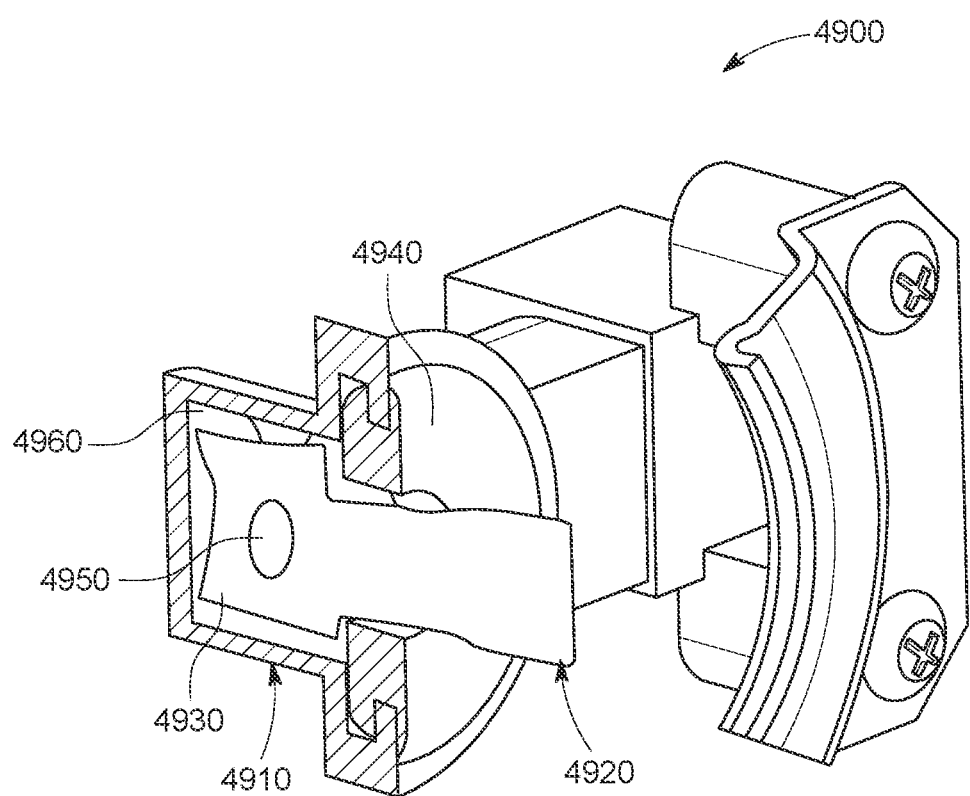
FIG. 49 is a cross-sectional perspective view of a truck-based glad hand connection employing a an inflatable, plug-like connection, shown in an engaged/connected orientation with respect to a trailer glad hand, whereby the manipulator accesses the interconnector via an appropriate truck based connection and end effector.

FIG. 49 shows yet another embodiment of an arrangement 4900 for a connection between a conventional trailer glad hand 4910 and a truck pneumatic source/line 4920, the pneumatic line includes an inflatable probe/plug 4930 that passes into the hole of the glad hand annular seal 4940. The plug is sealed around an internal line that exits in an outlet 4950. The uninflated plug geometry allows it to pass freely into and out of the glad hand seal hole. However, when inflated in response to an engagement command (after inserted) the interior of the plug expands, as shown, to seal against the edges of the annular seal 4940. Upon proper inflation of the plug into the glad hand pocket 4960, positive pressure can be supplied to the system via the port 4950. The plug can be constructed from a durable elastomeric material (e.g. natural or synthetic rubber) that expands upon application of inflation pressure. Appropriate adapters and/or brackets can be employed to allow the end effector of the fine manipulation system to carry, insert and extract the plug with respect to the glad hand annular seal.

Figure 50:
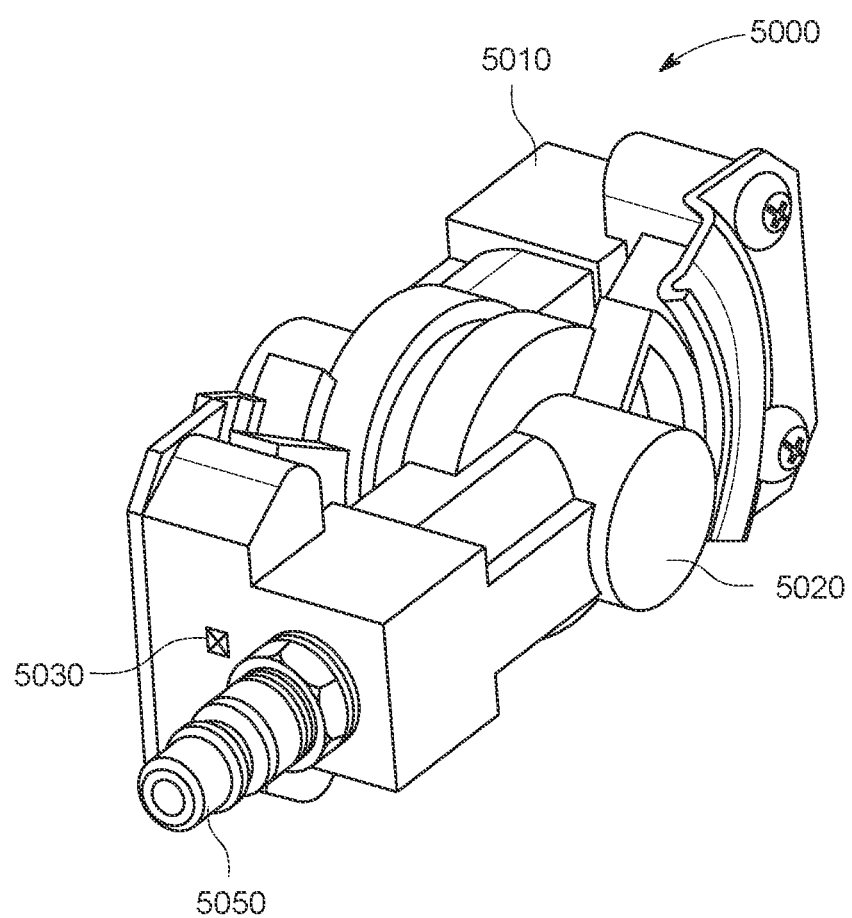
FIG. 50 is a perspective view of a truck-based glad hand connection employing an industrial interchange connector thereon for semi-permanent attachment of the truck-based glad hand (using conventional, rotational attachment techniques) to a trailer glad hand.

FIG. 50 shows another connection arrangement 5000 in which the trailer glad hand 5010 is provided with a semi-permanently attached truck glad hand 5020 according to a conventional rotary clamping motion. The truck glad hand connector 5020 now includes industrial interchange pneumatic connector (a quick-disconnect) 5050. The truck glad hand adaptor 5020 can include one or more fiducial(s) 5030 (e.g. ID codes with embedded information) for easier recognition by the gross and/or fine manipulation sensing system/camera(s). The interchange connection adaptor 5050 can be arranged to thread into the truck glad hand 5020, and thereby allows for the connection of a corresponding industrial interchange connector mounted on the end of the truck pneumatic line (not shown), and which is carried into engagement by the fine manipulator end effector. The fiducial can also be carried on a bracket in a manner similar to that described above with reference to FIG. 38. The fiducial can, more particularly, define ArUco marker images that provide pose estimation using a camera. The fiducial can also be part of an arrangement of reflective points: defining a reflective or high contrast coating to allow vision by a sensor camera.

Figure 51:
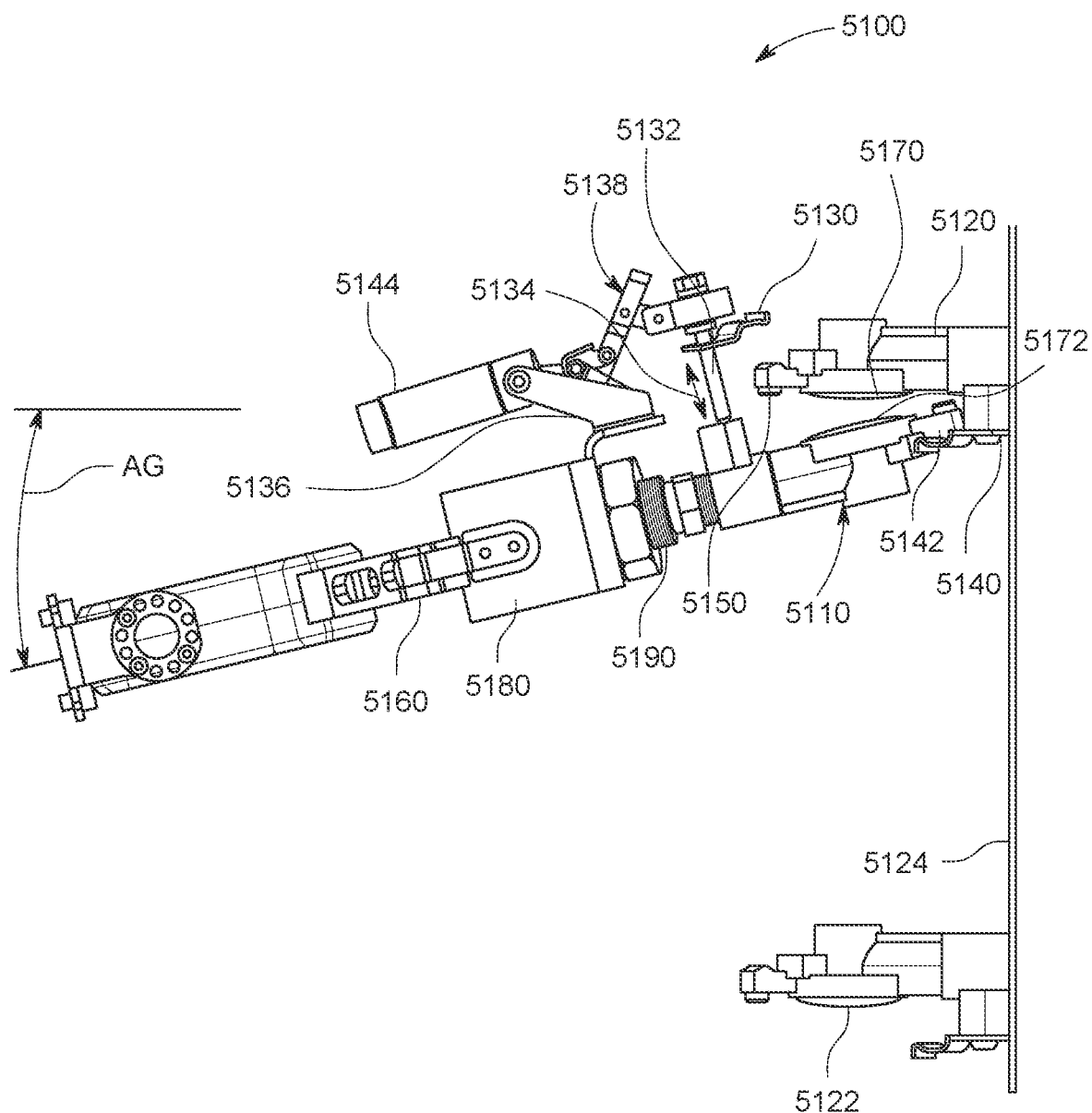
FIG. 51 is a fragmentary side view of a truck-based glad hand connection employing a clamping action with a linear actuator integrated with the truck connector, shown in an open orientation with respect to a trailer glad hand.
Figure 52:
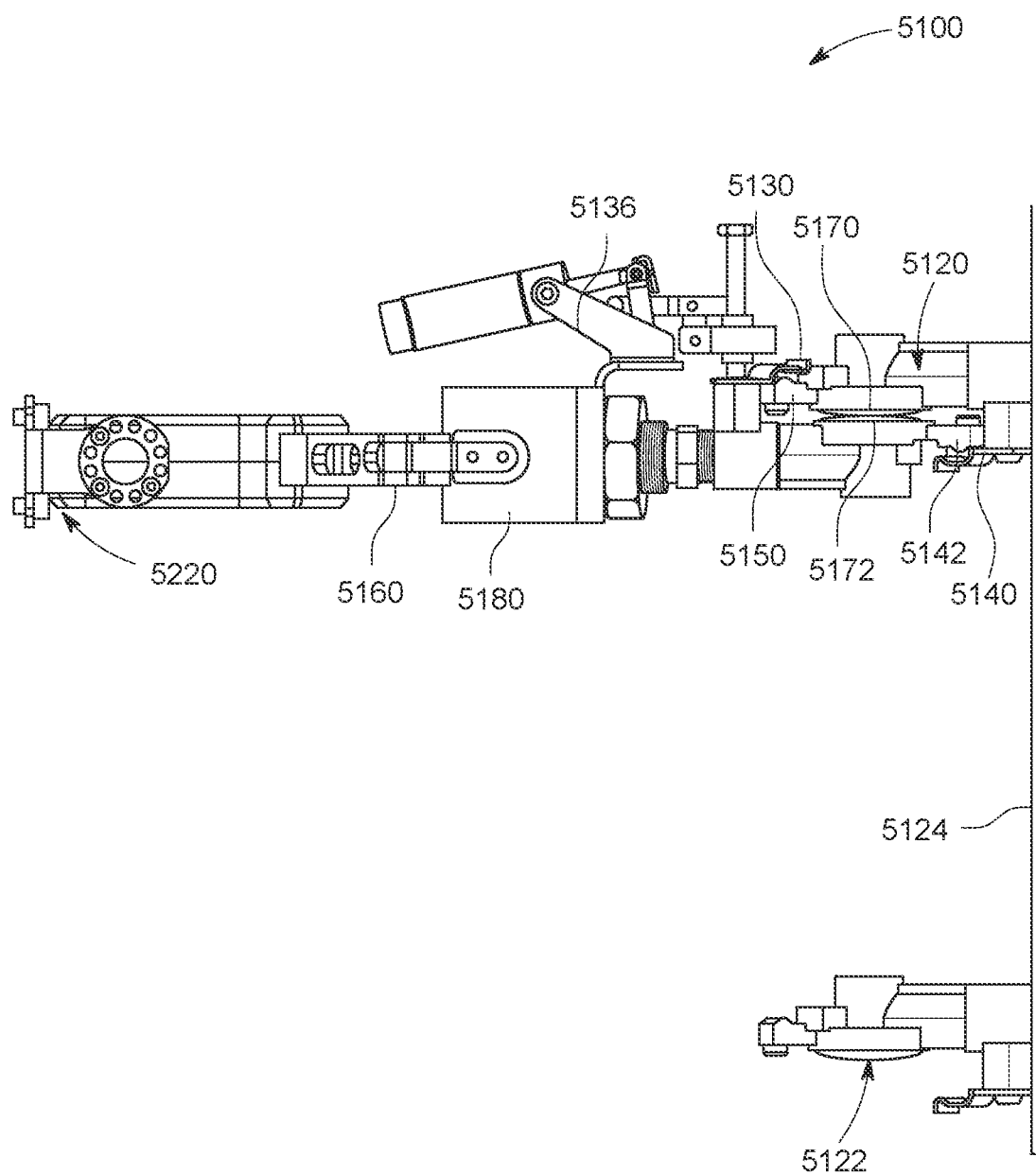
FIG. 52 is a fragmentary side view of the truck-based glad hand connection of FIG. 51, shown in a closed/engaged orientation with respect to the trailer glad hand

FIGS. 51 and 52 show another arrangement 5100 for attaching a truck-based glad hand connector 5110 to a trailer glad hand 5120, shown mounted in tandem with a second glad hand 5122 on the trailer front face 5124. The glad hand connector 5110 is a modification of a conventional glad hand unit. The glad hand 5110 includes a sliding sheet metal retainer 5130, that rides (double arrow 5134) on a rail 5132, under the driving force of an actuator assembly 5136. The actuator assembly can be operated by the sensor system when the glad hand 5110 is aligned with the trailer glad hand as shown in FIG. 51. In this orientation, the trailer glad hand's sheet metal retainer 5140 engages the truck glad hand's flange 5142. The actuator 5132 selectively engages and disengages the sheet metal retainer 5130 of the modified truck glad hand 6510 with the retainer 5130 of the aligned trailer glad hand 5120. In engaging the retainer 5130, the end effector 5160 rotates (curved arrow 5220) the glad hand 5110 into a parallel relationship with the trailer glad hand 5120, so that their respective seals 5170 and 5172 are engaged and mated (See FIG. 52). Hence, in operation, the end effector 5160 approaches the trailer glad hand 5120 at a non-parallel angle AG that allows the flange 5142 to slip under the fixed trailer glad hand retainer 5140 while the seals 5170 and 5172 are remote from each other (as shown in FIG. 51). The end effector then rotates the glad hand 5110 into a parallel relationship with the trailer glad hand 5120. During this step, the actuator 5136 slides the retainer 5130 into contact with the trailer glad hand flange 5150 to compressibly join the two seals 5170, 5172 together (as shown in FIG. 52). The end effector 5160 can release the attached glad hand 5110 at its grasping base 5180 and return to a neutral position on the truck chassis thereafter. Disconnection and removal of the glad hand 5110 from the trailer glad hand 5120 is the reverse of attachment—that is, the end effector 5160 is served to, and engages the glad hand grasping base 5180; the actuator 5136 releases the retainer 5130 and the end effector 5160 rotates the glad hand 5110 to generate the angle AG with respect to the trailer glad hand 5120; and then the glad hand 5110 is moved away from the trailer glad hand 5120 to a neutral location, awaiting the next connection cycle. This arrangement 5100 allows for relatively straightforward attachment and removal of the glad hand using a robot manipulator. It avoids (is free of) the complicated motions required in conventional glad hand interengagement—which requires rotation about the seal centroidal axis. Note that the glad hand grasping base can also act as an adaptor so as to allow pressurized air to pass through. The actuator assembly 5136 can include the depicted pivoting joints 5138 and linear actuator 5144. The actuator can employ electrical, hydraulic or pneumatic motive force. An appropriate line connection (not shown) to the actuator, so as to provide power, can be provided and can run in parallel to the truck pneumatic line (also not shown, but attached generally to the grasping base 5180 to deliver pressurized air to the glad hand pressure connection 5190).

Figure 53:
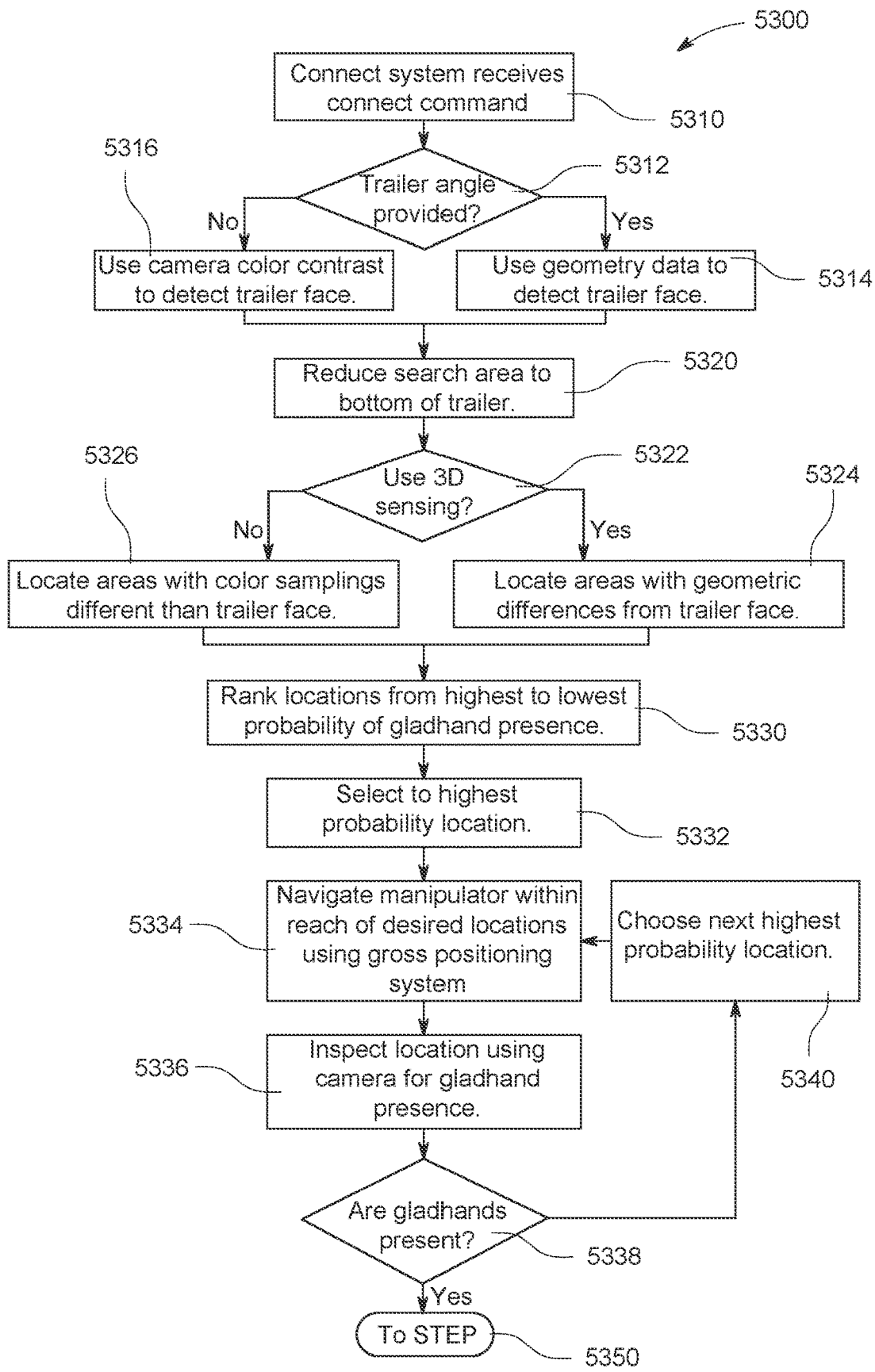
FIGS. 53 and 53A show a flow diagram of a procedure for performing a glad hand (or similar) connection between an autonomous truck and a trailer using a gross and fine sensing and manipulation system according to the various embodiments herein.
Figure 53A:
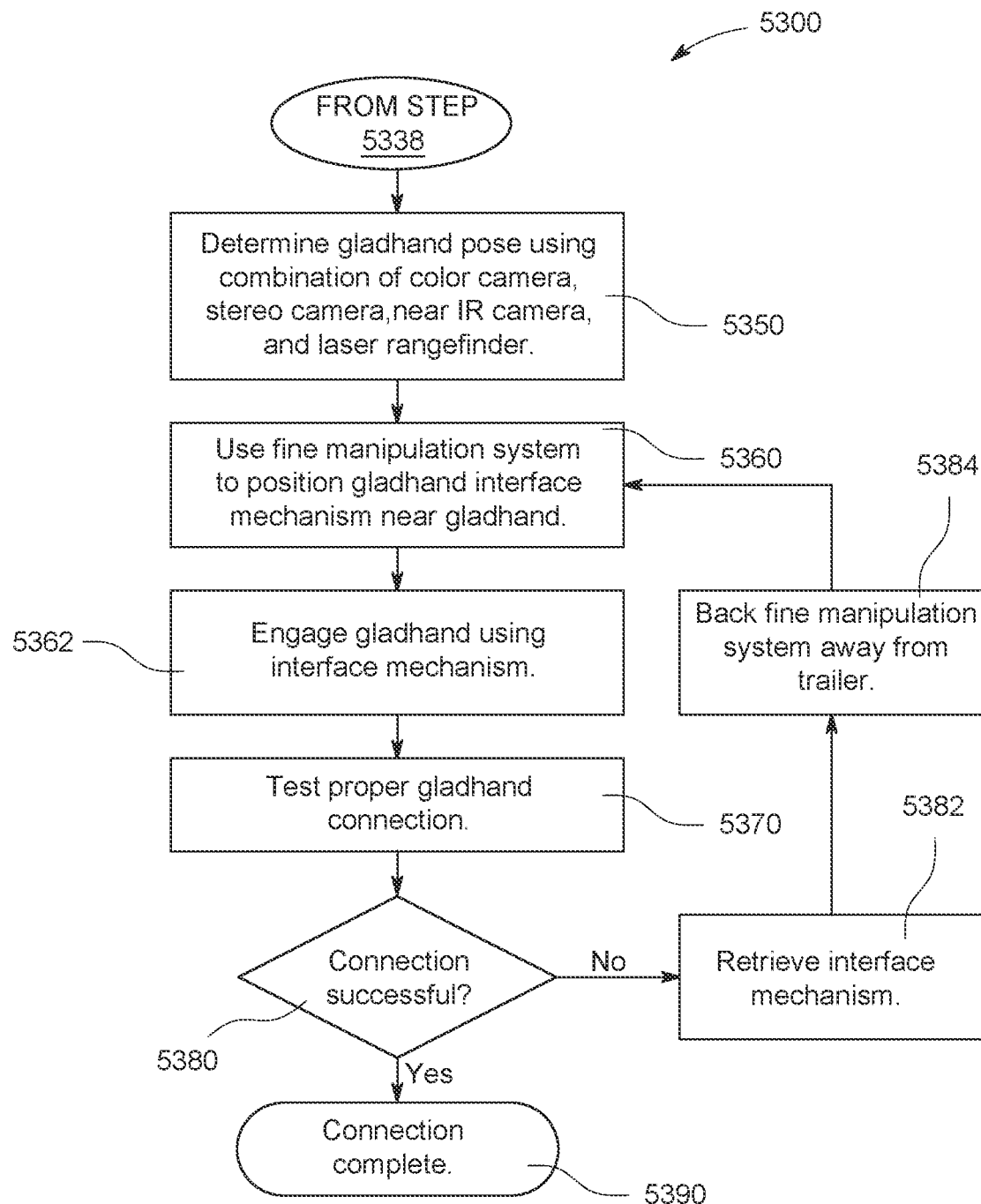

FIGS. 53 and 53A show the general procedure 5300 for operation of the gross and fine localization and manipulation for attaching truck pneumatic (or electrical) connection to the trailer glad hand using one of the connection implementations described above. The procedure 5300 begins by finding the trailer face after the system receives a connect command (step 5310). The procedure 5300 determines whether the trailer pivot/hitch angle, with respect to the truck chassis is available (decision step 5312). If the angle is available, the geometry data is provided to detect the trailer face in acquired images from the gross detection sensor (step 5314). Conversely, if the angle data is not available, then the gross sensor assembly can use (e.g.) color contrast in acquired images of the trailer front face to detect its location and dimensions (step 5316). Once determining the trailer location and dimensions, the procedure 5300 reduces the search area to the bottom region of the trailer where glad hands/glad hand panel are likely located (step 5320).

Next, the procedure 5300 attempts to locate the glad hand panel in the reduced search region, which may or may not entail 3D sensing (decision step 5322). If 3D sensing is used by the gross sensing system, then the system locates areas with geometric differences from the trailer face, and stores image features therefrom, in step S324. If 3D sensing is not employed, the procedure 5300 can attempt to locate the glad hand panel by identifying and storing color features on the trailer face image(s) that differ from surroundings (step 5326). Based on feature information identified via step 5324 or step 5326, or (optionally) both, the procedure 5300 then ranks locations on the trailer face from highest to lowest probability of glad hand/panel presence (step 5330). This ranking can be based on a variety of factors including the prevalence of glad hand/panel candidate features, a strong pattern match of specific colors or shapes, or other metrics. Trained pattern recognition software can be employed according to skill in the art. In step 5332, the location with the highest rank is selected as the target for gross position movement of the manipulator and the end effector carrying the truck connection.

This location data is then used to guide the manipulator and end effector using the gross positioning system in step 5334. The end effector is brought into proximity with/ adjacent to the candidate location whereby a fine sensor (e.g. camera, 3D scanner, etc.) assembly carried on the end effector and/or the manipulator can inspect the location for glad hand features (step 5336). If the fine sensing system verifies that glad hand features are present at the location, then the procedure uses that location for the fine manipulation process (decision step 5338). Conversely, if no identifiable glad hand features or patterns are recognized by the vision system associated with the fine sensing, then the next highest rank feature set is chosen, and (if needed) the manipulator is moved again in step 5334 to inspect the next location (step 5336). This process repeats until the glad hand is located or no glad hand is found (at which point the procedure reports an error or takes other action). Once a glad hand location is confirmed, then (via decision step 5338) the procedure 5300 estimates the glad hand pose from images acquired with the fine sensing system. This can include image data derived from any combination of color, stereo near IR or laser range finding, among other modalities (step 5350). The fine manipulator is moved toward the identified coordinates of the trailer glad hand and in an orientation that matches its 3D pose. Note that the carried truck-based connector has a known pose that is correlated with the determined pose of the trailer glad hand so that they can be engaged. Visual/sensor-based feedback can be used to servo the manipulator as it approaches the trailer glad hand (step 5360). The trailer glad hand is eventually engaged in the appropriate orientation by the end effector and carried connector in step S362. Once engaged, the connection can be secured using appropriate motions and/or actuations of the truck-based connector in accordance to any of the embodiments described above or other appropriate connection mechanisms—including, where the manipulator has been adapted, via the conventional rotational connection of a conventional truck glad hand. The connection is tested for security and success (decision step 5380). Such tests can include visual tests and/or whether the pneumatic system holds its pressure. If successful, the procedure 5300 signals success and the manipulator can disengage the truck-based connector and return to a neutral position (step 5390). If the connection test is unsuccessful (decision step 5380), then the procedure can instruct the manipulator to engage and/or retrieve the truck-based connector (step 5382). The fine manipulator is then backed away from the trailer front face (step 5384) to a sufficient location and fine manipulation steps 5360, 5362, 5370 and 5380 are repeated until the connection tests successfully. If the test is unsuccessful after a given number of attempts, then the procedure stops and sends an alert to personnel, and/or takes other appropriate action.

H. Autonomous-Only Glad Hand Adapters and Connecting Tools

Where the connection between the truck and the trailer is arranged to be implemented in a manner generally free of human intervention (i.e. autonomous-only operation), the lad hand assembly can be provided in a form more suited to automated handling—for example via a robotic manipulator. The following are glad hand arrangements for autonomous-only operation.

1. Rigid Adapter

Figure 54:
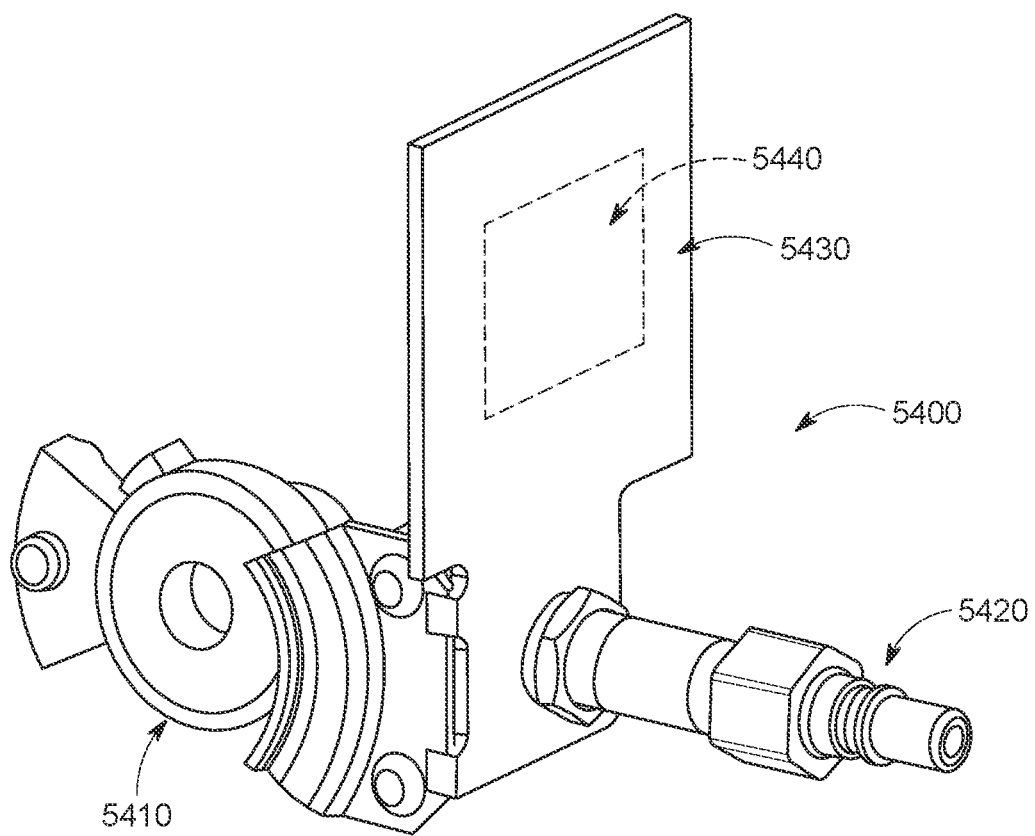
FIG. 54 is a perspective view of a direct-connection glad hand adapter for use in exclusive autonomous operation.

FIG. 54 shows an illustrative variation of the glad hand adapter 5400 that is suitable for exclusively autonomous connections. This adapter 5400 includes a conventional glad hand connection 5410 that is initially attached to the trailer glad hand (e.g. at the yard gatehouse), so that the adapter 5400 is semi-permanently attached to the trailer during yard operations. Hence, the adapter 5400 converts the standard trailer-mounted glad hand into an alternate connection mechanism for attachment of the truck airline. In this exemplary embodiment, the alternate connection is the male end 5420 of a quick-disconnect system, in which the removable (e.g. commercially available), male nipple end is provided with respect to the truck in various ways described above. The adapter is mounted so that the connector is directed outwardly, and is accessible to engagement using a robotic manipulator, probe or other truck-mounted device, which carries the truck's airline connector. Connection (e.g.) using a manipulator is facilitated by a frame-mounted panel 5430 and associated fiducial 5440 (shown in phantom) for visual recognition by an autonomous system using conventional and/or custom machine vision technique s implemented by the truck processor or a remote system server.

2. Flexible Adapter

Figure 55:
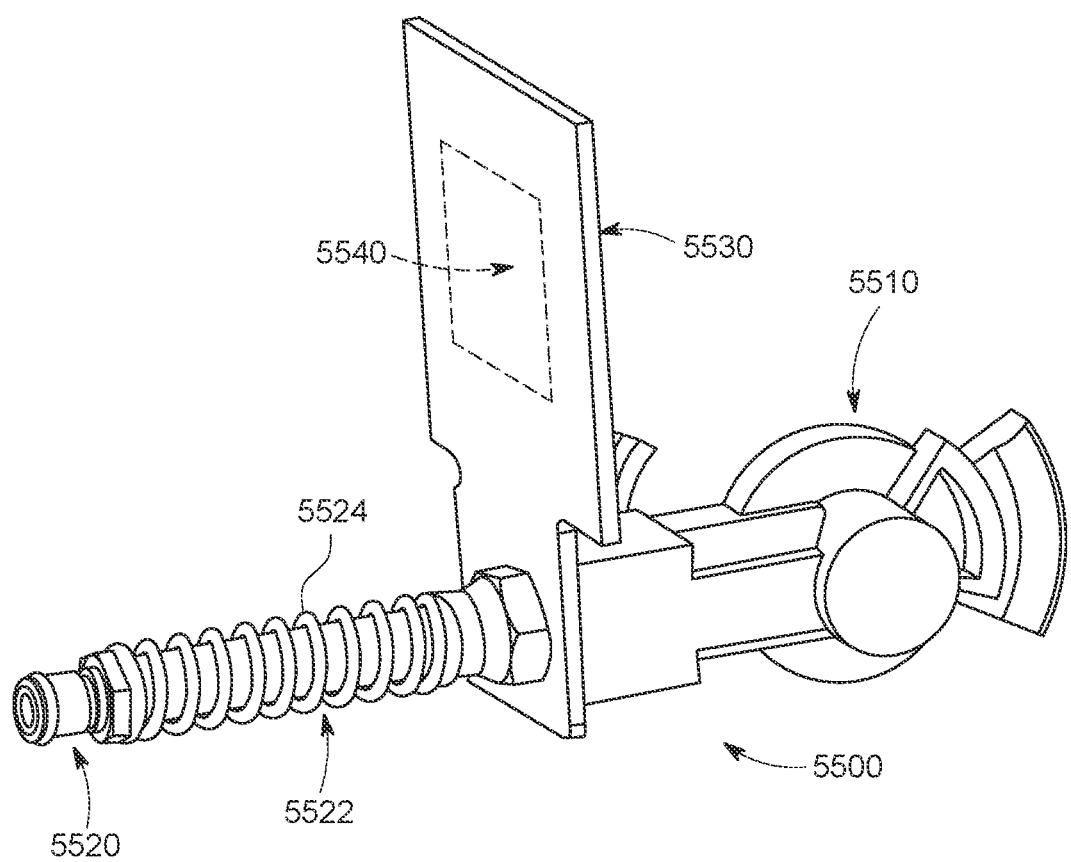
FIG. 55 is a perspective view of a direct-connection glad hand adapter for use in exclusive autonomous operation, having a flexible connector according to another embodiment.

Another exemplary embodiment of a glad hand adapter 5500, functionally similar to the adapter 5400 described in FIG. 54 is shown in FIG. 55. A conventional glad hand connection 5510 is provided. A male, quick-disconnect nipple 5520 is provided at the end of a flexible stem tube 5522 that can be reinforced with a wrapped spring 5524 in an embodiment. This tube 5522 allows the adapter 5500 to comply when making a connection with a handling tool (described below), helping to avoid possible breakage. This embodiment includes a panel 5530 with fiducial 5540 (in phantom) as described above.

3. Solenoid Release Tool

Figure 56:
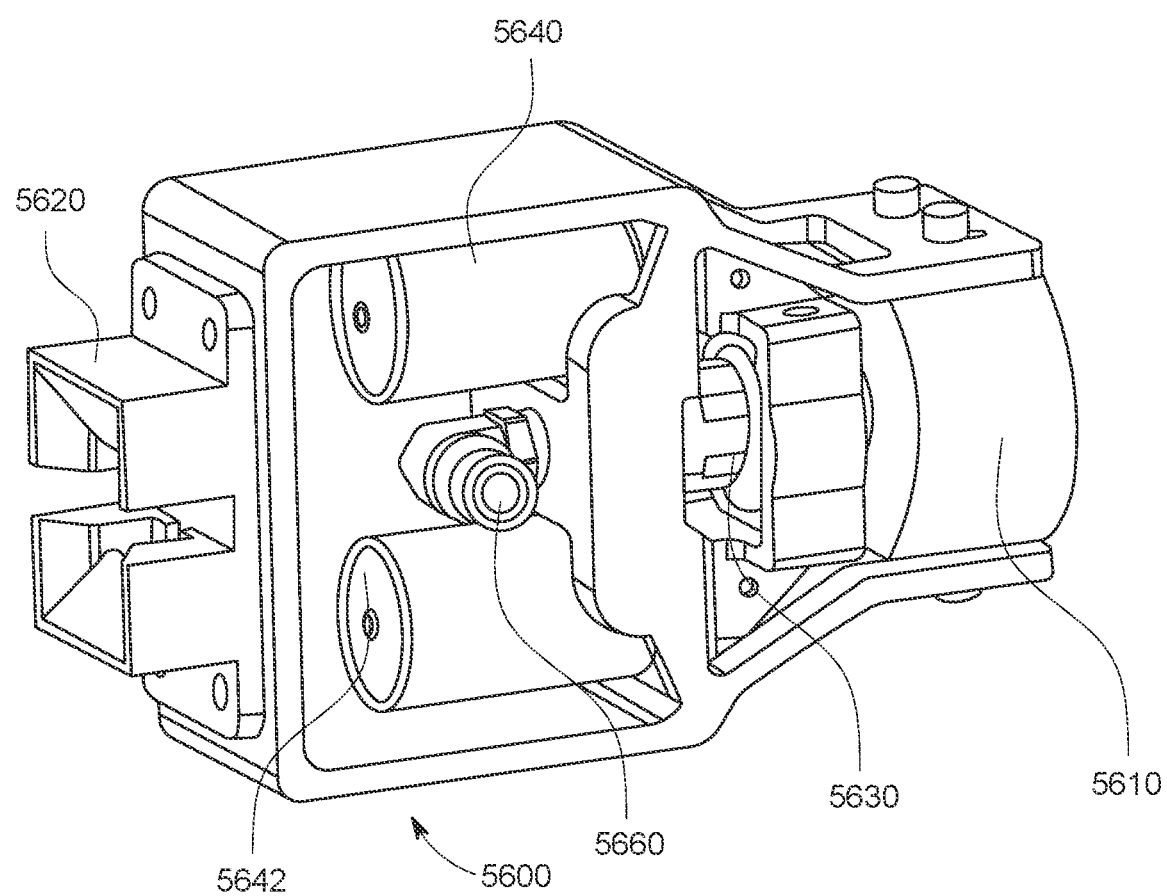
FIG. 56 is a perspective view tool for engaging and providing pressurized air to the direct-connection glad hand adapter of FIG. 54 or 55, that employs selectively powered solenoids to release, according to an embodiment.
Figure 57:
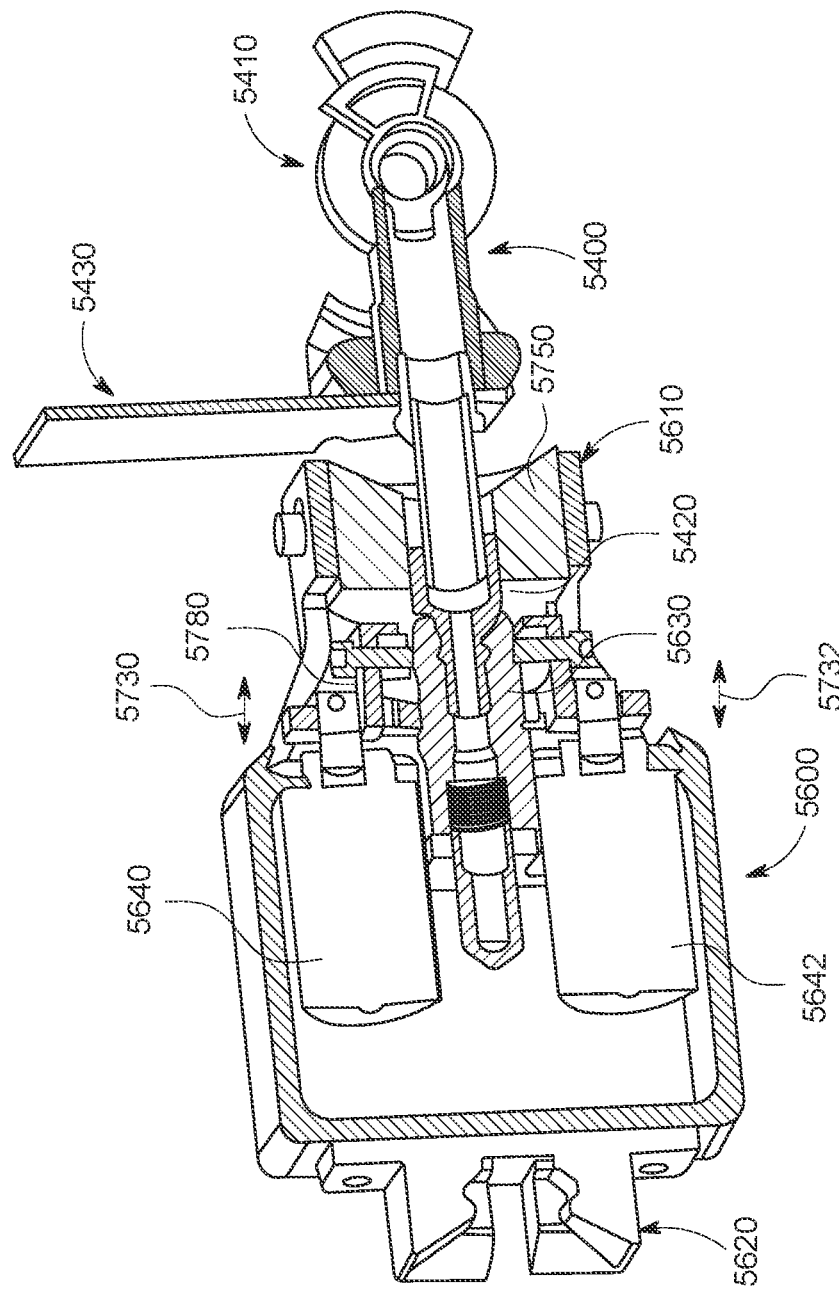
FIG. 57 is a side cross-section of the tool of FIG. 56 shown interconnected with the adapter of FIG. 54.

A tool 5600 that is adapted for connection with an autonomous-only adapter (e.g. 5400 and 5500 above) is shown in FIGS. 56 and 57. This tool 5600 is capable of delivering air and power from a truck to a trailer. It contains a mechanical locking mechanism (locking cone 5610) to maintain engagement of the tool with the adapter (5400 in FIG. 57). The tool 5600 further includes a gripper interface 5620 for retrieval by a robotic arm (described above). This interface 5620 can contain fiducials (not shown) for finding the tool 5600 (using a vision system) after it has been left on a trailer, secured to the adapter. The tool's air connection mechanism 5630 can include a female quick-disconnect-style fitting adapted to engage the male nipple 5420 of the adapter 5400 in a manner described herein and known to those of skill. The mechanism 5630 contains a mechanical locking collar 5720 that is actuated by (e.g.) two electromagnetic solenoid cylinders 5640, 5642 that displace the collar 5720 linearly (double-arrows 5730 and 5732, respectively). The solenoid assembly 5540, 5642 can be activated when the tool 5600 is to be retrieved off of the glad hand adapter 5400. The front of the tool 5600 contains a frusto-conical location structure 5750 to ensure proper alignment with the adapter nipple 5420 for engagement. The solenoid assembly 5640, 5642 can be actuated using a switched power source wired directly from the truck with contacts built into the gripper and the base 5620. When the gripper is engaged it allows the solenoids to be selectively energized by operation of the connection system. The tool 5600 includes an air outlet/fitting 5660 that is permanently connected to the treaded end of a truck-based airline.

4. Pull-to-Release Tool

Figure 58:
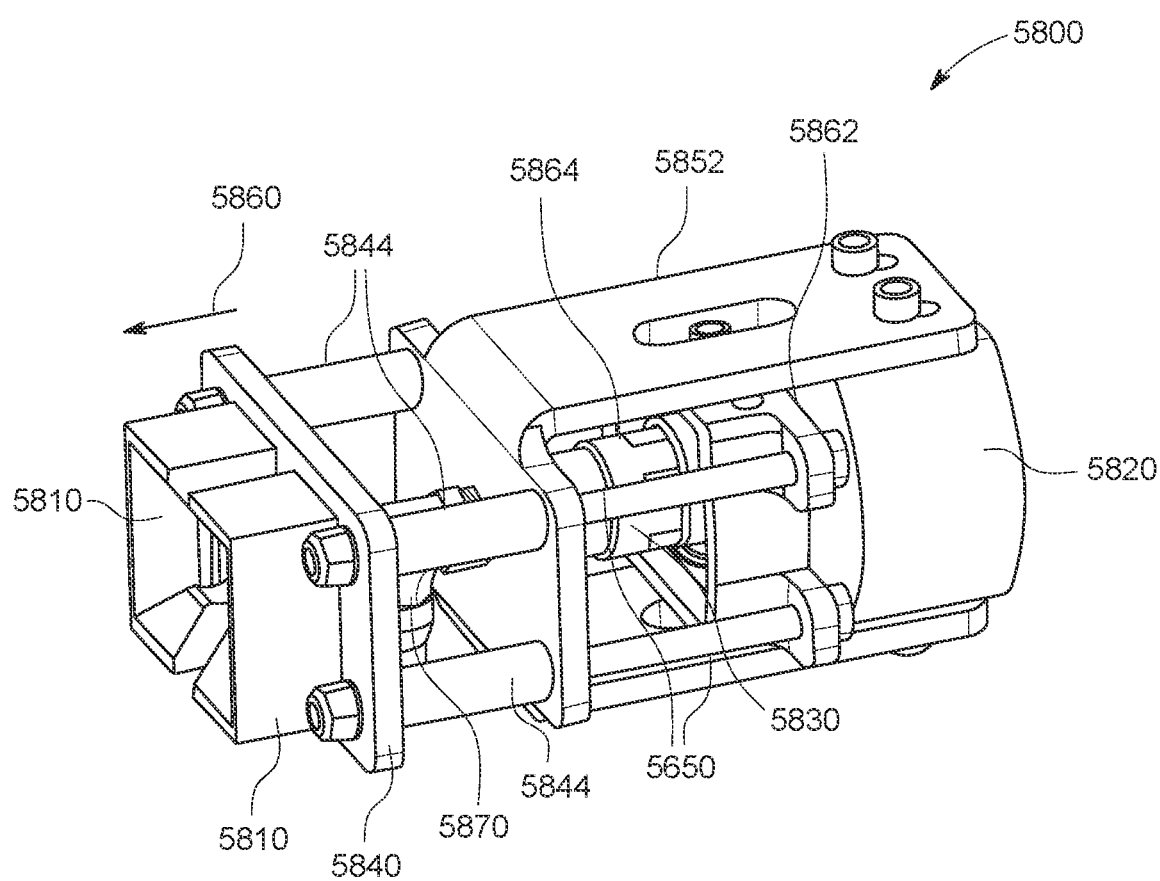
FIG. 58 is a is a perspective view tool for engaging and providing pressurized air to the direct-connection glad hand adapter of FIG. 54 or 55, that employs a pull-motion to release, according to an embodiment.

Another exemplary embodiment of the tool 5600 is shown in FIG. 58. This tool 5800 uses a gripper connection 5810 at a rear of the framework and an aligning locating cone 5820 at the opposing end for engaging a nipple, as described above. A similar female quick-disconnect assembly 5830 to that of the tool 5600 is provided. The tool 5800 defines a sliding framework in which a rear plate 5840 and a front plate 5842 are separated spacers 5844 on rods 5850. The front plate 5842 is integral, or unitary, with the front framework 5852 that supports the locating cone 5820 and non-sliding portion of the female quick-disconnect 5830. The rear plate 5840 can slide rearwardly (arrow 5860), drawing back the rods 5850 and a carriage 5862. The carriage is secured to the spring-loaded (normally forward-biased) outer sleeve 5864 of the quick-disconnect. Thus, drawing back the rear plate 5840, draws back the sleeve 5864, relative to the fixed portion of the quick-disconnect, allowing it to be unlocked. In this embodiment, on-board actuators—such as the solenoids 5640, 5642 of the tool 5600—are thus omitted and unlocking of the quick disconnect is performed by drawing back the gripper in the direction of arrow 5860. This avoids the need for an on-board, powered actuation mechanism in this embodiment. The air outlet 5870 (connecting to the truck airline) is located on the longitudinal, central axis of the tool 5800, and is fixed to the frame 5852 in a non-sliding manner.

5. Pull-to-Release Tool with Cylindrical Gripper Interface

Figure 59:
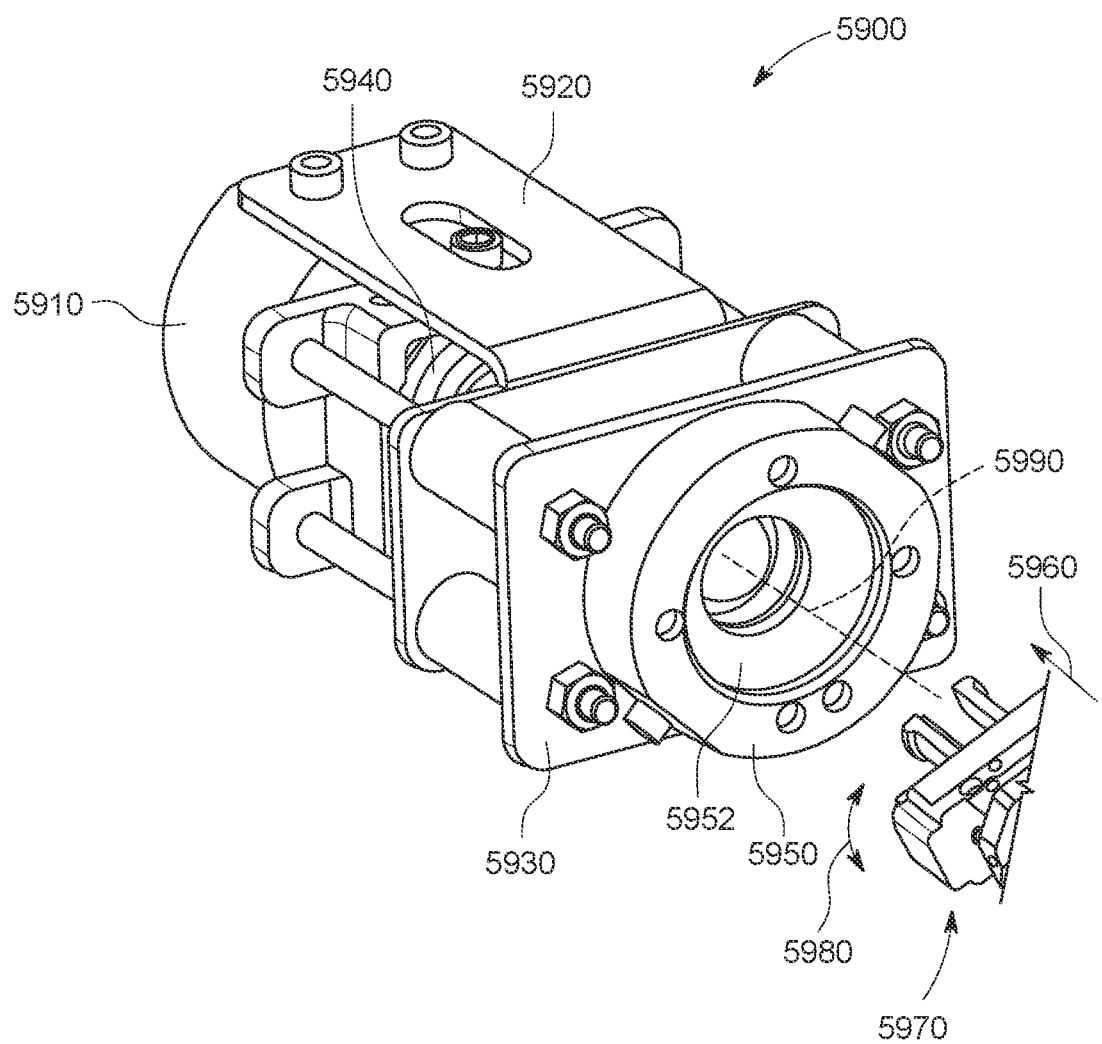
FIG. 59 is a is a perspective view tool for engaging and providing pressurized air to the direct-connection glad hand adapter of FIG. 54 or 55, that employs a pull-motion to release and includes a cylindrical gripper interface, according to an embodiment.

FIG. 59 shows a tool 5900 according to a further exemplary embodiment, which operates on the pull-to-release principle described with reference to FIG. 58. Hence, the locating cone 5910, fixed frame 5920 and sliding rear plate 5930 operate similarly to those of the tool 5800 of FIG. 58 to unlock a central, female quick-disconnect fitting 5940. The gripper base 5950, which is mounted on the rear side of the rear plate 5930 defines an annulus, with a frustoconical guiding funnel 5952. This structure is adapted to receive an inserted (arrow 5960) gripper 5970 at any rotation (double-curved arrow 5980 about the longitudinal central axis (dashed line 5990) of the tool 5900.

I. Autonomous-Favored Glad Hand Adapters and Tools

Figure 60:
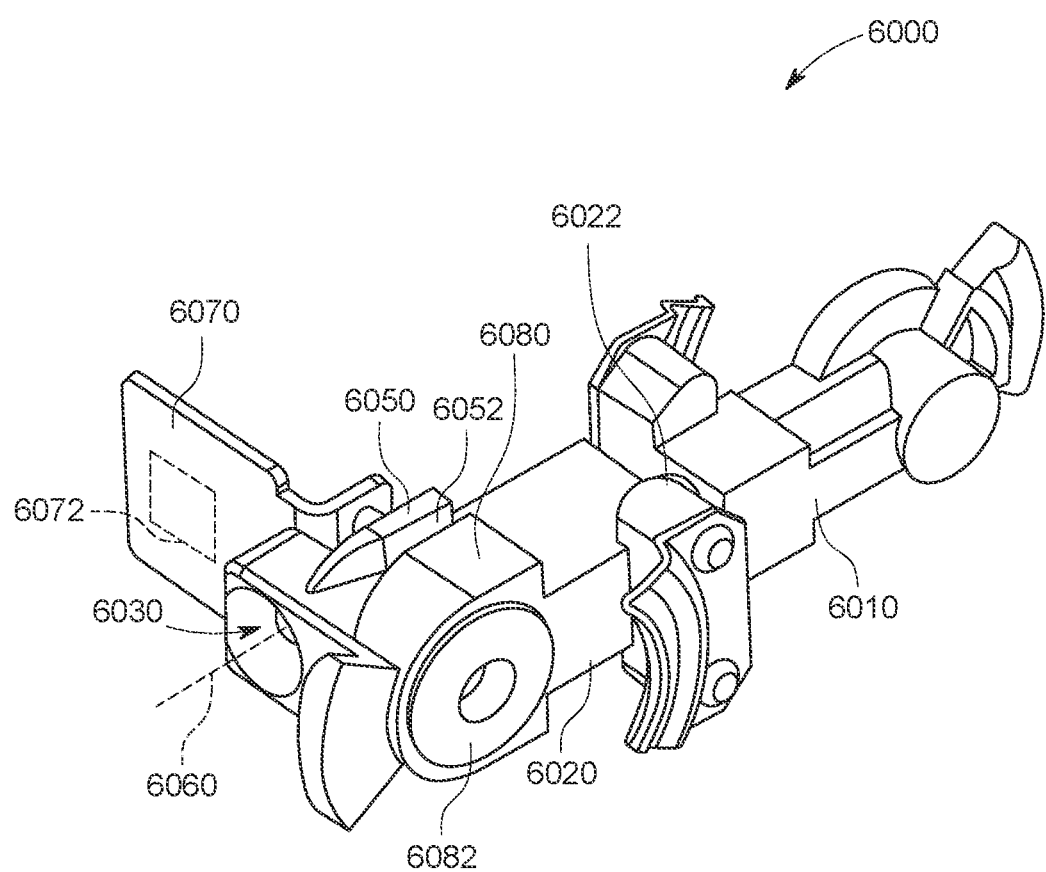
FIG. 60 is a perspective view of an autonomous-operation-favored glad hand adapter that also allows for manual interconnection of a truck-side glad hand connector, according to an embodiment.

FIG. 60 shows an adapter that is used in scenarios where a manual attachment of the glad hand is still contemplated in an autonomous operating environment. The adapter arrangement 6000 is arranged so that the same connection interface as a conventional, manual connection is employed, but fiducials and alignment mechanisms are added to this adapter arrangement 6000 to enable an autonomous connection system to find and connect to the arrangement. As shown, a standard glad hand 6010 on the trailer-side is connected (e.g. using threaded pipe fittings 6022) to an autonomous capable glad hand 6020 on the truck-side. The same interface exists for connection with an over the road truck's glad hand, but a new interface is added to the back of the autonomous glad hand for alignment. The interface contains a gross alignment cone 6030, and two rotation alignment posts/vanes on the top (6050) and bottom (not shown), that define slots (top slot 6052 shown). The gross alignment cone 6030 allows a corresponding gripper-mounted tool (described below—FIG. 61) to assume a proper position, and the posts/slots ensure the tool is rotated (about longitudinal axis 6060) to the correct angle correctly before engagement. A fiducial plate 6070 and associated fiducial 6072 (shown in phantom) is used to assist in locating the glad hand 6020, and servoing of the gripper tool into engagement with the glad hand 6020. The glad hand base 6080 is arranged in the form of a conventional glad hand geometry for use of either a conventional, manual (twist-lock) glad hand connection on the truck airline, or a manipulated connection tool sent by the truck's autonomous system, as described below.

Figure 61:
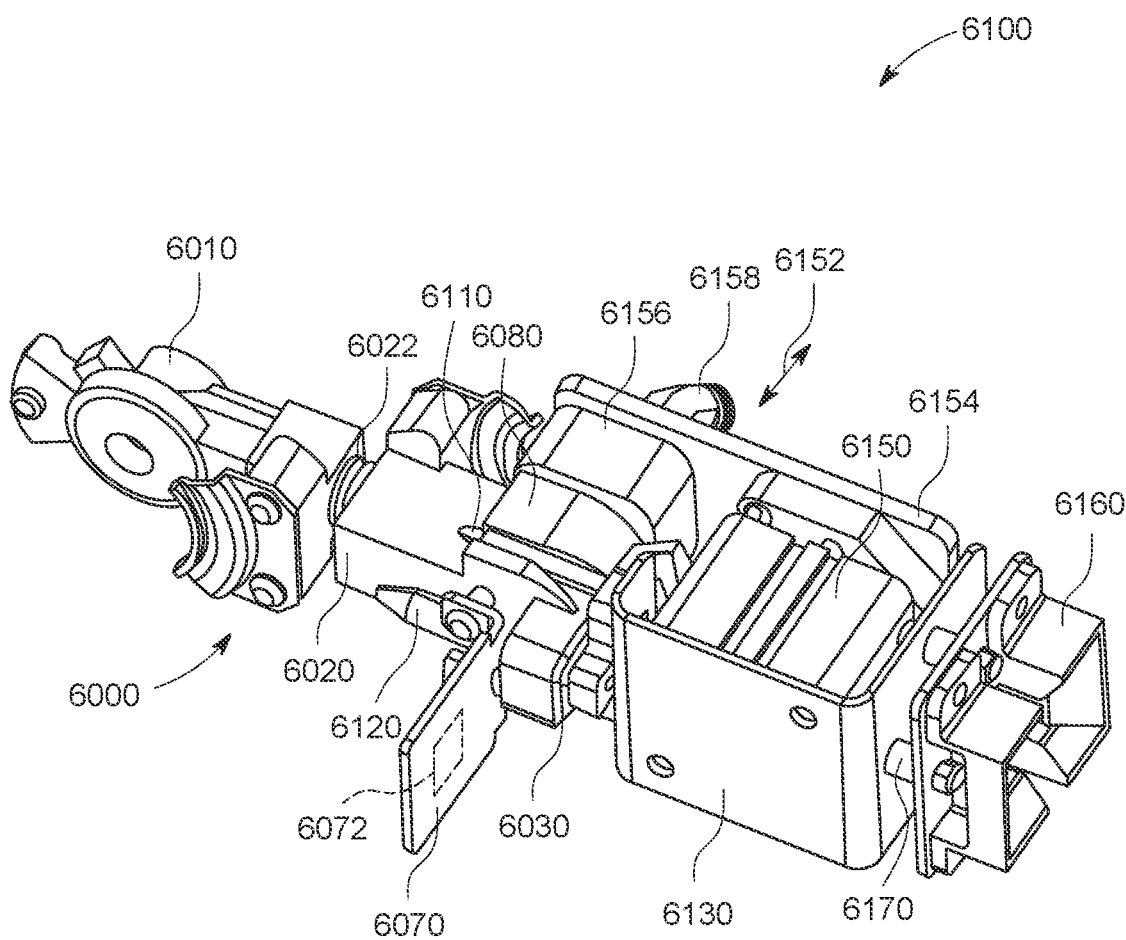
FIG. 61 is a perspective view of the autonomous-operation-favored glad hand adapter of FIG. 60, shown engaged with a gripper manipulated clamping tool, according to an embodiment.

To assist connection of a tool to the glad hand adapter arrangement 6000, a glad hand adapter connection tool, an example of which is shown in FIG. 61, contains top and bottom angle location pins (top pin 6110 shown) and a main locating pin 6120 (shown engaging the alignment cone 6130), all of which ensure proper rotational and angular alignment of the tool 6100 with respect to the adapter arrangement 6000. More particularly, the main location pin 6120 provides an initial location mechanism for the tool 6100 upon approach with the arrangement 6000. The angle adjustment pins 6110 thereafter ensure that the tool 6100 is in the correct orientation before connection. The autonomous manipulator and control system can sense once the pins have bottomed out, and use that sensed impulse to make the clamp connection.

The clamped connection of the tool 6100 with respect to the glad hand base 6080 is facilitated using a pneumatic cylinder 6150, that selectively operates to move (double-arrow) 6152 a baseplate toward and away from the glad hand base 6080 and the tool framework 6130 (that carries the pins 6110, 6120, etc.). The plate 6154 carries a block 6156, with an attached air inlet 6158. The block 6156 seals against the base gasket (6082 in FIG. 64) cylinder is moved into a clamped position. This also ensures that the overall arrangement remains secured together during truck operation. The air inlet 6158 is connected to the truck airline. Note that the use of a pneumatic cylinder 6150 to actuate clamping and connection of the tool is by way of example. Other equivalent actuators, such as electric solenoids, spring-loaded systems, etc., can also be employed. A gripper interface/base 6160 is provided on the rear of the framework 6130. An appropriate gripper and manipulation system, as described generally herein, can be employed to attach and remove the tool 6100 from the arrangement. Elastomeric (e.g. rubber, urethane, etc.) dampers 6170 can be used to mount the gripper interface/base 6160 to the framework 6130 to provide compliance as the tool 6100 is handled by the manipulator.

Figure 62:
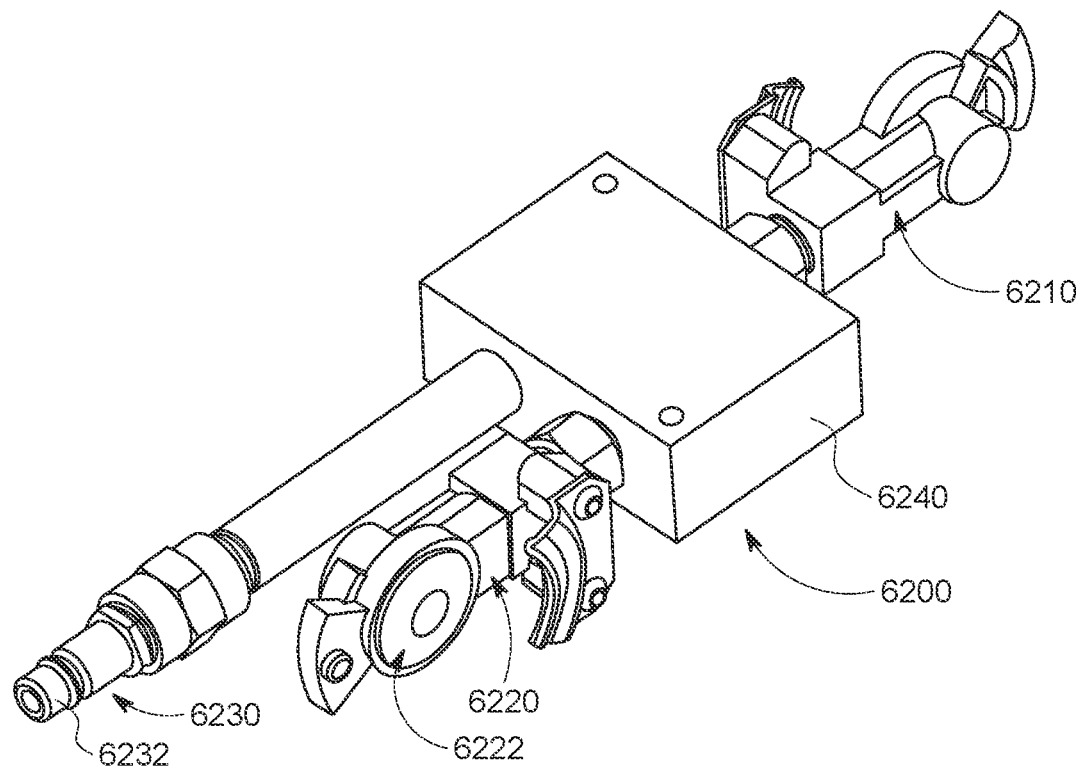
FIG. 62 is a perspective view of an autonomous-operation-favored glad hand adapter that also allows for manual interconnection of a truck-side glad hand connector using a shuttle valve and dual-port, truck side connectors, according to an embodiment.

FIG. 62 shows a dual-fitting shuttle valve glad hand adapter arrangement 6200 according to an exemplary embodiment, for autonomous-favored operations. The trailer side of the arrangement 6200 includes a conventional glad hand connector 6210 meant to be mounted semi-permanently to the trailer airline. The opposing side of the arrangement 6200 includes two parallel ports 6220 and 6230. One port 6220 contains a standard glad hand connector base 6222 for interfacing with an over the road truck airline that is manually attached and removed. The second port 6230 can contain any of the autonomous adapters/tools described above—in this example, a male nipple 6232 for an actuated quick-disconnect system, such as shown and described in FIGS. 54 and 55.

In the arrangement 6200, a shuttle valve 6240 interconnects the trailer-side glad hand 6210, the truck-interfacing glad hand 6220 and the autonomous port 6230, and operates (in a conventional manner) to allow for connection from either the autonomous adapter or a standard glad hand connector. The shuttle valve 6240 routes pressurized air from the connected side through to the trailer airline in a manner free of leaks or pressure loss. The shuttle valve 6240 is also adapted to be open to the environment when disconnected, thereby allowing the air in the trailer airlines to purge.

Figure 63:
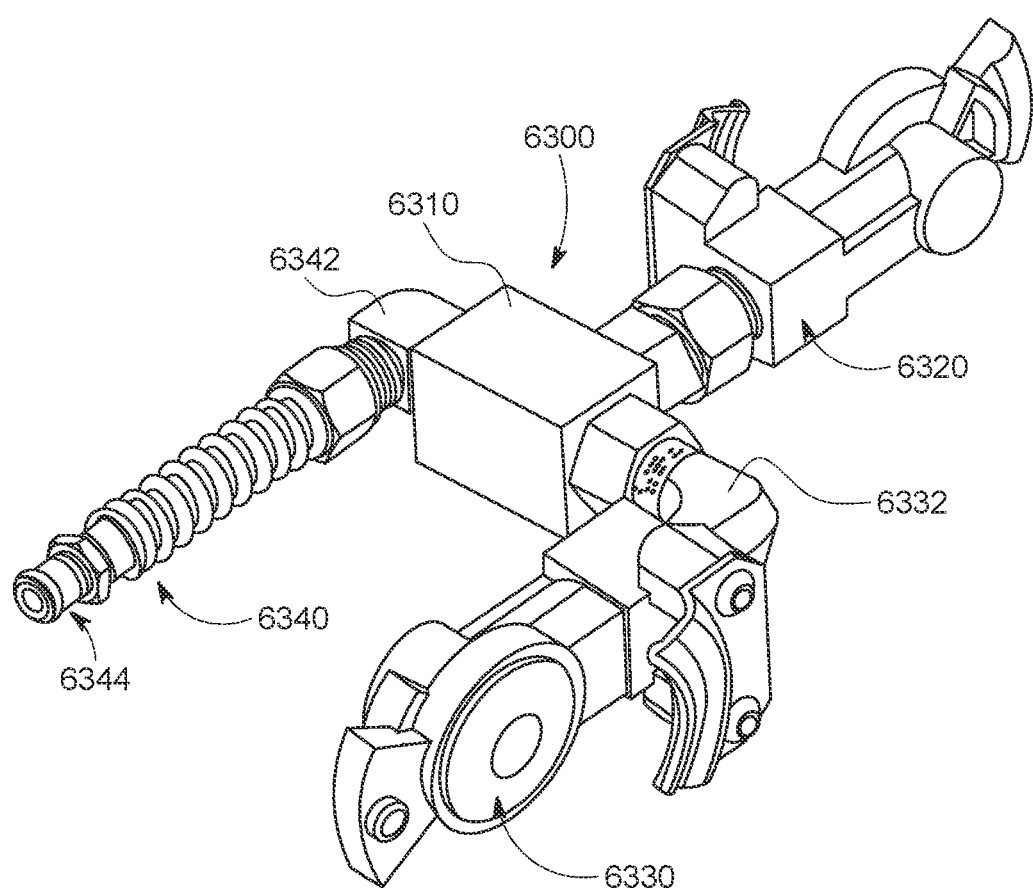
FIG. 63 is a perspective view of an autonomous-operation-favored glad hand adapter that also allows for manual interconnection of a truck-side glad hand connector, using a shuttle valve and 90-degree-attached dual-port-truck side connectors according to an embodiment.

FIG. 63 shows another exemplary embodiment of a dual-fitting shuttle valve glad hand adapter arrangement 6300. In this embodiment, a shuttle valve 6310 connects a conventional, trailer-side glad hand assembly 6320 and a pair of truck-side ports 6330 and 6340. The ports 6330 and 6340 each extend with a respective right-angle elbow 6332 and 6342 from the shuttle valve 6310, which defines a T-connection in this embodiment. It should be clear that a wide range of geometric arrangements can be employed in alternate embodiments to orient the ports appropriately and/or provide desired positioning/spacing. The port 6330 is a conventional glad hand connector for manual attachment of an OTR connection as described above. The other port 6340 is arranged with a quick-disconnect nipple 6344 for use with the above-described tools. The nipple 6344 in this embodiment is mounted on the end of a spring-wrapped tube 6346 for compliance.

Figure 64:
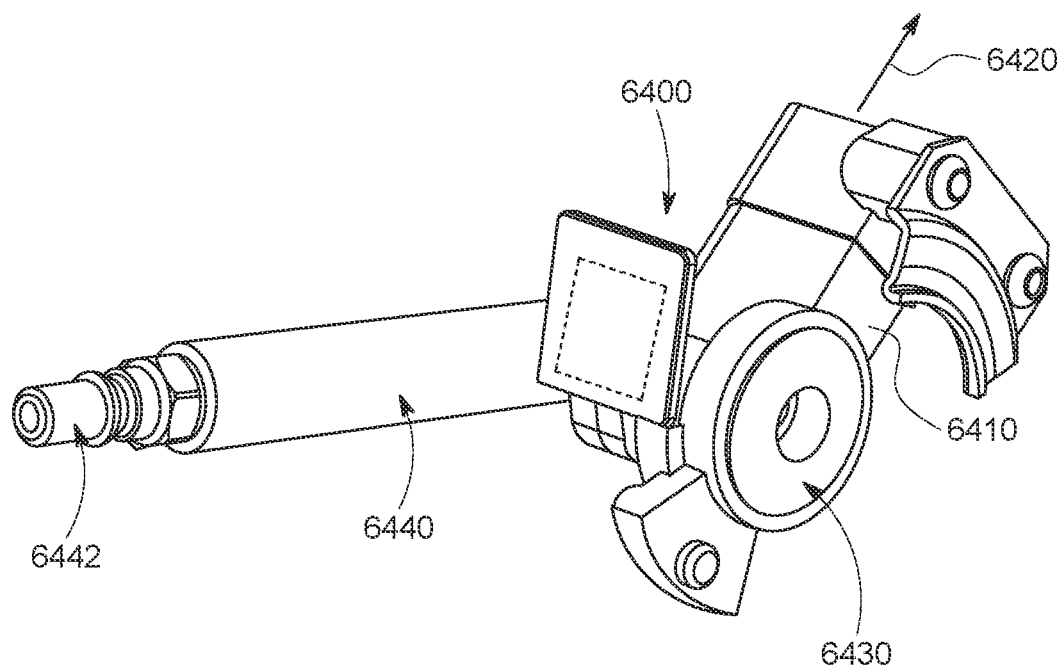
FIG. 64 is a perspective view of an autonomous-operation-favored glad hand adapter for direct connection to the trailer-side airline, that also allows for manual interconnection of a truck-side glad hand connector and employs an integrated shuttle valve with dual-port, truck-side connectors, according to an embodiment.

FIG. 64 shows an arrangement 6400 that includes an integrated shuttle valve 6410. As shown, the shuttle valve is integrally constructed directly into the backside of a standard glad hand connection geometry. The shuttle valve allows pressurized air to flow through the rear outlet (arrow 6420) from either the glad hand base 6430 or an autonomous port 6440 (shown with a quick-disconnect nipple 6442 as described above). This arrangement 6400 can provide both autonomous and standard connection mechanisms to a trailer with a relatively small form factor, and without (free of) use of a separate glad hand adapter. Instead, the integrated glad hand can be permanently fitted to the trailer at the outlet (6420), and the trailer is, thus, outfitted for both OTR and autonomous connections.

Figure 65:
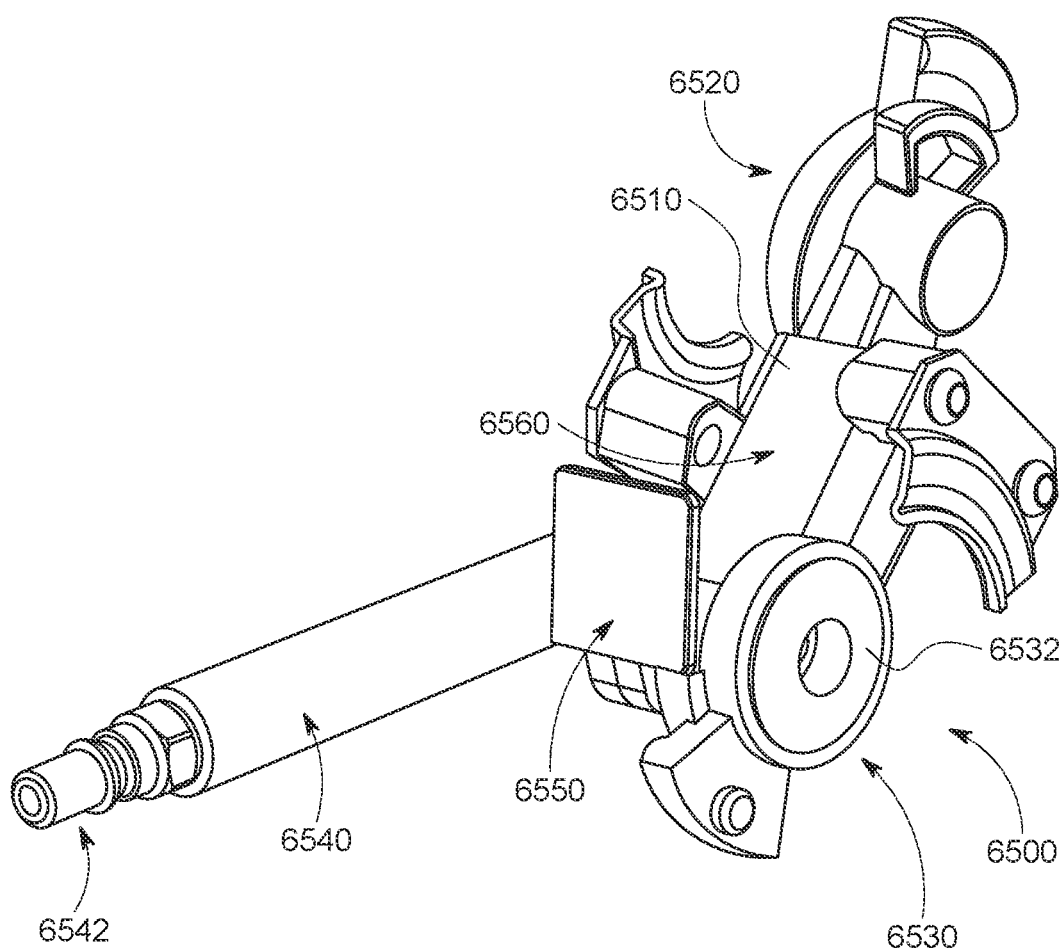
FIG. 65 is a perspective view of an autonomous-operation-favored glad hand adapter for connection to the trailer-side glad hand connection, that also allows for manual interconnection of a truck-side glad hand connector and employs an integrated shuttle valve with dual-port, truck-side connectors, according to an embodiment.

FIG. 65 shows another glad hand adapter arrangement 6500 having an integrated shuttle valve 6510. Unlike the embodiment of FIG. 64, this arrangement 6500 does not dictate direct replacement of a stock trailer glad hand. Rather this adapter arrangement 6500 employs a trailer-side glad hand 6520, which can be semi-permanently attached to the trailer glad hand connection. It is interconnected via the integral shuttle valve 6510 to a pair of ports 6530 and 6540. The valve selectively routes pressurized air to the trailer-side glad hand 6520 from the connected port. As described above, the ports include a conventional truck side glad hand connector 6532 and a tool-engaged autonomous (e.g. nipple) connector 6542. A fiducial-carrying plate 6550 is also provided on the arrangement housing 6560, where it can be imaged by the autonomous manipulator system.

Figure 66:
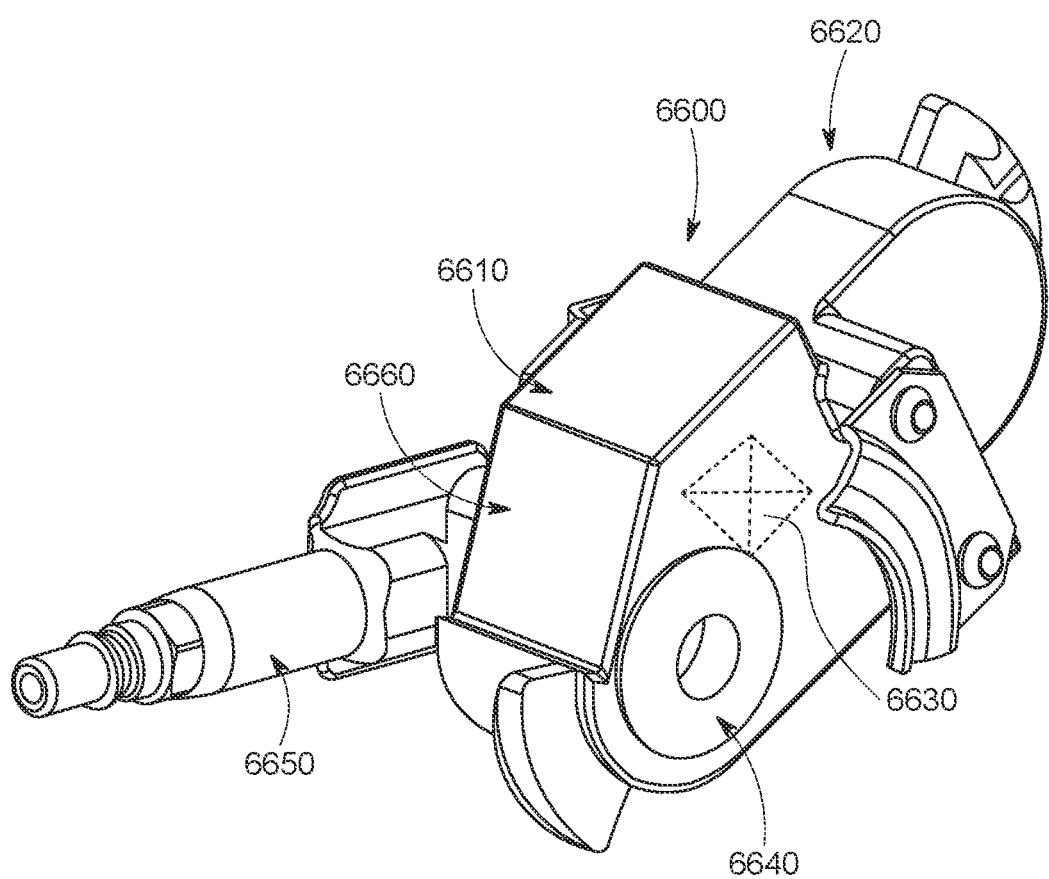
FIG. 66 is a perspective view of an autonomous-operation-favored glad hand adapter for connection to the trailer-side glad hand connection, that also allows for manual interconnection of a truck-side glad hand connector and employs an integrated shuttle valve in a machinable housing with dual-port, truck-side connectors, according to an embodiment.

FIG. 66 shows another exemplary embodiment of a glad hand adapter arrangement 6600 with a housing 6610 that is constructed in a machinable configuration. It includes a trailer-side glad hand connection that is fed via an integrated shuttle valve 6630 (shown schematically in phantom within the machined housing 6610). The shuttle valve 6630 allows wither the conventional, truck-side glad hand connection 6640 or the autonomous connection 6650 to deliver pressurized air to the trailer airline via the trailer-side glad hand 6620. A fiducial carrying panel 6660 can be provided on the front side of the housing 6610.

J. Clamping Tool into Adapter

Figure 67:
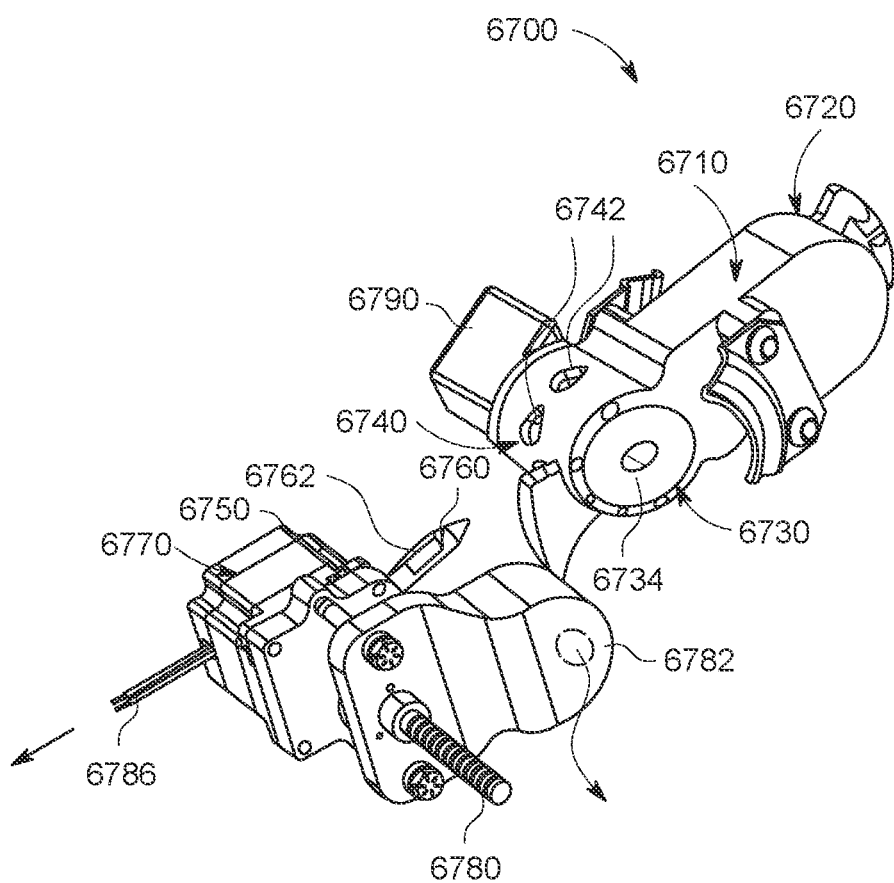
FIG. 67 is a perspective view of an autonomous-operation-favored glad hand adapter for connection to the trailer-side glad hand connection, that also allows for manual interconnection of a truck-side glad hand connector, and that employs a key-guided clamping tool having a lead screw driven clamping member for sealing against the truck-side glad hand connector, according to an embodiment, shown prior to engagement.
Figure 68:
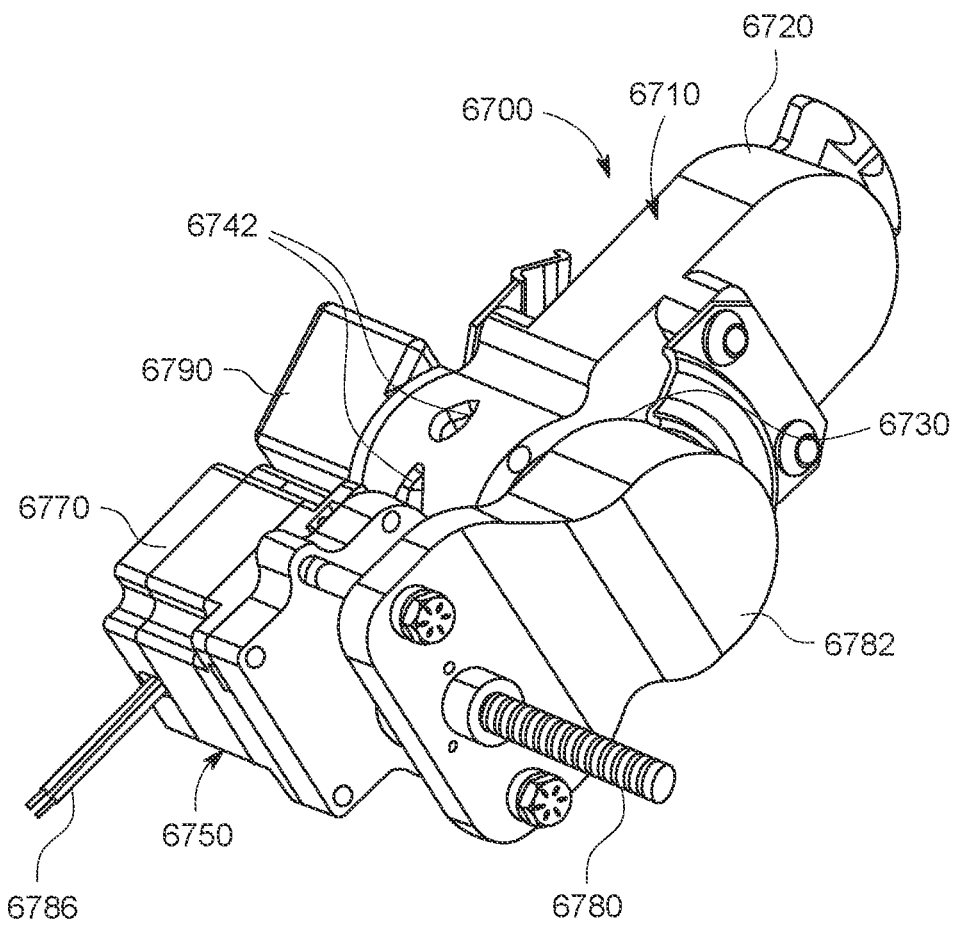
FIG. 68 is a perspective view of the arrangement of FIG. 67 shown after engagement.
Figure 69:
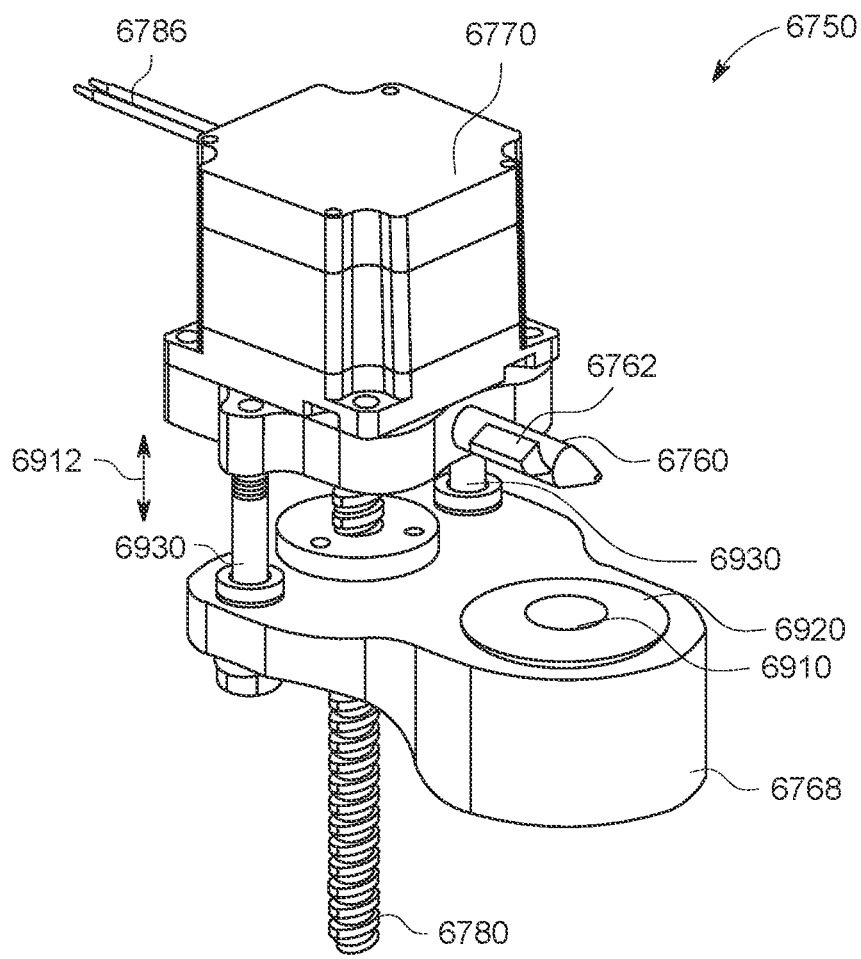
FIG. 69 is a perspective view of the clamping tool of FIG. 67 shown in a opened, un-clamped position.

According to an exemplary embodiment, an autonomous connection (nipple) and associated shuttle valve is omitted in the arrangement 6700 of FIGS. 67-69. This adapter arrangement 6700 defines a housing 6710 with a machinable design, and a trailer-side glad hand connection 6720 that can be semi-permanently attached to the trailer glad hand. A truck side glad hand connection 6730 is also provided to the housing 6710. The glad hand connection 6730 defines a cylindrical base 6740 with multiple alignment holes 6782, which allow a clamping tool 6750 to approach at various angles.

As shown particularly in FIG. 69, the clamping tool 6750 includes an alignment pin 6760 that projects from a motorized base 6770. The base 6750 can be adapted for carrying by, and release from, a robotic manipulator. The alignment pin 6760 has a vane 6762 that is sloped at its front so as to assist in aligning the base 6760 with the glad hand cylindrical base 6740. The holes 6742 each define a conforming shape (e.g. la teardrop-shaped keyway) that guides the pin and vane into proper alignment when the tool 6750 is brought into engagement with the glad hand base 6740.

The clamping tool 6750 is shown engaged with the truck-side adapter glad hand 6730 in FIG. 68. A lead screw 6780, driven by the motorized base, moves the clamp member 6782 toward and away from the glad hand seal 6734. A variety of linear actuators can be used to move the clamp member 6782. In an embodiment, NEMA 23 stepper motor provides sufficient force to make a seal. A pair of bolts, mounted into the motorized clamp base 6770 provide guideways for the clamping member 6782 and it is driven linearly (double-arrow 6912 in FIG. 69) by the lead screw 6780. The motor base 6770 receives power via leads 6786 and the clamping member is pressurized by the truck airline, with pressurized air routed through the member 6782 to a port 6910, surrounded by an appropriate glad hand seal 6920 (FIG. 69). As in other embodiments, the housing 6710 can include a fiducial-carrying plate 6790 to help identify the adapter arrangement 6700 and guide a manipulator carrying the clamping tool into engagement with the arrangement. Clamping can occur when the system confirms (via impulse, etc.) that the tool 6750 is firmly seated with respect to the glad hand base 6740, after which, the manipulator is released from the tool. Unclamping can occur when the manipulator firmly re-engages the tool 6750, after which, the manipulator and tool are withdrawn to a neutral location so that the trailer can be unhitched in accordance with the general description herein.

K. Automated Trailer Angle Detection

When hauling a trailer, it is desirable to determine the orientation (relative angle) of the trailer with respect the tractor. Traditionally, the orientation and perspective of the front face of trailer is observed by a human driver to derive the approximate angle measurement. However, due to the variability in the front face's surface (due to the presence of refrigeration units, fairings, etc.), this approach is less effective using automated sensors, such as visual cameras, conventional LIDAR, etc. However, the commercial availability of so-called high-resolution LIDAR affords more capability in automating the relative trailer angle determination process. Such a high-resolution solution is commercially available from Velodyne LiDAR, Inc. of San Jose, CA in the form of the VLS-128™ system, which is presently considered one of the world's highest-resolution LiDAR for use in (e.g.) autonomous vehicles and similar applications. This system uses 128 discrete structured light (laser) beams to derive a 3D surface contour/shape at a significant working distance. These beams can be arranged in projected concentric rings. Other competing high-resolution LIDAR devices and also be employed herein, as well as alternate 3D sensing systems, which can include stereoscopic cameras, etc.

Figure 70:
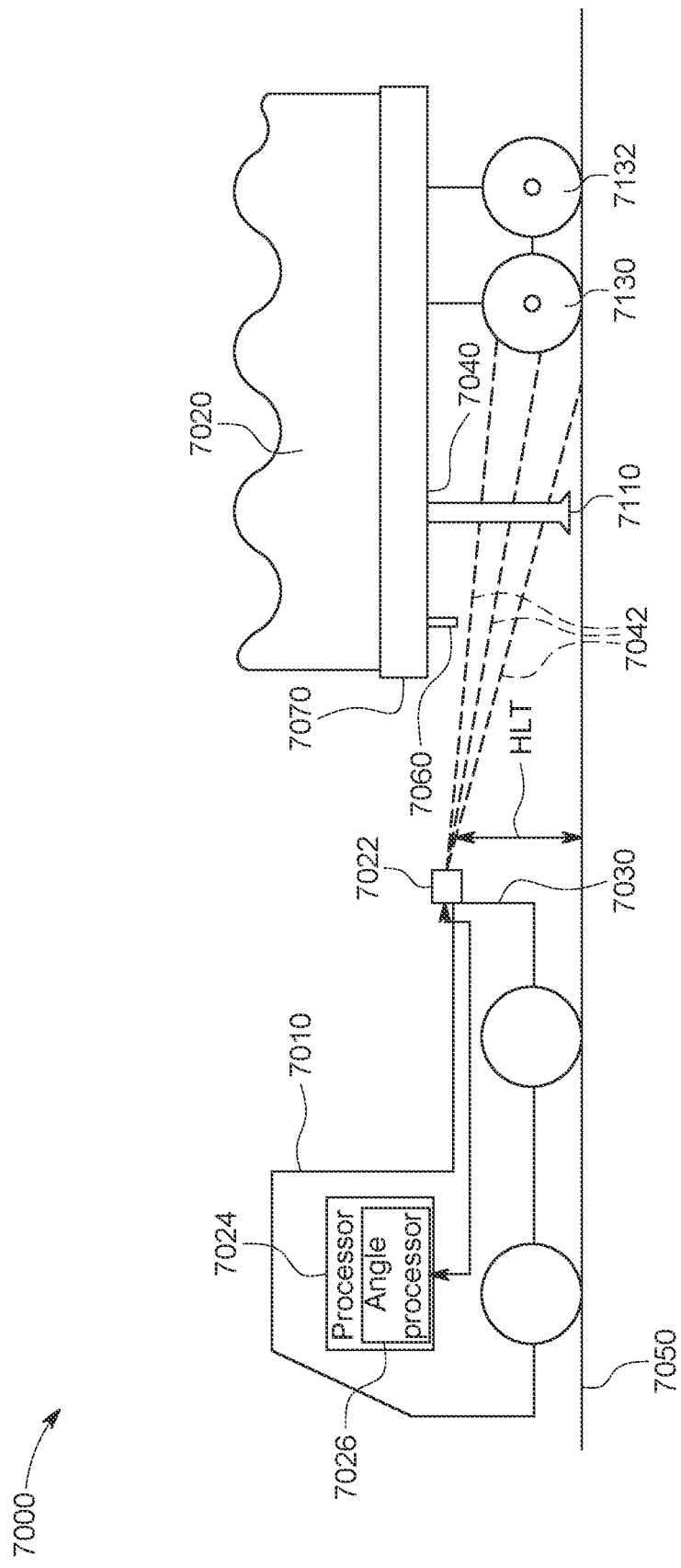
FIG. 70 is a side view of an autonomous (e.g. yard) truck and trailer, arranged to allow hitching thereof together using a truck-rear-mounted high-resolution LIDAR device and associated process(or) that locates and determines the relative angle of the trailer (centerline) with respect to the truck.
Figure 71:
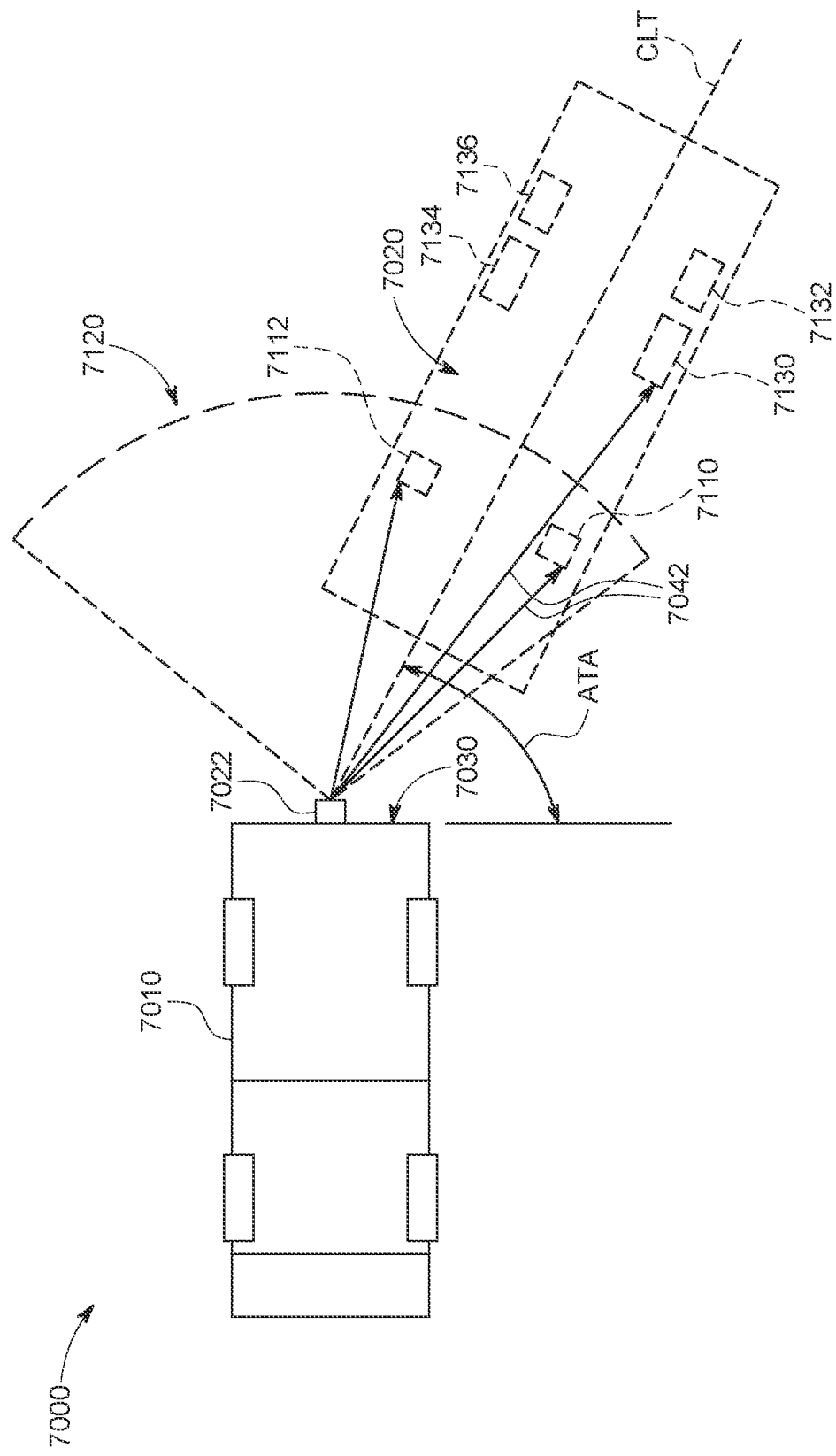
FIG. 71 is a top view of the truck and trailer arrangement of FIG. 69 showing locations of trailer landing gear and wheel sets with respect to the beam pattern of the rear-mounted LIDAR device.

FIGS. 70 and 71 show an arrangement 7000 of an autonomous (e.g. yard) truck 7010 and unhitched trailer 7020 to detect the relative trailer angle ATA, shown herein between the plane of a rear chassis (e.g. bumper 7030) of the truck 7010 and the centerline CLT of the trailer 7020. Illustratively, this arrangement 7000 includes a LIDAR device 7022 mounted on the truck rear chassis/bumper 7030, facing rearwardly toward the trailer. In operation, the LIDAR device 7022 communicates with a processor 7024, which can be part of the vehicle CPU, and includes an angle determination process(or) 7026. The process(or) 7026 detects the position and orientation of the (e.g.) two landing-gear legs 7110 and 7112 on the trailer 7020 in order to estimate the trailer's angle ATA relative to the rear 7030 of the truck 7010. The LIDAR device 7022 defines a working angle range 7120 that is sufficient to capture the legs 7110 and 7112 within the range of expected trailer angles ATA to be encountered during operation. As shown, the LIDAR beam(s) can also acquire the fronts of at least one of the wheel set(s) 7130, 7132, 7134 and 7136. The height HLT (FIG. 89) between the LIDAR device 7122 and the ground 7050 is chosen to allow its beams 7042 to travel sufficiently beneath the trailer underside 7040 to reach the landing gear legs 7110 and 7112, and potentially, the tire set(s) 7130, 7132, 7134 and 7136. Because the legs 7110 and 7112 and (optionally) the tires are positioned at known parallel orientation across the width/beam on either side of the trailer 7120, and these structures have distinctive surface shapes, they can be used as a reference to determine the relative angle ATA with respect to the truck and associated LIDAR unit (and the truck coordinate system established by the process(or) 7026).

Figure 72:
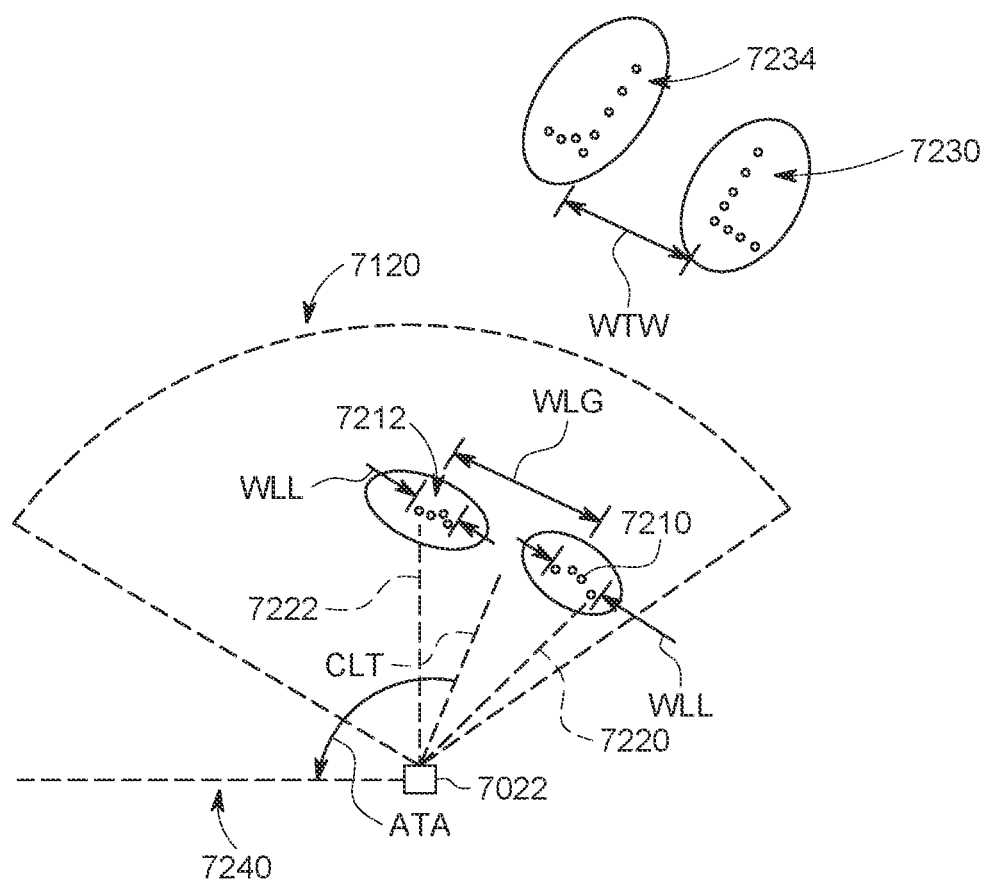
FIG. 72 is a top view of the LIDAR-device-scanned area of the trailer of FIGS. 70 and 71, showing point groups representative of landing gear legs and wheels, used in determining the relative trailer angle.

In operation, and with further reference to FIG. 72, the process(or) 7026 analyzes at least one of the rings in the transmitted LIDAR data from the trailer scan to search for groups of points 7210, 7212 where the overall group is roughly the width WLL of a respective landing gear leg. The process(or) 7026, then compares all groups to look for pairs of groups which are roughly equidistant from the trailer kingpin point 7060, and where the separation distance WLG between the two groups 7210, 7212 is roughly the width of a trailer. For pairs that match the criteria, the process(or) 7026 estimates the trailer angle ATA (taken with respect to a line 7240 parallel to the truck bumper) as the angle that bisects the two vectors (outside angles) 7220, 7222 from the truck/trailer hitch point to the opposing outer edges of the two point groups 7210 and 7212.

Figure 73:
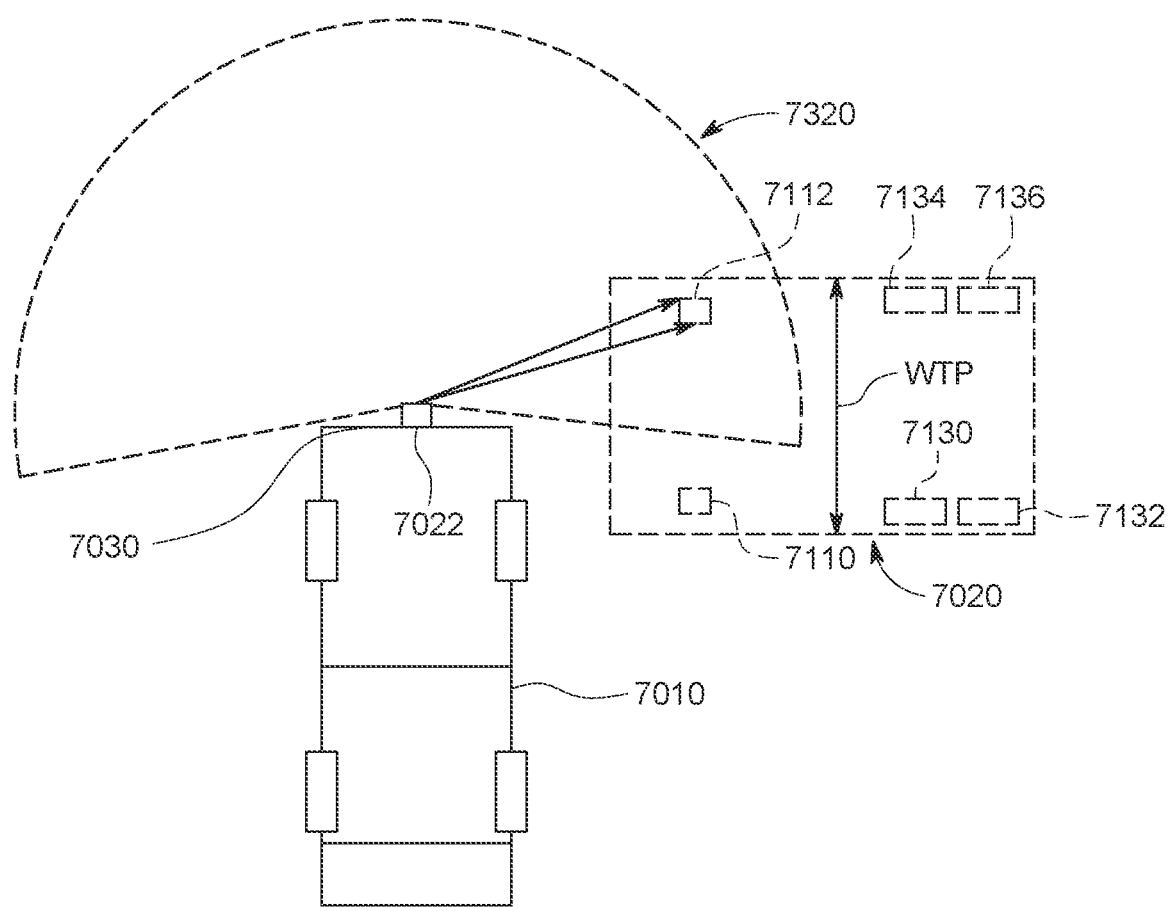
FIG. 73 is a top view of the truck and trailer arrangement of FIGS. 70 and 71 being scanned by the LIDAR device beams where the trailer centerline is oriented at an approximate right angle to the central axis of the beam cone/truck centerline, in which one trailer landing gear leg is occluded from view.

At extreme relative angles between the truck and trailer, one of the landing gear legs 7110, 7112 can be occluded from the LIDAR sensor's view (e.g. the occluded leg may be in front of the rear bumper due to the extreme angle). This condition is shown by way of example in FIG. 73, in which the landing gear leg 7112 of the trailer 7020 is visible within the maximum sensing fan (cone) 7320 of the LIDAR device 7022, but the opposing leg 7110 is outside the cone (positioned in front of the bumper 7130), and occluded. If no point pairs representative of landing gear legs are found, and if a single group of points is detected (e.g. points corresponding to leg 7112) in the area where the other leg would be expected to be occluded (as that leg is now at an extreme left or right position), then the process(or) 7026 uses a predefined trailer width WTP to estimate the location of the occluded leg 7110. The process(or) 7026 then uses the sensed location of the found leg 7112 and an estimated location for the occluded leg 7110 as an approximated pair for the purposed of the above-described procedure. It then uses this pair to estimate the trailer angle as the angle that bisects the two vectors from the kingpin to the outer edges of the two legs in the approximated pair.

Note that in certain situations, an additional step of providing a linear quadratic estimate (e.g. Kalman filtering) can be employed in order to smooth the output and improve robustness of the trailer angle determination procedure described above.

With reference again to FIG. 70, in a further embodiment, it can be useful to confirm trailer angle ATA, or improve trailer angle accuracy. The procedure can employ the use of the lower outer edges 7070 of the leading edge of the trailer 7020. This procedure can be accomplished by processing the received, upper LIDAR rings to detect the outer edges of the trailer and can be useful in confirming results from the landing gear detection, or in eliminating false positives if the landing-gear detection procedure returns more than one solution.

In another embodiment, and with reference again to FIG. 72, the LIDAR device can be used to detect the trailer wheels 7130 and 7134 by locating corresponding points 7230 and 7234. This data can be used to confirm, and/or refine the accuracy of, the angle determined using detection of the landing gear, or if the landing gear detection is not conclusive, the location of the wheels can be used to independently establish the trailer angle. The (stored) typical width WTW between (e.g.) the inside edges can be compared to sensed width to establish that the groups of points are wheels and angles can be computed in a manner similar to that described above for landing gear.

L. Automated Kingpin Detection

Figure 74:
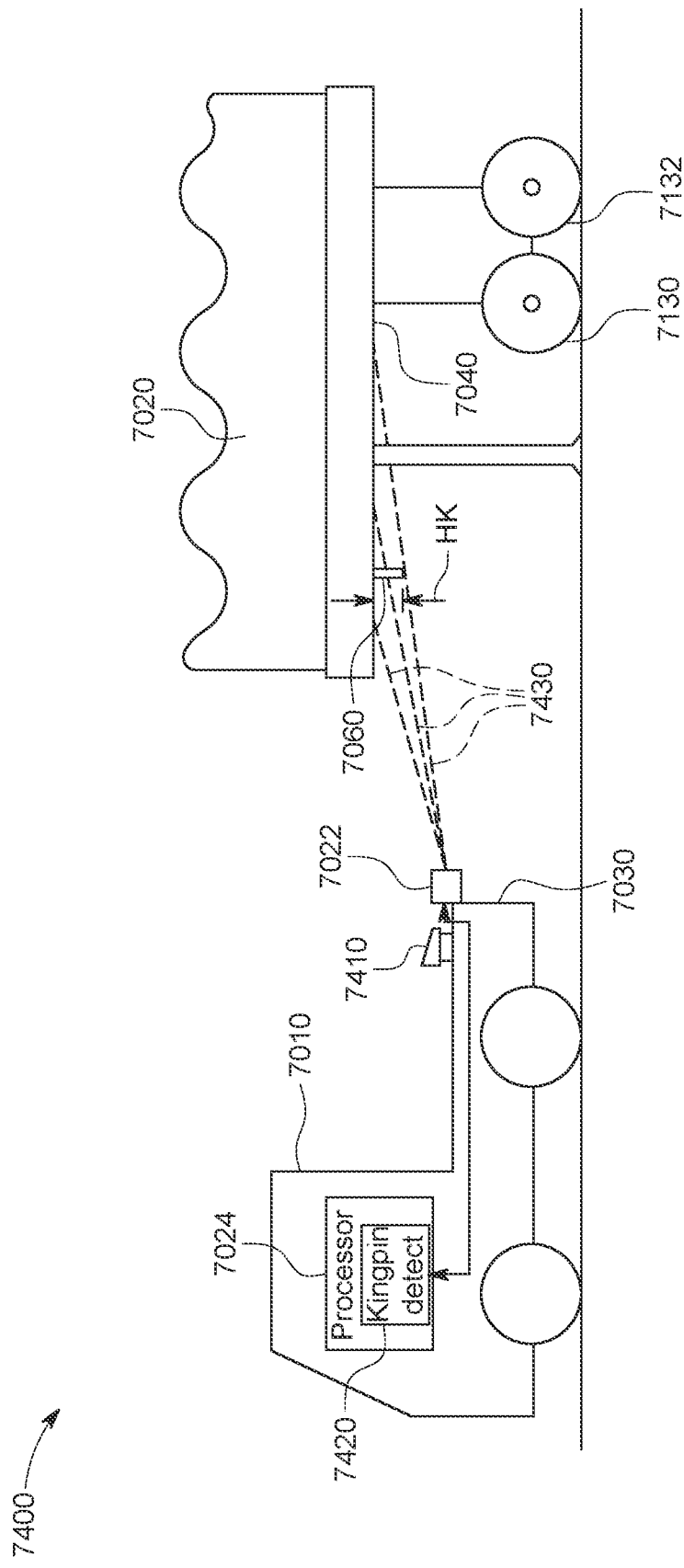
FIG. 74 is a side view of an autonomous (e.g. yard) truck and trailer, arranged to allow hitching thereof together using a truck-rear-mounted high-resolution LIDAR device and associated process(or) that locates and determines the position of the trailer kingpin used to hitch to the truck fifth wheel.
Figure 75:
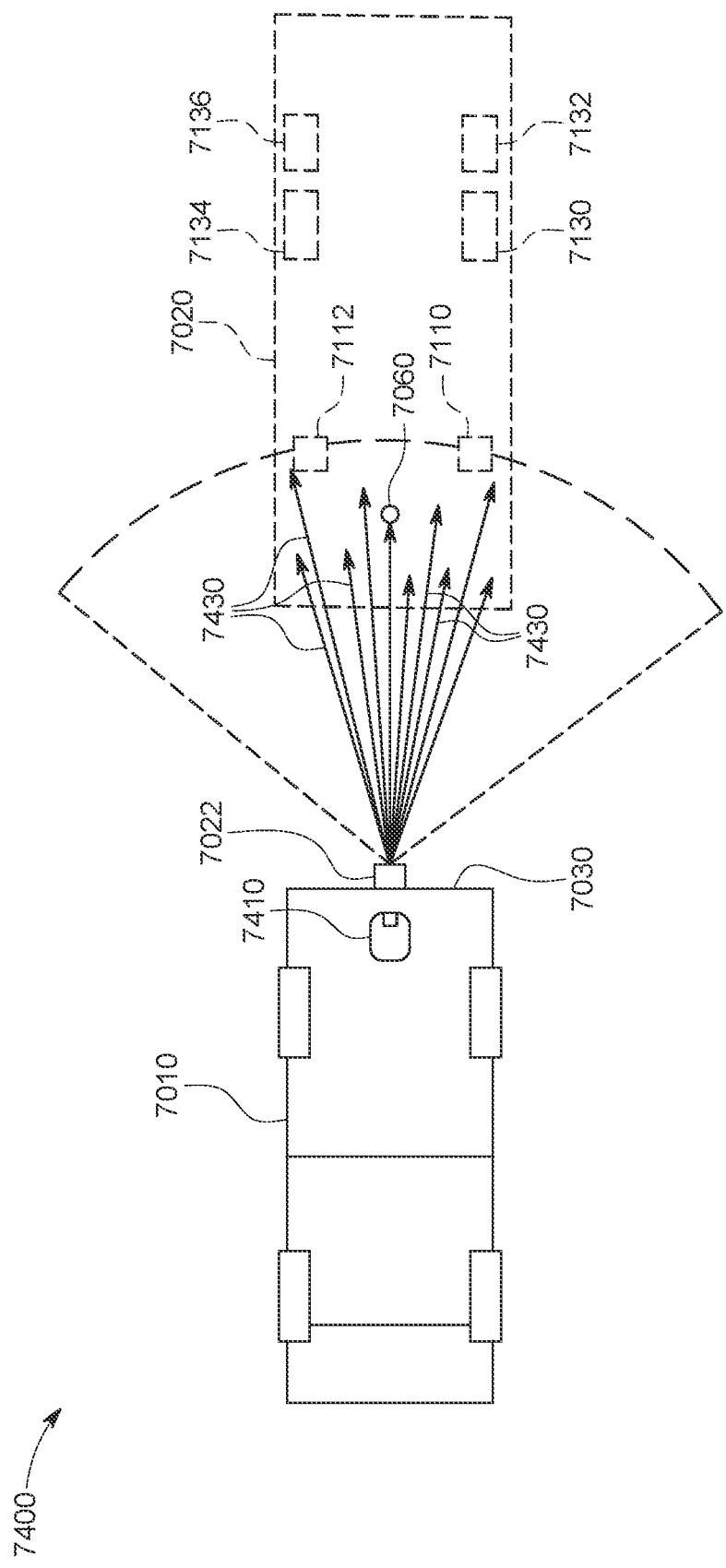
FIG. 75 is a top view of the truck and trailer arrangement of FIG. 74 showing locations of trailer kingpin, landing gear and wheel sets with respect to the beam pattern of the rear-mounted LIDAR device.

Reference is made to FIGS. 74 and 75 that depicts a system and method to further assist in the retrieval of a trailer by an autonomous truck. In performing this operation, the system and method employs the approximate location of the trailer, which can be obtained by visual sensing and/or other techniques as described herein. The system and method of this embodiment generally allows the truck to be able to back down and connect to the trailer successfully. This embodiment can employ the above-described LIDAR device 7022 (in FIGS. 70-73). Other like reference numbers are also employed in the depiction of FIGS. 74 and 75 where they apply to similar or identical structures/components.

The system and method, more particularly, allows for proper connection of the truck fifth wheel 7410 to the trailer kingpin 7460 in a backing operation. It employs a kingpin location detection and determination process(or) 7420, which can be part of the overall vehicle processor/CPU 7024, and is interconnected to the LIDAR device and any resident processes/ors instantiated thereon (or associated therewith). Using the system-provided trailer location, the truck 7010 is positioned adjacent to the trailer 7020, and the reversing procedure is then initiated to connect the truck and trailer. During this process it is highly desirable to accurately determine the relative position of the trailer kingpin 7060. While the kingpin 7060 is a relatively small structure on the overall trailer underside 7040, using a LIDAR device 7022 mounted on a truck's back bumper 7030, it is uniquely identifiable as an image feature set produced by the beams 7430 of the LIDAR device 7022.

Figure 76:
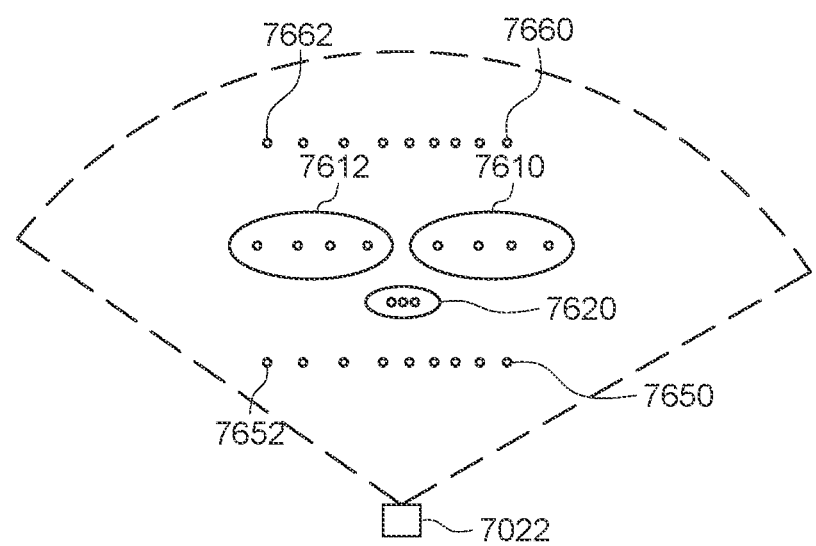
FIG. 76 is a top view of the LIDAR-device-scanned area of the trailer of FIGS. 74 and 75, showing point groups representative of the kingpin and landing gear legs, used in determining the position of the kingpin within the vehicle/navigation coordinate space.
Figure 77:
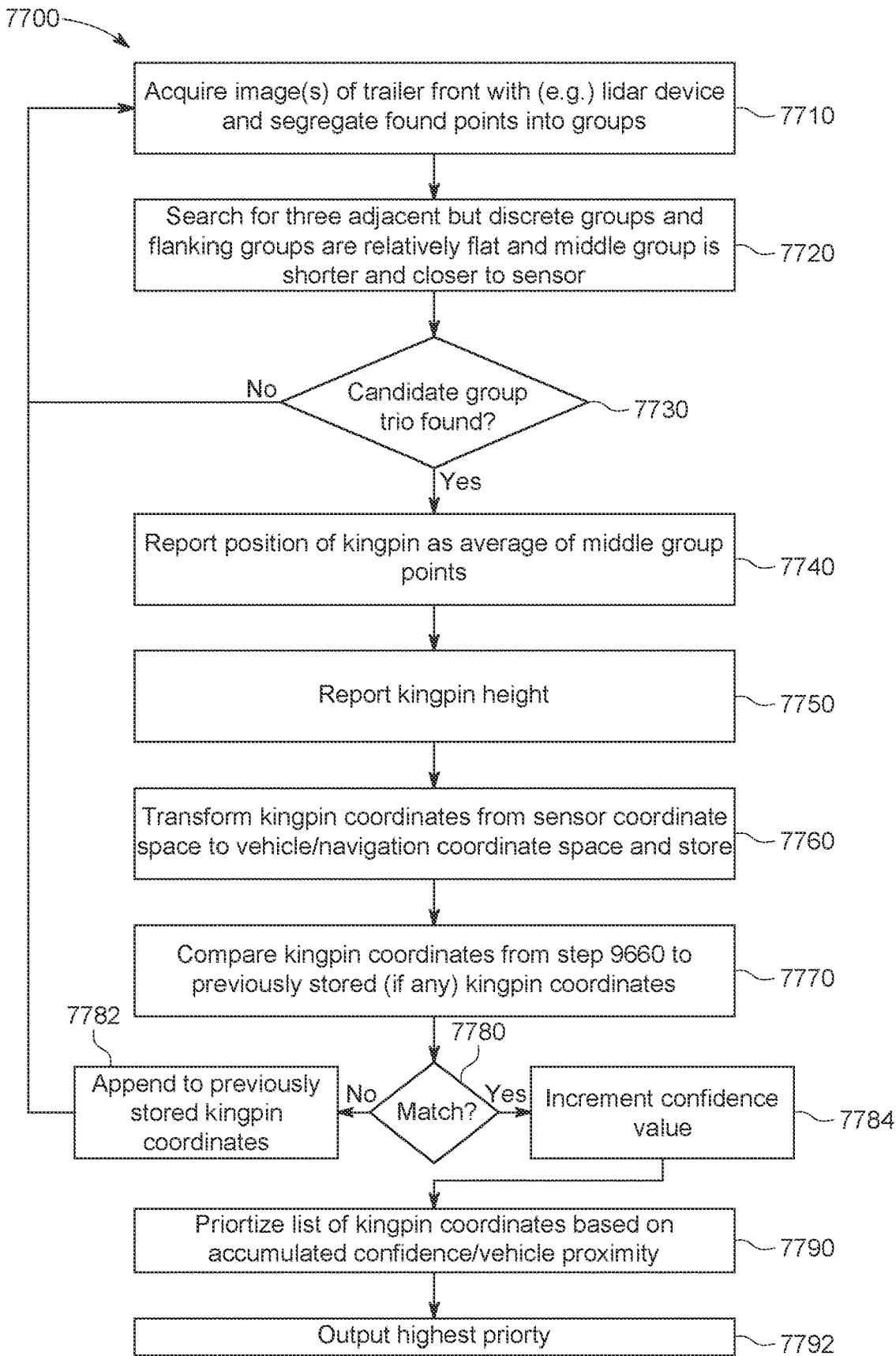
FIG. 77 is a flow diagram showing a procedure for identifying and determining the position of the trailer kingpin using the LIDAR device in accordance with FIGS. 74-76.

According to an embodiment, and with further reference to FIG. 76 and the flow diagram of FIG. 77, a procedure 7700 for accurately determining the location of the trailer kingpin 7060 is shown. The procedure 7700 processes (e.g. using the process(or) 7420) each of the LIDAR rings independently and segregates the found points into groups (step 7710). The procedure 7700 then searches for three discrete groups of points 7610, 7612 and 7620 that are separate, but relatively adjacent (within a predetermined threshold), and where the middle group 7620 is closer to the sensor 7022 than the other two (flanking) groups 7610 and 7612 (step 7720).

Step 7720 of the procedure 7700 then further eliminates trios of groups where the flanking groups 7610 and 7612 are not relatively flat and at roughly the same height, and/or where the middle group is significantly wider or taller than the expected width/height of a kingpin. If a trio of groups matches all criteria (decision step 7730), then the procedure 7700 estimates the x, y (or another coordinate system) position of the kingpin as the average of all the point hits in the middle group 7620 (step 7740). The procedure 7700 also reports the kingpin plate height (minimum height of the flanking groups 7610, 7612) HK (FIG. 74) so that the system will have a metric as to how high to raise the fifth wheel 74 (step 7750). The procedure 7700 then transforms the x, y position from the sensor coordinate space to the navigation/vehicle coordinate space (step 7760). The procedure 7760 then compares the x, y position with the coordinates of any previous detections (step 7770). If there is no match (decision step 7780), then the new x, y position is appended to the list of previous detections (step 7782), and the procedure 7700 continues to search (via steps 7710-7770). However, if there is a match (decision step 7780), then the confidence in the matched detection is incremented to increase its value (step 7784). Based upon incrementing of the confidence value in step 7784, the procedure 7700 prioritizes the list of previous detections using the accumulated confidence, as well as proximity to the vehicle (step 7790). After prioritizing in step 7790, the procedure 7700 outputs detection that has the highest priority for use to guide the backing operation of the truck onto the trailer via the navigation coordinate space.

In an alternate, related embodiment, the system and method employs the above-described trailer angle determination procedure (FIGS. 70-73) which detects the location of the trailer landing gear legs 7110 and 7112. Once both of the landing gear legs have been identified and located, the location of the kingpin 7060 can be estimated based on known/standard trailer geometry, typically expressed in terms of an x, y coordinate relationship between (e.g. centroids). This estimated location is translated into the vehicle/navigation coordinate space. As shown in FIG. 76, the outer edges 7650, 7652, 7660 and 7662 are identified in related point groups that span the width of the trailer underside/sides, and can also be the basis of a trailer angle determination.

V. Conclusion

It should be clear that the above-described system and method of handling and managing trailers within a shipping yard and the associated devices and operational techniques for autonomous AV yard trucks provides an effective way to reduce human intervention, thereby lowering costs, potentially increasing safety and reducing downtime. The systems and methods herein are practically applicable to a wide range of both electric and fuel-powered trucks and any commercially available trailer arrangement. More particularly, the systems and methods herein effectively enable automation of critical yard operations, such as connection of one or more pneumatic and electrical lines between truck and trailer, unlatching and opening of trailer doors, safe hitching, navigation and docking of trailers with loading bays and docks, maintaining security at the dock and within the vehicle against unauthorized operations and/or users, and other aspects of autonomous vehicle operation. Such systems also enhance operations in container yards, and in other busy yard environments where reverse direction may be a concern and ensuring safety of parked vehicles is a consideration. These novel systems, methods and operations, while adapted to use on AV yard trucks can also benefit other types of automated transport vehicles, and it is contemplated that, using skill in the art, such can be extended to a wide range of non-yard-based and/or OTR vehicles.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub—processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, qualifying terms such as "substantially" and "approximately" are contemplated to allow fort a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A method for connecting service lines between a truck and trailer comprising the steps of:
controlling a robotic manipulator, tied to a processor, mounted on the truck, the robotic manipulator including an end effector that removably engages a first connector arrangement tied to a service line on the truck adapted to engage a second connector arrangement tied to a service line on the trailer;
acquiring images of the second connector arrangement with a camera assembly associated with the robotic manipulator and communicating with the processor;
moving the robotic manipulator to align the first connector arrangement with the second connector arrangement based upon pose or position information derived from the acquired images by the processor;
moving the robotic manipulator to join the first connector arrangement to the second connector arrangement so as to complete a service line circuit between the truck and the trailer; and
disengaging the end effector from the first connector arrangement and withdrawing the robotic manipulator therefrom.

2. The method as set forth in claim 1, wherein the first connector arrangement and the second connector arrangement both comprise at least one of a pneumatic system connector and an electrical connector.

3. The method as set forth in claim 2, wherein the pneumatic system connector comprises a glad hand.

4. The method as set forth in claim 3, wherein the step of moving the robotic manipulator to join the first connector arrangement to the second connector arrangement includes removably attaching an adaptor to the glad hand on the trailer, wherein the truck pneumatic system is connected to the connection tool.

5. The method as set forth in claim 4, wherein the step of moving the robotic manipulator to join the first connector arrangement to the second connector arrangement includes connecting a connector from the truck pneumatic system to the adaptor.

6. The method as set forth in claim 5, wherein the adaptor includes a gripper assembly that removably engages the glad hand on the trailer to complete the service line circuit.

7. The method as set forth in claim 5, wherein the step of connecting includes guiding the robotic manipulator based upon a fiducial provided on the adaptor.

8. The method as set forth in claim 1, wherein the end effector is mounted on at least one of (a) a framework moving along at least two orthogonal axes and having a rearwardly extending arm, (b) a multi-degree-of-freedom robot arm, and (c) a linear-actuator-driven arm with pivoting joints to allow for concurrent rearward extension and height adjustment.

9. A method for operation of an autonomous vehicle (AV) yard truck in a yard environment comprising:
facilitating, with a processor, autonomous movement of the AV yard truck, substantially free of human user control inputs to onboard controls of the truck, and connection to and disconnection from trailers in the yard;

sensing, with a plurality of sensors located on the yard truck that are interconnected with the processor, terrain and objects in the yard and assist in automatically connecting to and disconnecting from a trailer;

communicating with a server that is interconnected wirelessly with the processor, including tracking movement of the AV yard truck around the yard and determining locations for connecting to and disconnecting from the trailer; and connecting, with a robotic manipulator located on the yard truck that is responsive to the processor, at least one of an airline and an electrical line on the trailer to a respective airline and an electrical line on the trailer.

10. The method as set forth in claim 9, further comprising, supplying air pressure to the connected trailer to release pneumatic brakes on the trailer via the airline.

11. The method as set forth in claim 10, wherein the step of connecting includes providing the robotic manipulator with an end effector and a connector arrangement having a first side configured to face a trailer and a second side opposite the first side, the connector arrangement comprising a first glad hand on the first side and configured to be attached to a trailer glad hand adapted to be interconnected the airline.

12. The method as set forth in claim 11, further comprising, removably engaging the end effector of the robotic manipulator with a gripper interface on the second side.

13. The method as set forth in claim 12, moving in response to a position or pose of the trailer glad hand, the robotic manipulator to align and engage the connector arrangement with the trailer glad hand so as to complete the pneumatic connection circuit between the truck and the trailer.

14. The system as set forth in claim 13, further comprising, locating a fiducial between the trailer glad hand and the gripper interface and a camera sensor, and guiding the end effector based upon the fiducial.

15. The method as set forth in claim 14, wherein the fiducial includes one or more ID code(s).

16. The method as set forth in claim 9, wherein the robotic manipulator includes an end effector is mounted on at least one of (a) a framework moving along at least two orthogonal axes and having a rearwardly extending arm, (b) a multi-degree-of-freedom robot arm, and (c) a linear-actuator-driven arm with pivoting joints to allow for concurrent rearward extension and height adjustment.

17. A method, comprising the steps of:
controlling, with a processor, a robotic manipulator having an end effector;
removably attaching to a trailer glad hand, a connector arrangement having a first side configured to face a trailer and a second side opposite the first side, the connector arrangement comprising a first glad hand on the first side and a tool-engaged autonomous connector on the second side;
acquiring images of features relative to the trailer to guide movement of the robotic manipulator toward the connector arrangement; and
in response to a position or pose of the features, moving the robotic manipulator to align a truck-based pneumatic line with the tool-engaged autonomous connector.

18. The method as set forth in claim 17, wherein the step of acquiring images includes acquiring images a fiducial-bearing plate between the first side and the second side.

19. The method of claim 17, wherein the connector arrangement comprises one of:
a modified glad-hand;
a modified glad-hand including a sliding metal sheet retainer configured to ride on a rail; or
an adapter arrangement configured to engage with a glad hand adapter connection tool.

20. The method as set forth claim 17, wherein the tool-engaged autonomous connector comprises a nipple.

21. The method as set forth in claim 17, wherein the end effector is mounted on at least one of (a) a framework moving along at least two orthogonal axes and having a rearwardly extending arm, (b) a multi-degree-of-freedom robot arm, and (c) a linear-actuator-driven arm with pivoting joints to allow for concurrent rearward extension and height adjustment.

22. The method as set forth in claim 17, wherein the pneumatic line is part of a brake system that includes at least one of a service brake and an emergency brake.

23. The method as set forth in claim 22, further comprising an electrical connection on the connector arrangement attached to the truck electrical system.

24. The method as set forth in claim 17, further comprising permanently or temporarily affixing a receiver to the trailer, the receiver interconnected with at least one of a pneumatic line and an electrical line.

25. The method as set forth in claim 24, further comprising, removably attaching the receiver to a front face of the trailer by at least one of an interengaging fabric material, fasteners, clamps and magnets.

26. An autonomous vehicle (AV) yard truck comprising:
a processor that facilitates autonomous movement of the AV yard truck, substantially free of human user control inputs to onboard controls of the truck, and connection to and disconnection from trailers in the yard;
a sensor arrangement located on the yard truck that is interconnected with the processor, and that senses terrain and objects in the yard and assist in automatically connecting to and disconnecting from a trailer,
wherein the processor is interconnected wirelessly with a server arranged to track movement of the AV yard truck around the yard and determine locations for connecting to and disconnecting from the trailer; and
a robotic manipulator located on the yard truck that is responsive to the processor, at least one of an airline and an electrical line on the trailer to a respective airline and an electrical line on the trailer.

27. The AV yard truck as set forth in claim 26, wherein the robotic manipulator includes an end effector and a connector arrangement having a first side configured to face a trailer and a second side opposite the first side, the connector arrangement comprising a first glad hand on the first side and configured to be attached to a trailer glad hand adapted to be interconnected the airline.

28. The AV yard truck as set forth in claim 27, wherein the end effector is adapted to removably engage a gripper interface on the second side.

29. The AV yard truck as set forth in claim 28, where in processor is adapted to move the robotic manipulator in response to a position or pose of the trailer glad hand to align and engage the connector arrangement with the trailer glad hand so as to complete the pneumatic connection circuit between the truck and the trailer.

30. The AV yard truck as set forth in claim 29, further comprising, a fiducial between the trailer glad hand and the gripper interface and a camera sensor, the end effector being guided with respect to the gripper interface based upon the fiducial.

31. The AV yard truck as set forth in claim 30, wherein the fiducial includes one or more ID code(s).

32. The AV truck as set forth in claim 26, wherein the robotic manipulator includes an end effector mounted on at least one of (a) a framework moving along at least two orthogonal axes and having a rearwardly extending arm, (b) a multi-degree-of-freedom robot arm, and (c) a linear-actuator-driven arm with pivoting joints to allow for concurrent rearward extension and height adjustment.

33. A device that connects service lines between a truck and trailer comprising the steps of:
 a robotic manipulator, tied to a processor, mounted on the truck, the robotic manipulator including an end effector that removably engages a first connector arrangement tied to a service line on the truck adapted to engage a second connector arrangement tied to a service line on the trailer; and
 a camera assembly that acquires images of the second connector arrangement, associated with the robotic manipulator, and that communicates with the processor,
 wherein the robotic manipulator is moved to align the first connector arrangement with the second connector arrangement based upon pose or position information derived from the acquired images, and
 wherein the robotic manipulator joins the first connector arrangement to the second connector arrangement so as to complete a service line circuit between the truck and the trailer, and then disengages the end effector from the first connector arrangement and withdraws the end effector therefrom.

34. The device as set forth in claim 33, wherein the first connector arrangement and the second connector arrangement both comprise at least one of a pneumatic system connector and an electrical connector.

35. The device as set forth in claim 34, wherein the pneumatic system connector comprises a glad hand.

36. The device as set forth in claim 35, wherein the first connector arrangement is removably attached to the second connector arrangement by an adaptor to the glad hand on the trailer, and wherein the truck pneumatic system is connected to the connection tool through the adaptor.

37. The device as set forth in claim 36, wherein the adaptor includes a gripper assembly that removably engages the glad hand on the trailer to complete the service line circuit.

38. The device as set forth in claim 36, further comprising a fiducial provided on the adaptor that is imaged by the camera assembly.

39. The device as set forth in claim 33, wherein the end effector is mounted on at least one of (a) a framework moving along at least two orthogonal axes and having a rearwardly extending arm, (b) a multi-degree-of-freedom robot arm, and (c) a linear-actuator-driven arm with pivoting joints to allow for concurrent rearward extension and height adjustment.

40. A device that connects a truck pneumatic line to a trailer comprising:
 a robotic manipulator, controlled by a processor, having an end effector;
 a connector arrangement, removably attached to a glad hand of the trailer, having a first side configured to face a trailer and a second side opposite the first side, the connector arrangement comprising a first glad hand on the first side and a tool-engaged autonomous connector on the second side;
 a sensor that senses features relative to the trailer to guide movement of the robotic manipulator toward the connector arrangement; and
 the processor adapted to move the robotic manipulator to align a truck-based pneumatic line with the tool-engaged autonomous connector in response to a position or pose of the features.

41. The device as set forth in claim 40, further comprising a fiducial-bearing plate between the first side and the second side.

42. The device as set forth in claim 40, wherein the connector arrangement comprises one of:
 a modified glad-hand;
 a modified glad-hand including a sliding metal sheet retainer configured to ride on a rail; or
 an adapter arrangement configured to engage with a glad hand adapter connection tool.

43. The device as set forth claim 40, wherein the tool-engaged autonomous connector comprises a nipple.

44. The device as set forth in claim 40, wherein the end effector is mounted on at least one of (a) a framework moving along at least two orthogonal axes and having a rearwardly extending arm, (b) a multi-degree-of-freedom robot arm, and (c) a linear-actuator-driven arm with pivoting joints to allow for concurrent rearward extension and height adjustment.

45. The device as set forth in claim 40, wherein the pneumatic line is part of a brake system that includes at least one of a service brake and an emergency brake.

46. The device as set forth in claim 40, further comprising an electrical connection on the connector arrangement attached to the truck electrical system.

* * * * *